(12) United States Patent
Goodson

(10) Patent No.: US 10,926,233 B2
(45) Date of Patent: Feb. 23, 2021

(54) BEVERAGE MIXING SYSTEM AND METHOD

(71) Applicant: Mark E. Goodson, Corinth, TX (US)

(72) Inventor: Mark E. Goodson, Corinth, TX (US)

(*) Notice: Subject to any disclaimer, the term of this patent is extended or adjusted under 35 U.S.C. 154(b) by 160 days.

(21) Appl. No.: 16/131,776

(22) Filed: Sep. 14, 2018

(65) Prior Publication Data

US 2019/0015803 A1  Jan. 17, 2019

Related U.S. Application Data

(63) Continuation-in-part of application No. 15/470,566, filed on Mar. 27, 2017, now Pat. No. 10,105,665, (Continued)

(51) Int. Cl.
 *A23G 9/04* (2006.01)
 *B01F 15/06* (2006.01)
 (Continued)

(52) U.S. Cl.
 CPC .......... *B01F 15/068* (2013.01); *A23G 9/045* (2013.01); *A23G 9/224* (2013.01); *A47J 43/042* (2013.01);
 (Continued)

(58) Field of Classification Search
 CPC .............. B01F 15/068; B01F 15/00181; B01F 15/00201; B01F 15/00253; B01F 7/00725;
 (Continued)

(56) References Cited

U.S. PATENT DOCUMENTS

| 3,127,155 A | 3/1964 | Geffcken |
| 4,678,881 A | 7/1987 | Griffith |
| (Continued) | | |

FOREIGN PATENT DOCUMENTS

| DE | 4403795 A1 | 8/1995 |
| EP | 0473313 A1 | 3/1992 |
| GB | 2541746 A | 3/2017 |

OTHER PUBLICATIONS

"Application Note AN-3004—Applications of Zero Voltage Crossing Optically Isolated Triac Drivers"; Fairchiled Semiconductor Corporation; Rev. 4.00, May 7, 2002; 12 pp.
(Continued)

*Primary Examiner* — Steven N Leff
(74) *Attorney, Agent, or Firm* — Jeffrey G. Degenfelder; Carstens & Cahoon, LLP

(57) ABSTRACT

A beverage mixing system/method allowing faster mixing/blending of frozen beverages is disclosed. The system/method in various embodiments utilizes inductive coupling to introduce heat into the frozen beverage during the mixing/blending process via a rotating driveshaft and attached mechanical agitator to speed the mixing/blending process. Exemplary embodiments may be configured to magnetically induce heat into the driveshaft and/or mechanical agitator mixing blade to affect this mixing/blending performance improvement. This heating effect may be augmented via the use of high power LED arrays aimed into the frozen slurry to provide additional heat input. The system/method may be applied with particular advantage to the mixing of ice cream type beverages and other viscous beverage products.

45 Claims, 96 Drawing Sheets

Related U.S. Application Data which is a continuation-in-part of application No. 13/751,745, filed on Jan. 28, 2013, now Pat. No. 9,610,553.

(60) Provisional application No. 61/663,348, filed on Jun. 22, 2012.

(51) Int. Cl.
| | |
|---|---|
| *A47J 43/042* | (2006.01) |
| *B01F 15/00* | (2006.01) |
| *A23G 9/22* | (2006.01) |
| *B01F 7/00* | (2006.01) |
| *B01F 7/22* | (2006.01) |

(52) U.S. Cl.
CPC .... *B01F 7/00725* (2013.01); *B01F 15/00181* (2013.01); *B01F 15/00201* (2013.01); *B01F 15/00253* (2013.01); *B01F 15/067* (2013.01); *B01F 7/22* (2013.01); *B01F 2015/062* (2013.01); *B01F 2215/0022* (2013.01)

(58) Field of Classification Search
CPC .................. B01F 7/22; B01F 2015/062; B01F 2215/0022; A23G 9/045; A23G 9/224; A47J 43/042

USPC ........................................................ 426/519

See application file for complete search history.

(56) References Cited

U.S. PATENT DOCUMENTS

| | | |
|---|---|---|
| 5,274,207 A | 12/1993 | Griffith |
| 5,412,171 A | 5/1995 | Yahav et al. |
| 6,402,365 B1 | 6/2002 | Wong |
| 6,504,136 B2 | 1/2003 | Snowball |
| 6,805,312 B2 | 10/2004 | Capp |
| 9,060,650 B2 | 6/2015 | de'Longhi |
| 9,107,533 B2 | 8/2015 | Volz et al. |
| 9,610,553 B2 | 4/2017 | Goodson |
| 2010/0326284 A1 | 12/2010 | Volz et al. |

OTHER PUBLICATIONS

"MOC3031M, MOC3032M, MOC3033M, MOC3041M, MOC3042M, MOC3043M—6-Pin DIP Zero-Cross Optoisolators Triac Driver Output (250/400 Volt Peak)"; Fairchild Semiconductor Corporation; Rev. 1.0.7; Sep. 2010; 10 pp.

FIG. 1
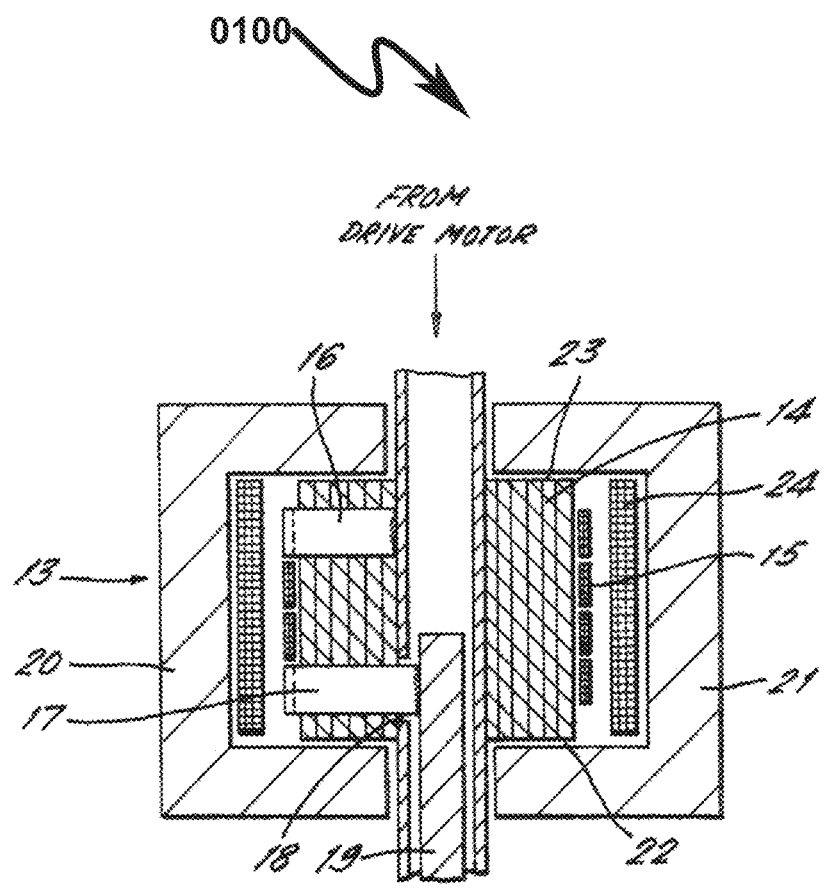
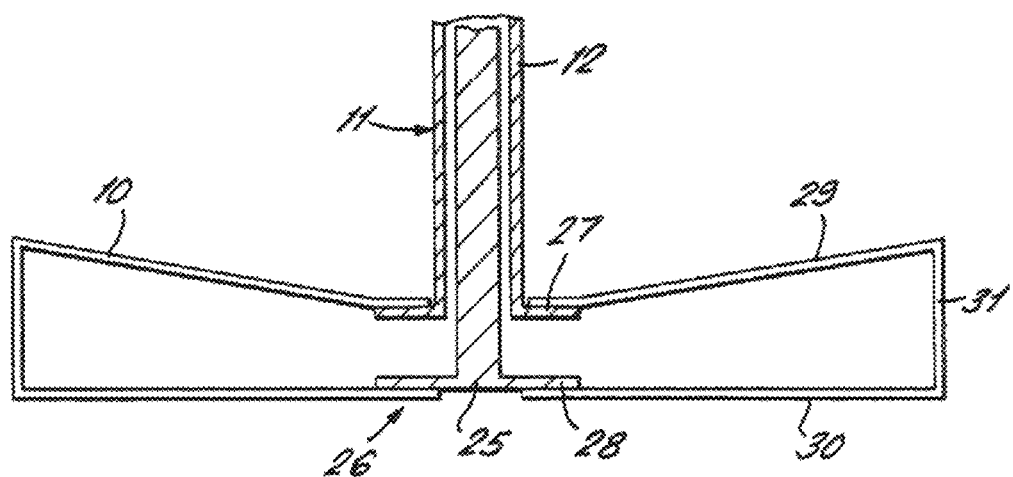
*PRIOR ART*
*U.S. Patent 4,678,881*

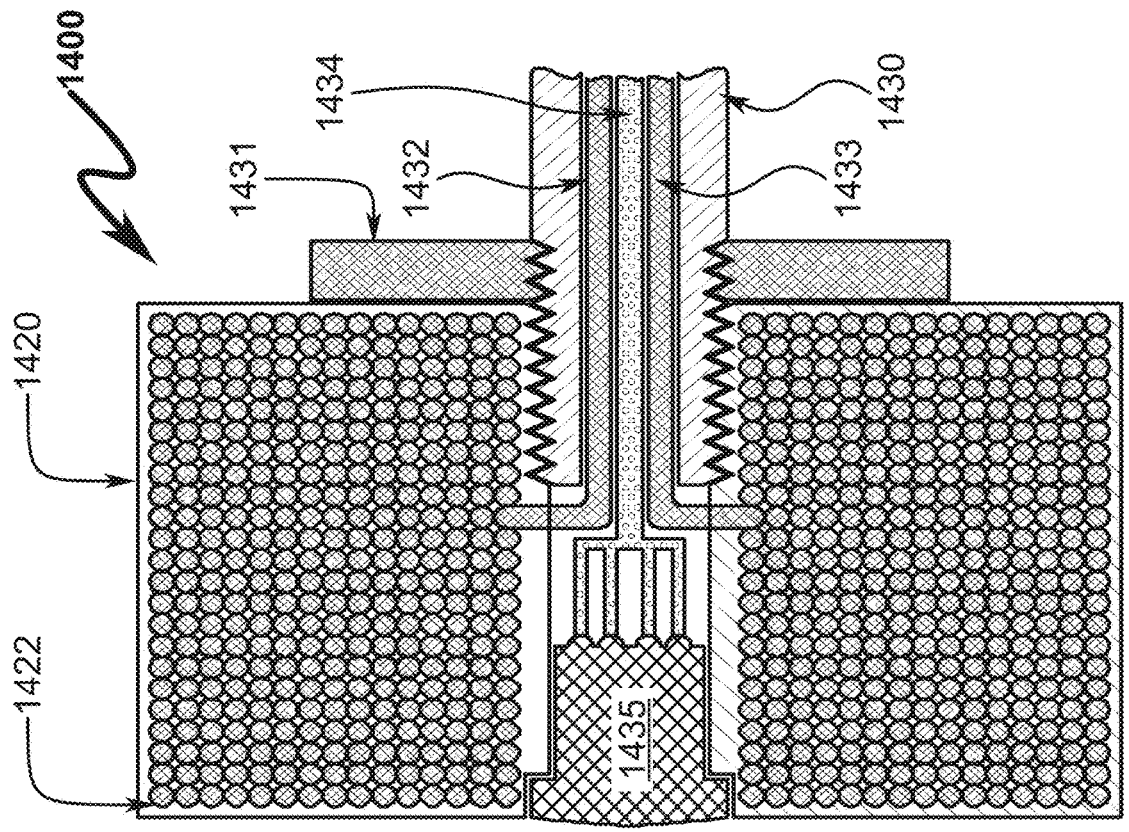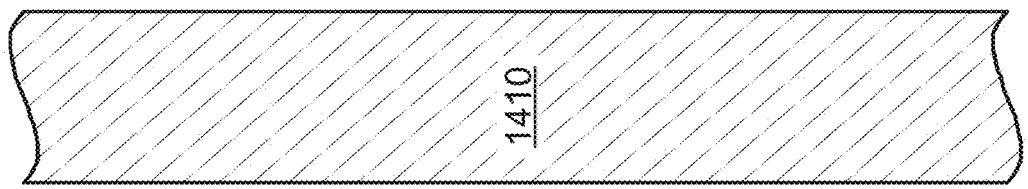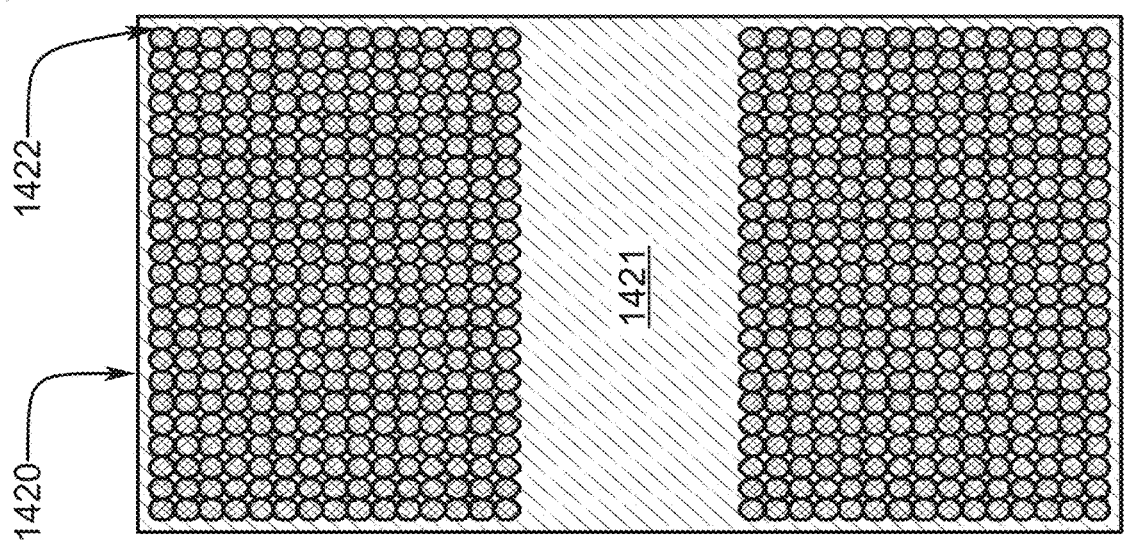
FIG. 14

FIG. 20
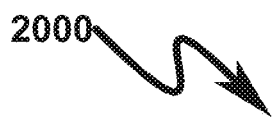
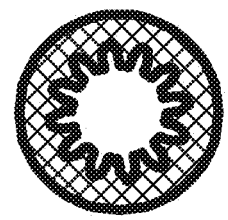
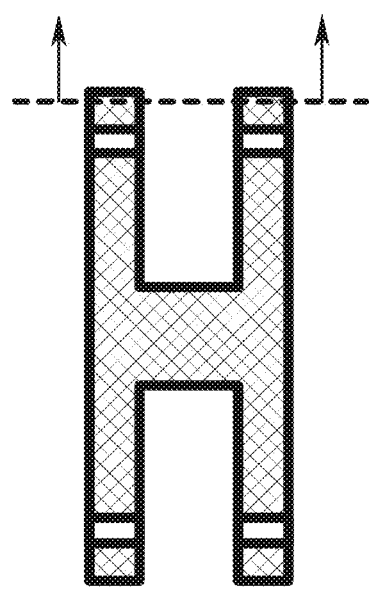

7600

BEVERAGE MIXING SYSTEM AND METHOD

CROSS REFERENCE TO RELATED APPLICATIONS

Parent Application

This is a Continuation-In-Part (CIP) Patent Application of United States Utility Patent Application for BEVERAGE MIXING SYSTEM AND METHOD by inventor Mark E. Goodson, filed electronically with the USPTO on Mar. 27, 2017, with Ser. No. 15/470,566, EFS ID 287507045, confirmation number 4512, which is a Continuation-In-Part (CIP) Patent Application of United States Utility Patent Application for BEVERAGE MIXING SYSTEM AND METHOD by inventor Mark E. Goodson, filed electronically with the USPTO on Jan. 28, 2013, with Ser. No. 13/751,745, EES ID 14809245, confirmation number 7151, issued as U.S. Pat. No. 9,610,553 on Apr. 4, 2017.

U.S. Utility Patent Applications

This application claims benefit under 35 U.S.C. § 120 and incorporates by reference United States Utility Patent Application for BEVERAGE MIXING SYSTEM AND METHOD by inventor Mark E. Goodson, filed electronically with the USPTO on Mar. 27, 2017, with Ser. No. 15/470,566, EFS ID 287507045, confirmation number 4512, which is a Continuation-In-Part (CIP) Patent Application of United States Utility Patent Application for BEVERAGE MIXING SYSTEM AND METHOD by inventor Mark E. Goodson, filed electronically with the USPTO on Jan. 28, 2013, with Ser. No. 13/751,745, EFS ID 14809245, confirmation number 7151, issued as U.S. Pat. No. 9,610,553 on Apr. 4, 2017.

U.S. Provisional Patent Applications

United States Utility Patent Application for BEVERAGE MIXING SYSTEM AND METHOD by inventor Mark E. Goodson, filed electronically with the USPTO on Jan. 28, 2013, with Ser. No. 13/751,745, EFS ID 14809245, confirmation number 7151, issued as U.S. Pat. No. 9,610,553 on Apr. 4, 2017 claims benefit under 35 U.S.C. § 119 and incorporates by reference United States Provisional Patent Application for DEVICE FOR BEVERAGE MIXING by inventor Mark E. Goodson, filed electronically with the USPTO on Jun. 22, 2012, with Ser. No. 61/663,348, EFS ID 13087243, confirmation number 9979.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods that mix and/or blend beverages and/or food products, and specifically to systems/methods associated with blending frozen beverages including but not limited to the mixing of ice cream and frozen and/or soft-serve dairy products. The present invention may also be applied to improvements to drink mixers and/or blenders.

PRIOR ART AND BACKGROUND OF THE INVENTION

Overview

Many restaurants, including "drive thru" or "fast food" restaurants, sell ice cream type beverages, such as milk shakes and malts. These beverages are typically a mixture of flavorings, milk, and ice cream. The beverages are made by mixing these three ingredients according to some recipe, and then blending or mixing the ingredients.

One of the drawbacks of making these types of beverages in a timely manner is that the milk and ice cream mixture must reach a desired temperature and resultant consistency. Inherent in this process is the complete or partial phase transition as the solidus mixture of ice cream rises in temperature to approach a liquidus state. Depending on variables such as the storage temperature of the ice cream, the ambient temperature, the temperature of the milk, and the dwell time of the mixing or blending, one can have a resultant beverage that varies in its viscosity. The most common manifestation of this variance in viscous properties is the beverage that is so thick that it cannot be successfully aspirated through a drinking straw. Instead, the straw collapses.

Prior Art (0100)-(0400)

Exemplary prior art relevant to this invention disclosure includes the following:
U.S. Pat. No. 4,678,881 issued Jul. 7, 1987 to John T. Griffith for INDUCTION APPARATUS FOR HEATING AND MIXING A FLUID. As detailed in FIG. 1 (0100) and FIG. 2 (0200), this patent describes how the simultaneous heating and mixing of a fluid in a vessel with heated walls and a stirring device can lead to excessively high temperatures at the walls due to the formation of a thick boundary layer. This specification discloses a stirring paddle incorporating a heated element and mounted on a rotatable shaft. The heating element is connected in series with a rotor winding mounted on the shaft so that, when the shaft rotates, a heating current flows through the heating element.
U.S. Pat. No. 5,274,207 (GB 2,163,930/EP0473313 A1) issued Dec. 28, 1993 to John T. Griffith for INDUCTION HEATER. As detailed in FIG. 3 (0300), this patent describes an induction heater for heating a material which has an alternating current carrying conductor 30 extending along an axis of rotation. Mounted about the axis are containers 32 which rotate about the axis and hold the material to be heated. A core 34 is provided encircling the alternating current carrying conductor 30. The core 34 guides the magnetic flux resulting from an alternating current flowing in the conductor 30 to induce a current in the inner sleeve 38 between the conductor 30 and core 34. Current flowing in the inner sleeve 38 is conducted to end plates 40 and 42 and through the containers 32. The containers 32 are heated by the electrical current induced by the magnetic flux in the core 34.

U.S. Pat. No. 6,805,312 issued Oct. 19, 2004 to Rand Capp for FOOD PREPARATION APPLIANCE. As detailed in FIG. 4 (0400), this patent describes a food preparation appliance including a food preparation container and a base unit. The base unit includes a stirring mechanism drive and a heating element. The heating element comprises an induction heating element. The base unit has a control panel for use in controlling the stirring mechanism drive and the heating element. In one or more embodiments, the base unit includes a processor and memory storage device controlling the stirring and heating mechanisms in a specific sequence and manner of operation. The food preparation container comprises a specially configured pot having a mixer which is removably located in its interior and configured to be rotated with the stirring mechanism drive. The mixer includes a helical central blade and an outwardly extending wiping blade. The pot may be removed from the base unit and used independently thereof.

While portions of this prior art is applicable to the food service industry, none of the art solves the problems mentioned above relating to the preparation of frozen beverages to a consistent viscosity standard.

Deficiencies in the Prior Art

The prior art as detailed above suffers from the following deficiencies:

Prior art beverage mixing systems have difficulty in quickly mixing/blending a frozen beverage to a normalized viscosity or consistency.

Prior art beverage mixing systems are inconsistent in the amount of time required to successfully mix/blend a given frozen beverage.

Prior art beverage mixing systems may produce a final mixed/blended beverage product that is too viscous for human consumption.

Prior art beverage mixing systems may produce a final mixed/blended beverage product that is too viscous for consumption using conventional drinking straws.

Prior art beverage mixing systems may produce a final mixed/blended beverage product that is too viscous for consumption without using special (oversized, reinforced, etc.) drinking straws.

While some of the prior art may teach some solutions to several of these problems, the core issue of improving the efficiency of frozen beverage mixing/blending has not been solved by the prior art.

OBJECTIVES OF THE INVENTION

Accordingly, the objectives of the present invention are (among others) to circumvent the deficiencies in the prior art and affect the following objectives in the context of a beverage mixing/blending system/method:

(1) Provide for a beverage mixing system and method that transfers heat to a beverage slurry, whereby the heat is inductively coupled to the mixing blade of a beverage mixer.

(2) Provide for a beverage mixing system and method that uses both heat and mechanical mixing simultaneously in blending a beverage, such that the time necessary to reach a given solid-liquid state (i.e., thickness or consistency) is reduced.

(3) Provide for a beverage mixing system and method that transfers heat in a way that does not use nichrome or similar heating elements, which are subject, to failure.

(4) Provide for a beverage mixing system and method that induces heat directly to the mixing blade, such that heat losses created by intervening mediums are avoided or minimized, and energy efficiency is maximized.

(5) Provide for a beverage mixing system, and method that transfers heat to the beverage slurry without the use of moving parts.

(6) Provide for a beverage mixing system and method that adds heat to the beverage slurry without the requirement of special cup or beverage containers.

(7) Provide for a beverage mixing system and method that allows for inductive heating of the mixing blade, with the mixing blade constructed such that the inductive heat cannot travel to the bearings and windings of the motor and damage them.

(8) Provide for a beverage mixing system and method that develops heat which does not parasitically draw power from the motor windings for heating purposes, such that motor torque is not compromised, which would adversely impact the mixing/blending time.

(9) Provide for a beverage mixing system and method that optically couples heat into the beverage, with heat being generated by one or more LEDs aimed into the top of the slurry.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention provides a device for the faster mixing of frozen beverages, and more particularly, for the mixing of ice cream, type beverages. By means of inductive coupling, heat is introduced into the beverage during the mixing or blending process. The heat is magnetically induced into a driveshaft and then transferred via conduction to a mixing blade, which then in turn transfers heat to the beverage slurry. In addition, singular or multiple high power LEDs, aimed into the slurry may optionally provide additional heat input.

BRIEF DESCRIPTION OF THE DRAWINGS

For a fuller understanding of the advantages provided by the invention, reference should be made to the following detailed description together with the accompanying drawings wherein:

FIG. 1 illustrates a side sectional view of a prior art induction heating system as taught by U.S. Pat. No. 4,678,881;

FIG. 14 illustrates a side sectional view of an exemplary induction coil assembly used in some preferred invention embodiments;

FIG. 20 illustrates an end view of an exemplary mechanical coupler cavity profile used to insulate the rotational driver in some preferred invention embodiments;

DESCRIPTION OF THE PRESENTLY PREFERRED EXEMPLARY EMBODIMENTS

Figure 2:
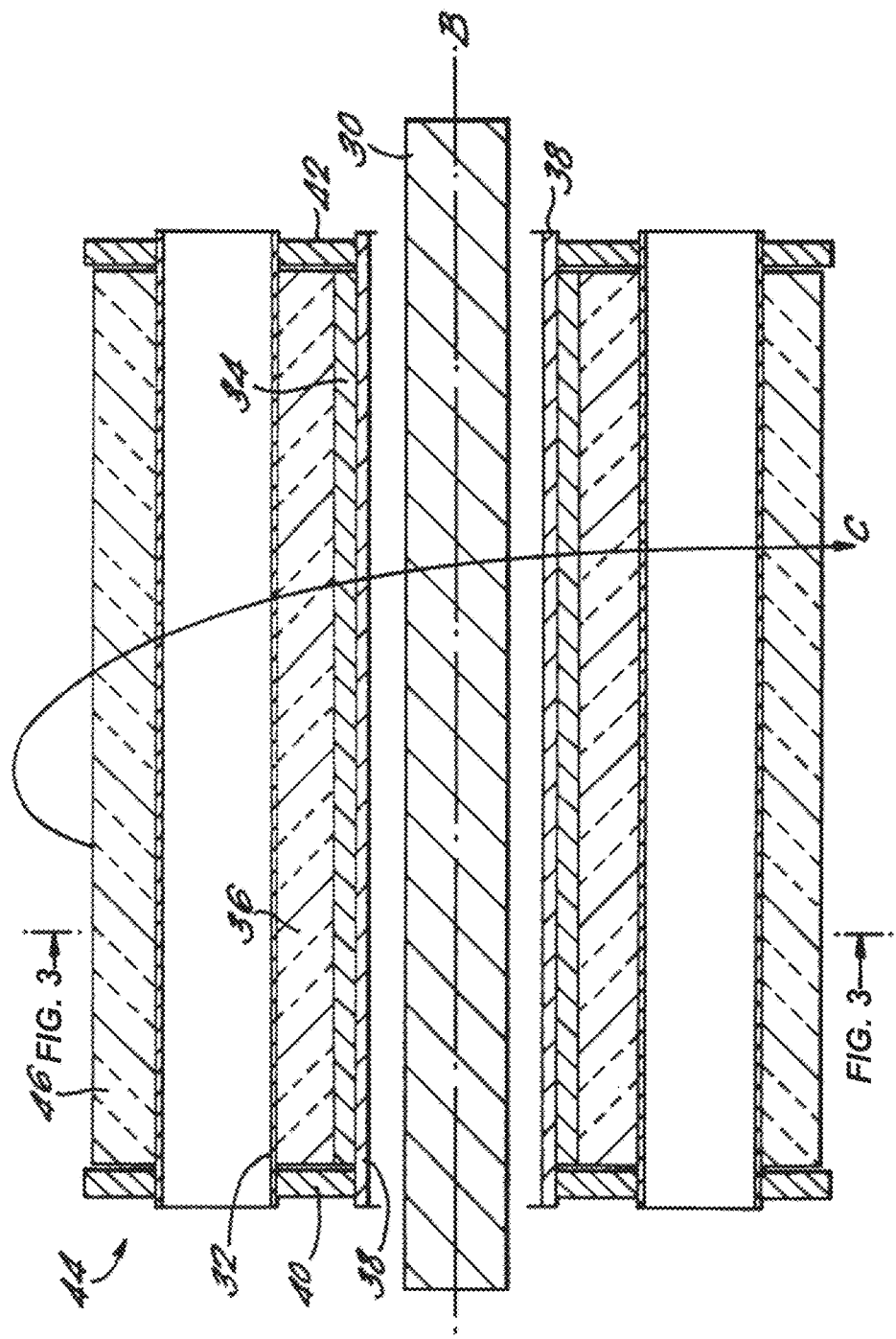
FIG. 2 illustrates a side sectional view of a prior art induction heating system as taught by U.S. Pat. No. 5,274,207.
Figure 3:
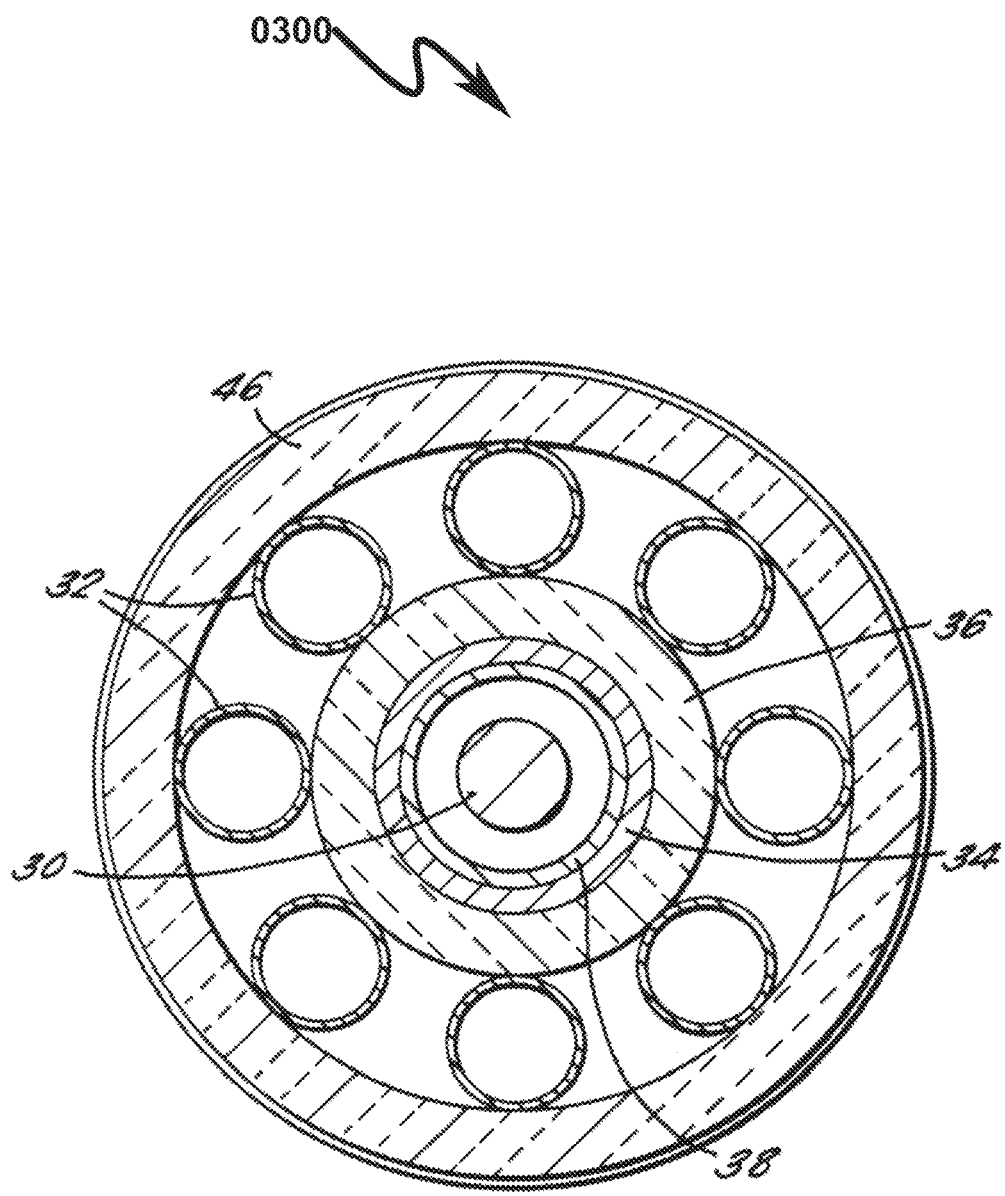
FIG. 3 illustrates a top sectional view of a prior art induction heating system as taught by U.S. Pat. No. 5,274,207.
Figure 4:
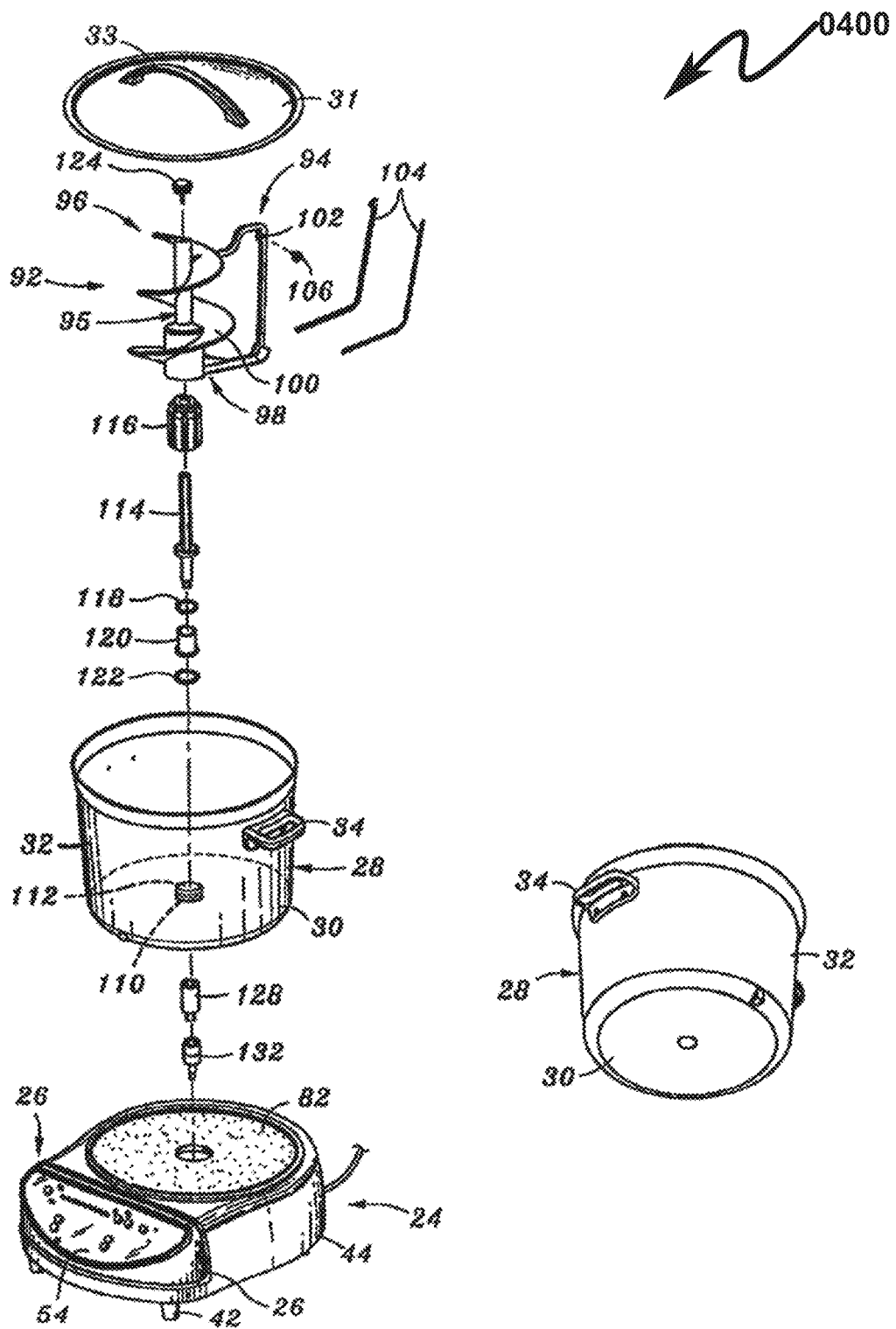
FIG. 4 illustrates an assembly view of a prior art mixing system as taught by U.S. Pat. No. 6,805,312.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a BEVERAGE MIXING SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

NSF Not Limitive

References to "NSF" refer to NSF International, P.O. Box 130140, 789 N. Dixboro Road, Ann Arbor, Mich. 48113-0140, and their standards are not limitive of the invention scope.

Mixing/Blending Not Limitive

The terms "mixing" and "blending" shall be used synonymously within the description of the present invention, as the same systems/methods taught herein to "mix" a given frozen beverage may be used to "blend" multiple beverages (not all of which may be frozen) within a given context.

Target Beverage Product Not Limitive

While the present invention may be advantageously applied to the mixing/blending of frozen beverages and/or foods such as ice cream, dairy products, and the like, the present invention is not necessarily limited in scope to application within this context. Thus, the term "beverage product" within the context of terms such as "mixing" and "blending" should be given its broadest possible interpretation consistent with the application context of the invention.

LED Not Limitive

The present invention may make use of other illumination/heating elements other than LED lighting, such as tungsten halogen lighting, Xenon lighting, ultraviolet lighting, and/or a wide variety of infrared lighting products well known to those skilled in the art. Thus, the terms "high power LED", "illumination source", "irradiation source", and "heating source" should be considered synonymous with an additional heating source and given a broad interpretation consistent with this application context.

LITZ Wire Not Limitive

The present invention may in some preferred, embodiments make use of Litz wire to construct magnetic coils used to generate the inductive heating used in the mixing/blending operation. Litz wire is a type of cable used in electronics to carry alternating current. The wire is designed to reduce the skin effect and proximity effect losses in conductors used at frequencies up to about 1 MHz. It consists of many thin wire strands, individually insulated and twisted or woven together, following one of several carefully prescribed patterns often involving several levels (groups of twisted wires are twisted together, etc.). This winding pattern equalizes the proportion of the overall length over which each strand is at the outside of the conductor. Note, however, that the present invention is not limited to the use of Litz wire in this application context.

Excitation Frequency Not Limitive

The present invention may make use of a wide range of excitation frequencies for the induction coil. Preferred embodiments of the invention as described herein are specifically anticipated to utilize 50/60 Hz (power line frequencies and counting number multiples thereof) and ultrasonic (above human perception) excitation frequencies, but these preferred examples do not limit the range of permissible excitation frequencies that may be used with a given invention embodiment. Within this context, the term "counting number multiple" is assumed to have its conventional mathematical definition having integer values equal to or greater than unity.

Ultrasonic Frequency Not Limitive

The term "ultrasonic" in the context of the induction coil excitation frequency detailed herein should be given the broadest possible interpretation to include all frequencies above typical human perception (typically approximately 20 kHz and above).

Computing Device Not Limitive

The present invention may make use of a wide variety of computing devices in its general theme of construction. While microcontroller unit (MCU) construction may be optimal in many circumstances, the present invention is not limited to this particular form of construction and the term "computing device" and "MCU" should be given their broadest possible definitions in this context.

Induction Coil Not Limitive

The present invention may make use of a wide variety of induction coils (coil inductors) in its general theme of construction. While coil inductor construction may be optimal in many circumstances for the formation of the induction coil, the present invention is not limited to this particular form of construction and the term "induction coil", "inductor", and "coil inductor" should be given their broadest possible definitions in this context.

Induction Coil Potting Material Not Limitive

The present invention may make use of a wide variety of potting materials to encase/enclose the induction coil(s) (coil inductor(s)) that may be used in various invention embodiments. While not limitive of the present invention scope, this potting material typically comprises a material that is inert to normal foodstuffs. As an example, DOW CORNING 736 HEAT RESISTANT SEALANT is NSF 51 certified for direct food contact and rated at a continuous operating temperature of 500° F.

Microprocessor/Microcontroller Not Limitive

The present invention may utilize microprocessor/microcontroller control elements, but is not necessarily limited to this type of digital control system.

Resonant Tank Circuit Not Limitive

The present invention may make use of a wide variety of induction coils (coil inductors) as part of a LC resonant tank circuit in various embodiment constructions. One skilled in the art will recognize that any inductor incorporates parasitic capacitances which impact the overall inductor/capacitor model associated with the inductor and as such real-world inductors have a "self-resonance" associated with these hybrid device characteristics. Thus, when speaking of LC resonant tank circuits (LC tank circuit) within this document, the overall LC behavior of the inductor should be considered. Thus, while in some invention embodiments an additional capacitor may be placed in parallel with the induction coil, some self-resonant induction coil embodiments may dispense with this external capacitor, relying solely on the parasitic induction coil capacitance to operate the system, assuming a self-resonant frequency for the induction coil. From, this discussion one skilled in the art will recognize that any reference to the "LC resonant tank" associated with the induction coil may or may not reference an associated external capacitor.

Rotational Driver Not Limitive

The present invention may make use of a wide variety of rotational drivers in its general theme of construction to affect rotation of the driveshaft and attached mechanical agitator. Within this context, the use of electric motors is preferred but not by necessity limitive of the overall invention scope.

Rotational Driver/Driveshaft Insulation Not Limitive

The present invention may in some circumstances insulate (thermally and/or electrically isolate) the rotational driver and the driveshaft with a mechanical coupler that in some circumstances is electrically and/or thermally insulating. Within this context, a variety of materials may be used for the mechanical coupler, including but not limited to the preferred, selections of TEFLON®, TORLON®, VESPEL®, and DELRIN®. These engineered plastics are immune to attack by foodstuffs and are low in electrical/thermal conductivity, both being properties that are advantageous in situations where the rotational driver is to be isolated from the heating and electrical currents associated with the driveshaft and mechanical agitator.

Thus, the term "insulated" and its variants should be given its broadest possible meaning within this context to cover materials that may be electrically and/or thermally insulating. The selection of one or more of these properties permits the driveshaft to be raised to elevated temperatures by means of magnetic coupling to an induction coil while preventing heating of the rotational driver (motor) driving shaft and/or bearings. The use of a coupling material that is electrically insulating prevents induced currents within the driveshaft from conduction within the rotational driver components. These features either individually or in combination serve to improve the overall longevity and reliability of the rotational driver.

Driveshaft/Agitator Material Not Limitive

The present invention may make use of a wide variety of materials for the driveshaft and/or mechanical agitator described herein. Generally speaking, the driveshaft should be conductive and capable of being magnetically induced to generate inductive heat within its structure. Preferred materials for the driveshaft and/or mechanical agitator include but are not limited to SS430 (desirable for its compliance with NSF 51), copper plated steel/iron, nickel plated or polymer coated copper and copper/nickel plated steel/iron. Situations in which the driveshaft and/or mechanical agitator are constructed of copper or some copper alloy may require labeling to conform to NSF requirements. In any of these circumstances, the core material of the driveshaft may preferably comprise an iron (ferritic) core.

Mechanical Agitator Not Limitive

The present invention may make use of a wide variety of mechanical agitators in its general theme of construction to mix/blend the beverage product. Within this context, the function and structure of the mechanical agitator may take many forms, including but not limited to mixing blades and the like. Thus, the terms "mechanical agitator", "mixing blade" and the like should be considered broadly and synonymously equivalent to include the overall scope of devices which may be used to mix/blend a beverage product.

System Theory of Operation

The present invention is designed to speed up the mixing process by adding heat to the beverage during the mixing process. More particularly, the present invention first adds heat by means of induction heating. The beverage is blended in a cup of (typically) ferrous design. In use, ice cream, flavorings, and milk are introduced into a conventional cup, be it plastic, paper, ceramic, or metal. The cup is held in place in a blender, and mechanical blending takes place by means of a motor and a blender paddle. As electrical energy is applied to the motor by means of an electrical switch, the same electrical switch applies power to a switching circuit that in turn provides a rectangular wave (pulse train) to a resonant LC circuit. The LC circuit is switched off and on at or near resonance, allowing for Q multiplication. The L of the LC circuit is a spiral (helical) wound inductor that is dielectrically and environmentally encased. The inductor L has as its core the rotating shaft of the mixing blade. The inductor L and the mixing blade combination form, the primary and secondary of a transformer, respectively.

As the electronics produce a drive frequency that is at or near resonance of the LC circuit, Q multiplication takes place, and the electromagnetic energy is converted into heat in the mixing blade. The heat then is transferred to the slurry. The second manner in which heat is added is by the optical aiming of high power LEDs into the slurry. LED efficiency has dramatically improved over the last decade, and these solid state devices have lifetimes that far exceed the lifetime of a motor on a blender. Coupling the optical energy from an LED into the slurry may result in faster melt times for the beverage.

System Overview (0500)

Figure 5:
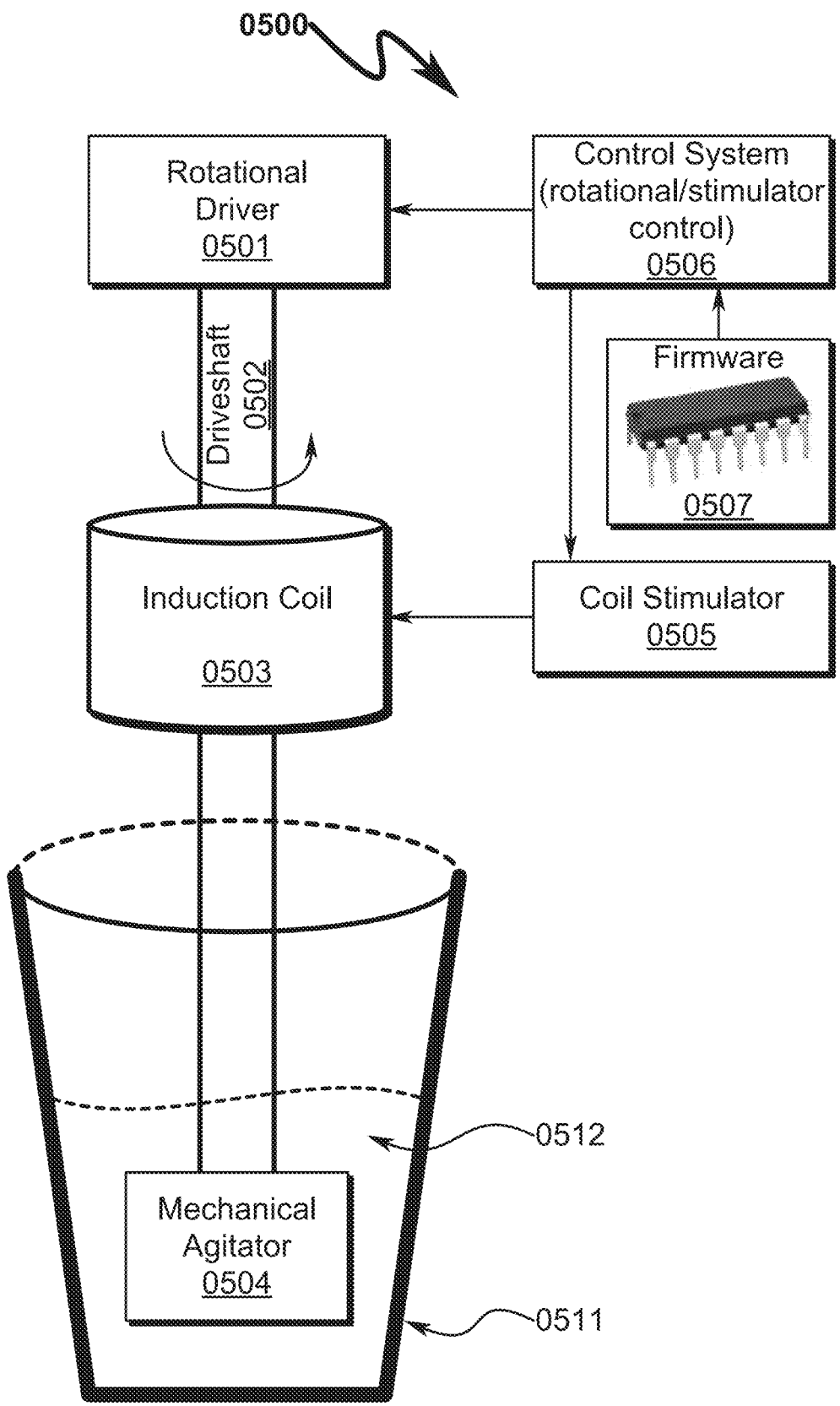
FIG. 5 illustrates a system block overview diagram describing a presently preferred system embodiment of the present invention.

A general overview of the system may be seen in FIG. 5 (0500) wherein the system operates in the context of a mixing container (0511) having some beverage product (0512) that is desired to be mixed/blended. This mixing/blending is accomplished in this preferred embodiment by the use of a rotational driver (0501) (typically an electric motor or the like) that is mechanically coupled to and rotates a driveshaft (0502). This driveshaft (0502) is magnetically coupled to an induction coil (0503) (the coupling may be considered bidirectional) that inductively heats the driveshaft (0502). The heated driveshaft (0502) is mechanically coupled to a mechanical agitator (0504) that mixes/blends the beverage product (0512) within the mixing container (0511). The mechanical coupling between the driveshaft (0502) and the mechanical agitator (0504) permits neat to flow from the driveshaft (0502) to the mechanical agitator (0504) and thus soften the beverage product (0512) to a consistent viscosity. The induction coil (0503) is electrically coupled to a coil stimulator (0505) that electrically drives the induction coil (0503) to inductively heat the driveshaft (0502) and thus by thermal conduction the mechanical agitator (0504) and by contact the beverage product (0512) that is being mixed/blended in the container (0511).

The system as generally depicted in FIG. 5 (0500) may also incorporate a control system (0506) running under computer control and executing instructions read from a computer readable medium such as firmware or the like (0507). This control system (0506) by executing the embodied software/firmware (0507) manages and directs the rotational driver (0501) and/or coil stimulator (0505). This control system (0506) permits operational control of the rotational driver (0501) (activation, speed, etc.) and variations in the waveform type, duration, duty cycle, and/or frequency of the coil stimulator (0505) electrical drive to the induction coil (0503) and thus permits modulation of the amount of heat transferred to the driveshaft (0502) and eventually the mechanical agitator (0504). Inherent in this control system (0506) is anticipation of feedback and/or timing controls to permit, the mixing of beverage product (0512) to a consistent viscosity based on measured conditions and/or a configuration matrix of known data or desired viscosity conformance.

Method Overview (0600)

Figure 6:
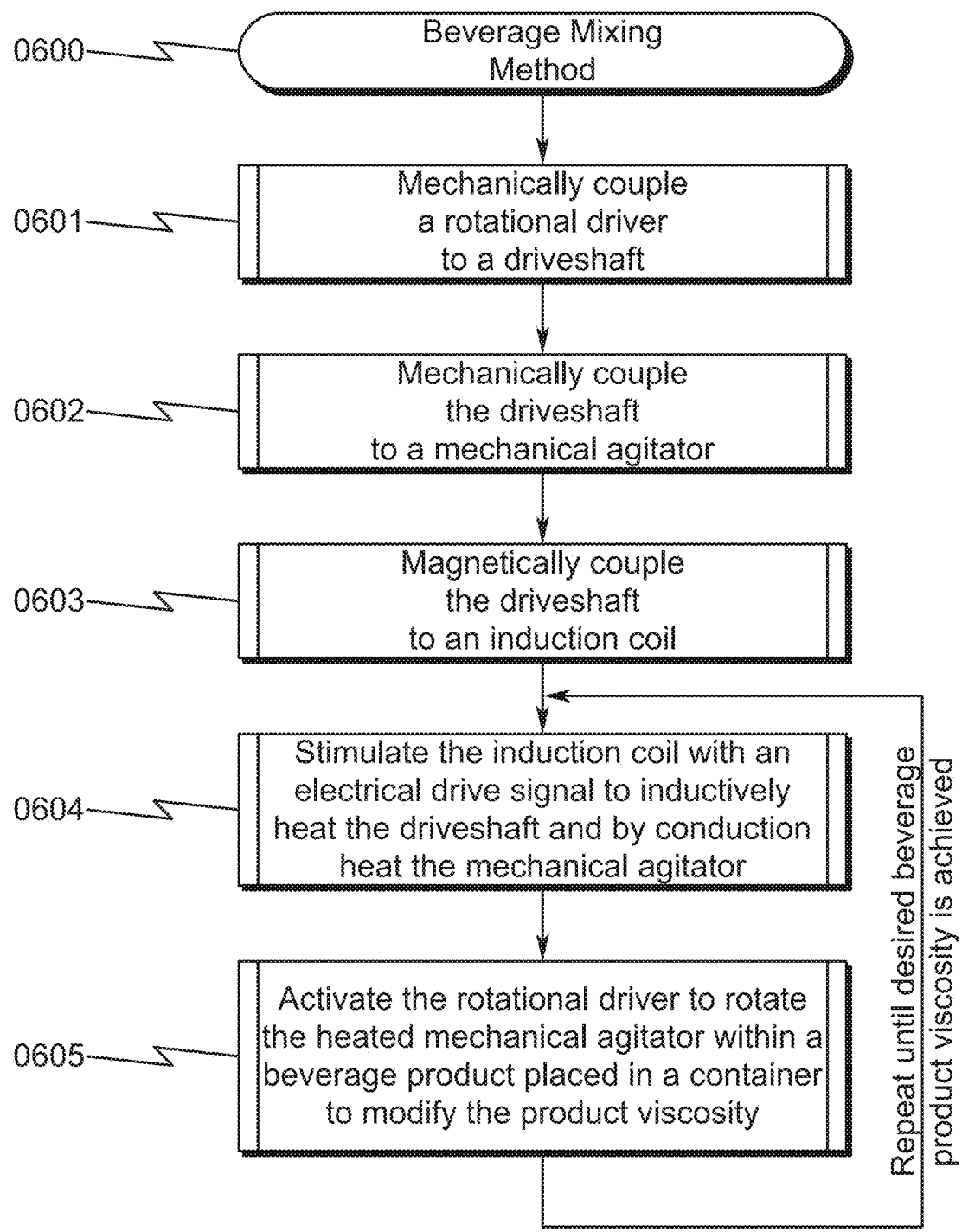
FIG. 6 illustrates an exemplary flowchart describing a presently preferred method embodiment.

The present invention system as described above may be utilized in the context of an overall beverage mixing method as generally illustrated in FIG. 6 (0600), wherein the beverage mixing method comprises the following steps:
(1) mechanically coupling a rotational driver to a driveshaft (0601);
(2) mechanically coupling the driveshaft to a mechanical agitator (0602);
(3) magnetically coupling the driveshaft to an induction coil (0603);
(4) stimulating the induction coil with an electrical drive signal at an excitation frequency to inductively heat the driveshaft and by conduction heat the mechanical agitator (0604); and
(5) activating the rotational driver to rotate the heated mechanical agitator within a beverage product placed in a container to modify the beverage product viscosity and proceeding to step (4) until a desired beverage product viscosity is reached (0605).

Integration of this and other preferred exemplary embodiment methods in conjunction with a variety of preferred exemplary embodiment systems described herein is anticipated by the overall scope of the present invention.

Alternate System Overview (0700)

Figure 7:
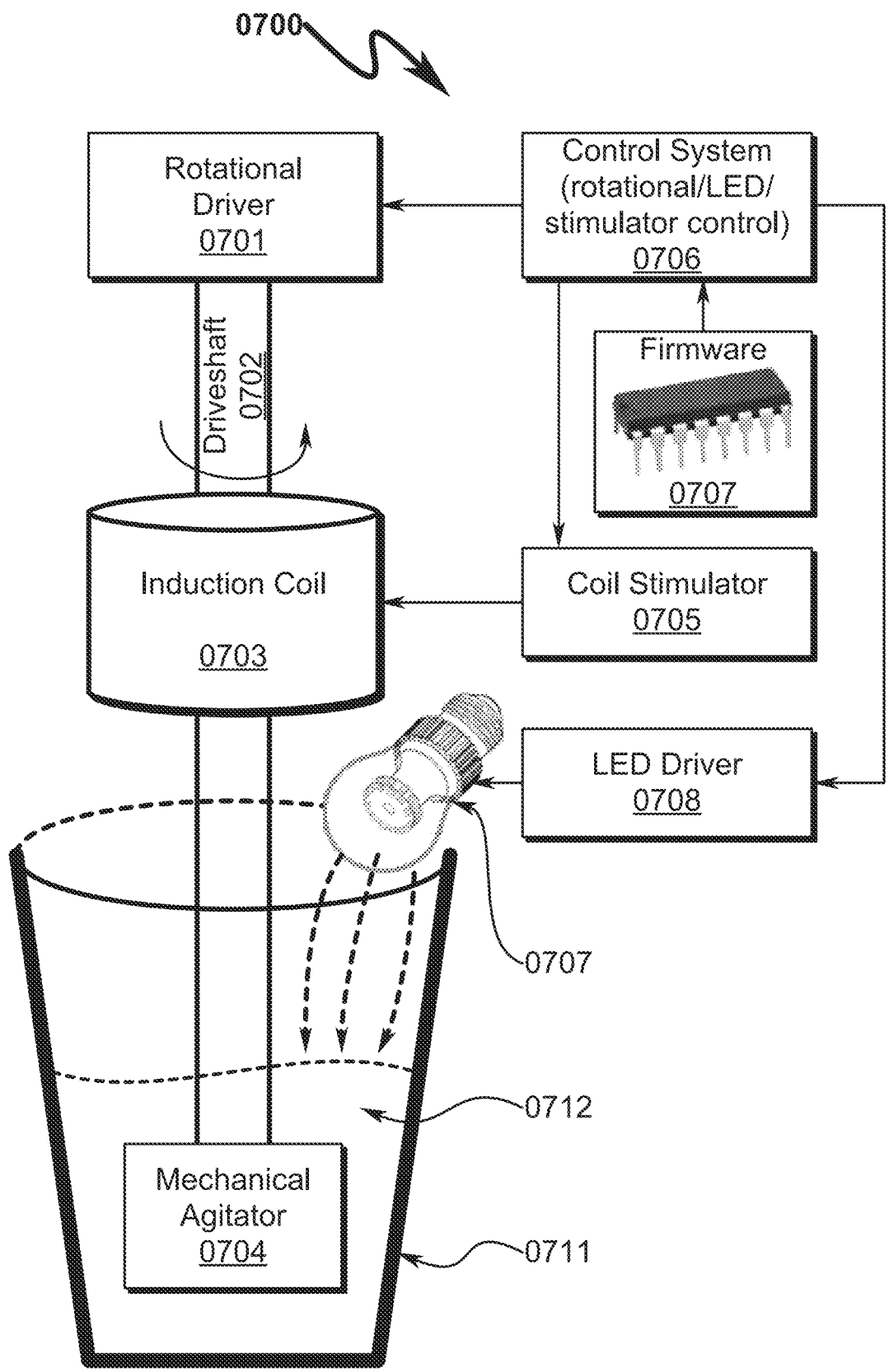
FIG. 7 illustrates a system block overview diagram describing a presently preferred LED heating system embodiment of the present invention.

A general overview of an alternative system may be seen in FIG. 7 (0700) wherein the system operates in the context of a mixing container (0711) having some beverage product (0712) that is desired to be mixed/blended. This mixing/blending is accomplished in this preferred embodiment by the use of a rotational driver (typically an electric motor or the like) that is mechanically coupled to and rotates a driveshaft (0702). This driveshaft (0702) is magnetically coupled to an induction coil (0703) (the coupling may be considered bidirectional) that inductively heats the driveshaft (0702). The heated driveshaft (0702) is mechanically coupled to a mechanical agitator (0704) that mixes/blends the beverage product (0712) within the mixing container (0711). The mechanical coupling between the driveshaft (0702) and the mechanical agitator (0704) permits neat to flow from the driveshaft (0702) to the mechanical agitator (0704) and thus soften the beverage product (0712) to a consistent viscosity. The induction coil (0703) is electrically coupled to a coil stimulator (0705) that electrically drives the induction coil (0703) to inductively heat the driveshaft (0702) and thus by thermal conduction the mechanical agitator (0704) and by contact the beverage product (0712) that is being mixed/blended in the container (0711). A high power LED (0708) (or other source of infrared radiation) activated by a LED driver (0709) (or other suitable activation circuitry) may also be activated to inject additional heat into the beverage product (0712) to speed the mixing/blending process within the container (0711).

The system as generally depicted in FIG. 7 (0700) may also incorporate a control system (0706) running under computer control and executing instructions read from a computer readable medium such as firmware or the like (0707). This control system (0706) by executing the embodied software/firmware (0707) manages and directs the rotational driver (0701) and/or coil stimulator (0705) and/or LED driver (0709). This control system (0706) permits operational control of the rotational driver (0701) (activation, speed, etc.) and variations in the waveform type, duration, duty cycle, and/or frequency of the coil stimulator (0705) electrical drive to the induction coil (0703) as well as activation and duty cycle associated with the LED driver (0709) (and associated high power LED (0708)) and thus permits modulation of the amount of heat transferred to the driveshaft (0702) and eventually the mechanical agitator (0704), or direct heat injection by the high power LED (0708). Inherent in this control system (0706) is anticipation of feedback and/or timing controls to permit the mixing of beverage product (0712) to a consistent viscosity based on measured conditions and/or a configuration matrix of known data or desired viscosity conformance.

Alternate Method Overview (0800)

Figure 8:
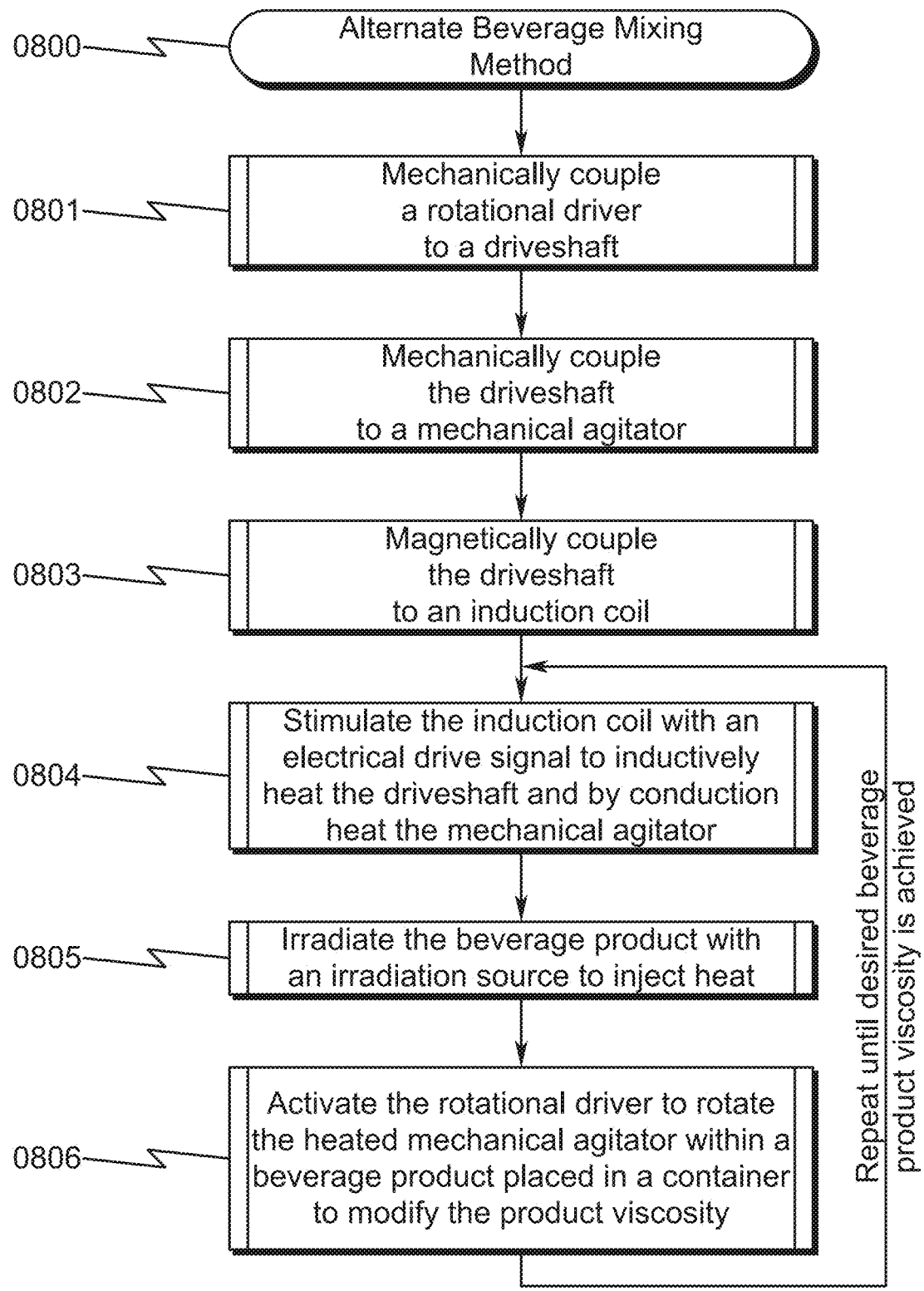
FIG. 8 illustrates an exemplary flowchart describing a presently preferred LED heating method embodiment.

The present invention alternate system, as described above may be utilized in the context of an overall beverage alternate mixing method as generally illustrated in FIG. 8 (0800), wherein the beverage mixing method comprises the following steps:

(1) mechanically coupling a rotational driver to a driveshaft (0801);
(2) mechanically coupling the driveshaft to a mechanical agitator (0802);
(3) magnetically coupling the driveshaft to an induction coil (0803);
(4) stimulating the induction, coil with an electrical drive signal at an excitation frequency to inductively heat the driveshaft and by conduction heat the mechanical agitator (0804);
(5) irradiating the beverage product with an infrared irradiation source to inject additional heat into the beverage product (0805); and
(6) activating the rotational driver to rotate the heated mechanical agitator within a beverage product placed in a container to modify the beverage product viscosity and proceeding to step
(4) until a desired beverage product viscosity is reached (0806).

Integration of this and other preferred exemplary embodiment methods in conjunction with a variety of preferred exemplary embodiment systems described herein is anticipated by the overall scope of the present invention.

Typical Application Context (0900)

Figure 9:
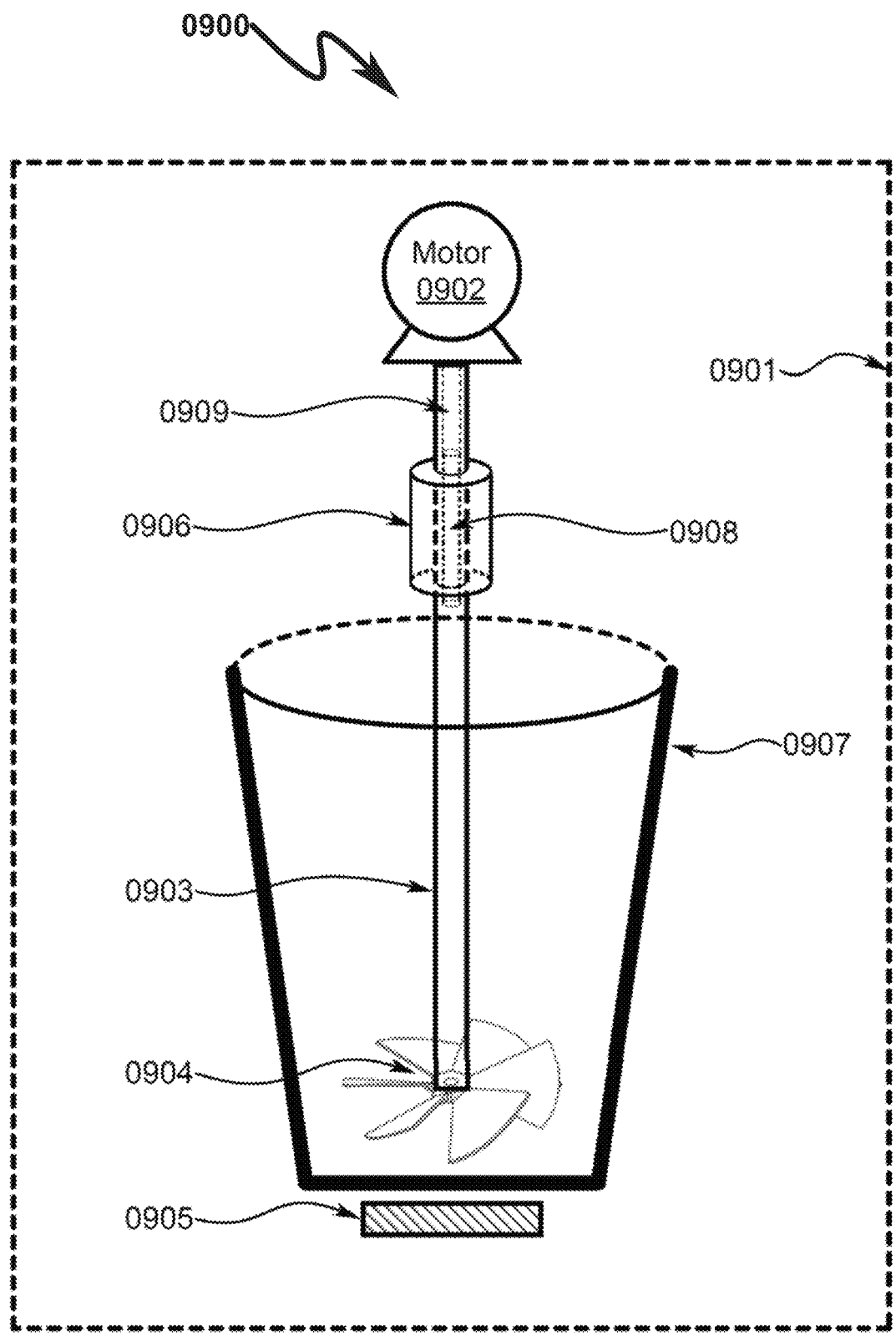
FIG. 9 illustrates an exemplary system application context for some preferred embodiments of the present invention.

A typical application context for the present invention is generally depicted in FIG. 9 (0900), wherein an exemplary beverage mixer system is shown. This beverage mixer embodiment comprises a chassis (0901) having attached to it a motor (0902), a driveshaft (0903), a mixing blade (0904), an activation switch (0905), and an encased induction coil (0906). The encased induction coil (0906) has as its "core" the driveshaft (0903) of the mixing blade (0904). Beverage holder (cup) (0907) has no specific material requirements.

In a preferred embodiment, the driveshaft (0903) comprises a solid copper shaft or rod having a ferromagnetic or ferrous iron slug (0908) fitted in a void (0909) created within the top of the driveshaft (0903). The ferromagnetic or ferrous iron slug (0908) is configured within the copper driveshaft (0903) so as to interact with the induction coil (0906). While the slug (0908) and void (0909) are depicted as being cylindrical in shape, it is understood that the slug (0908) and corresponding void (0909) may have any geometric shape. Moreover, while the slug (0908) is depicted as only filling a portion of the length of the void (0909), it is understood that the slug (0908) may fill the entire void (0909). Alternatively, the slug (0908) may fill only a portion of the void (0909) with the remainder comprising metal or polymeric construction to specifically include materials such as DELRIN®, TEFLON®, TORLON®, VESPEL® brand or similar high temperature plastics having poor thermal conductivity, in order to deter heat from the driveshaft being conductively transferred to the rotational driver and causing damage to the internal bearings or motor windings of the rotational driver.

The induction coil (0906) generates an electromagnetic field which causes heat to develop in the slug (0908). The heat developed in the slug (0908) is transferred conductively to the copper driveshaft (0903), which transfers the heat more efficiently to the slurry. The solid copper driveshaft (0903) in the preferred embodiment may be plated with a metal (e.g., nickel) or coated with a polymer to serve as a deterrent to corrosion. Using a solid copper driveshaft is far more efficient in transferring heat than previously disclosed drive shafts constructed of SS430, copper plated steel/iron, and copper/nickel plated steel/iron. Whereas steel/iron has a coefficient of thermal conductivity of 36-43 and stainless steel has a coefficient of thermal conductivity of 16-24, steel, solid copper has a coefficient of thermal conductivity of 111. Thus, heat generated in the slug (0908) is able to transfer much more efficiently from the slug (0908) to the slurry in the preferred embodiment of the driveshaft (0903).

The mixing blade (0904) is chosen so as to be ferromagnetic, with a thickness that is at least twice the skin depth thickness of the given material at the chosen excitation (oscillating) frequency of the induction coil (0906). Because the mixing blade (0904) is meant to contact foodstuffs, it should be chosen to meet NSF (National Sanitation Foundation) requirements. As such, stainless steel type 430 (SS 430) would be one suitable material in many preferred embodiments. In the alternative, the mixing blade (0904) may be constructed of iron (steel) with a copper (or other non-reactive metal and/or coating) plating the iron so as to render the mixing blade (0904) chemically inert to foodstuffs.

Exemplary Electrical System (1000)

Figure 10:
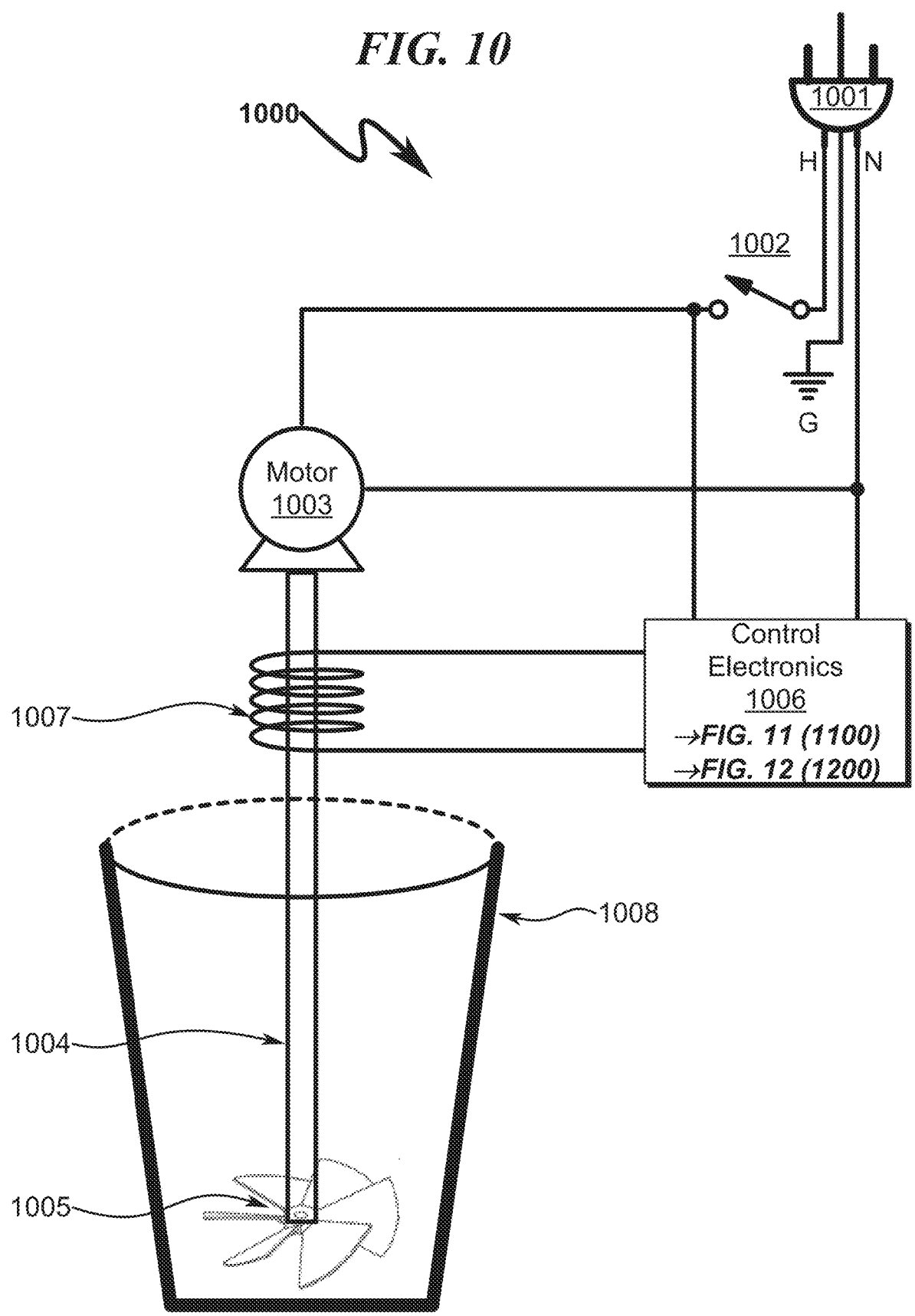
FIG. 10 illustrates an exemplary electrical schematic for some preferred embodiments of the present invention.

FIG. 10 (1000) generally illustrates an exemplary electrical system for a preferred embodiment. FIG. 10 (1000) depicts an incoming power feed (1001) (a line cord) a switch (1002), a motor (1003), the driveshaft (1004), the mixing blade (1005), and the electronics section (1006). The electronics section feeds the encased induction coil (1007).

FIG. 10 (1000) depicts an exemplary overall electrical system summary. When switch (1002) is turned on, it applies AC power to the motor (1003). As motor (1003) is activated, it turns a driveshaft (1004) that is connected to a mixing blade (1005), which is in essence an extension of the motor shaft for the motor (1003). This same AC power is delivered to the electronics section (1006). The mixing blade (1005) is positioned such that it stirs the beverage that is present in beverage holder (1008). Beverage holder (1008) may typically be constructed of metal, polymer, or ceramic.

Exemplary Electronics Configuration (1100)

Figure 11:
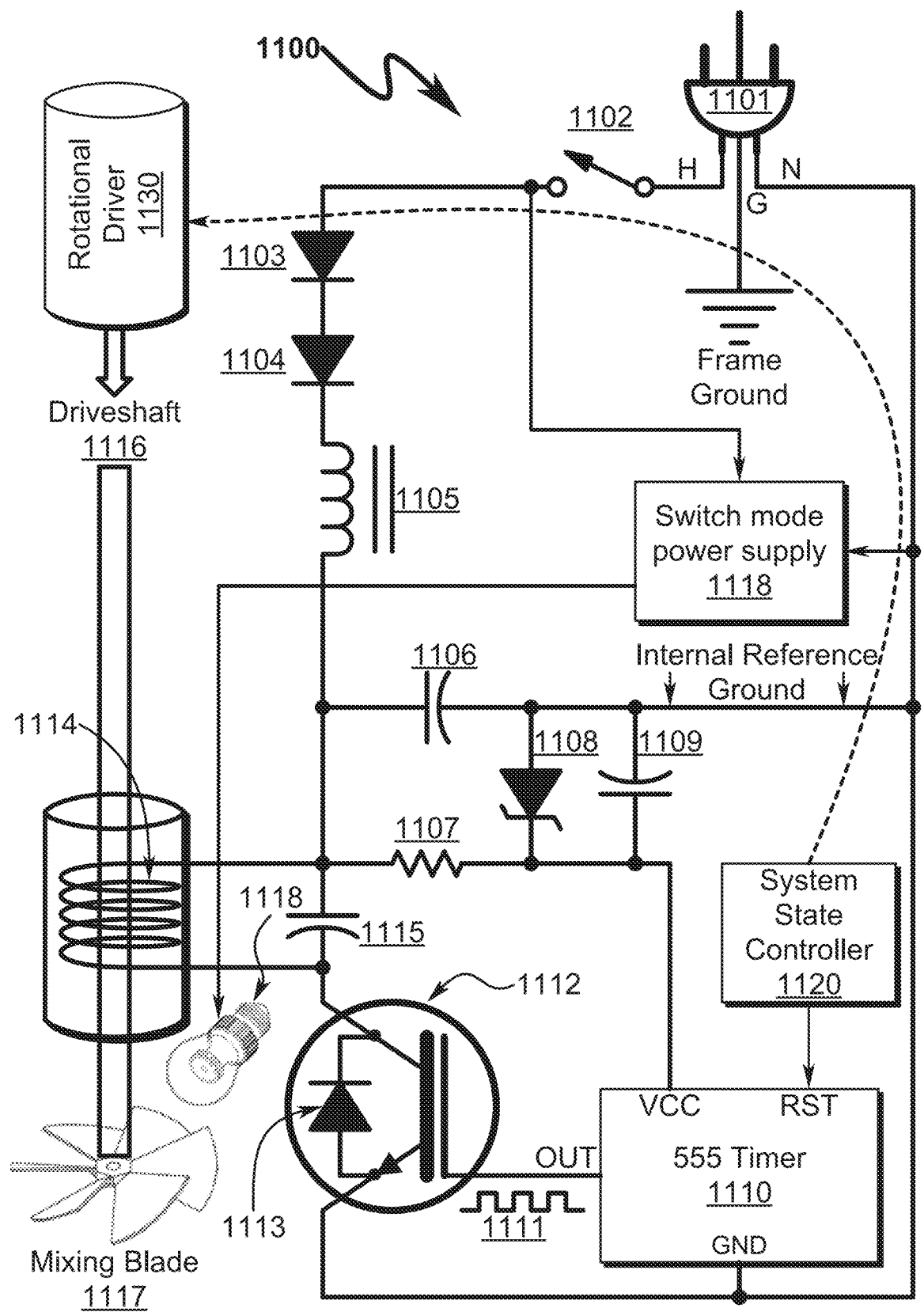
FIG. 11 illustrates an exemplary electrical detail schematic for some preferred embodiments of the present invention.

An exemplary electronics embodiment that may be used to operate the disclosed invention is generally depicted in FIG. 11 (1100). This exemplary electronics embodiment (1100) takes AC power (1101) from the switch (1102) and then converts it into a switched pulse train (1111) that is eventually fed to induction coil (1114). The incoming 120 volts AC (nominal) (1101) is rectified by diodes (1103, 1104), while inductor (1105) and capacitor (1106) filter the half-wave rectified DC pulse train generated by the diodes (1103, 1104). Encased induction coil (1114) and capacitor (1115) form an LC tank circuit. Insulated gate bipolar transistor (IGBT) (1112) forms a switch, while diode (1113) is a free wheeling diode that may be integrated into the IGBT (1112) or implemented as a standalone device component. Encased induction coil (1114) is optimally constructed from Litz wire or another wire that is suitable for high frequency operation while maintaining a relatively high Q (quality factor).

The IGBT (1112) has a gate which is driven by a pulse train generated in this embodiment by 555 timer, indicated here as oscillator/clock generator (1110). The operating frequency of the oscillator (1110) (which is run in an astable mode) is optimally chosen so as to be at the resonant point of the LC circuit formed by induction coil (1114) and capacitor (1115). The driven pulse train (1111) from the 555 timer (1110) then drives the IGBT (1112) gate OFF and ON, and thus controls the collector-emitter switching action of the IGBT (1112). The induction coil (1114), which is encased for sanitation reasons, serves as the primary of a virtual transformer. The secondary of the transformer is the driveshaft (1116) of the mixing blade (1117). This transformer inductively takes the current from the induction coil (1114) and excites the ferrous structure with in the driveshaft (1116) and/or mixing blade (1117).

Power to the oscillator (1110) (555 timer) is provided by a series drop resistor (1107), zener diode (1108), and capacitor (1109) combination. The oscillator (1110) (555 timer) may optionally be disabled using an active-low RST (reset) input generated by a system state controller (1120) in situations where pulse modulation of the induction coil (1114) and modulated heating of the driveshaft (1116) is desired. Optical LED (1118) is affixed to the appliance in such a manner that its optical power is aimed into the slurry. A switch mode power supply (1119) supplies the necessary current for the LED (1118).

The system as depicted may incorporate a wide variety of system state controllers (1120) that directs the operation of the oscillator (1110) as well as the rotational driver (1130).

System State Controller (1200)

Figure 12:
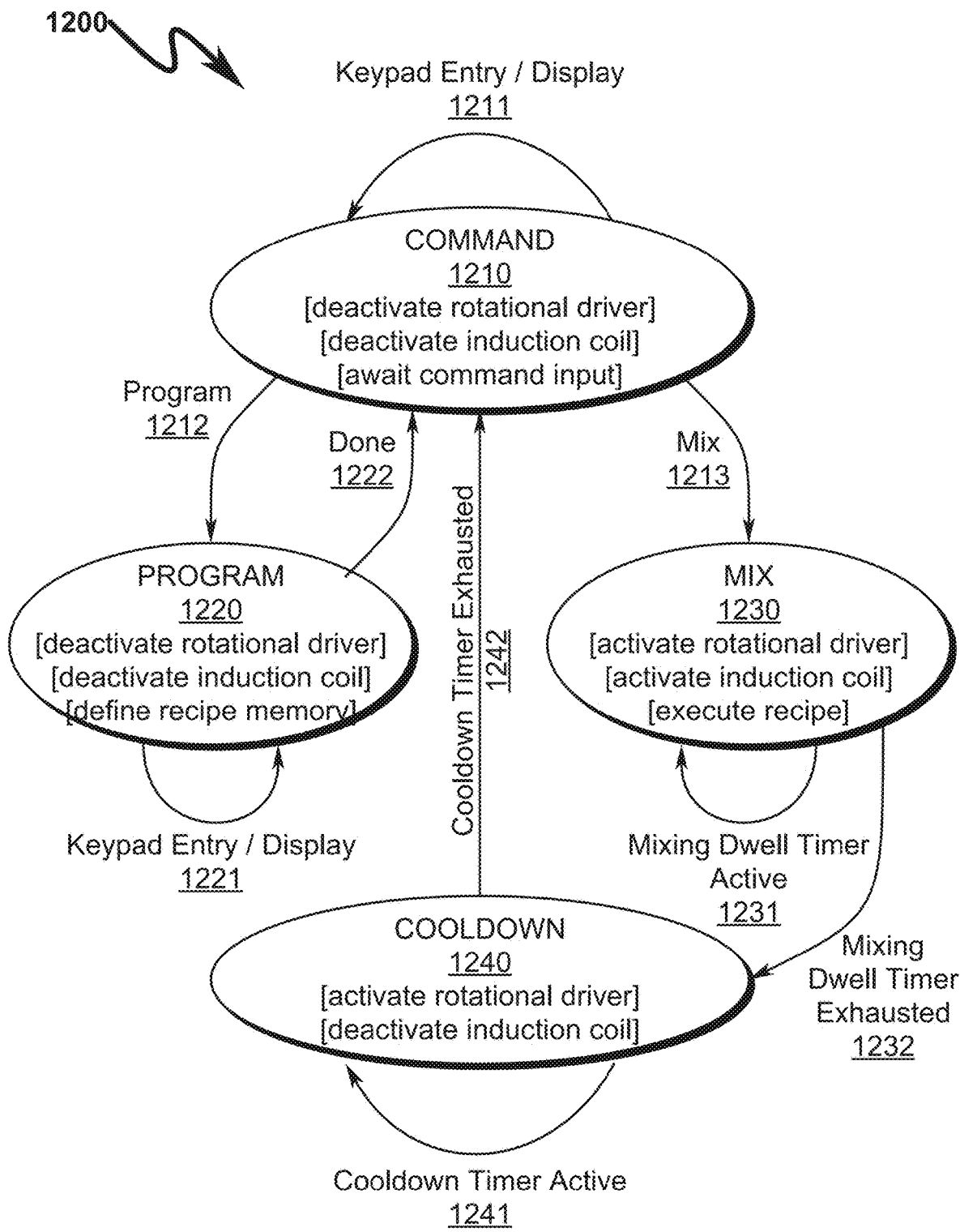
FIG. 12 illustrates an exemplary state machine diagram that may be used in some preferred system state controller embodiments incorporated within the present invention.

The system state controller (1120) depicted in FIG. 11 (1100) may incorporate a variety of operational state maps, an exemplary embodiment of which is generally depicted in FIG. 12 (1200). Here the system control is generally depicted, to include COMMAND (1210), PROGRAM (1220), MIX (1230), and COOLDOWN (1240) states. The COMMAND (1210) state permits keypad entry and/or display of commands during times where the rotational driver and induction coil are deactivated. If a RECIPE PROGRAM (1212) command is entered the PROGRAM (1220) state is activated in which keypad entries/displays (1221) are activated while recipe memory is loaded with user defined mixing parameters. When the recipe definition is completed (1222) control returns to the COMMAND state (1210). If a MIX command is entered (1213), control passes to the MIX state (1230) wherein the rotational driver and induction coil are activated to execute a specific recipe retrieved from previously defined recipe memory (or some pre-programmed recipe configuration) and this state is maintained while the dwell timer is active (1231). When the mixing dwell timer is exhausted (1232), a COOLDOWN state (1240) is entered in which the rotational driver is maintained with the induction coil deactivated while a cooldown timer (1241) is monitored. When the cooldown timer is exhausted (1242) control returns to the COMMAND state (1210).

Induction Coil Detail (1300,1400)

Figure 13:
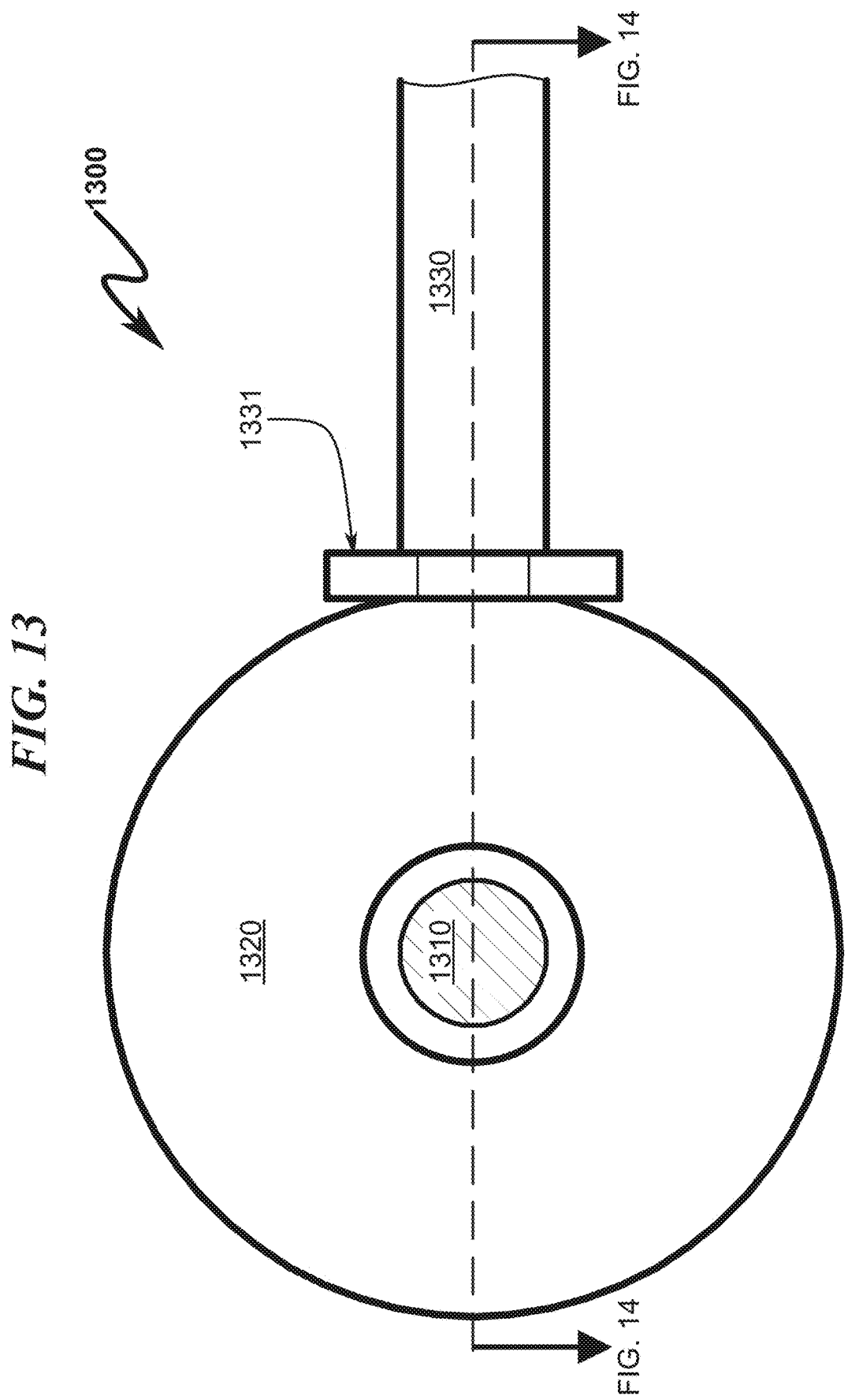
FIG. 13 illustrates an end view of an exemplary induction coil assembly used in some preferred invention embodiments.

Additional detail of an exemplary induction coil is generally illustrated in the top view of FIG. 13 (1300) and the side sectional view of FIG. 14 (1400). Referencing FIG. 13 (1300), the driveshaft (1310) is encircled by the induction coil housing (1320) that is generally cylindrical in shape in many preferred embodiments. The induction coil housing (1320) is mounted to a fixed support via use of support shaft (1330) (and optional locking nut (1331)) that provides both mechanical support and provisions for electrical connections to the induction coil contained within the induction coil housing (1320).

Referencing the exemplary induction coil side sectional view of FIG. 14 (1400), the driveshaft (1410) is peripherally enclosed by the induction coil housing (1420) that may comprise a containment shell and/or encapsulation material (1421) which contain the induction coil windings (1422). This induction coil structure (1420) may be supported in a wide variety of fashions, but as shown in FIG. 14 (1400), an exemplary mounting methodology is via the use of a support shaft (1430) that threads into the body of the induction coil structure (1420) and is retained via the use of a locking nut (1431) or other fastening means. In this preferred exemplary embodiment the support shaft (1430) is tubular and permits the induction coil windings (1422) to be routed (1432, 1433) through the tubular support shaft (1430) for connection to the coil excitation electronics. This exemplary embodiment of the induction coil structure also permits incorporation of additional wiring (1434) that supports connections to a shaft sensor module (1435) that may incorporate a shaft speed detection sensor and/or shaft temperature sensor as described herein.

Integrated Heating Lamp Detail (1500,1800)

Figure 15:
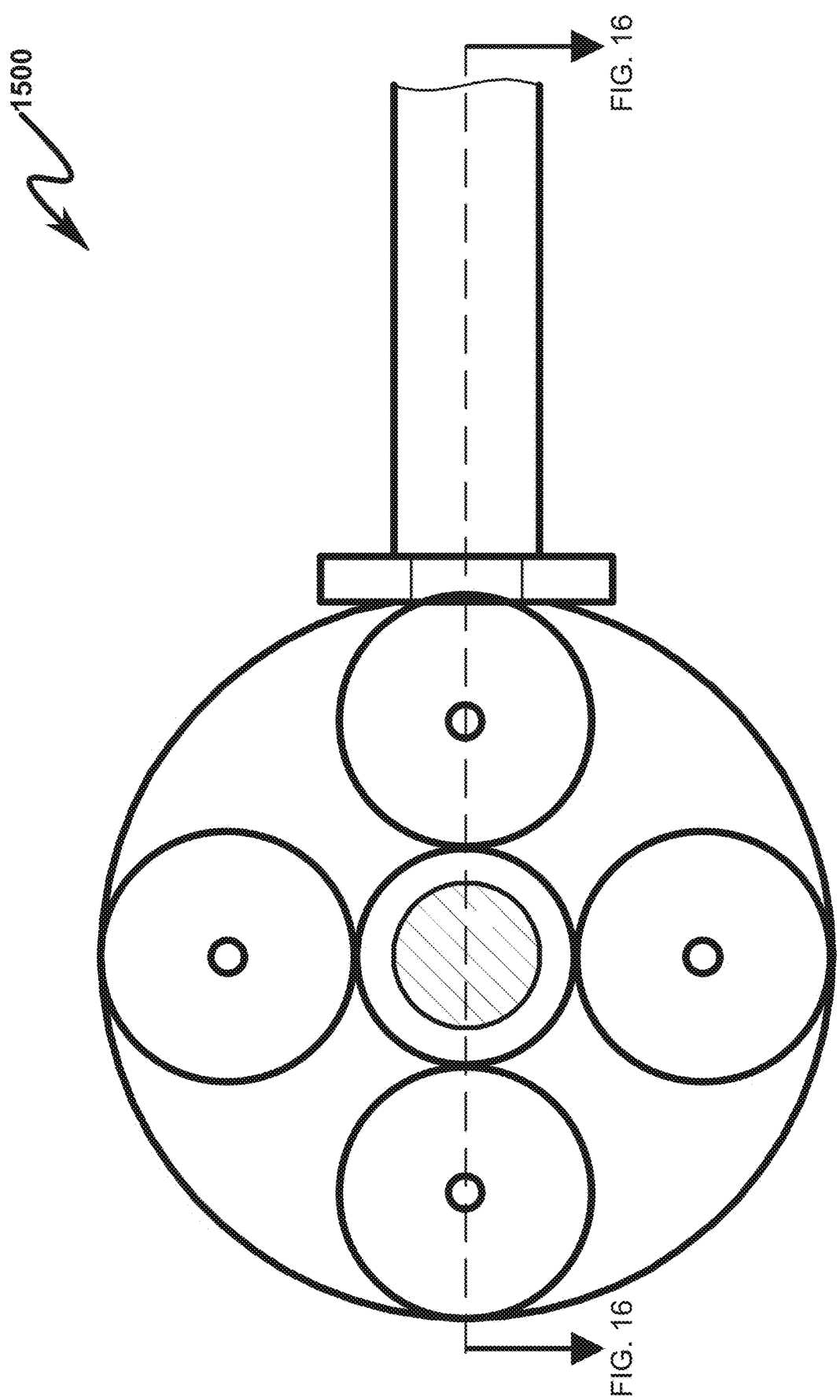
FIG. 15 illustrates an end view of an exemplary induction coil assembly used in some preferred invention embodiments that incorporate integrated heating lamps.
Figure 16:
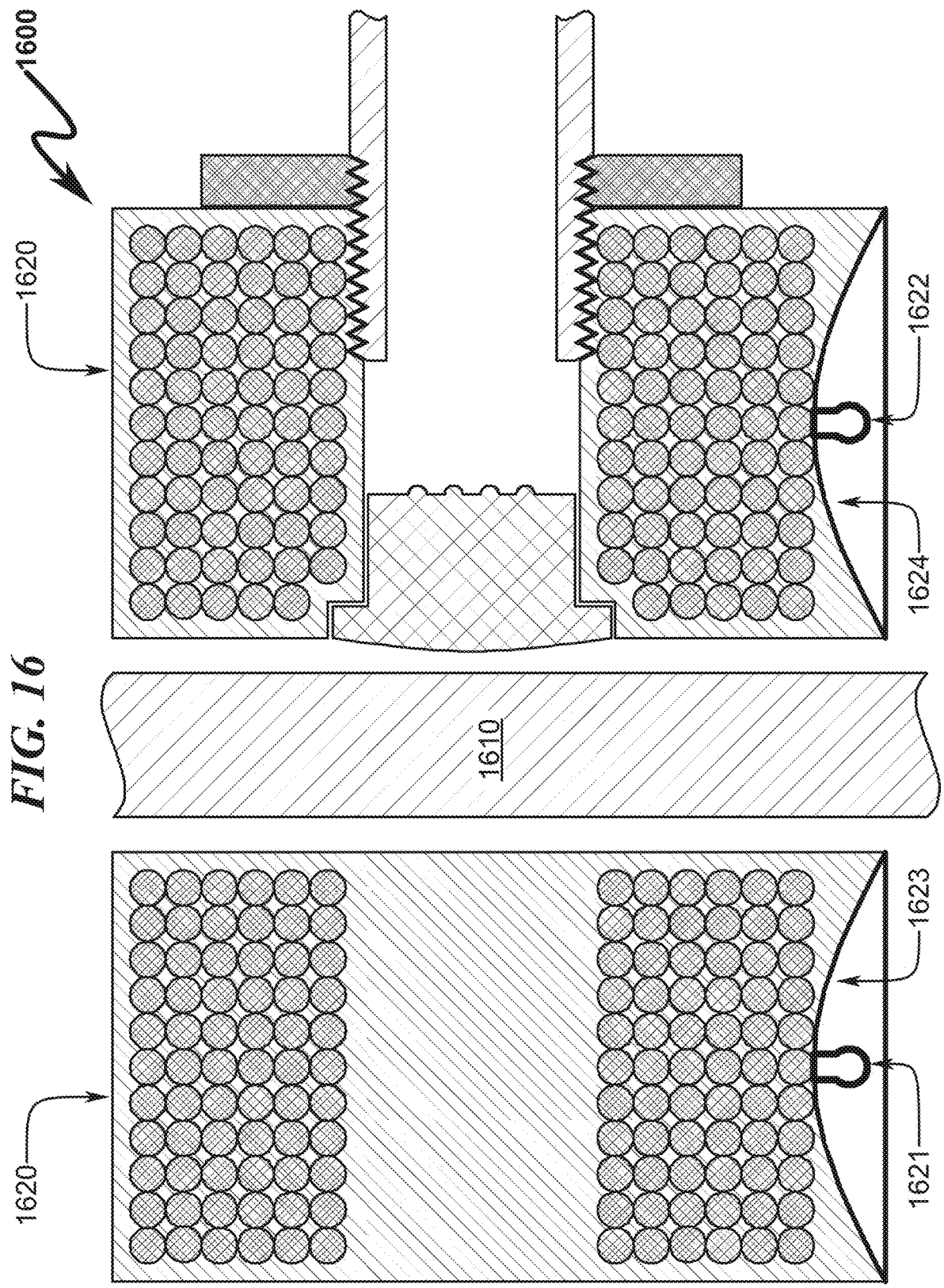
FIG. 16 illustrates a side sectional view of an exemplary induction coil assembly used in some preferred invention embodiments that incorporate integrated heating lamps.

The induction coil structure depicted in FIG. 13 (1300) and FIG. 14 (1400) may be modified in some configurations as depicted in the bottom view of FIG. 15 (1500) and the side sectional view of FIG. 16 (1600) to include provisions for heating lamps (1621, 1622) and associated reflectors (1623, 1624) that may be integrated within or attached to the induction coil assembly (1620) as it surrounds the driveshaft (1610). The heating lamps (1621, 1622) depicted in this diagram may comprise a wide variety of heating sources well known in the art, including but not limited to incandescent, halogen, LED, etc. The power source for these heating lamps (1621, 1622) may be separately derived from power cables routed through the tubular shaft support (1430) or in some circumstances derived by utilizing contacts with the induction coil windings (1422). One skilled in the art will no doubt envision a variety of methods of powering the heating lamps based on this disclosed anticipated connection options.

Rotational Driver/Driveshaft Insulating Coupling

Overview (1700)

Figure 17:
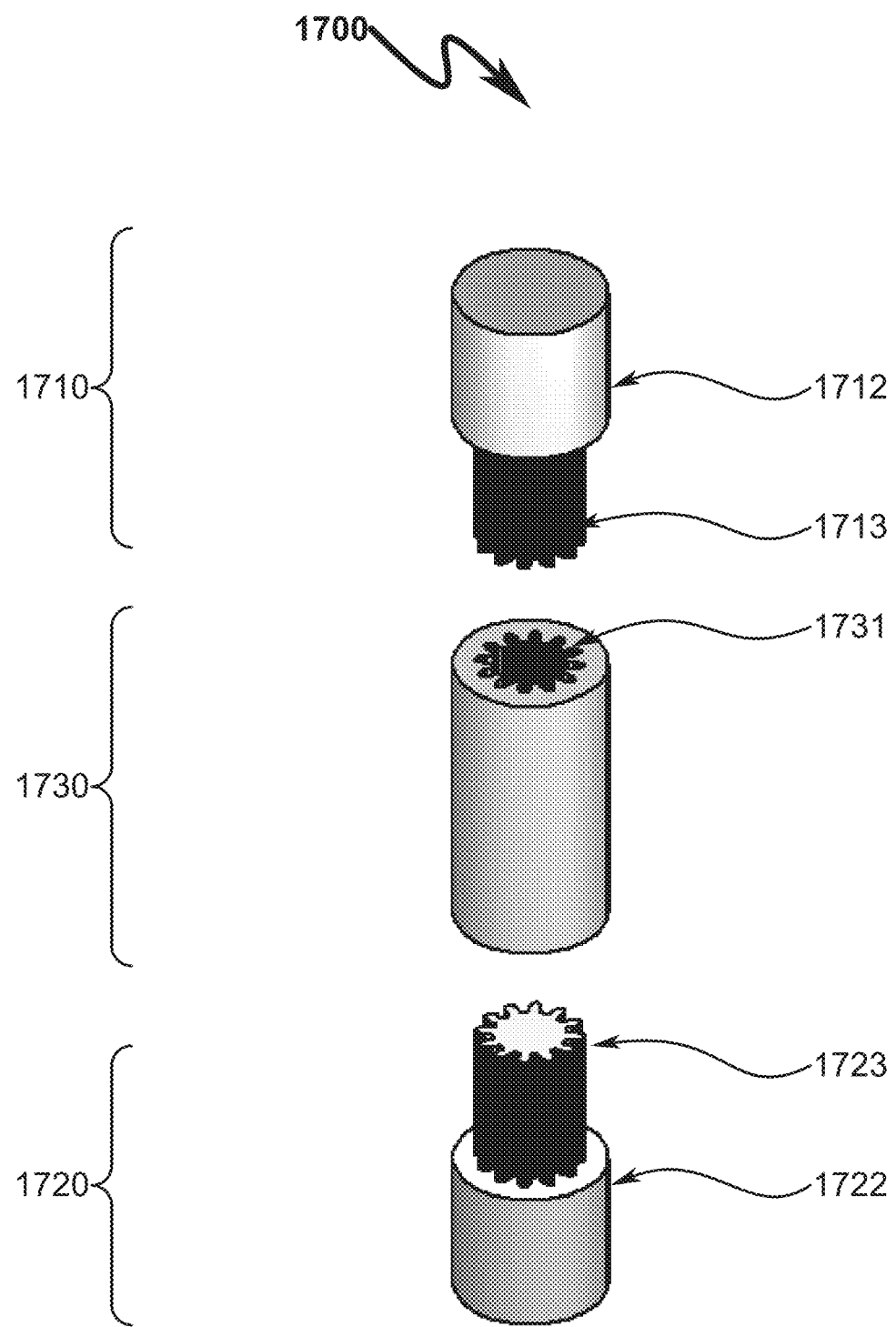
FIG. 17 illustrates a perspective view of a preferred embodiment of the present invention illustrating isolation of the driveshaft from the rotational driver motor.

In some circumstance the rotational driver and the driveshaft may be insulated (thermally and/or electrically isolated) from each other by means of a mechanical coupler having electrical and/or thermal insulating characteristics as generally depicted in FIG. 17 (1700). As depicted in FIG. 17 (1700), the rotational driver (1710) rotating shaft (1712) is configured with a first male mating endshaft (1713) that corresponds to a first female mating receptacle (1731) within the mechanical coupler (1730). The driveshaft (1720) is configured with a second male mating endshaft (1721) that corresponds to a second female mating receptacle within the mechanical coupler (1730). The mechanical coupler (1730) may be optionally configured with a variety of fastening means to secure the first male mating endshaft (1713) with the second male mating endshaft (1723) within the confines of the mechanical coupler (1730).

The first male mating end (1713) and the second male mating end (1723) may be configured differently and have different profiles and/or sizes. Exemplary configurations of theses mating ends (1713, 1723) include but are not limited to cylindrical shafts, spline shafts, TORX® shafts, regular polyhedron (square, hexagonal, octagonal, etc.) shafts, and conventional WOODRUFF-style keyed shaft profiles. Each mating endshaft and the corresponding female cavity may be independently selected from this exemplary group of shaft profiles in a wide variety of preferred invention embodiments.

Driveshaft Insulation Detail (1800)-(2200)

The heating action of the induction coil will cause neat to develop in the mixing blade. While the majority of the heat will be dissipated into the beverage slurry, some of the heat will travel towards the motor, along the length of the mixing blade driveshaft. A TEFLON® (or other dielectric material such as DELRIN®) insert or spacer may be used in some embodiments to mechanically couple and electrically/thermally isolate the mixing blade to the motor shaft. This insert isolates the motor shaft from the mixing blade, both thermally and electrically. The isolation helps insure that the heat from, the inductive heating does not damage the windings of the motor and also the bearings.

Figure 18:
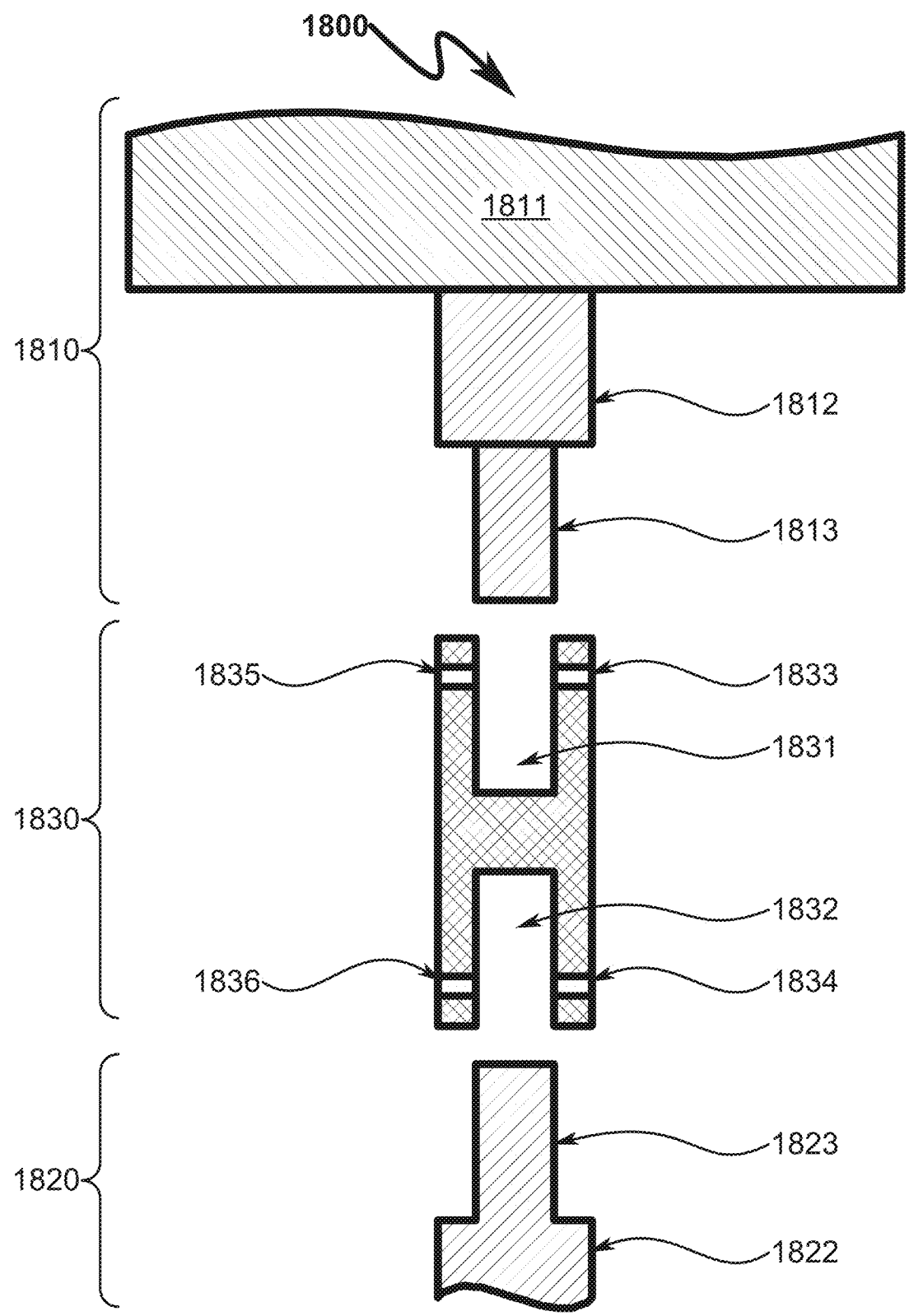
FIG. 18 illustrates a side sectional view of a preferred embodiment of the present invention illustrating isolation of the driveshaft from the rotational driver motor.

As generally depicted in the sectional view of FIG. 18 (1800), the rotational driver (1810) may be isolated to the driveshaft (1820) via the use of an insulating mechanical coupler (1830). In this preferred, exemplary embodiment, the rotational driver (1810) comprises a drive motor (1811) having a driveshaft (1812) configured with a keyed endshaft (1813) that mates with a corresponding cavity (1831) in the mechanical coupler (1830). The driveshaft (1820) is similarly configured with main shaft portion (1822) connected to the mechanical agitator (not shown) and a keyed endshaft (1823) that mates with a corresponding cavity (1832) in the mechanical coupler (1830). Provisions for setscrews, pins, or other fasteners (1833, 1834, 1835, 1836) are provided within the mechanical coupler (1830) to ensure a rigid and fixed mechanical coupling between the motor endshaft (1813), the mechanical coupler (1830), and the driveshaft endshaft (1823).

Figure 19:
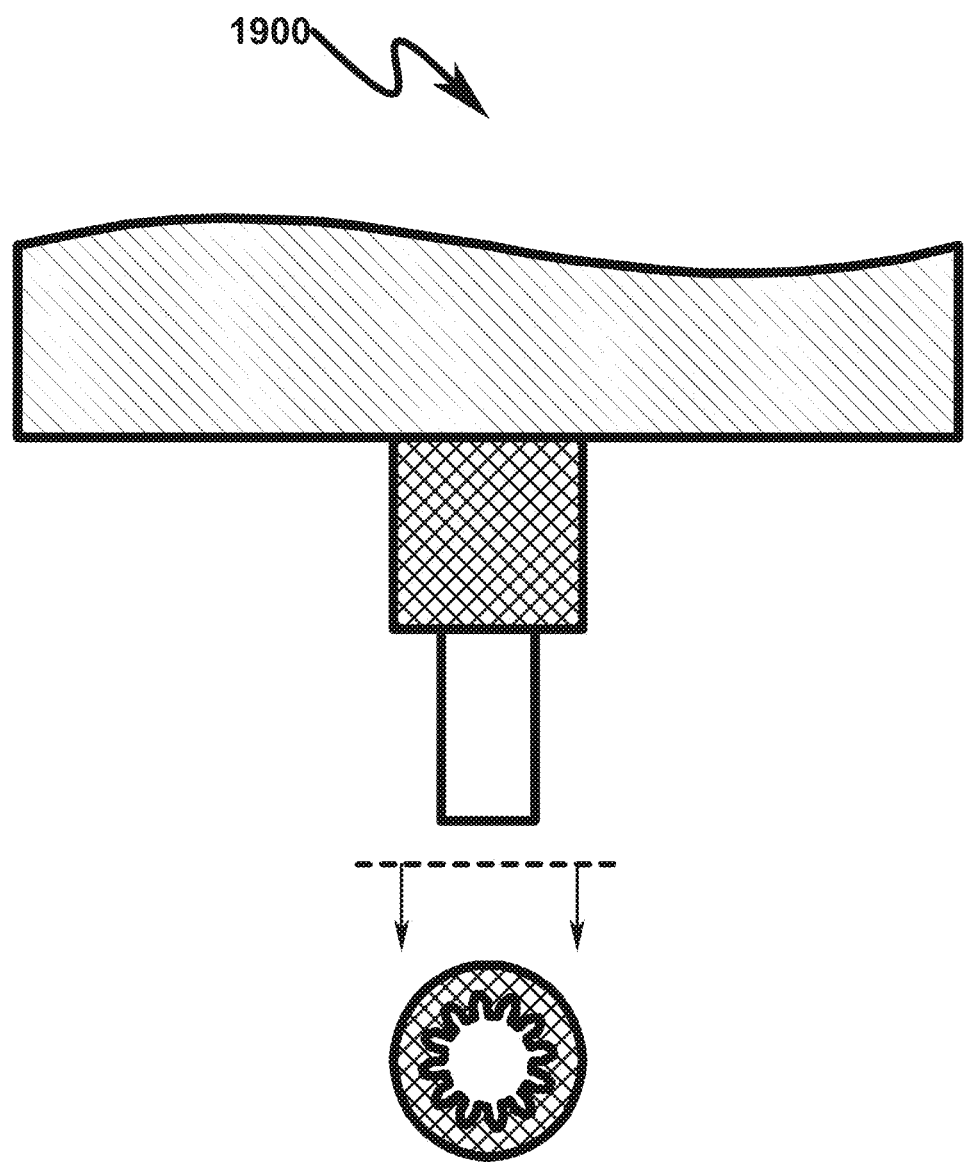
FIG. 19 illustrates an end view of an exemplary rotational driver endshaft profile used to insulate the rotational driver and driveshaft in some preferred invention embodiments.
Figure 21:
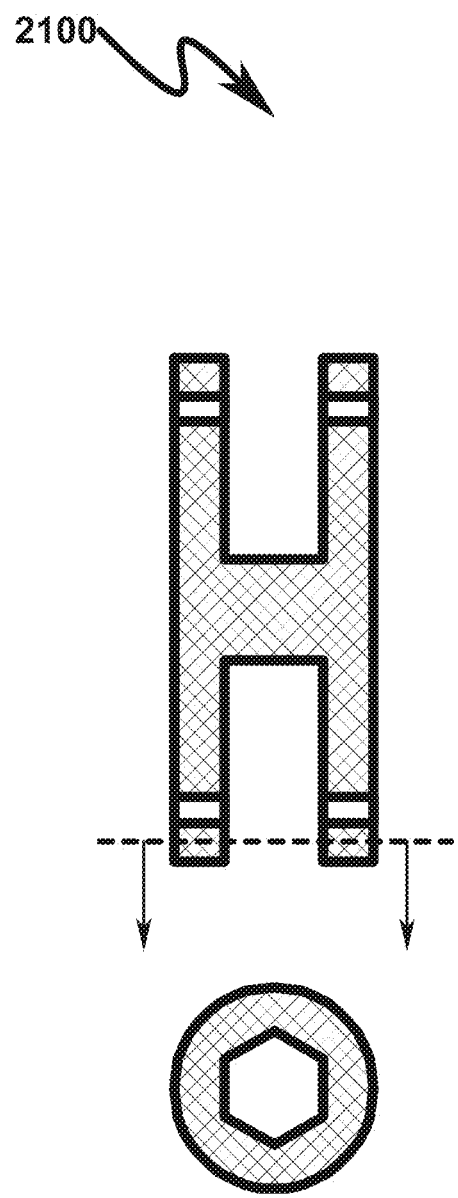
FIG. 21 illustrates an end view of an exemplary mechanical coupler cavity profile used to insulate the driveshaft in some preferred invention embodiments.
Figure 22:
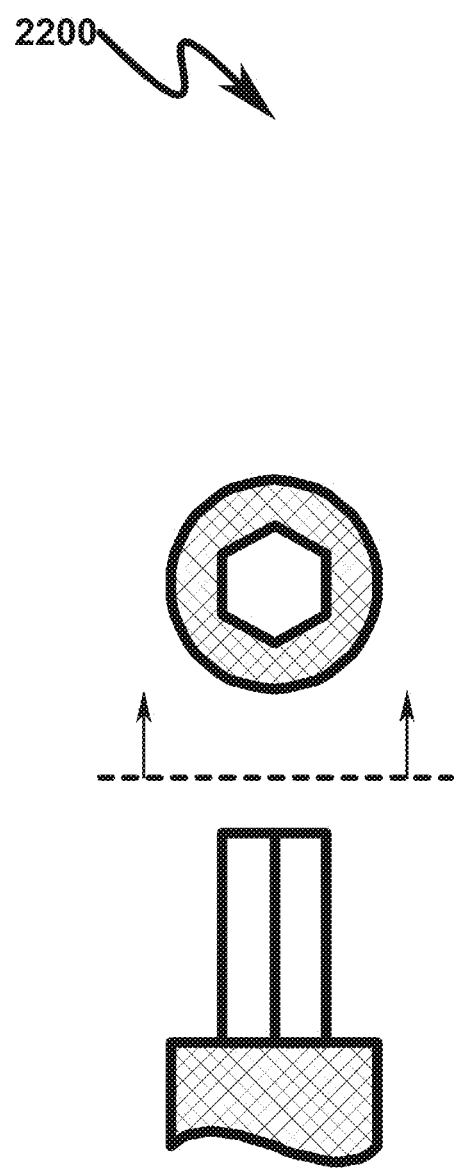
FIG. 22 illustrates an end view of an exemplary driveshaft endshaft profile used to insulate the rotational driver and driveshaft in some preferred invention embodiments.

The endshafts (1813, 1823) and corresponding mechanical coupler cavities (1831, 1832) are not necessarily of the same construction and may typically be constructed using cylindrical, spline, TORX®, regular polyhedral (square, hexagonal, octagonal, etc.) profiles. For example, FIG. 19 (1900) and FIG. 20 (2000) illustrate end views of an exemplary spline pattern that may be used in this construction and FIG. 21 (2100) and FIG. 22 (2200) illustrate the use of a hexagonal key/broached insert pattern.

Exemplary System Control Electronics (2300, 2400)

Figure 23:
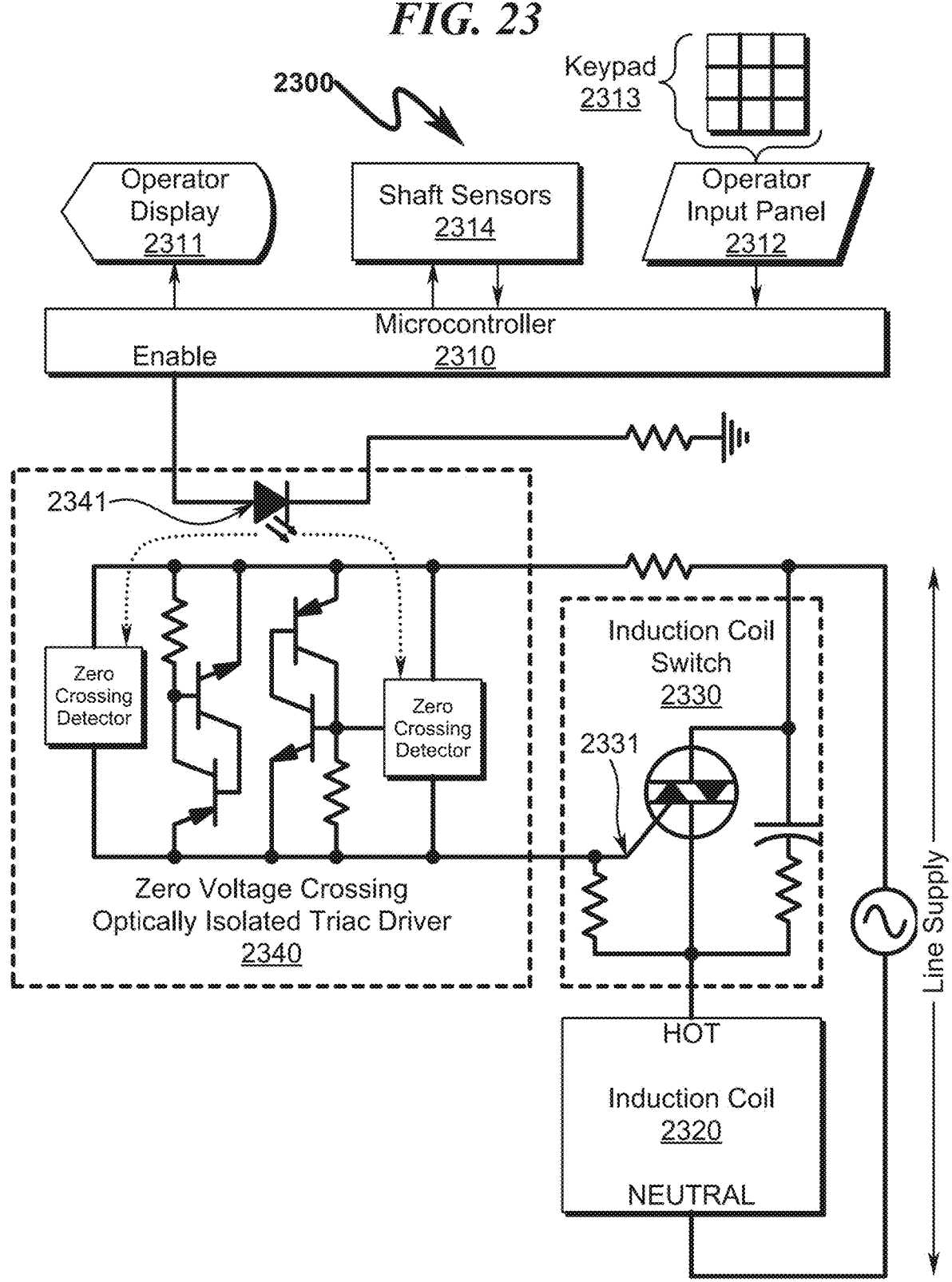
FIG. 23 illustrates an exemplary system control schematic of an induction coil power switching arrangement.
Figure 24:
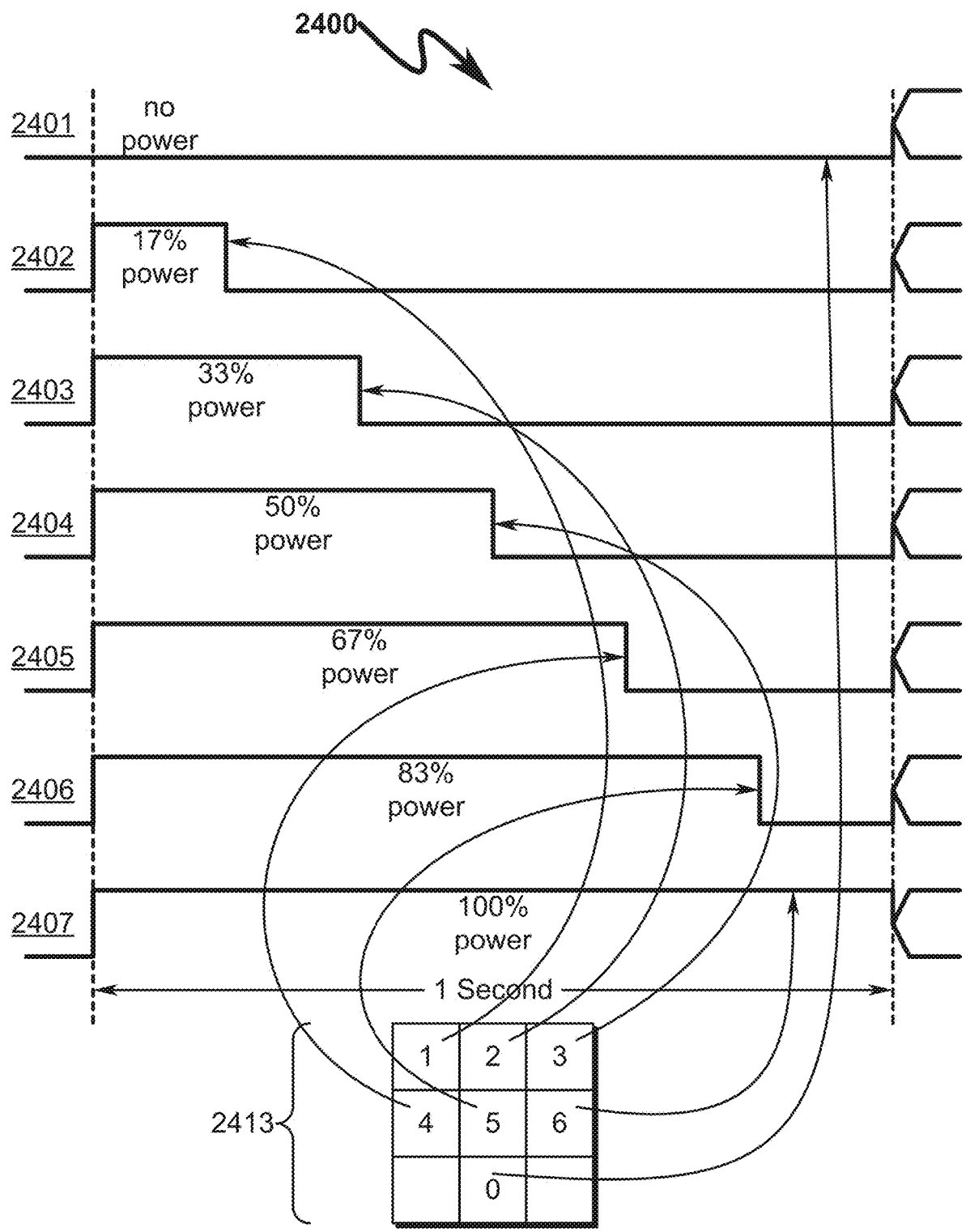
FIG. 24 illustrates exemplary power switching waveforms associated with a preferred invention embodiment.

While the present invention anticipates many possible methodologies of controlling the heat generated by the induction coil, the schematic depicted in FIG. 23 (2300) and waveforms depicted in FIG. 24 (2400) are exemplary of a preferred system control configuration.

Exemplary Power Control Schematic (2300)

Referring to the schematic of FIG. 23 (2300), a system microcontroller (MCU) (2310) that supervises the overall control system is supported by operator display indicators (2311), an operator input controls (2312) (which may incorporate a keypad (2313), and support for a variety of shaft sensors (2314) (speed, temperature, etc.). The MCU (2310) controls the driveshaft heat generated by the induction coil (2320) by means of a main induction coil switch (2330) which is typically a thyristor class device such as a SCR or TRIAC. In this context the gate control (2331) for this device should be isolated from the MCU (2310) to insulate the operator inputs (2312, 2313) from a possible shock hazard. This is accomplished by use of a zero voltage crossing optically isolated triac driver (2340) that incorporates an internal LED (2341) driven by the ENABLE digital output of the MCU (2310). The internal ZERO CROSSING DETECTORS within the triac driver (2340) are responsive to the output of the internal LED (2341) and trigger internal thyristors to affect gate control (2331) of the induction coil switch (2330).

While many forms of optical isolation are potentially useable in this configuration, some preferred invention embodiments employ FAIRCHILD® model MOC3031M/ MOC3032M/MOC3033M/MOC3041M/MOC3042M/ MOC3043M DIP Zero-Cross Optoisolators Triac Driver Output devices. These devices or their equivalent possess sufficient high voltage isolation to insulate the user interface devices (2312, 2313) and the MCU (2310) from potential high voltage hazards associated with the induction coil (2320) excitation.

Exemplary Power Control Waveforms (2400)

While many varieties of power control waveforms may be used to control the circuitry illustrated in FIG. 23 (2300), one preferred invention embodiment makes use of pulse width modulation as generally illustrated in FIG. 24 (2400) to enable the gate control (2341) of the optoisolator (2340) depicted in FIG. 23 (2300). As generally illustrated in FIG. 24 (2400), a keypad (2413) may be mapped to a variety of pulse widths (2401, 2402, 2403, 2404, 2405, 2406, 2407) that define the duty cycle for the triac drive circuitry generally illustrated in FIG. 23 (2300). Modulation of the gate enable for the triac results in a proportional amount of heating induced into the driveshaft by the induction coil. As discussed elsewhere herein, the invention also anticipates that this heating modulation may occur as a result of preprogrammed cycles within the overall control system architecture defined by the present invention.

One skilled in the art will recognize that while six power settings have been defined in FIG. 24 (2400), the present invention is not necessarily limited to these particular settings and that a wide variety of power settings are possible using the present invention teachings.

Exemplary Control System (2500)

Figure 25:
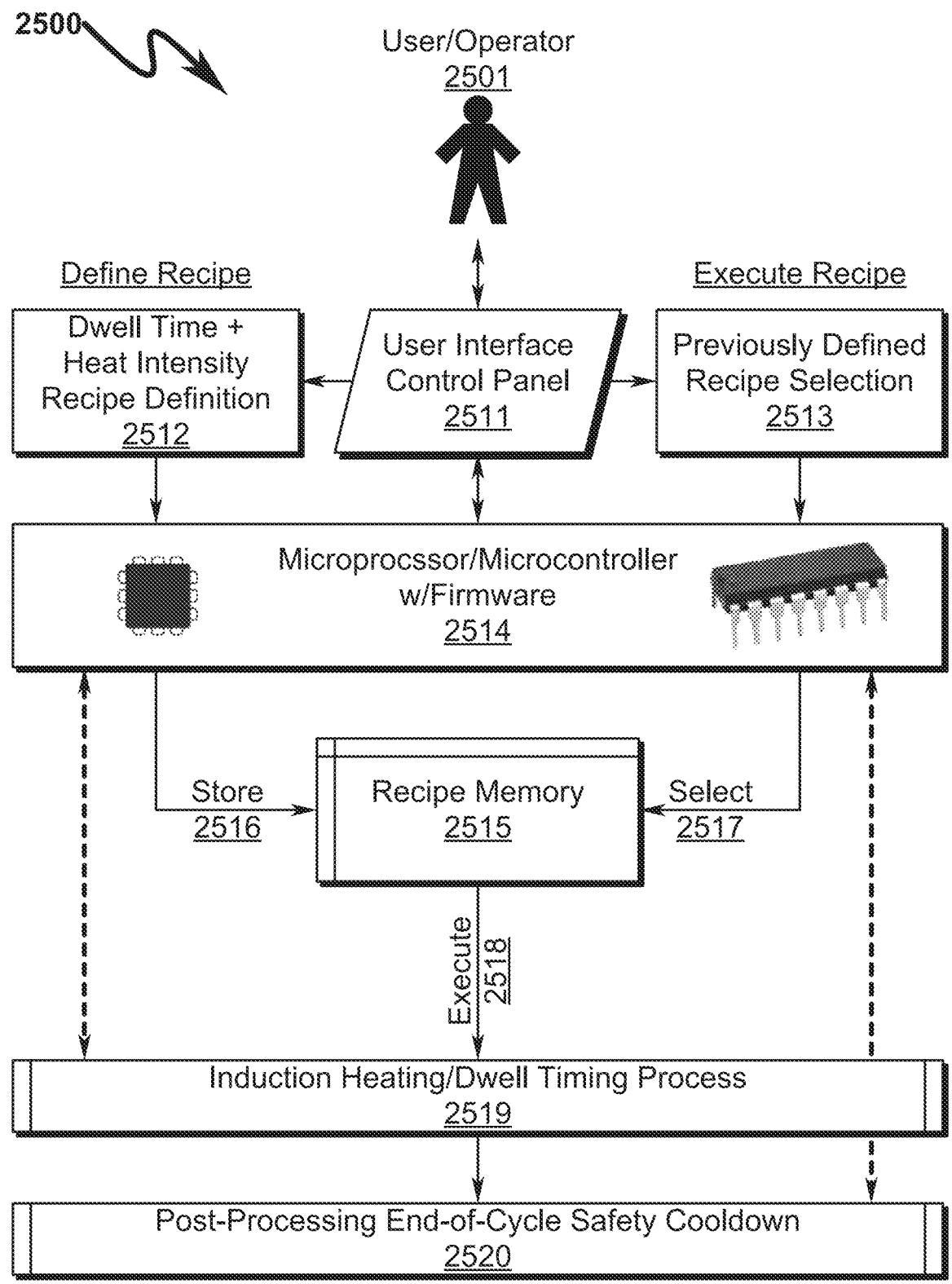
FIG. 25 illustrates an exemplary system block diagram of a computerized user interface control system useful in some preferred embodiments of the present invention.

The present invention may in some preferred embodiments incorporate a control system as generally depicted in FIG. 25 (2500). In this preferred exemplary embodiment the user/operator (2501) interacts with a hardware interface control panel (2511) that permits a number of 'recipes' to be defined (2512) in which the dwell time and/or heat intensity of the drive shaft are controlled. These predefined recipes may later be selected for execution (2513) via the user interface control panel (2511) under control of a microprocessor/microcontroller (2514) running software/firmware retrieved from a computer readable medium. Storage for the dwell time/heating recipes may include a variety of forms of non-volatile storage (2515) well known to those in the electrical arts. The storage/selection of recipes from the recipe memory (2515) by the microprocessor/microcontroller (2514) will by necessity be determined by the specific memory technology used in each application instance.

Once stored (2516) in the recipe memory (2515), a given recipe may be selected (2517) for execution (2518) by an induction heating/dwell timing process (2519) that heats the driveshaft using a specified induction heating sequence and dwells (spins) the driveshaft using a defined rotational program. Once the preprogrammed heating/dwell sequence is completed, a post-processing end-of-cycle safety cooldown sequence (2520) may be executed to ensure that the heat stored in the driveshaft is properly dissipated into the slurry and does not present a hazard to the operator (2501) who may touch the shaft after the preprogrammed cycle is complete. While the cooldown period may vary widely based on application context, some preferred exemplary invention embodiments may utilize approximately a 3-second cooldown period. Some preferred embodiments may utilize a cooldown timer value that is determined based on the heating profile of the driveshaft, thus permitting a variable cooldown period to be utilized.

The present invention anticipates that the recipe memory (2515) may incorporate both user-defined (2501) recipes that have been programmed using the user interface control panel (2511) as well as a variety of 'pre-defined' recipes that are factory-stored within the microprocessor/microcontroller (2514) firmware and/or portions of the non-volatile recipe memory (2515).

Arbitrarily Identified Recipes (2600)

Figure 26:
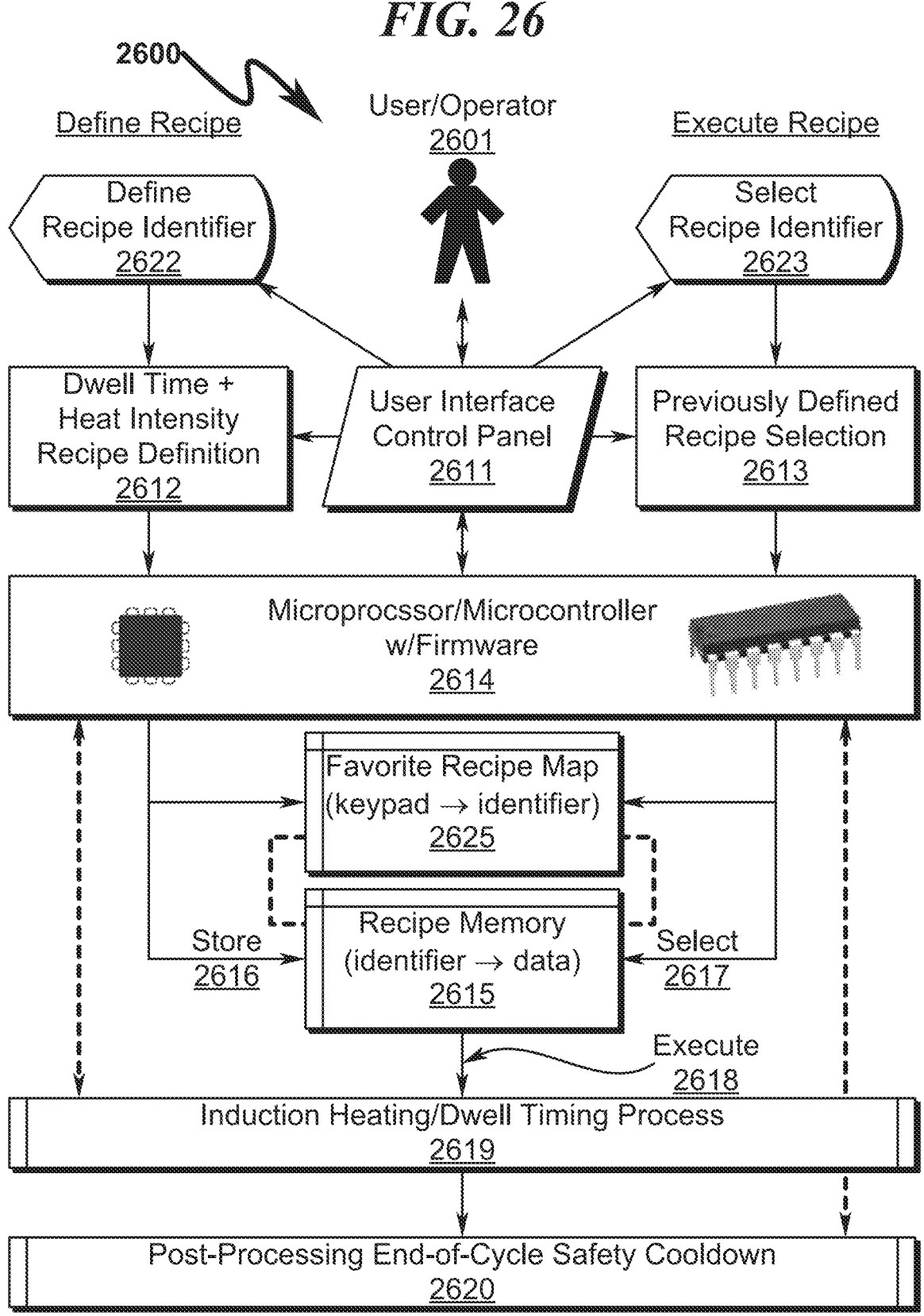
FIG. 26 illustrates an exemplary system block diagram of a computerized user interface control system incorporating customized recipe identification that may be applied in some preferred embodiments of the present invention.

Within the context of the system as described in FIG. 25 (2500), some preferred invention embodiments may incorporate the capability to 'tag' recipes with arbitrary identifiers (including but not limited to alpha and/or numeric identifiers) as generally depicted in FIG. 26 (2600). Here it can be seen that the recipe definition interface permits the user (2601) to map the heat intensity/dwell time recipe definition (2612) to an associated customized identifier (2622). This identifier (for example) could be alphanumeric and entered on a touch screen or other display device as a user selection data entry option. Once defined, the associated recipe definition could be selected (2623) using the same customized identifier. The association of the customized recipe identifier would typically be incorporated within the recipe memory (2615) as depicted here by using an identifier to data array mapping function processed by the microprocessor/microcontroller (2614).

This exemplary embodiment using customized recipe identifiers permits a larger number of recipes to be stored than would normally be possible using just a simple 1-10 selection keypad for example. Additionally, this methodology allows a conventional keypad entry device (2611) to incorporate preprogrammed 'favorite' recipes that provide a display of the recipe identifier to ensure that the operator (2601) has selected the proper recipe for the mixing operation that is to be executed. The mapping of keypad entries to recipe identifiers (2625) may be accomplished in a variety of ways, with a preferred implementation using a mapping function within a subset of the recipe memory (2615).

Preferred Embodiment Control Method (2700,2800)

Figure 27:
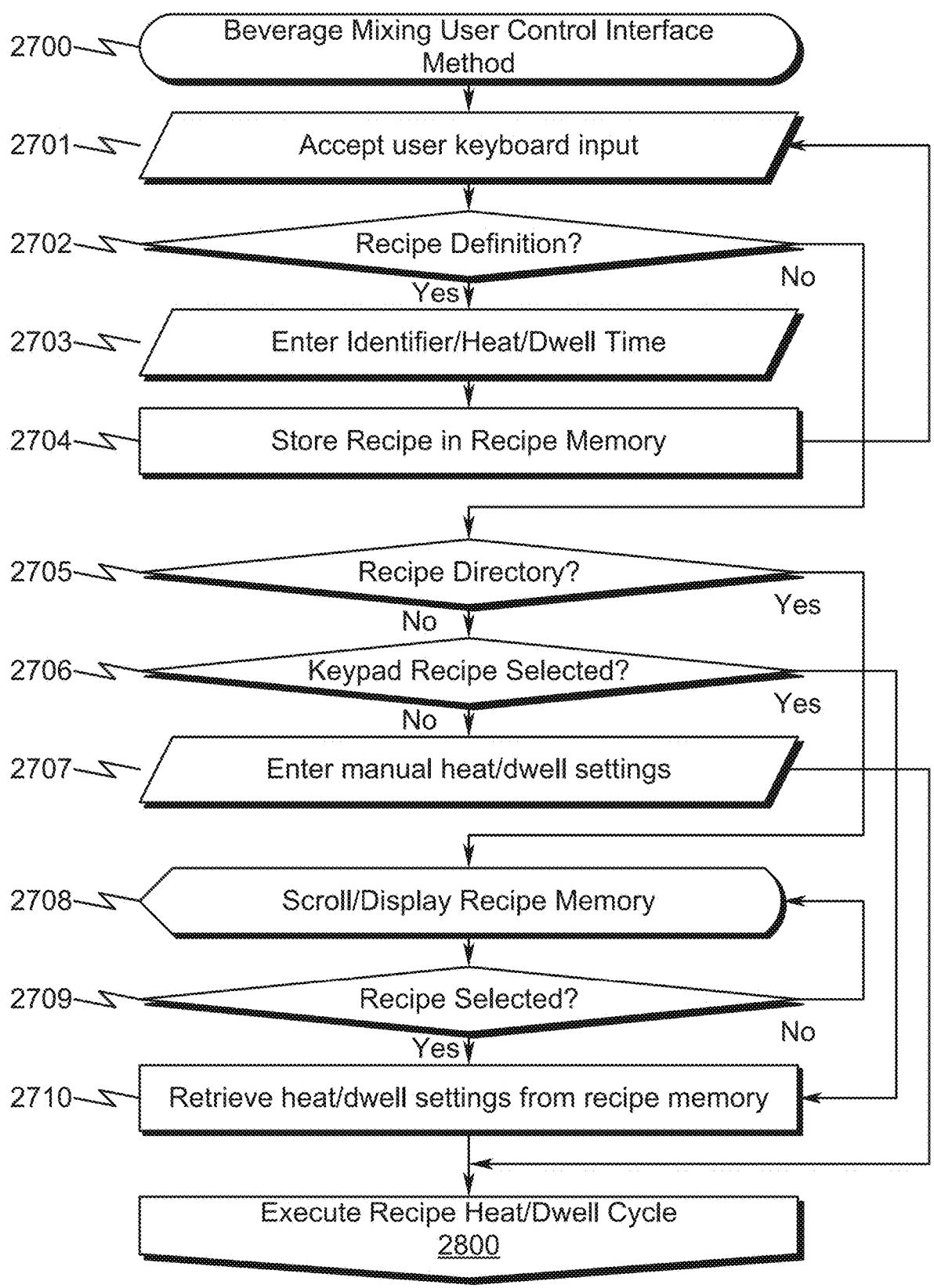
FIG. 27 illustrates an exemplary flowchart illustrating a preferred exemplary user control interface method useful in some preferred invention embodiments.
Figure 28:
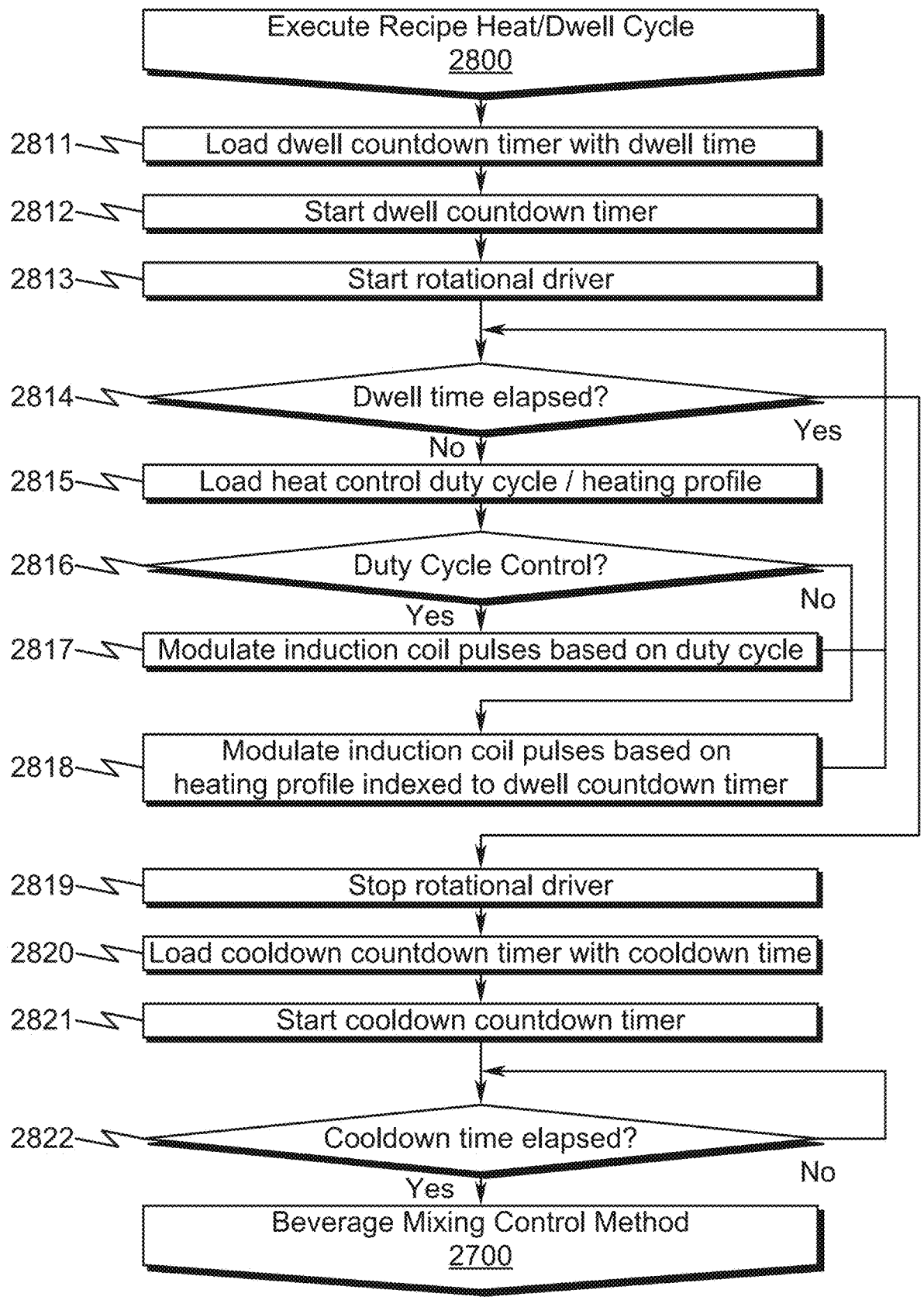
FIG. 28 illustrates an exemplary flowchart illustrating a preferred exemplary heating/dwell cycle recipe execution method useful in some preferred invention embodiments.

The present invention control system described above may employ a preferred exemplary beverage mixing user control interface method as described in FIG. 27 (2700) and a heating/dwell cycle recipe execution method as described in FIG. 28 (2800), wherein these embodiment methods comprise the following steps:

(1) accepting user input from a keyboard or control panel (2701);
(2) determining if a recipe definition is to be performed, and if not, proceeding to step (5) (2702);
(3) defining a recipe by entering an (optional) recipe identifier, the desired heating level, and the dwell time (2703);
(4) storing the defined recipe in the recipe memory and proceeding to step (1) (2704);
(5) determining if a recipe directory function is selected, and if so, proceeding to step (8) (2705);
(6) determining if a keypad (favorite) recipe has been selected, and if so, proceeding to step (10) (2706);
(7) entering manual heat/dwell settings from, a user interface and proceeding to step (11) (2707); and
(8) scrolling and/or displaying recipe memory to allow user selection of a stored recipe program configuration (2708);
(9) determining if a pre-stored recipe has been selected, and if not, proceeding to step (8) (2709);
(10) retrieving heat/dwell settings for a selected recipe from the recipe memory (2710);

(11) loading a dwell countdown timer with the dwell time for the mixing operation (2811);
(12) starting the dwell countdown timer (2812);
(13) activating the rotational driver (2813);
(14) determining if the dwell timer has elapsed, and if so, proceeding to step (19) (2814);
(15) loading the heat control duty cycle/heading profile information from the recipe memory (2815);
(16) determining if the heating control is to be based, on static duty-cycle modulation, and if not, proceeding to step (18) (2816);
(17) modulating the induction coil pulses based on a static duty cycle value retrieved from recipe memory and proceeding to step (14) (2817);
(18) modulating the induction coil pulses based on a heating profile indexed to the dwell countdown timer and proceeding to step (14) (2818);
(19) stopping the rotational driver (2819);
(20) loading a cooldown countdown timer with the cooldown time for the driveshaft (2820);
(21) starting the cooldown countdown timer (2821);
(22) determining if the cooldown countdown timer has elapsed, and if not, proceeding to step (22) (2822);
(23) returning to step (1) to await new user input from the keyboard/control panel.

One skilled in the art will recognize that these method steps may be augmented or rearranged without limiting the teachings of the present invention. This general method summary may be augmented by the various elements described herein to produce a wide variety of invention embodiments consistent with this overall design description.

Exemplary Recipe Control Scenarios

While the present invention may incorporate a variety of recipe control combinations, several examples may be useful in understanding how these may work together to achieve a desirable mixing outcome. In general, a given recipe may incorporate a desired heating value as well as a dwell time for which the mechanical driver is activated to rotate the mechanical agitator (mixing blade, etc.).

PWM Heating Control

The heating duty cycle values may take on a variety of values, but may in some cases be pulse width modulated (PWM) to achieve gradations of heating within the driveshaft. For example, six different heating levels can be achieved by utilizing a PWM scenario where LEVEL1=1 cycle ON (representing a low heat setting), 5 cycles OFF through LEVEL6=6 cycles ON, 0 cycles OFF (representing a high heat setting). The computing device counts and keeps track of the cycles output to the inductive coil in these scenarios and thus may directly set the driveshaft heating based on these parameters.

Within the context of the present invention, this form of PWM heating control may be static (as in the use of a fixed PWM heating value during activation of the rotational driver) or dynamic (as in the case where the PWM value is a function of time (and/or some other variable) during activation of the rotational driver).

Exemplary Recipe Map

While a variety of heating values/dwell timing values can be achieved with the present invention, an example of a set of user-programmed (or pre-programmed) combinations might include the following:

| Recipe Index (keypad #) | Dwell Time (s) | Heat Control (%) |
| --- | --- | --- |
| 1 | 45 | 50 |
| 2 | 60 | 50 |
| 3 | 60 | 66 |
| 4 | 60 | 83 |
| 5 | 60 | 100 |
| 6 | 75 | 50 |
| 7 | 75 | 83 |
| 8 | 75 | 100 |
| 9 | 90 | 66 |
| 10 | 90 | 100 |

One skilled in the art will recognize that this table is only exemplary of the possible heating/dwell time combinations that may be used with the present invention. Additionally, as noted before, this table may be augmented with a mandatory cooldown cycle time with the heat control set to 0% to permit heat present in the driveshaft to dissipate into the slurry. This safety feature prevents the operator from being burned due to an excessively hot driveshaft.

Rotational Driver Speed/Temperature Feedback (2900,3000)

Figure 29:
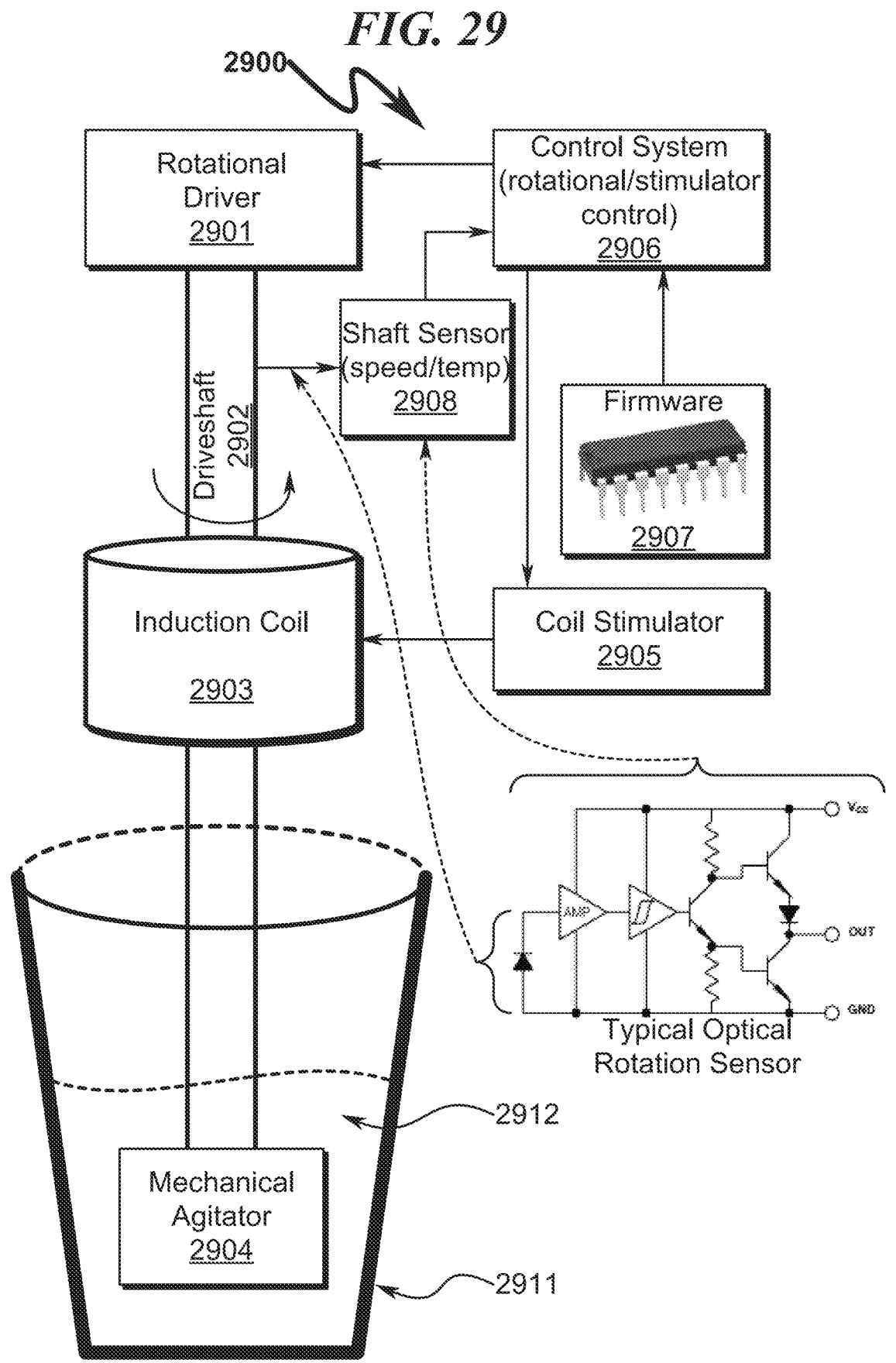
FIG. 29 illustrates a system block overview diagram describing a presently preferred system embodiment of the present invention that incorporates driveshaft speed detection to determine product slurry viscosity.

It is anticipated that the present invention when applied to the mixing of frozen beverages may in some circumstances be configured with a driveshaft shaft sensor (2908) comprising a rotational driver speed sensor and/or temperature sensor as generally depicted in FIG. 29 (2900). In these circumstances the induction coil (2903) when excited by the coil stimulator (2905) under control of the computing device (2906) will heat the driveshaft (2902) and by conduction the mechanical agitator (2904) and the product slurry (2912) within the product container (2911). The product, slurry (2912) will change (lower) in viscosity during this heating process, and thus present a varying frictional load (drag) on the mechanical agitator (2904) as it is rotated by the driveshaft (2902). This varying frictional load (drag) is transferred to the rotational driver (2901), which may vary in rotational speed based on this varying frictional load.

Speed Sensor

The invention embodiment as illustrated in FIG. 29 (2900) may utilize a shaft sensor (2908) comprising a rotational speed sensor that determines the rotational speed of the driveshaft (2902) to determine the varying frictional load presented by the product slurry (2912) and thus by inference the variation in product slurry (2912) viscosity. Differentials in the measured rotational speed of the driveshaft (2902) as measured by the shaft sensor (2908) can then be used to determine the point at which the product slurry (2912) is sufficiently fluid (by virtue of the heat transferred to the product slurry (2912) by the driveshaft (2912) via the induction coil (2903).

Figure 30:
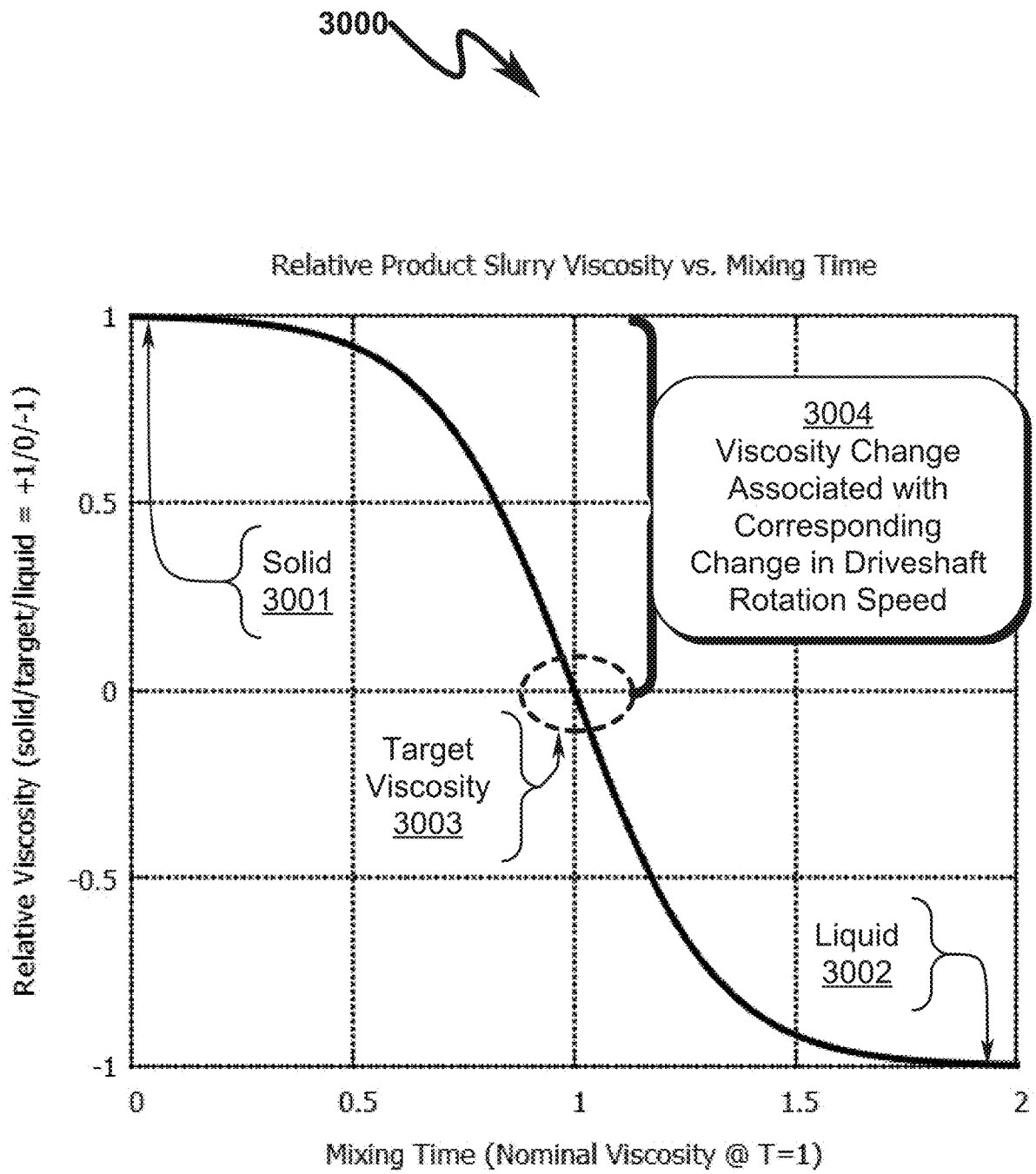
FIG. 30 illustrates a generalized graph depicting change in product slurry viscosity as a function of dwell time.

An example of this behavior is generally illustrated by the graph of FIG. 30 (3000), wherein the X-axis represents dwell time and the Y-axis represents relative product slurry viscosity ranging from, solid (3001) to liquid (3002) with an arbitrarily selected target (3003) viscosity obtained at a normalized, time of (T=1). As the fluid viscosity changes from solid (3001) to liquid (3002) through, the target viscosity point (3003), the load, on the rotational driver will decrease due to reduced friction, with the slurry and there will be a measurable differential in driveshaft rotation speed (3004) that can be used, to estimate the cutoff point at which the optimum product slurry viscosity (3003) is reached. One skilled in the art will recognize that the derivative of the rotational speed may be calculated by the computing device and this computed value may in some circumstances be sufficient to determine the point in time where the desired product slurry viscosity has been reached and the rotational driver can be deactivated. In other instances it may be sufficient to detect a change in absolute or relative driveshaft speed to determine the target point of optimal product slurry viscosity (3003).

The present invention anticipates a wide variety of shaft sensors (2908) may be used in this application, including but not limited to optical sensors (such as an OPTEK OPB760), Hall effect sensors, and magnetic pickup sensors. One skilled in the art will recognize that a wide variety of rotational speed sensors may be used in this application.

Infrared Feedback Control

The present invention also anticipates that the driveshaft (2902) may be monitored using a shaft sensor (2908) comprising an infrared temperature sensor to determine the actual temperature of the driveshaft (2902) as it is heated by the induction coil (2903). This temperature feedback information may then be used to modify the dwell time and/or driveshaft heating to optimize the mixing of the beverage. For example, a larger beverage container with more beverage slurry will generally require more heat and/or more dwell time to obtain the proper viscosity.

The use of a temperature sensor (2908) in these situations may produce a more optimal beverage product. Furthermore, the use of a temperature sensor may permit heating profiles to be more optimally utilized, wherein the heat induced into the driveshaft (2902) is initially at a very high level (to overcome the thermal mass of the driveshaft) and then dropped in intensity as the driveshaft (2902) temperature stabilizes to an acceptable value. This temperature measurement feature also permits different beverage products to be processed with a single machine with the assurance that the beverage products will not be overheated by the thermally induced driveshaft.

While a wide variety of IR temperature sensor products may be applicable in various invention embodiments, the use of products such as the Texas Instruments TMP006 or the MELEXIS MLX90614 may be suitable in some embodiment applications.

Rotational Load Sensor Feedback Control (3100, 3200)

Figure 31:
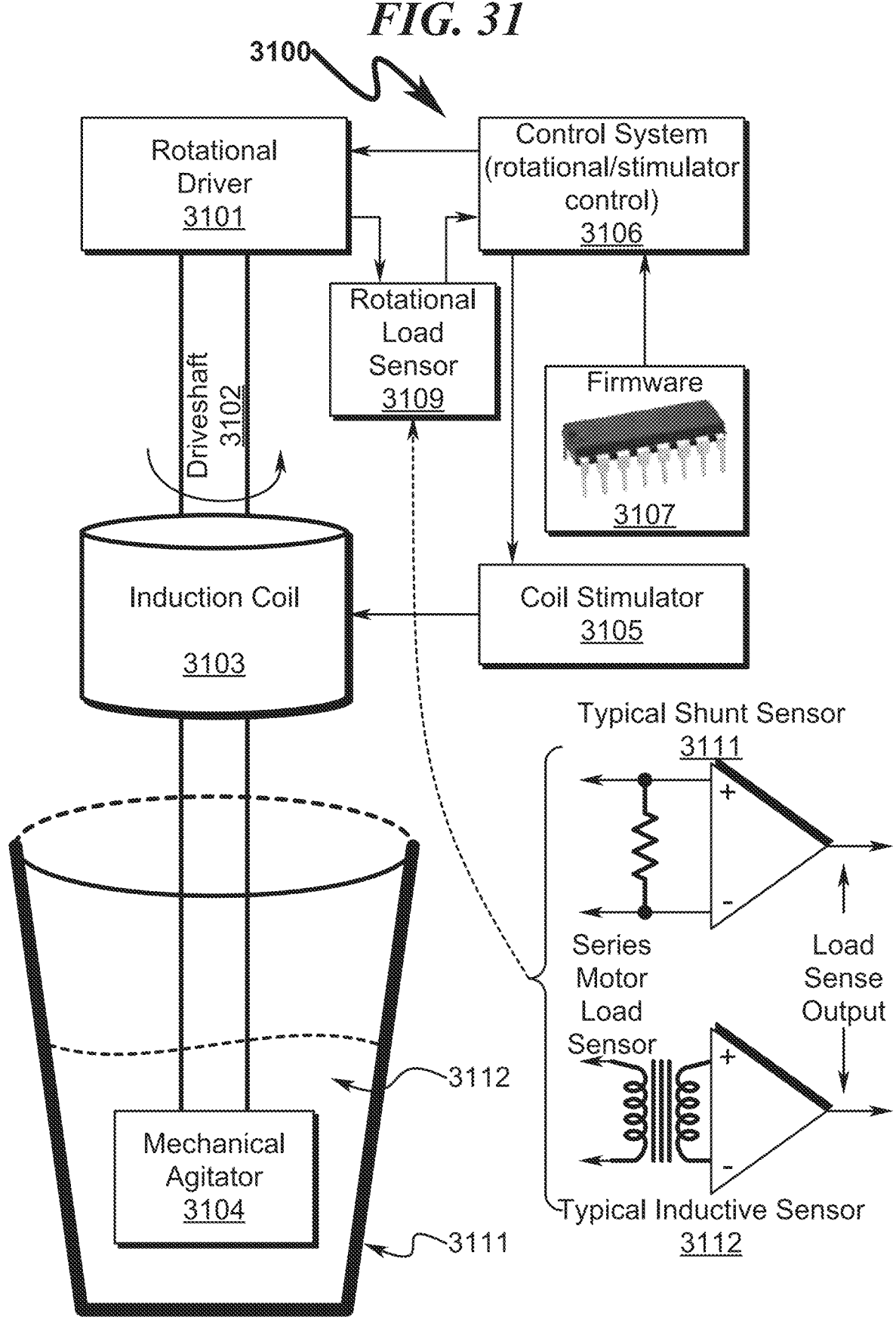
FIG. 31 illustrates a preferred exemplary system invention embodiment employing a rotational driver load sensor system used to determine beverage viscosity by indirectly measuring rotational driver load current/power consumption.

As generally depicted in FIG. 31 (3100), the present invention also anticipates that the speed of the rotational driver may be determined indirectly through the use of a rotational load sensor (3109). This rotational load sensor (3109) may take many forms, but generally serves to monitor the instantaneous current and/or power consumed by the rotational driver (3101). This current/power monitor (3109) may then be used to determine variations in the load presented to the motor via the mechanical agitator/driveshaft combination. Generally speaking, as the viscosity of the beverage slurry decreases, the rotational driver load will decrease, resulting in a measurable load variation that may be equated to increases in mixing RPM and decreased beverage slurry viscosity.

As generally depicted in FIG. 31 (3100), a wide variety of rotational load sensors (3109) may be used in this application, including but not limited to shunt resistors (3111) in series with the rotational driver (3101) that are monitored for voltage drops that correspond to instantaneous current draw by the rotational driver (3101), as well as inductive pickup's (3112) which measure AC field intensity that corresponds to current draw by the rotational driver (3101).

Figure 32:
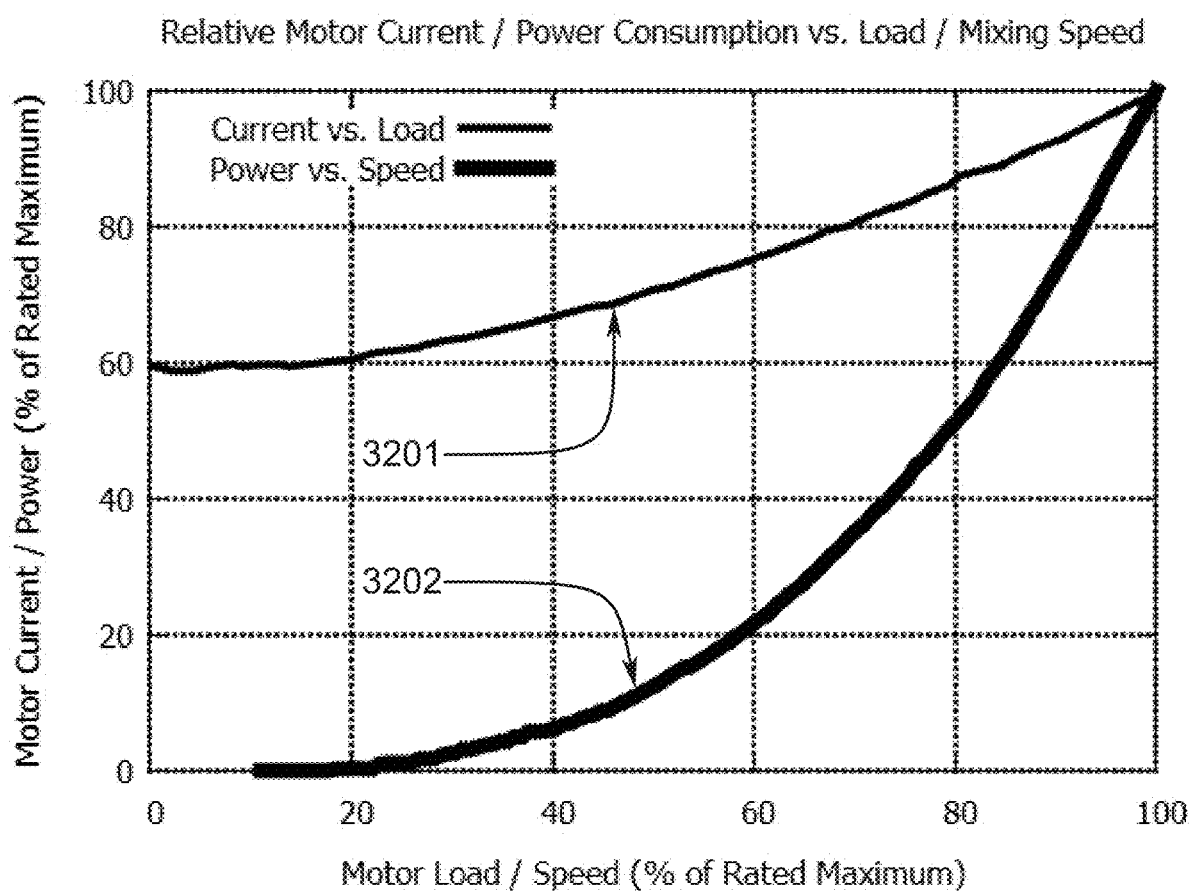
FIG. 32 illustrates exemplary graphs depicting rotational driver current consumption versus rotational driver shaft load and rotational power consumption versus rotational driver mixing RPM speed.

A characteristic of this technique that makes it amenable to use as a metric of beverage viscosity is the fact that the current/power drawn by an electric motor in this application is not linearly related to the load presented to the motor driveshaft. As generally depicted in the graph of FIG. 32 (3200), the graph of motor current drawn vs. motor shaft load (3201) indicates an example of this nonlinearity. This feature of the load transfer function can be used by control software to select a particular derivative in load current as the cessation point for mixing operations based on the desired beverage viscosity.

It should be noted that because the mechanical agitator attached to the driveshaft acts as a 'fan' within the context of the beverage slurry, the power required to affect rotation of the driveshaft will be proportional to the CUBE of the driveshaft rotational velocity RPM as generally depicted by the power vs. RPM graph (3202) and per the equation:

$$\frac{P_1}{P_2} = \left[\frac{N_1}{N_2}\right]^3 \qquad (1)$$

where
P=power consumption (W)
N=rotational speed (RPM)

Thus, the current curve (3201) depicted in FIG. 32 (3200) will be considerably more pronounced if translated into POWER consumption of the rotational driver as related to RPM speed of the rotational driver. This increased derivative curvature value associated with rotational driver power consumption can be used to determine an appropriate dwell time stopping point by experimentally determining the derivative at an optimal product slurry viscosity (as depicted in FIG. 30 (3003)) and then targeting this derivative as a point for cessation of mixing by the rotational driver.

It should be noted that the use of the cooldown timer as discussed elsewhere herein permits 'shedding' of excess heat induced within the driveshaft and mechanical agitator into the beverage slurry during the cooldown period. It is anticipated within the scope of the present invention that this cooldown period may be accounted for in the calculation of the proper dwell time (or point at which rotational driver activation is ceased) such that this cooldown heat transfer results in a beverage of desired viscosity when the cooldown period is terminated.

Induction Coil Modulation Techniques

The present invention anticipates a wide variety of modulation techniques may be used to stimulate the induction coil to induce and modulate the heat generated within the driveshaft. These include but are not limited to the following:

Pulse Width Modulation (PWM) where the width of pulses within a pulse train is varied;

Pulse Frequency Modulation (PFM) wherein the frequency of the pulses is modulated to a frequency below/at/above the resonant frequency of the LC tank comprising the induction coil;

Pulse Train Duty Cycle Modulation (PTDSM) wherein the pulse train is fixed in composition but gated on and off to effectively modulate the "ON" time of the induction coil.

One skilled in the art will no doubt recognize that these techniques may be used in combination in some applications and that other induction coil modulation techniques are also possible and within the scope of the present invention.

Preferred Exemplary Embodiments Overview

The overall aim of the present invention is to reduce mixing times for frozen or near frozen state beverages (product slurries such as milk shakes) by coupling both mechanical (stirring) energy into the beverage slurry product, as well as thermal heat by way of infrared energy that is both conducted into the beverage slurry and optically focused or aimed on the beverage slurry product.

Within this context a typical rotational driver may use an electric motor, with an endshaft that is mechanically attached to mechanical coupler with hardware such as a Torx keyway, Woodruff spline, etc., so as to prevent shaft slippage. The mechanical coupler may comprise polymeric construction to specifically include materials such as DELRIN®, TEFLON®, TORLON®, VESPEL® brand or similar high temperature plastics. The mechanical coupler is selected to have poor thermal conductivity, and deters heat from the mechanical drive shaft from being conductively transferred to the rotational driver and causing damage to the internal bearings or motor windings of the rotational driver.

The driveshaft typically comprises copper and is chosen for its high thermal conductivity. The driveshaft receives rotational energy from the rotational driver, and is mechanically coupled to the rotational driver by the mechanical coupler. A portion of the copper drive shaft is configured with a heatsink (typically painted or coated black at an exposed section) that is not covered by or immersed in the top of the beverage slurry being mixed. The heatsink (black paint or coating) allows thermal infrared energy from an infrared (IR) heating source to be efficiently absorbed by the mechanical drive shaft.

In a preferred embodiment, the driveshaft comprises a solid copper shaft or rod having a ferromagnetic or ferrous iron slug fitted in a void created within the top of the copper shaft. The ferromagnetic or ferrous iron slug is configured within the copper shaft so as to interact with the induction coil. The induction coil generates an electromagnetic field which causes heat to develop in the slug. The heat developed in the slug is transferred conductively to the copper drive shaft, which transfers the heat more efficiently to the slurry. The copper driveshaft in the preferred embodiment may be plated with a metal (e.g., nickel) or coated with a polymer to serve as a deterrent to corrosion. Using a solid copper driveshaft is far more efficient in transferring heat than previously disclosed driveshafts constructed of SS430, copper plated steel/iron, and copper/nickel plated steel/iron. Whereas steel/iron has a coefficient of thermal conductivity of 36-43 and stainless steel has a coefficient of thermal conductivity of 16-24, steel, solid copper has a coefficient of thermal conductivity of 111. Thus, heat generated in the slug is able to transfer much more efficiently from the slug to the slurry in the preferred embodiment of the driveshaft.

An optional heating source may comprise an infrared heating source that allows the beverage slurry contained in the mixing container to receive thermal energy not only from the heated drive shaft, but also by absorption of directed infrared radiation from the optional heating source.

Exemplary Manual System Embodiment (3400)-(4800)

Figure 33:
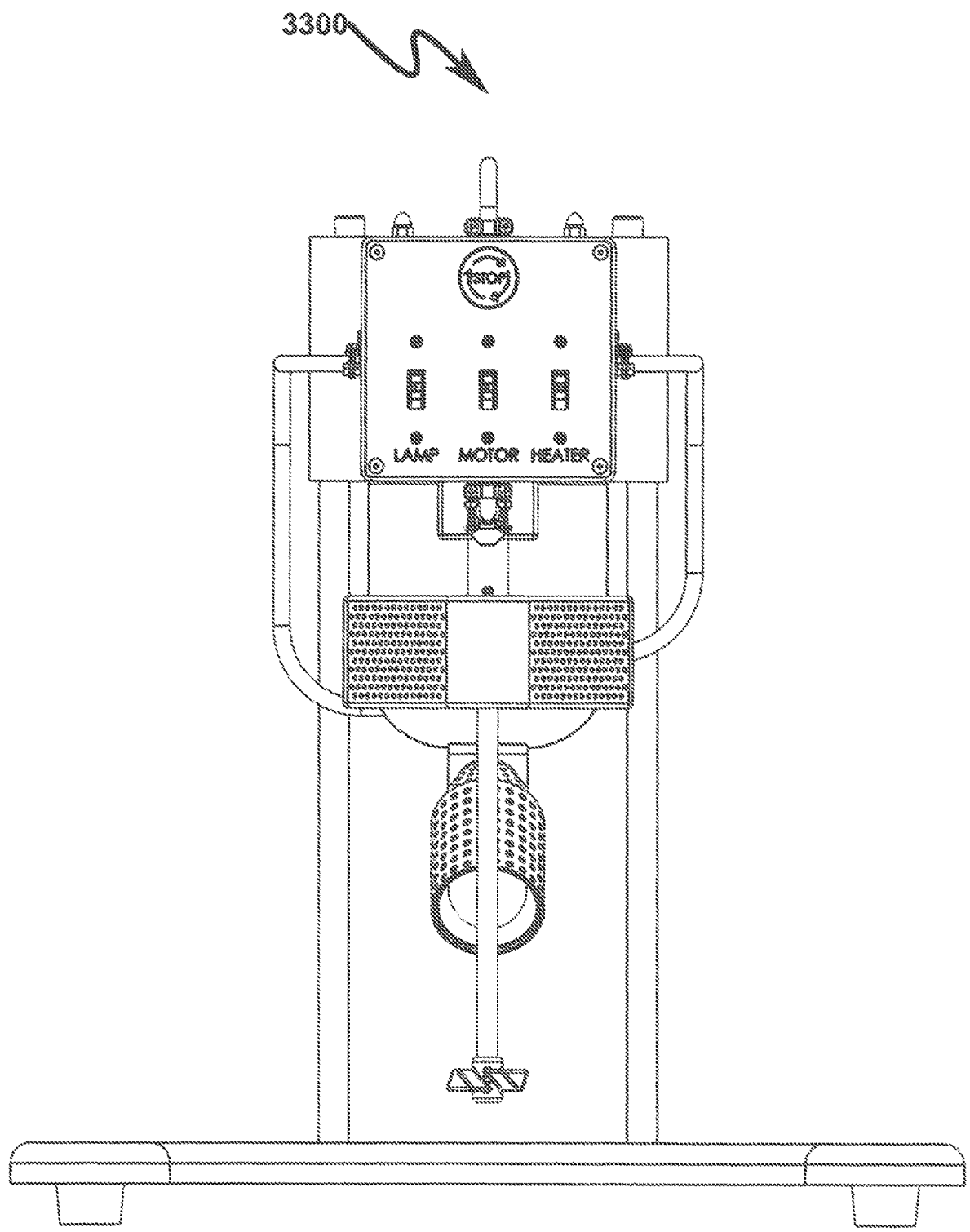
FIG. 33 illustrates a front view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 34:
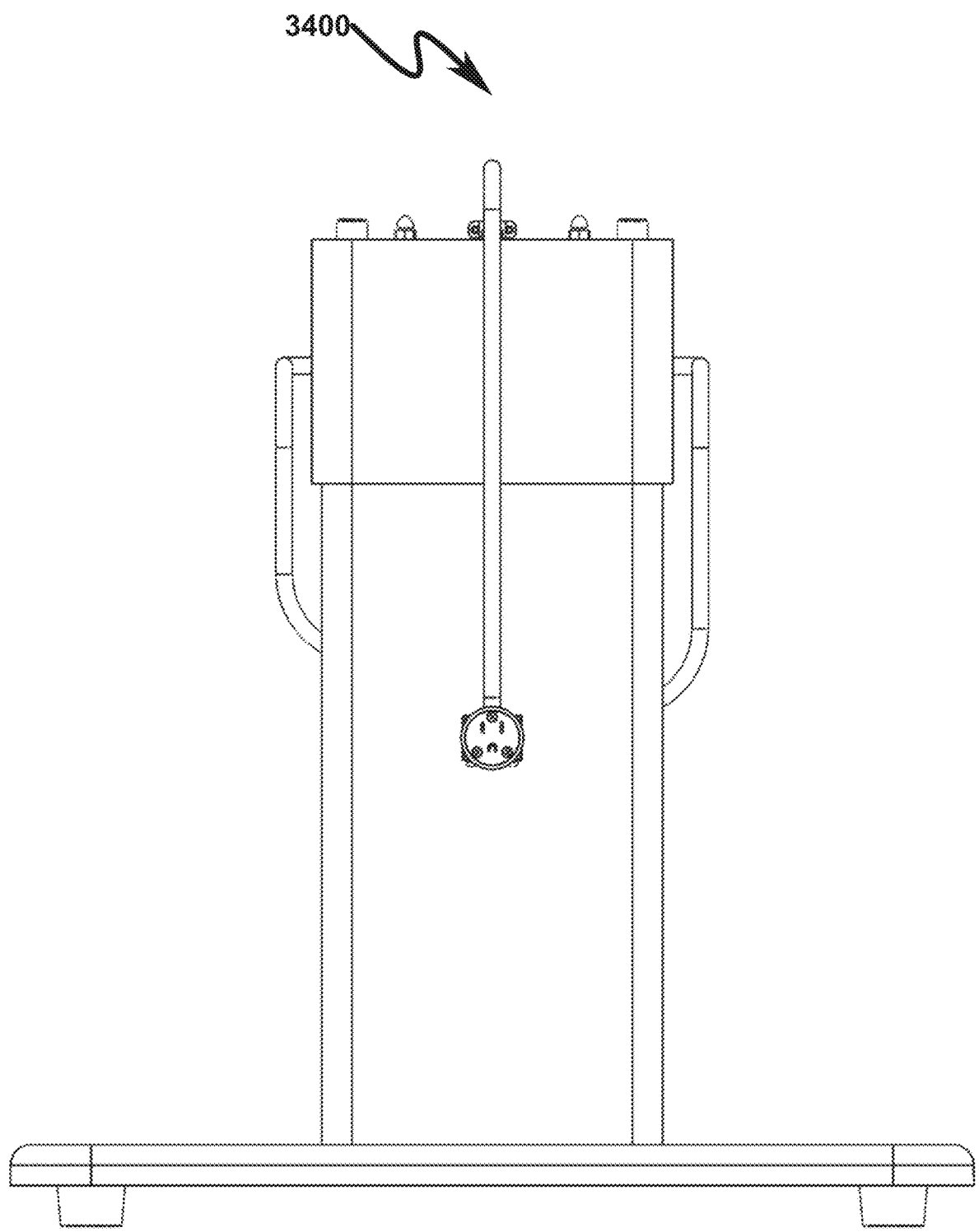
FIG. 34 illustrates a rear view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 35:
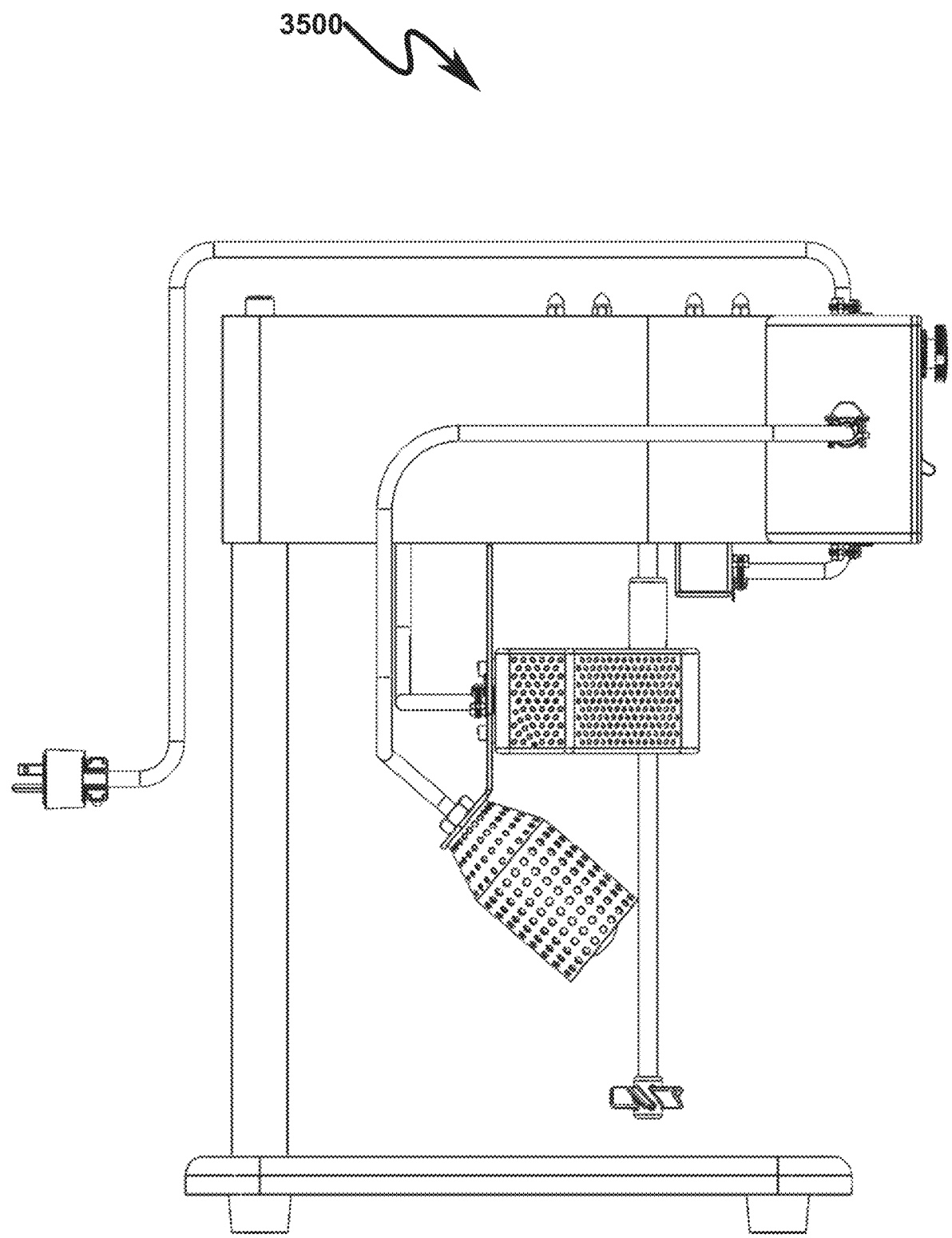
FIG. 35 illustrates a left view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 36:
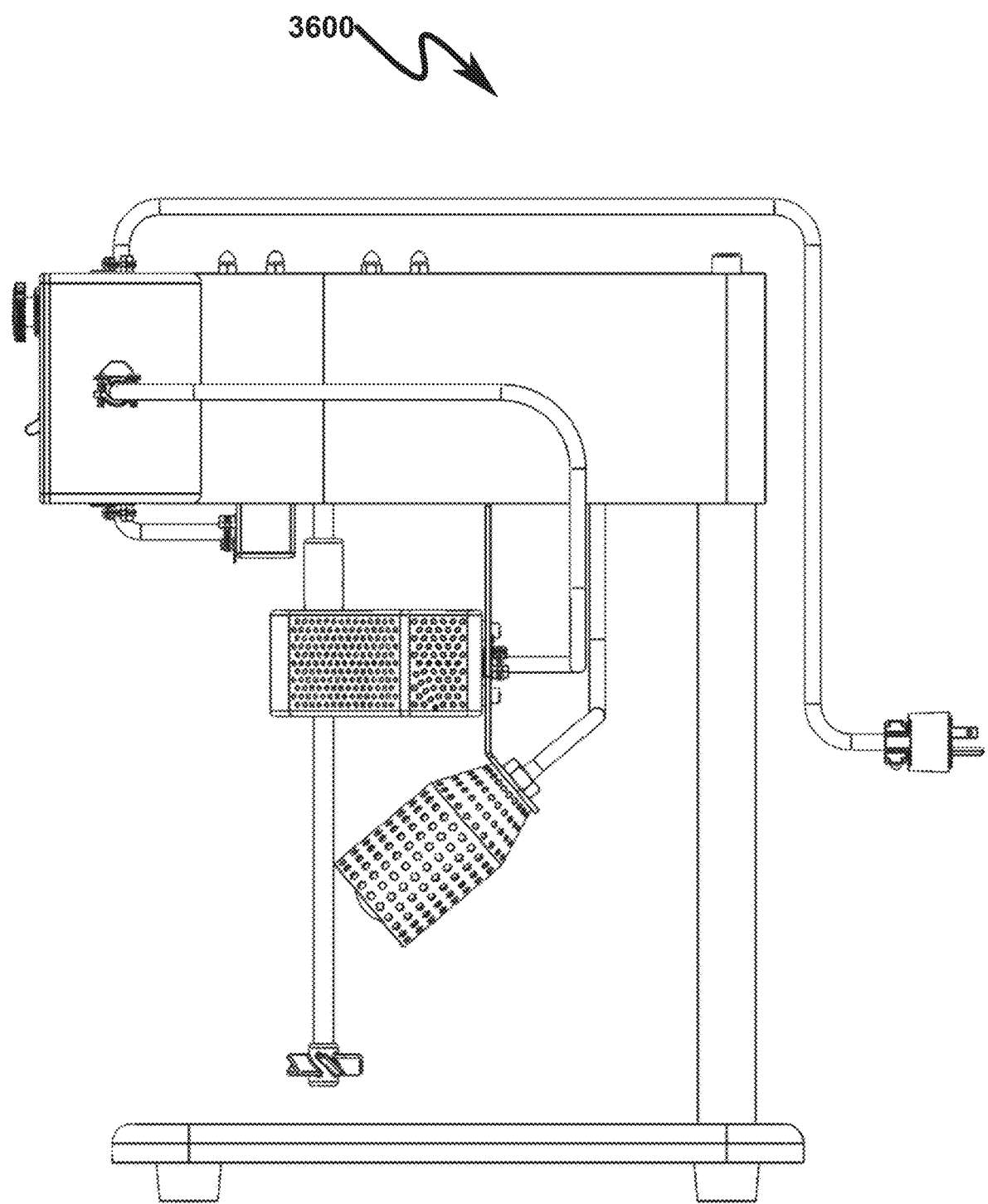
FIG. 36 illustrates a right view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 37:
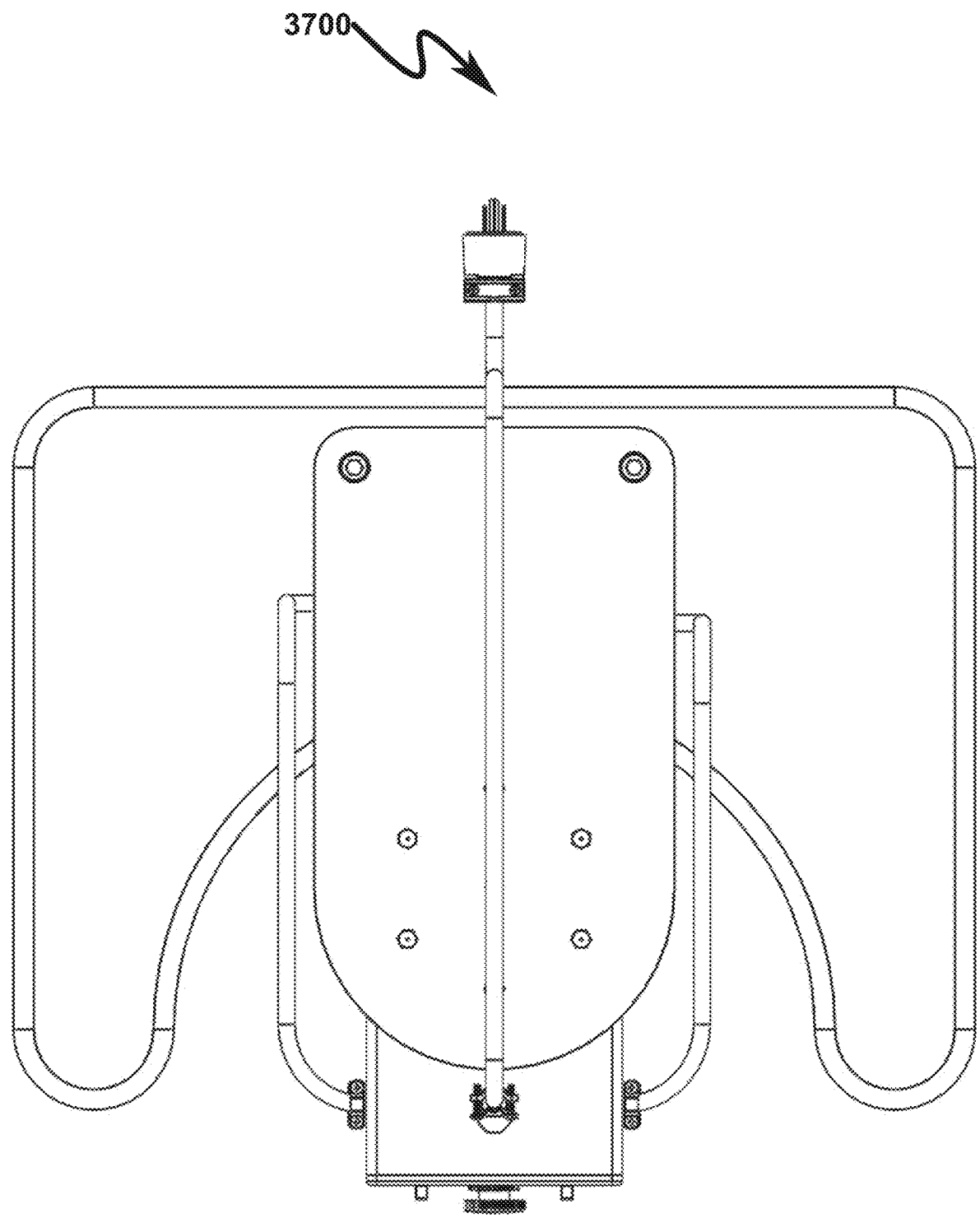
FIG. 37 illustrates a top view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 38:
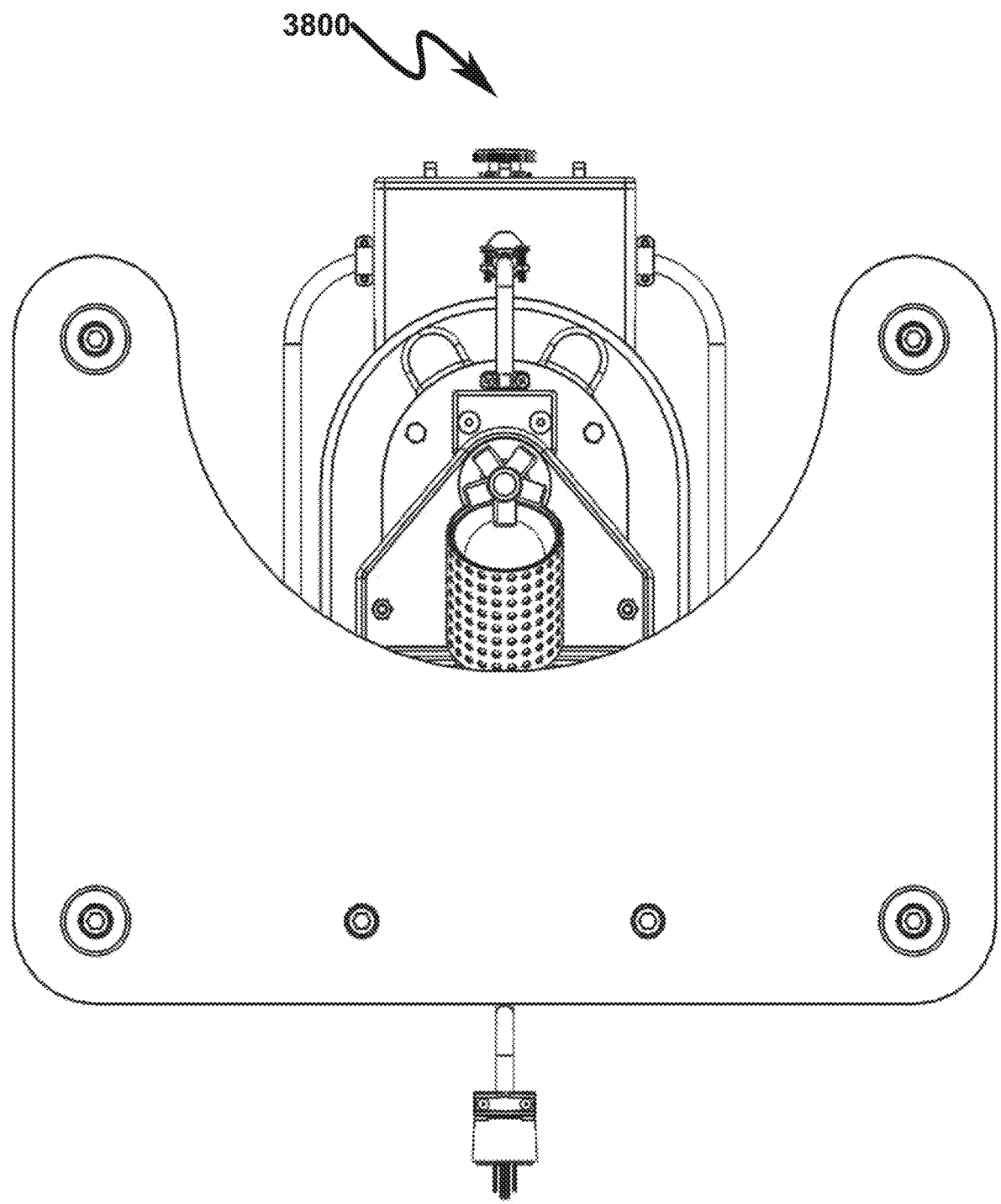
FIG. 38 illustrates a bottom view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 39:
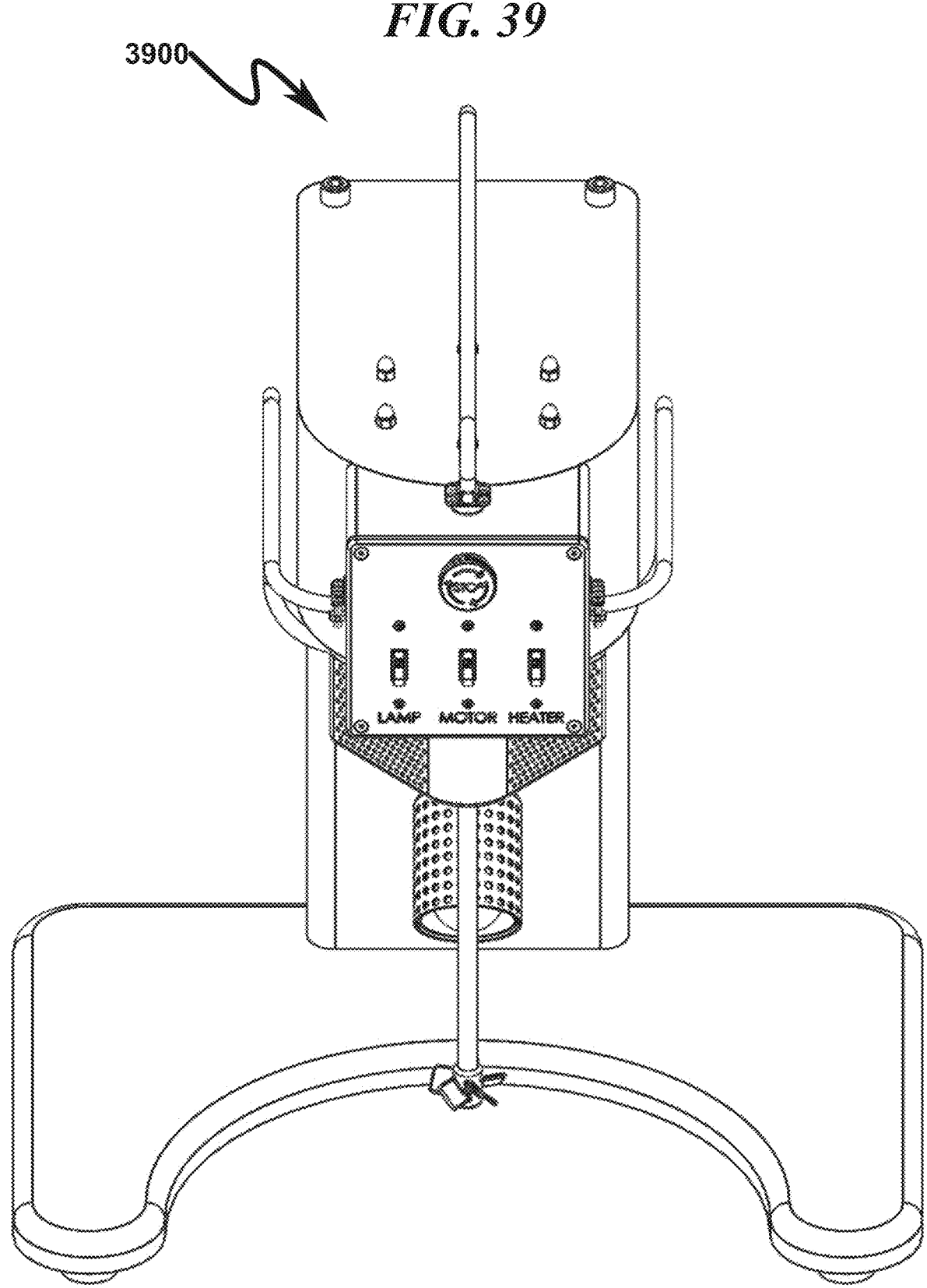
FIG. 39 illustrates a top front perspective view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 40:
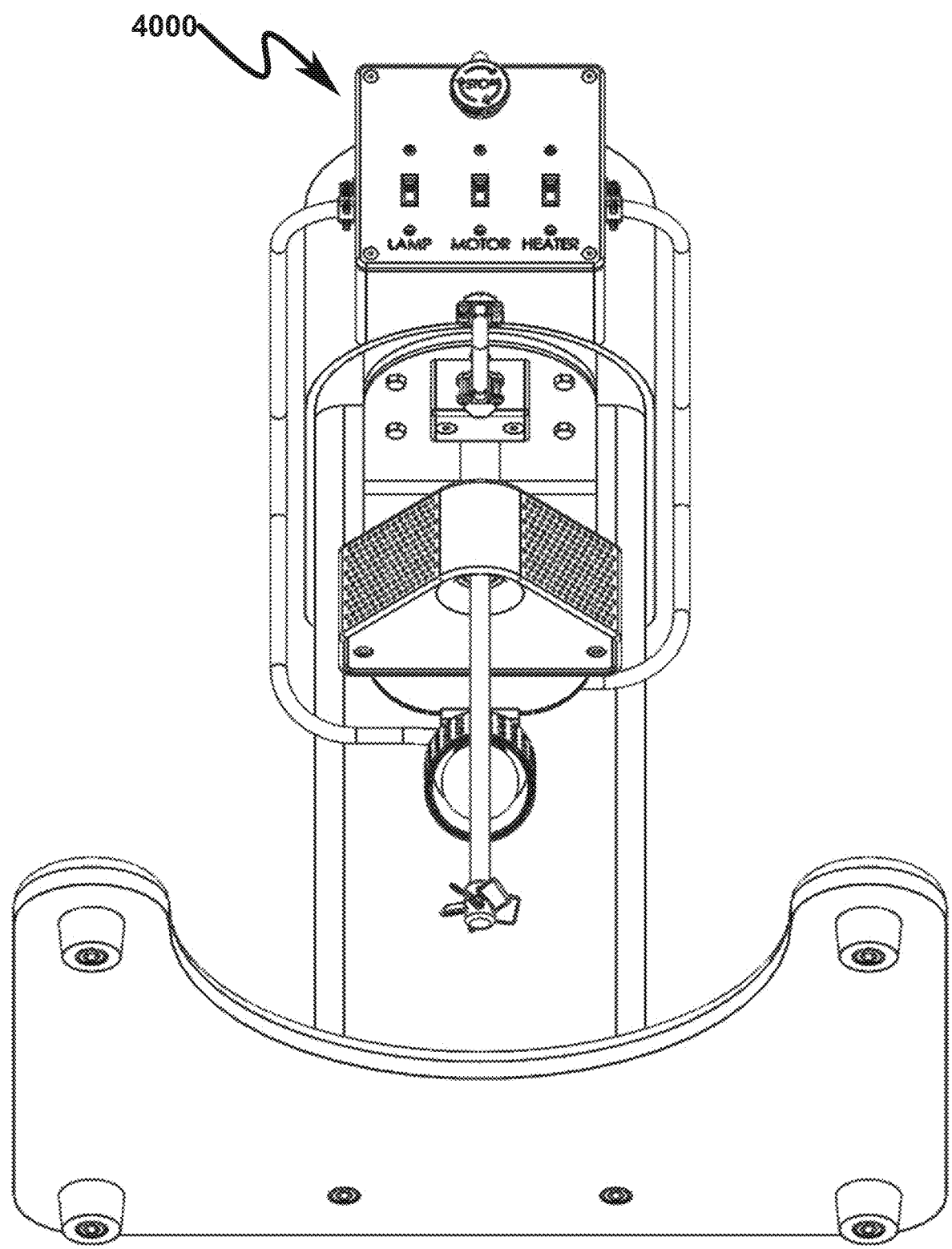
FIG. 40 illustrates a bottom front perspective view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 41:
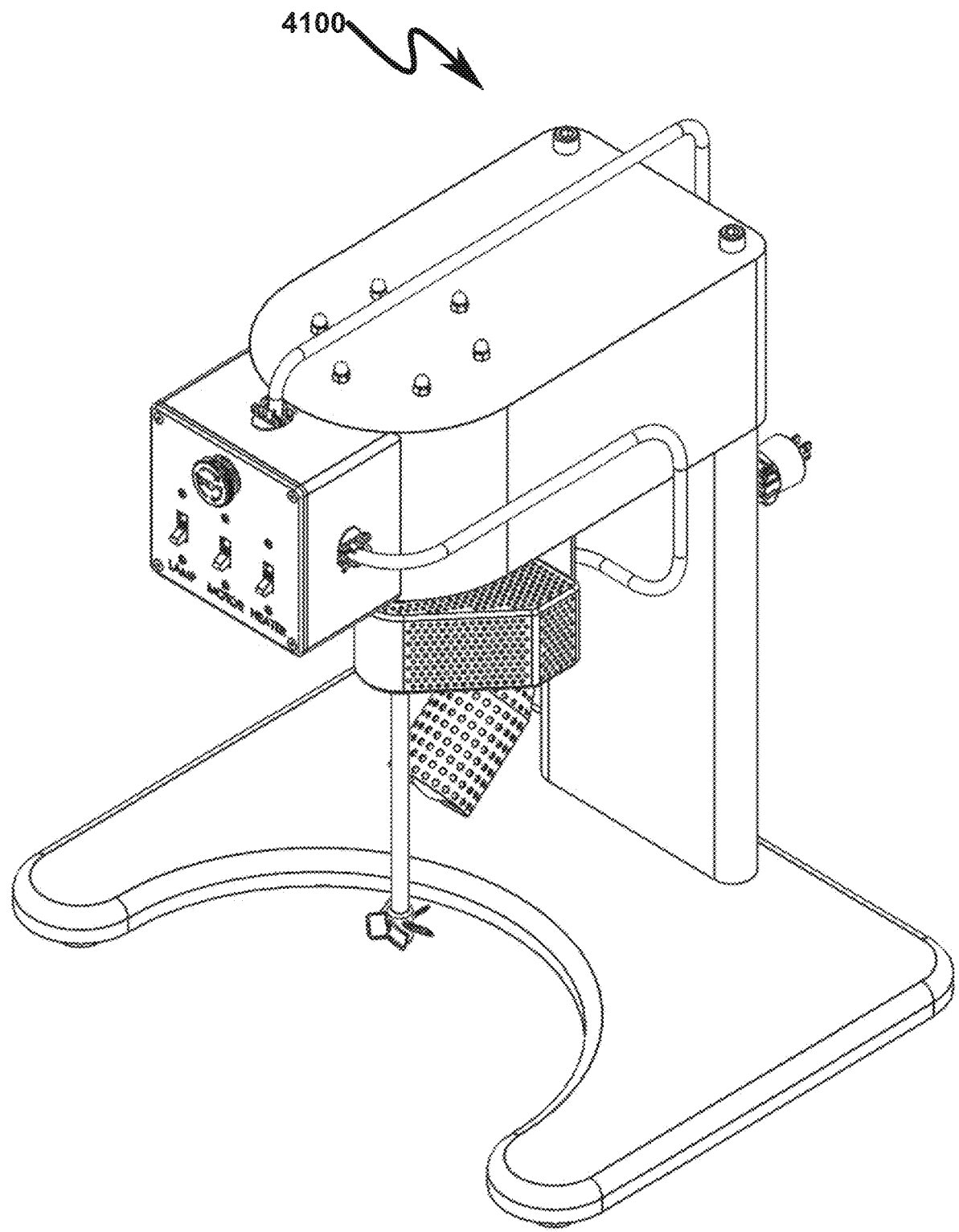
FIG. 41 illustrates a top right front perspective view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 42:
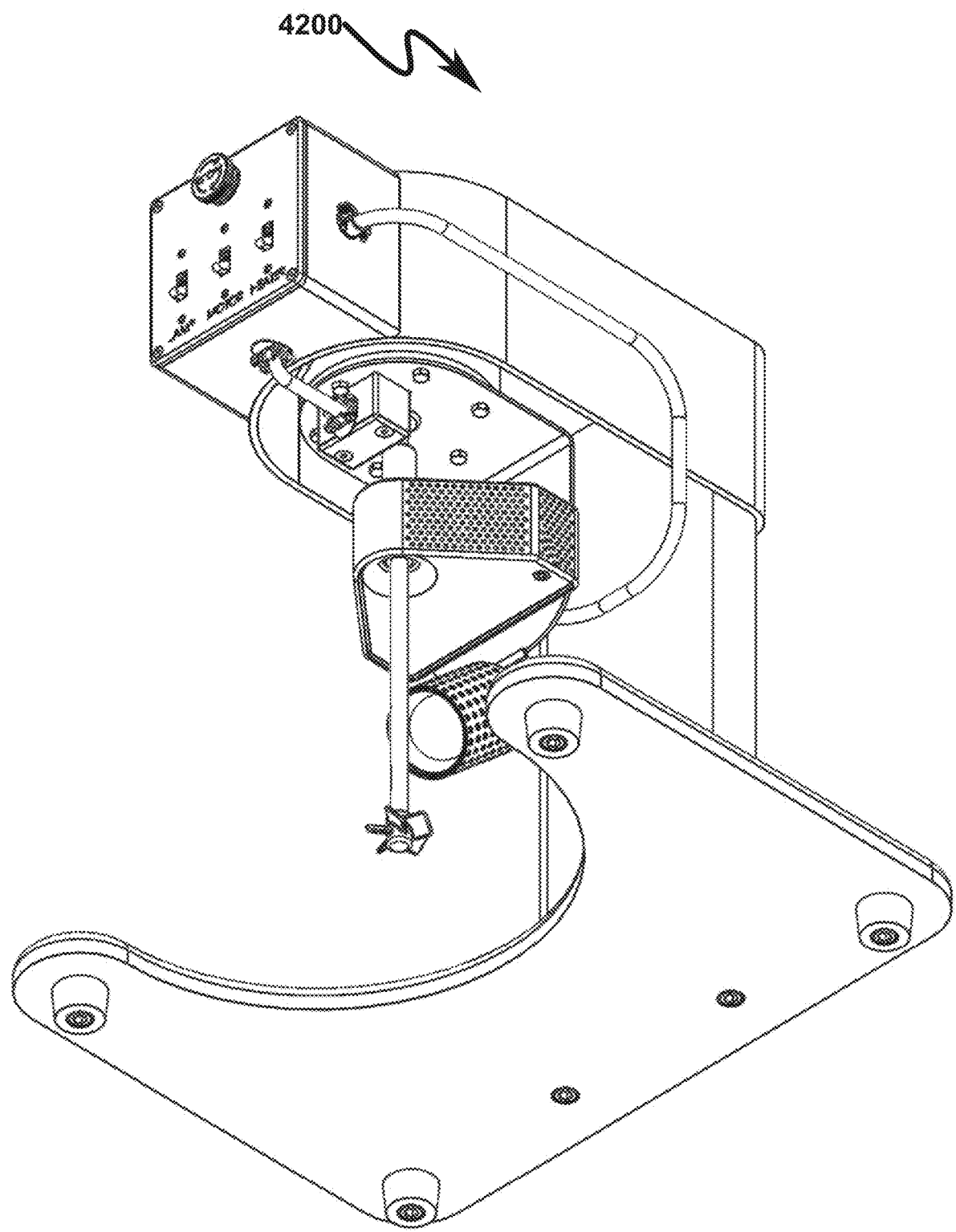
FIG. 42 illustrates a bottom right front perspective view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 43:
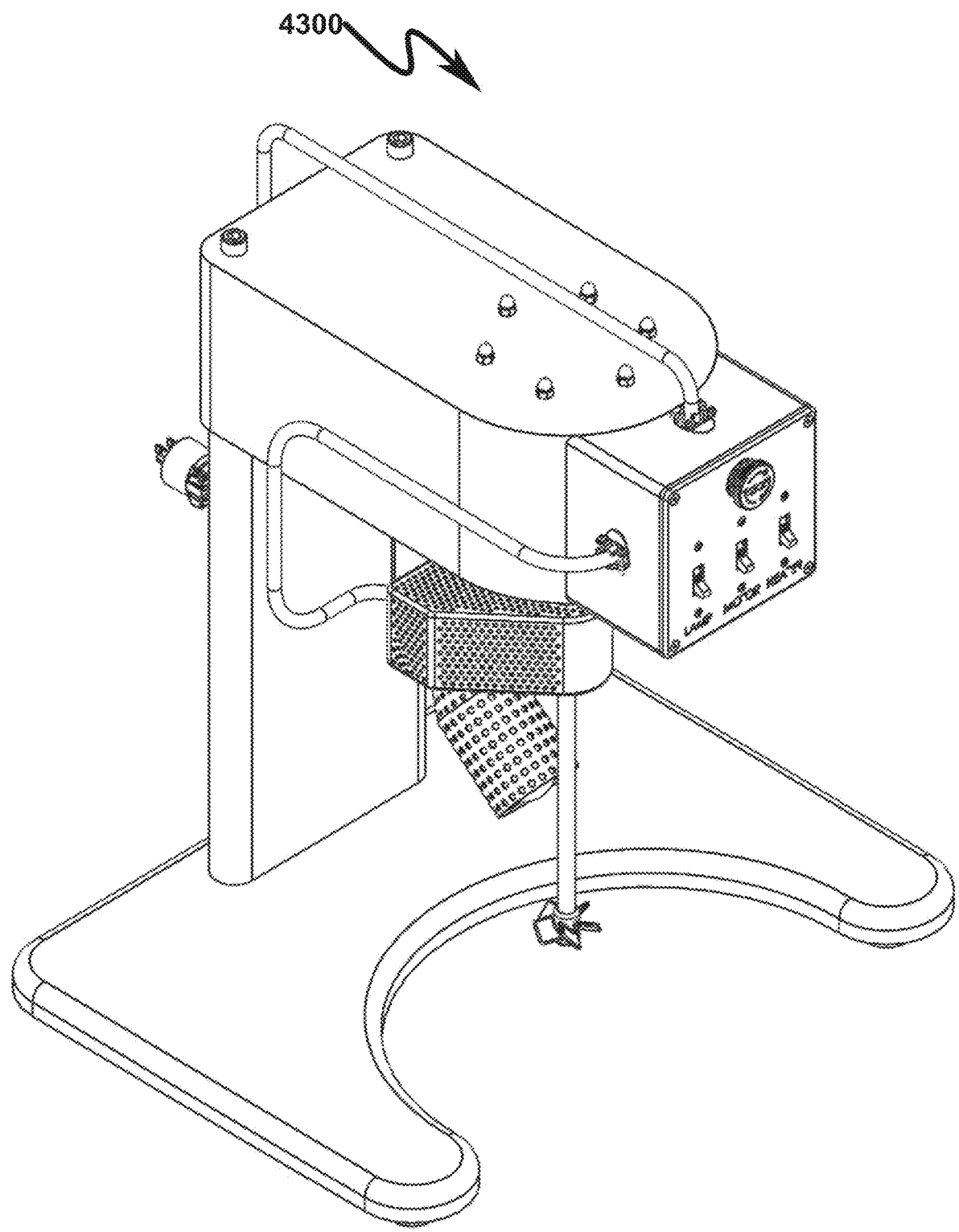
FIG. 43 illustrates a top left front perspective view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 44:
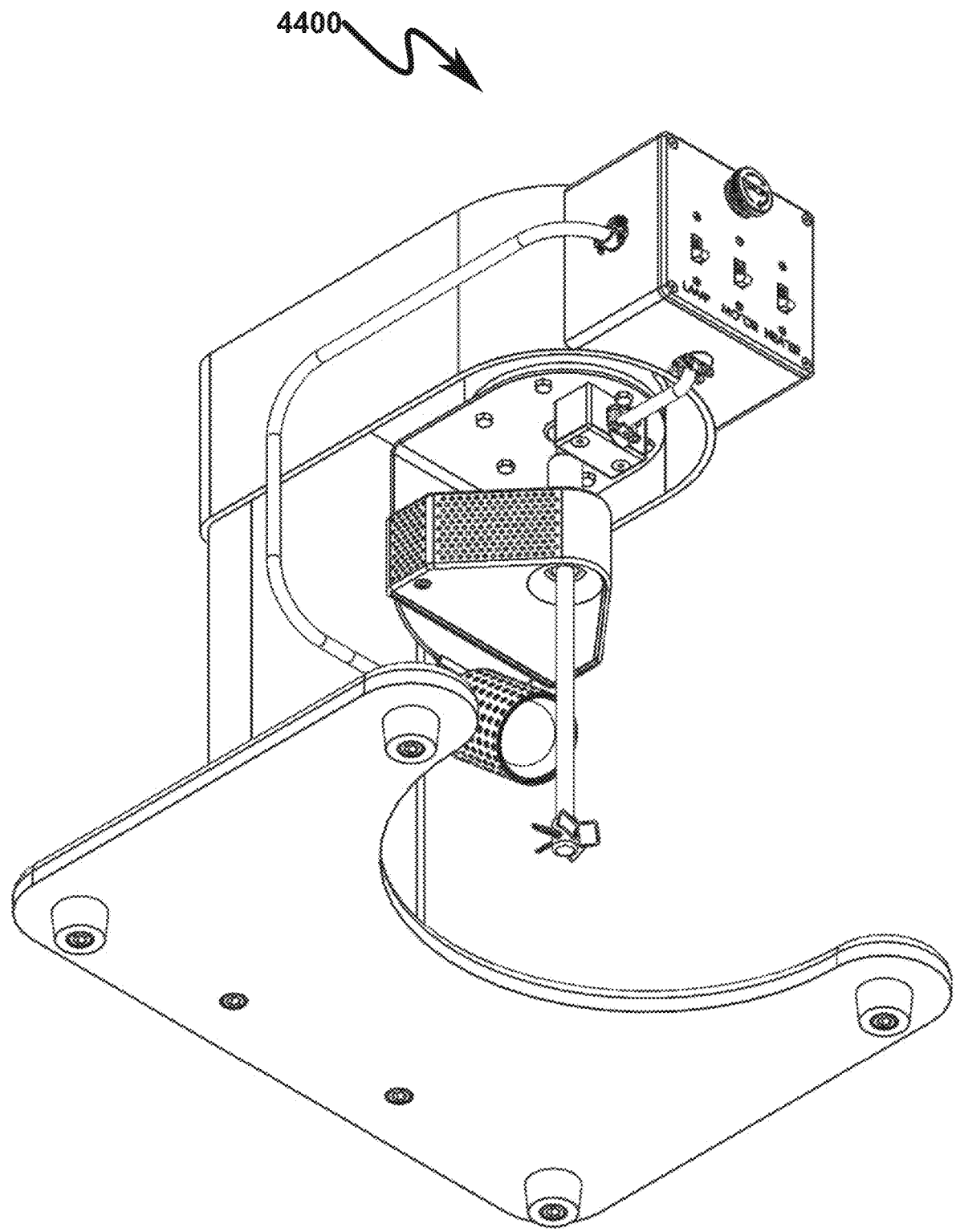
FIG. 44 illustrates a bottom left front perspective view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 45:
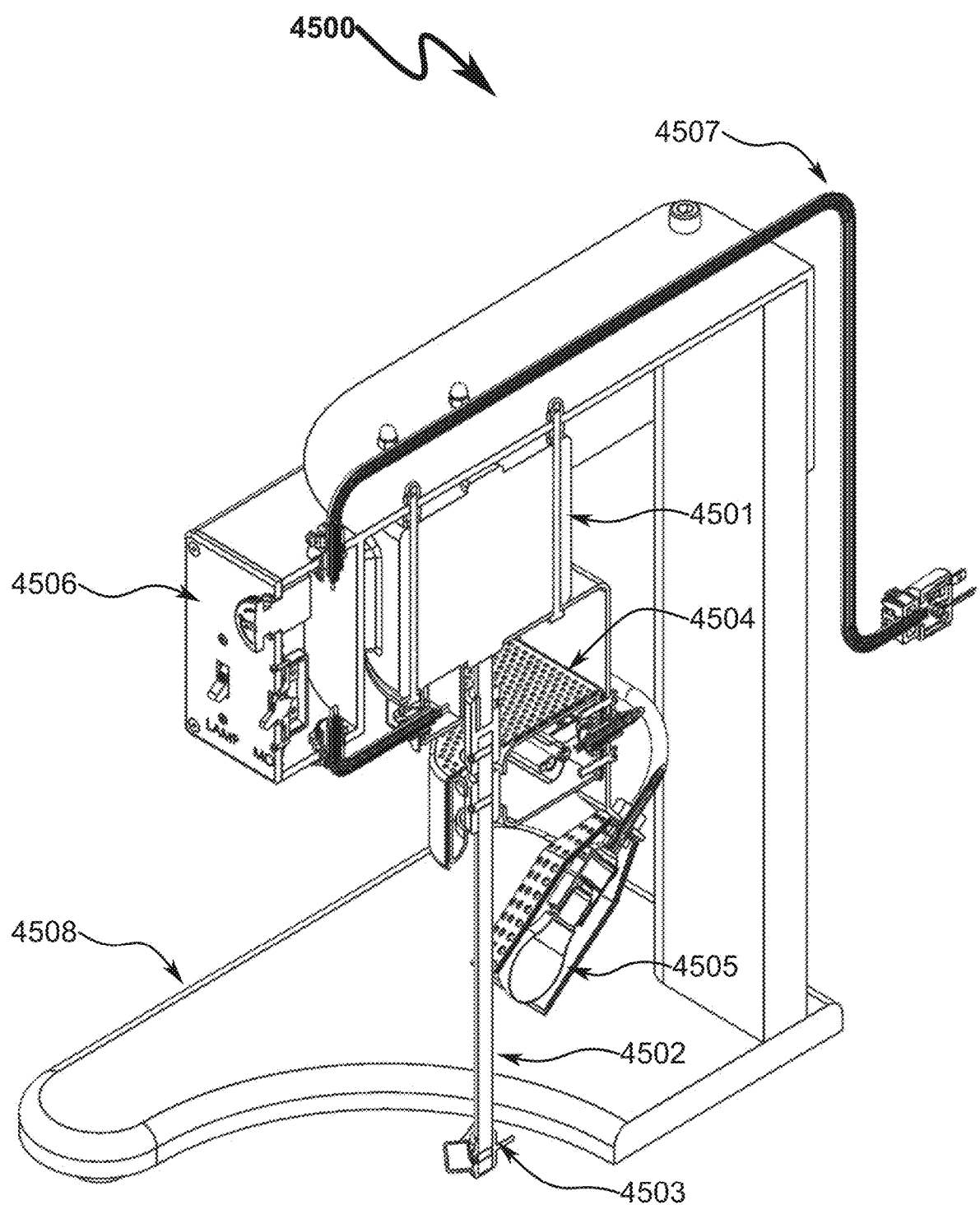
FIG. 45 illustrates a top right front perspective right side section view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 46:
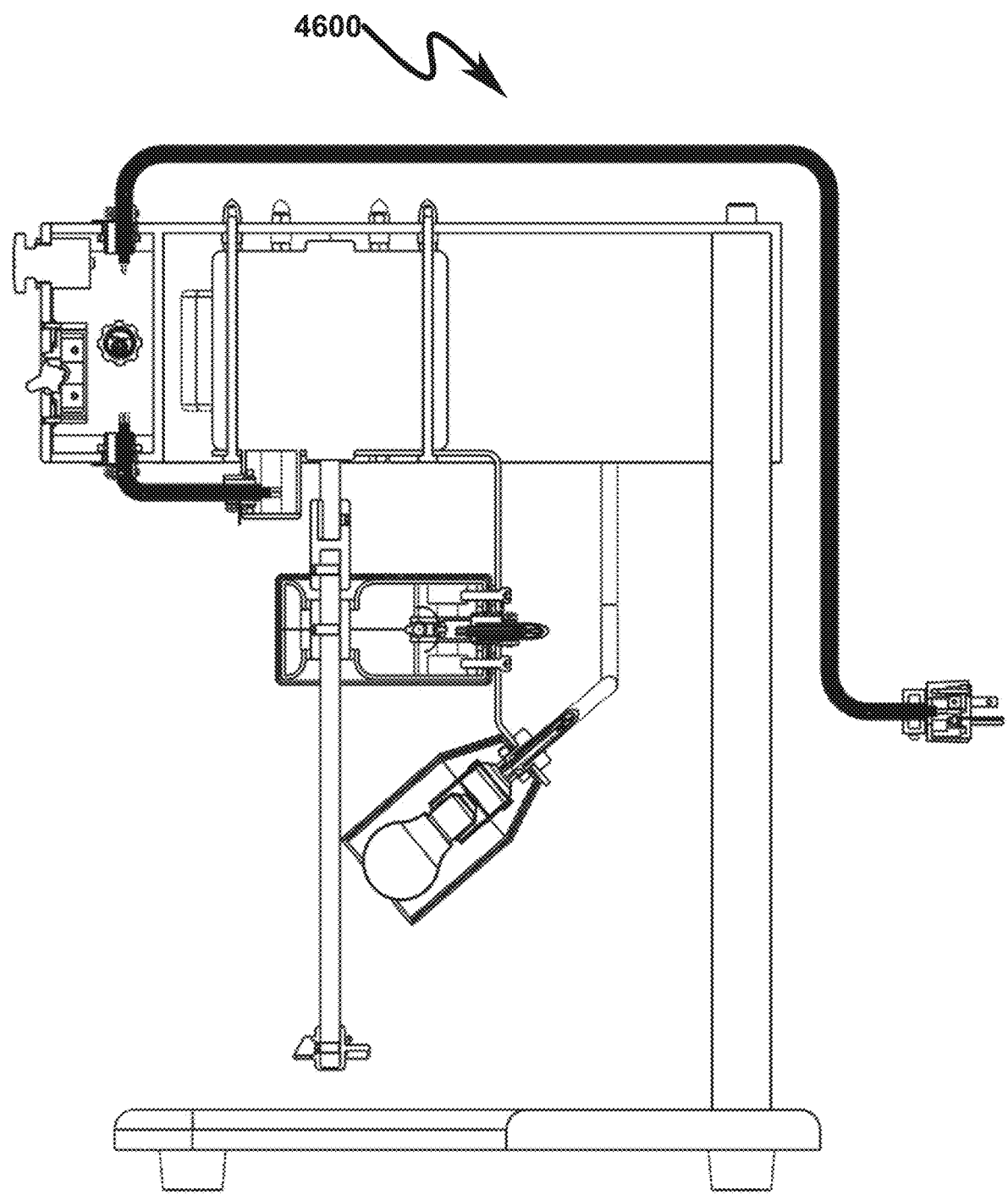
FIG. 46 illustrates a right side section view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 47:
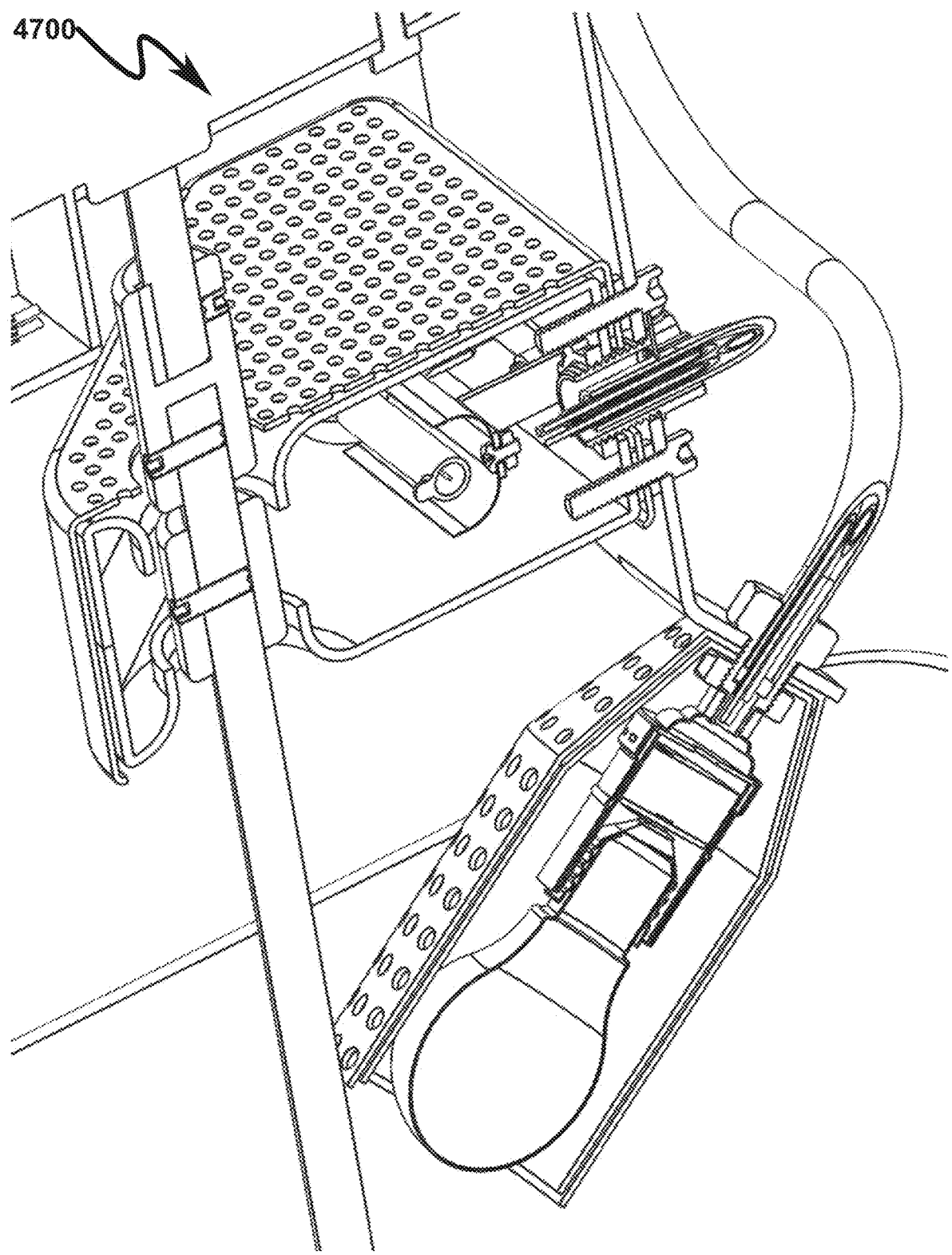
FIG. 47 illustrates a top right front perspective right side detail section view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)
Figure 48:
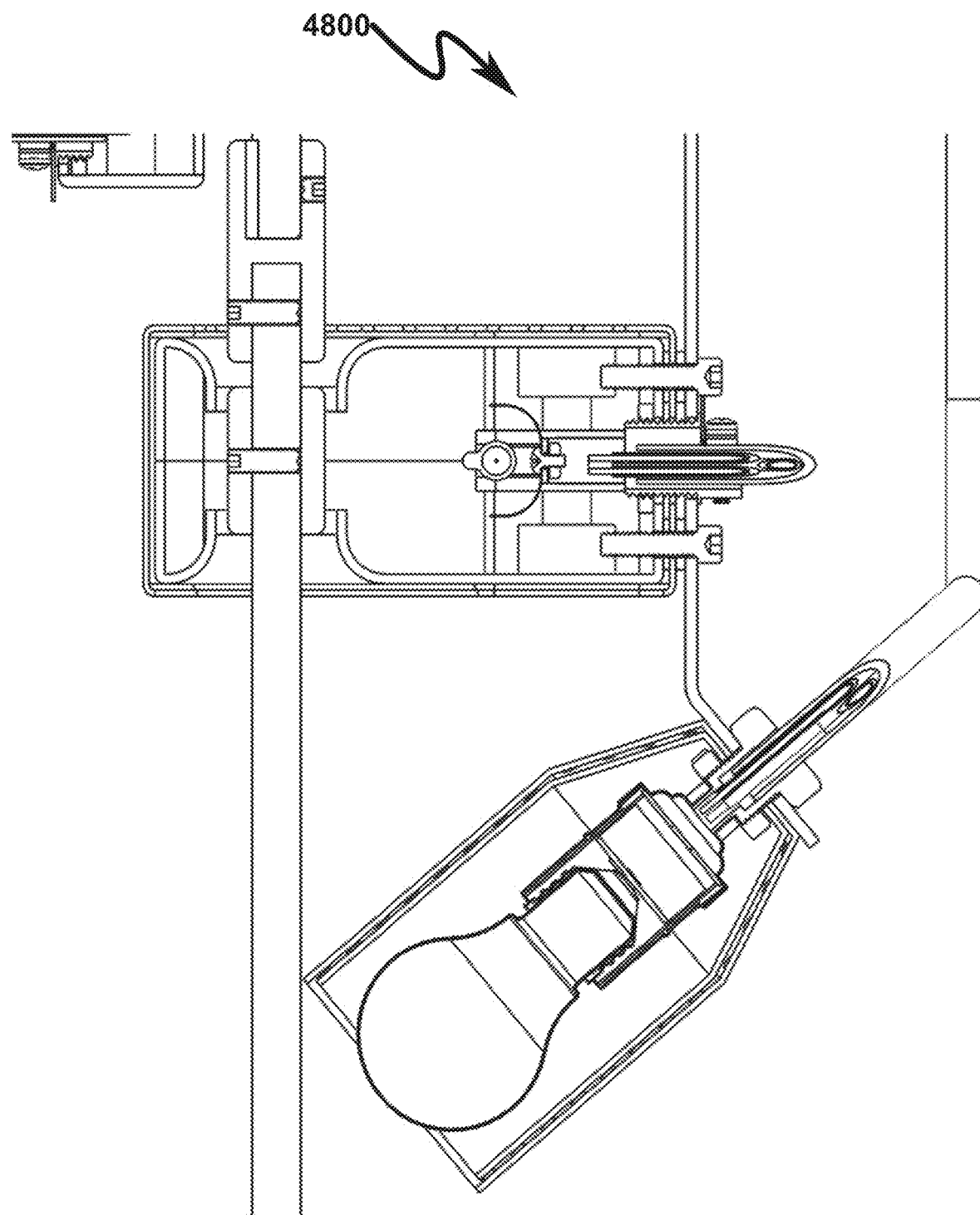
FIG. 48 illustrates a right side section detail view of a preferred exemplary beverage mixing system embodiment employing a manual switched control of a horizontal infrared heating source (IHS) configured to transfer heat through a mechanical mixing driveshaft (MMD) to a mechanical mixing agitator (MMA) and additionally heat the beverage product using an optional infrared irradiation source (IIS)

While the beverage mixing system may take many forms, a preferred exemplary embodiment utilizing manual controls is presented in FIG. 33 (3300)-FIG. 48 (4800). As generally depicted in the sectional view of FIG. 45 (4500), the beverage mixing system comprises a mechanical rotational driver (MRD) (4501), mechanical mixing driveshaft (MMD) (4502), mechanical mixing agitator (MMA) (4503), horizontal infrared heating source (IHS) (4504), and an optional infrared irradiation source (IIS) (4505).

The infrared heating source (IHS) (4504) depicted incorporates a horizontal heat lamp infrared heating source (IHS) (4504) configured as a halogen lamp. Control functions for the mechanical rotational driver (MRD) (4501) electric motor, horizontal infrared heating source (IHS) (4504) heater, and the optional infrared irradiation source (IIS) (4505) are provided for via a manual control switch panel (4506) that incorporates switch controls for MOTOR, HEATER, LAMP, and EMERGENCY STOP functions. Electrical power for the system is provided by a conventional power cord (4507). A baseplate (4508) provides structural support for the system.

Exemplary Automated System Embodiment (4900)-(6400)

Figure 49:
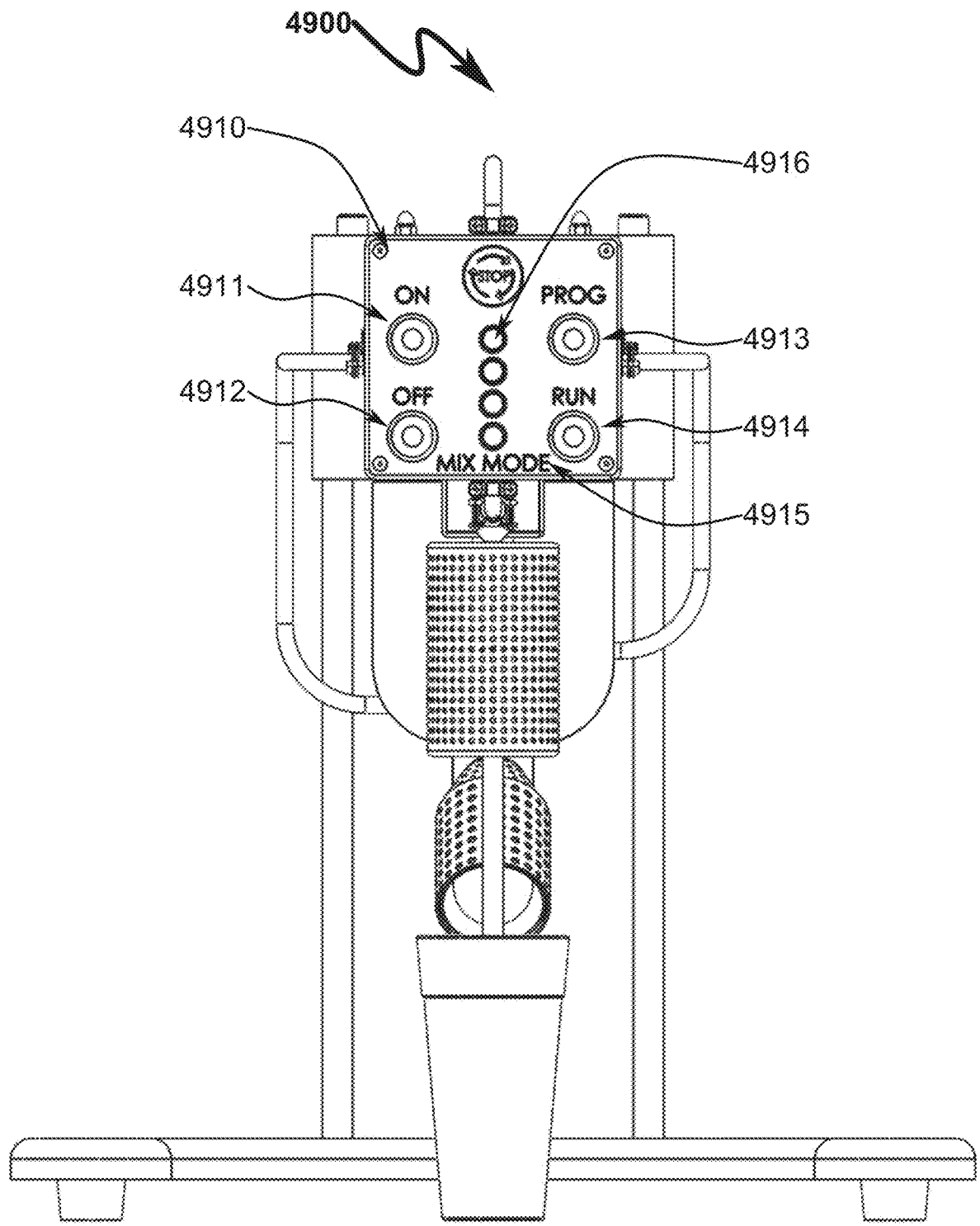
FIG. 49 illustrates a front view of a preferred exemplary beverage mixing system embodiment employing a computerized control of a vertical infrared heating source (IHS) configured to transfer heat through a mechanical mixing driveshaft (MMD) to a mechanical mixing agitator (MMA) and additionally heat the beverage product using an optional infrared irradiation source (IIS)
Figure 50:
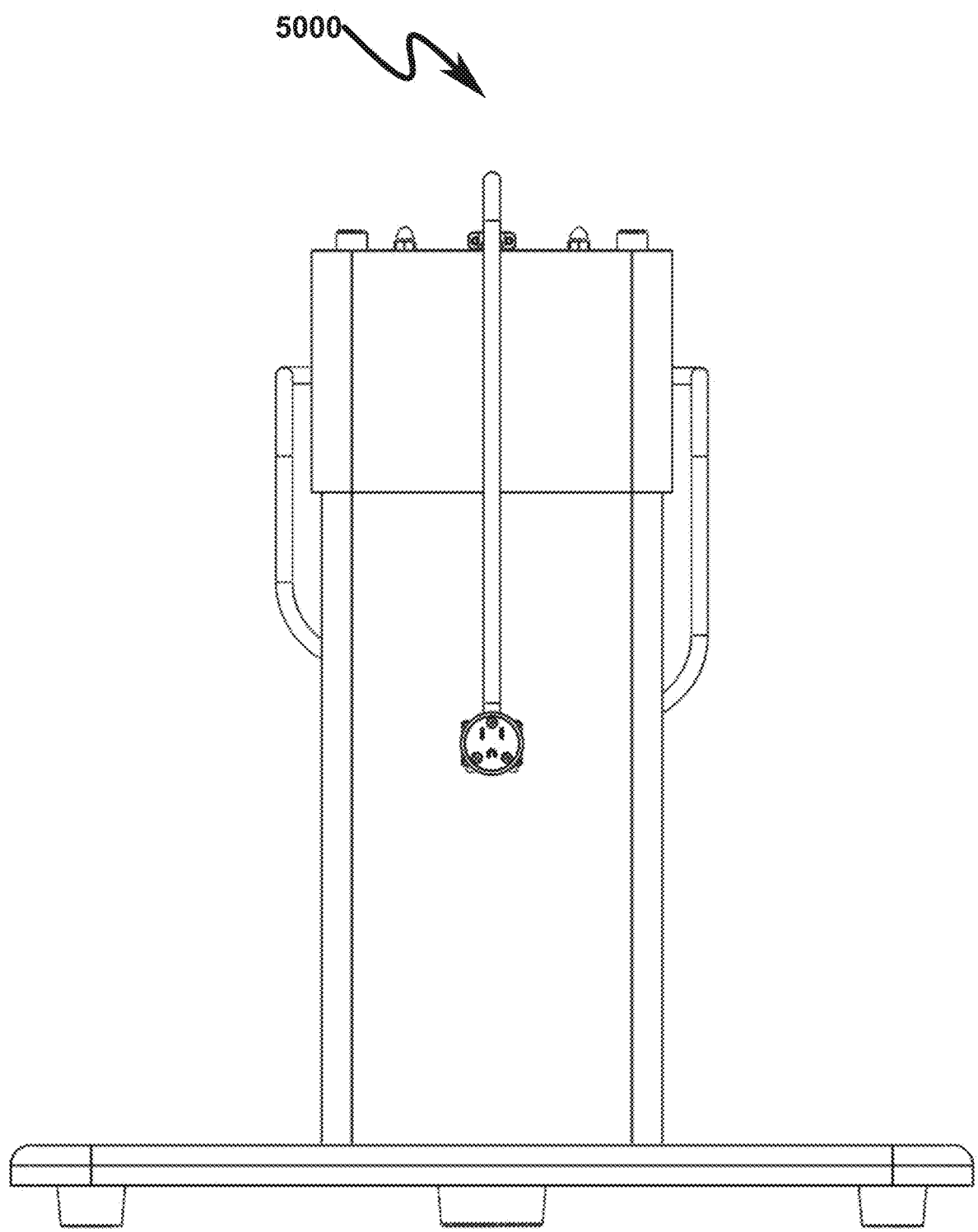
FIG. 50 illustrates a rear view of a preferred exemplary beverage mixing system embodiment employing a computerized control of a vertical infrared heating source (IHS) configured to transfer heat through a mechanical mixing driveshaft (MMD) to a mechanical mixing agitator (MMA) and additionally neat the beverage product using an optional infrared irradiation source (IIS)
Figure 51:
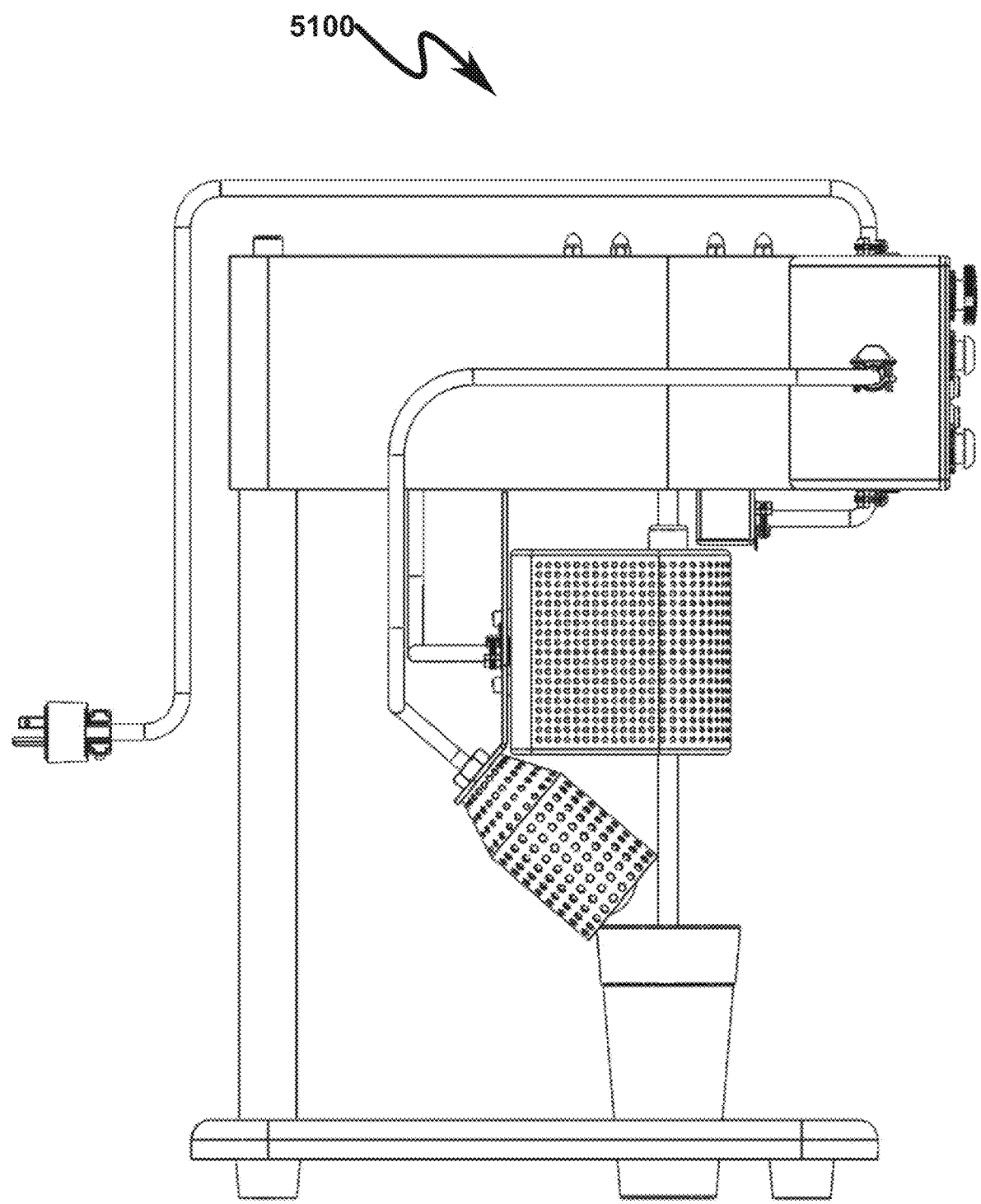
FIG. 51 illustrates a left view of a preferred, exemplary beverage mixing system embodiment employing a computerized control of a vertical infrared heating source (IHS) configured to transfer heat through a mechanical mixing driveshaft (MMD) to a mechanical mixing agitator (MMA) and additionally heat the beverage product using an optional infrared irradiation source (IIS)
Figure 52:
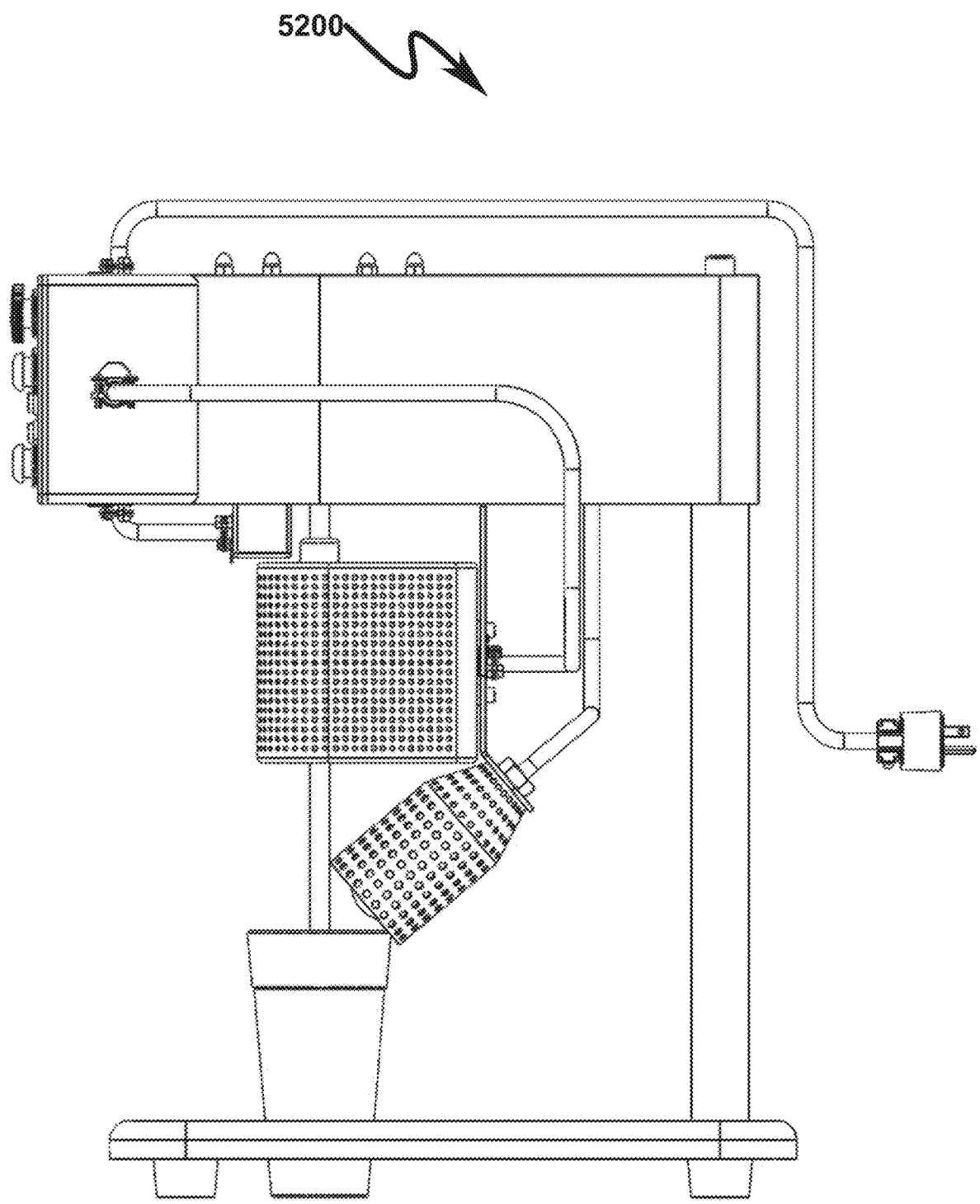
FIG. 52 illustrates a right view of a preferred exemplary beverage mixing system embodiment employing a computerized control of a vertical infrared heating source (IHS) configured to transfer heat through a mechanical mixing driveshaft (MMD) to a mechanical mixing agitator (MMA) and additionally heat the beverage product using an optional infrared irradiation source (IIS)
Figure 53:
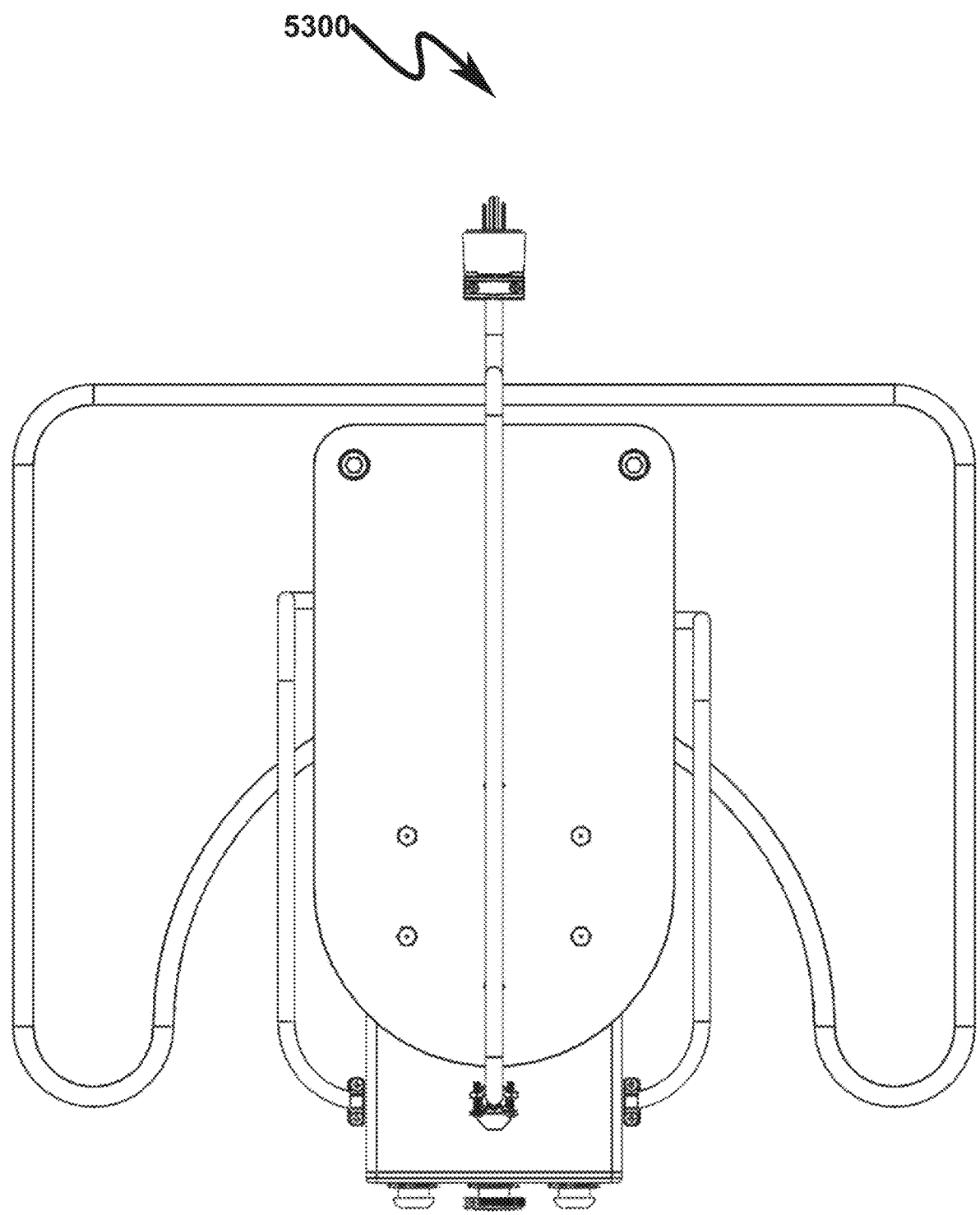
FIG. 53 illustrates a top view of a preferred exemplary beverage mixing system embodiment employing a computerized control of a vertical infrared heating source (IHS) configured to transfer heat through a mechanical mixing driveshaft (MMD) to a mechanical mixing agitator (MMA) and additionally heat the beverage product using an optional infrared irradiation source (IIS)
Figure 54:
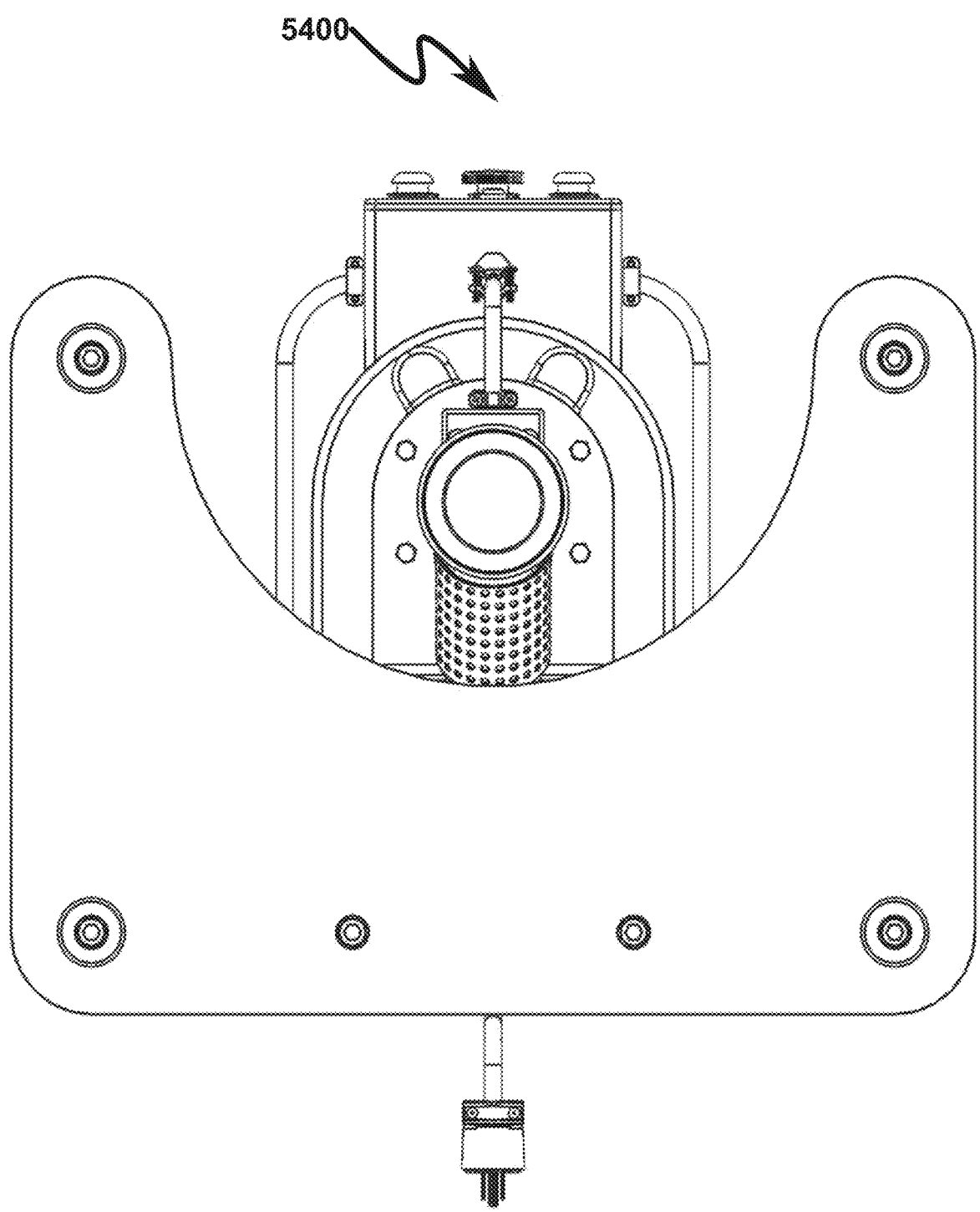
FIG. 54 illustrates a bottom view of a preferred exemplary beverage mixing system embodiment employing a computerized, control of a vertical infrared heating source (IHS) configured to transfer heat through a mechanical mixing driveshaft (MMD) to a mechanical mixing agitator (MMA) and additionally heat the beverage product using an optional infrared irradiation source (IIS)
Figure 55:
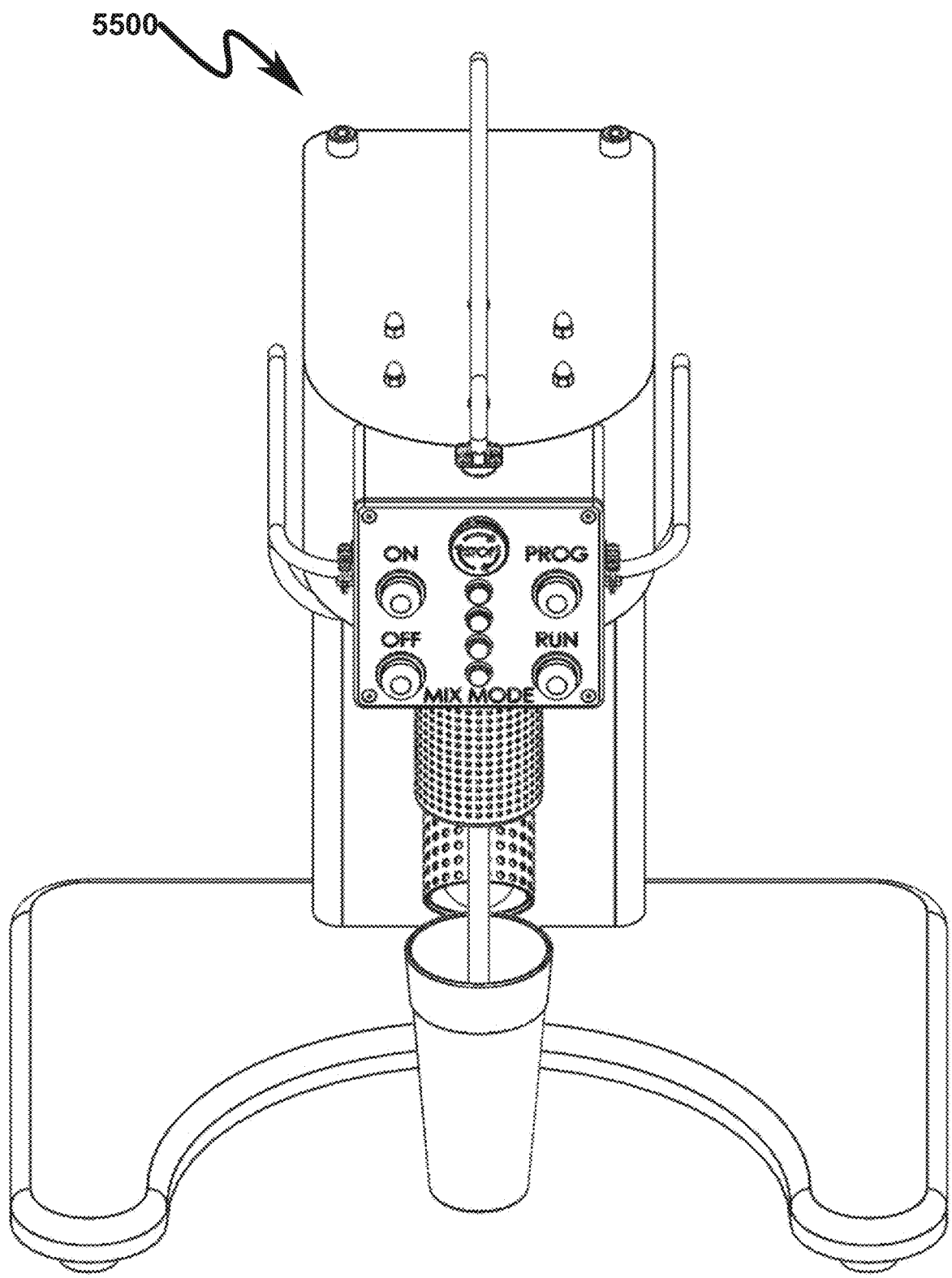
FIG. 55 illustrates a top front perspective view of a preferred exemplary beverage mixing system embodiment employing a computerized control of a vertical infrared heating source (IHS) configured, to transfer heat through a mechanical mixing driveshaft (MMD) to a mechanical mixing agitator (MMA) and additionally heat the beverage product using an optional infrared irradiation source (IIS)
Figure 56:
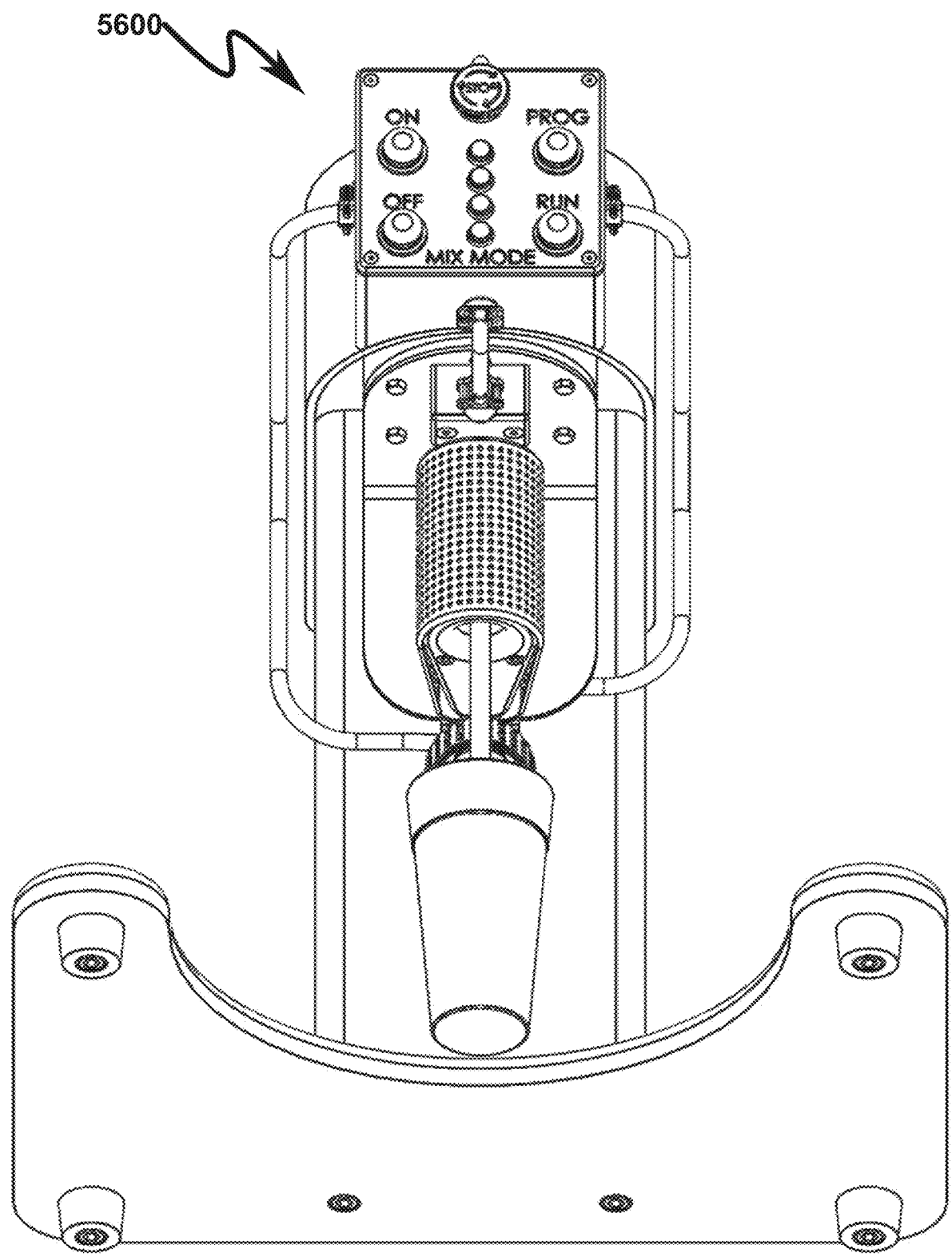
FIG. 56 illustrates a bottom front perspective view of a preferred exemplary beverage mixing system embodiment employing a computerized control of a vertical infrared heating source (IHS) configured to transfer heat through a mechanical mixing driveshaft (MMD) to a mechanical mixing agitator (MMA) and additionally heat the beverage product using an optional infrared irradiation source (IIS)
Figure 57:
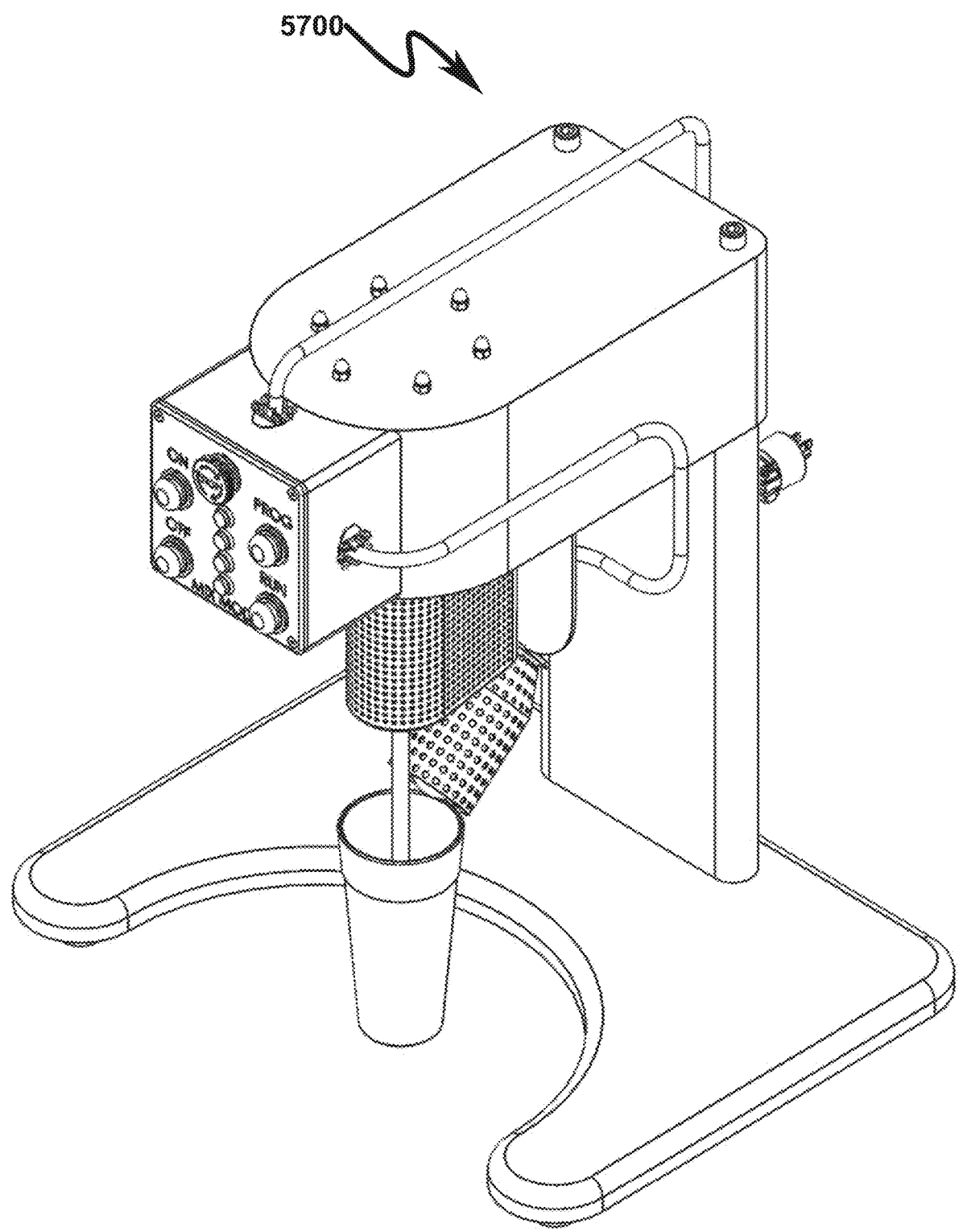
FIG. 57 illustrates a top right front perspective view of a preferred exemplary beverage mixing system embodiment employing a computerized control of a vertical infrared heating source (IHS) configured to transfer heat through a mechanical mixing driveshaft (MMD) to a mechanical mixing agitator (MMA) and additionally heat the beverage product using an optional infrared irradiation source (IIS)
Figure 58:
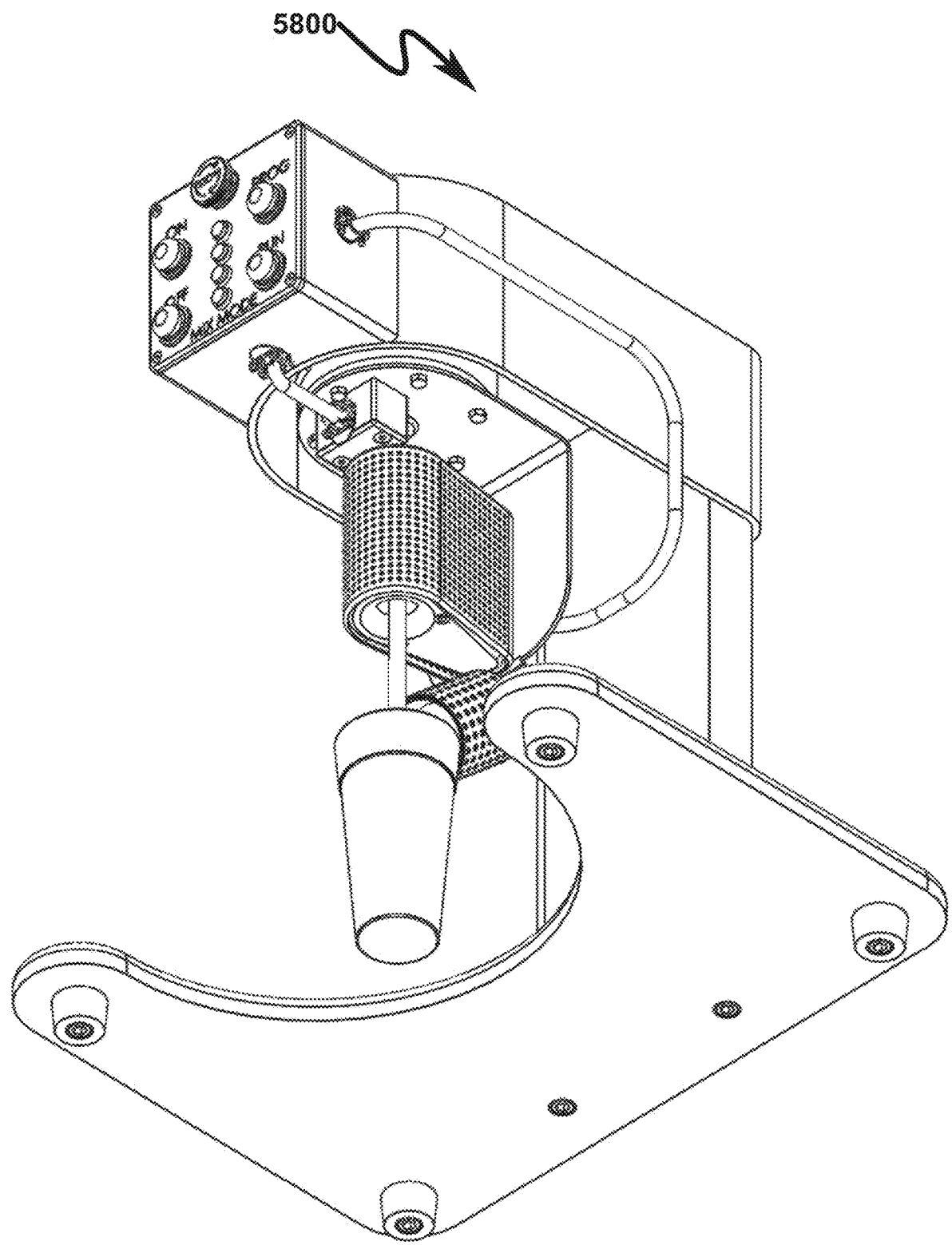
FIG. 58 illustrates a bottom right front perspective view of a preferred exemplary beverage mixing system embodiment employing a computerized control of a vertical infrared heating source (IHS) configured to transfer heat through a mechanical mixing driveshaft (MMD) to a mechanical mixing agitator (MMA) and additionally heat the beverage product using an optional infrared irradiation source (IIS)
Figure 59:
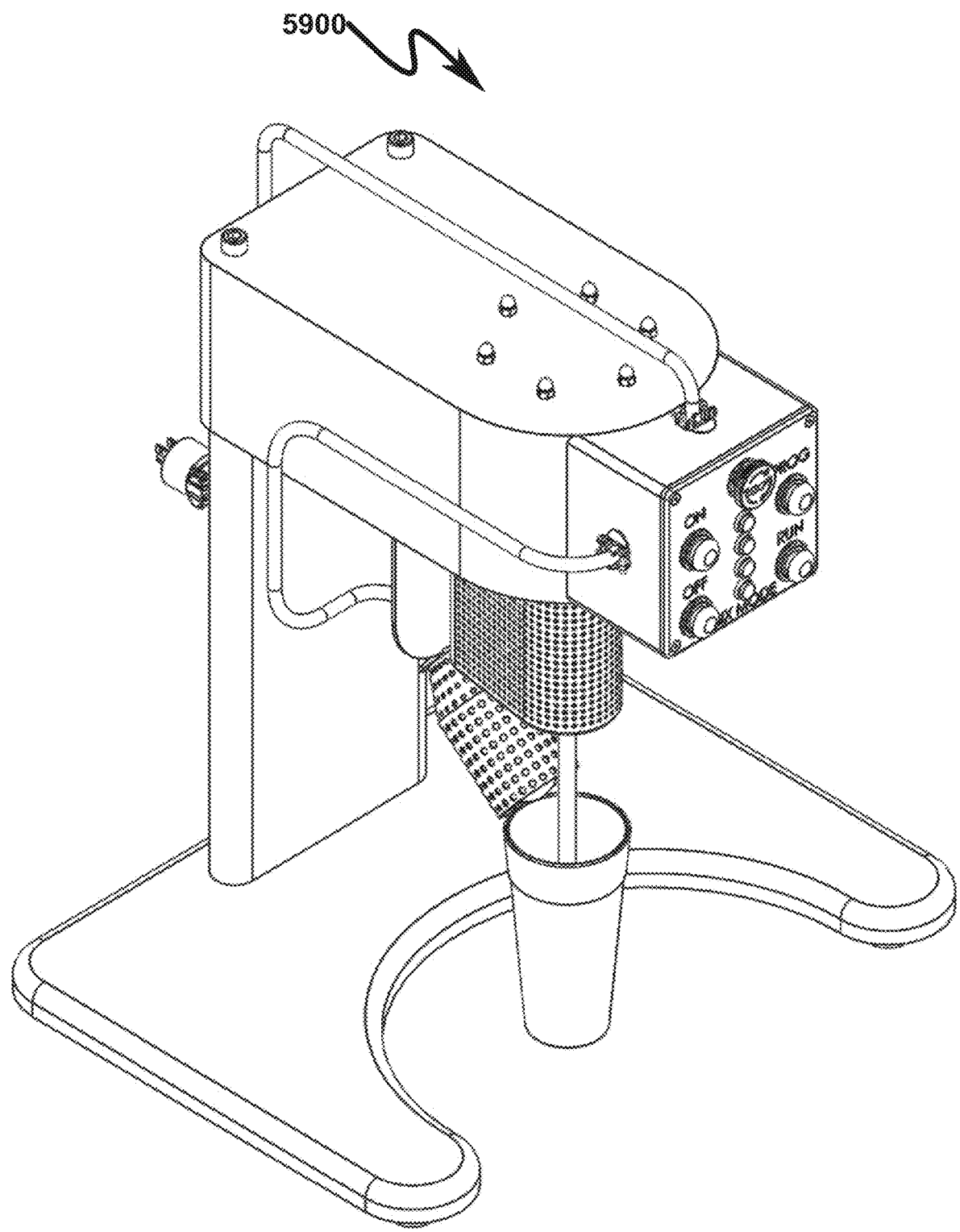
FIG. 59 illustrates a top left front perspective view of a preferred exemplary beverage mixing system embodiment employing a computerized control of a vertical infrared heating source (IHS) configured to transfer heat through a mechanical mixing driveshaft (MMD) to a mechanical mixing agitator (MMA) and additionally heat the beverage product using an optional infrared irradiation source (IIS)
Figure 60:
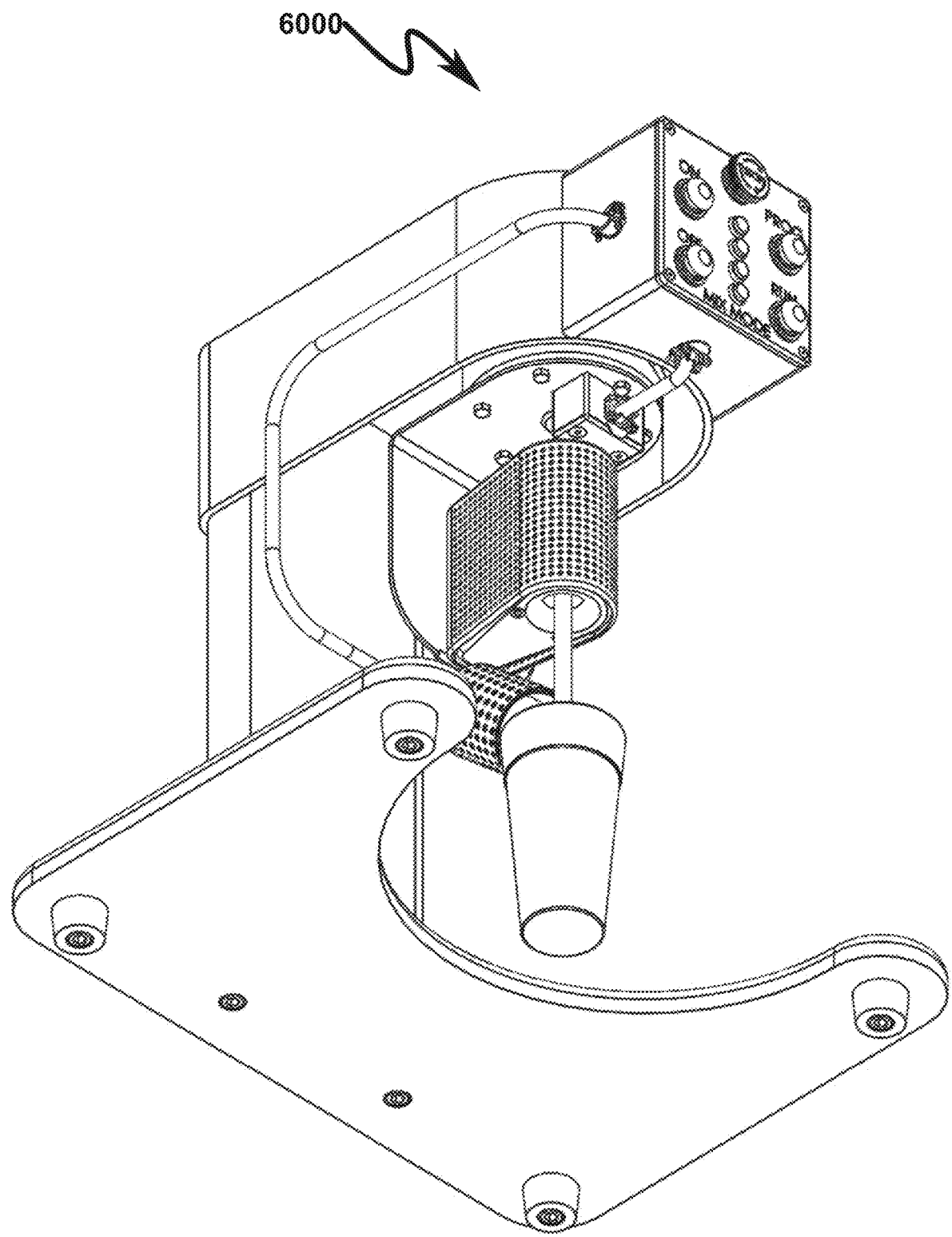
FIG. 60 illustrates a bottom left front perspective view of a preferred exemplary beverage mixing system embodiment employing a computerized control of a vertical infrared heating source (IHS) configured to transfer heat through a mechanical mixing driveshaft (MMD) to a mechanical mixing agitator (MMA) and additionally heat the beverage product using an optional infrared irradiation source (IIS)
Figure 61:
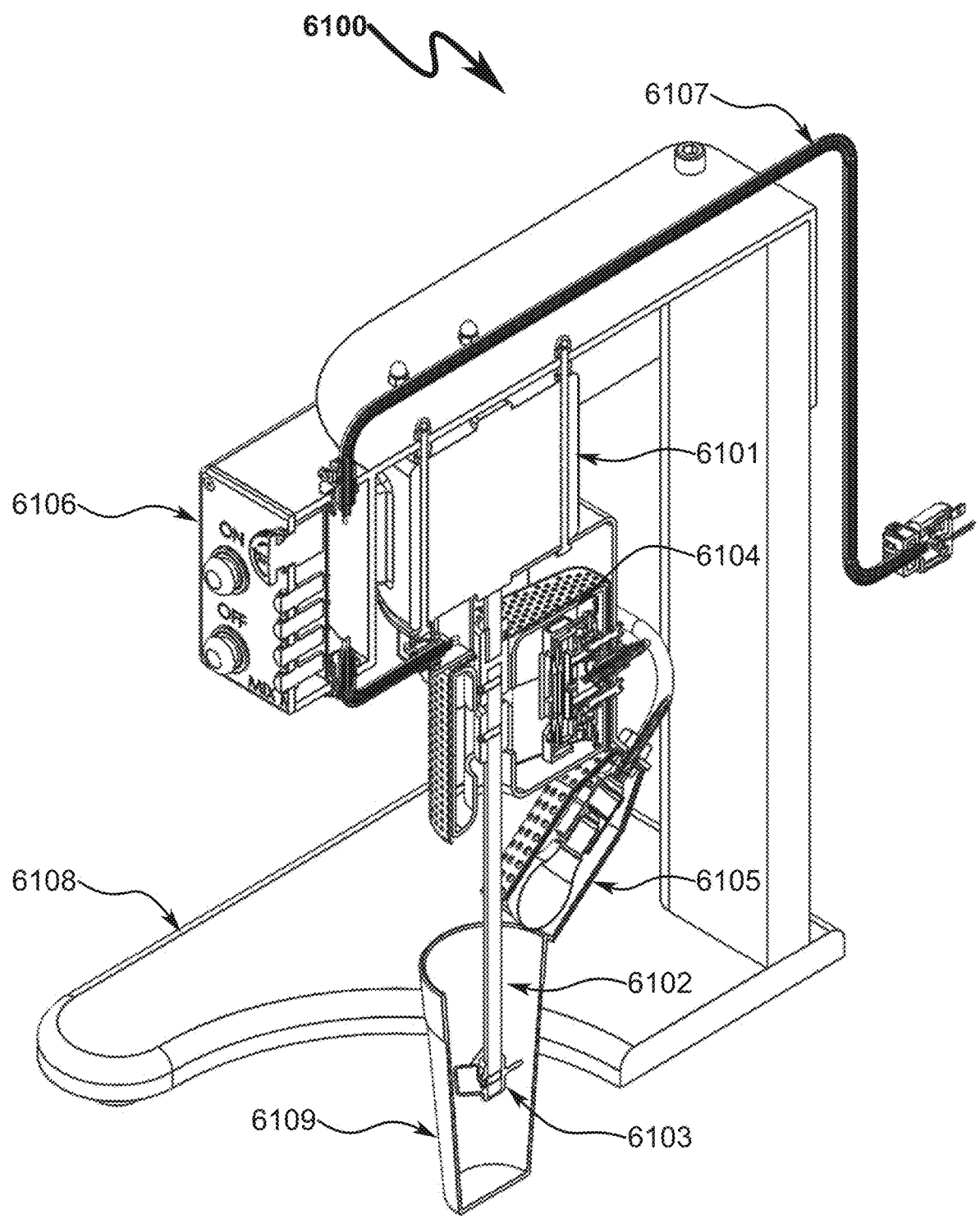
FIG. 61 illustrates a top right front perspective right side section view of a preferred exemplary beverage mixing system embodiment employing a computerized control of a vertical infrared heating source (IHS) configured to transfer heat through a mechanical mixing driveshaft (MMD) to a mechanical mixing agitator (MMA) and additionally heat the beverage product using an optional infrared irradiation source (IIS)
Figure 62:
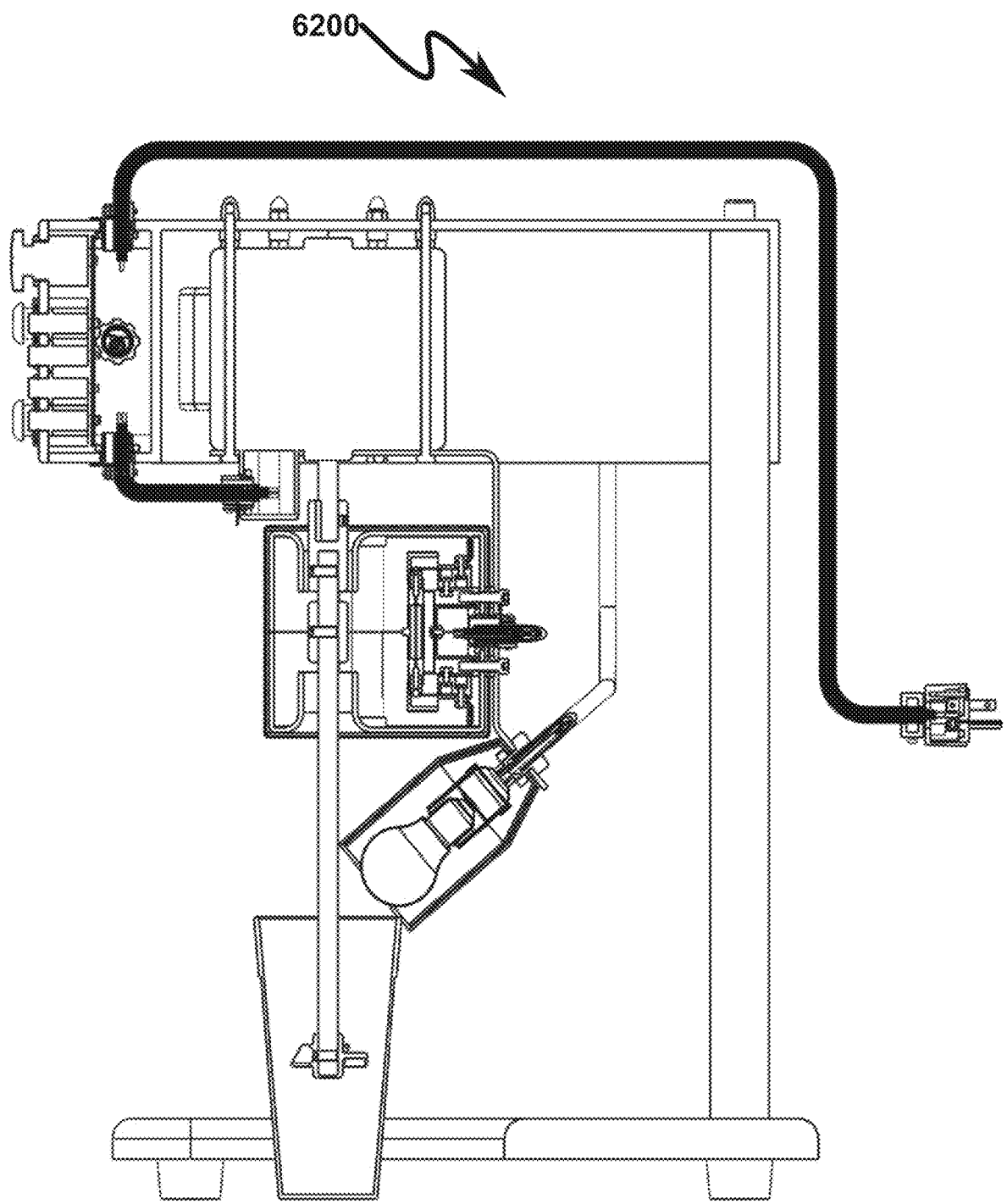
FIG. 62 illustrates a right side section view of a preferred exemplary beverage mixing system embodiment employing a computerized control of a vertical infrared heating source (IHS) configured to transfer heat through a mechanical mixing driveshaft (MMD) to a mechanical mixing agitator (MMA) and additionally heat the beverage product using an optional infrared irradiation source (IIS)
Figure 63:
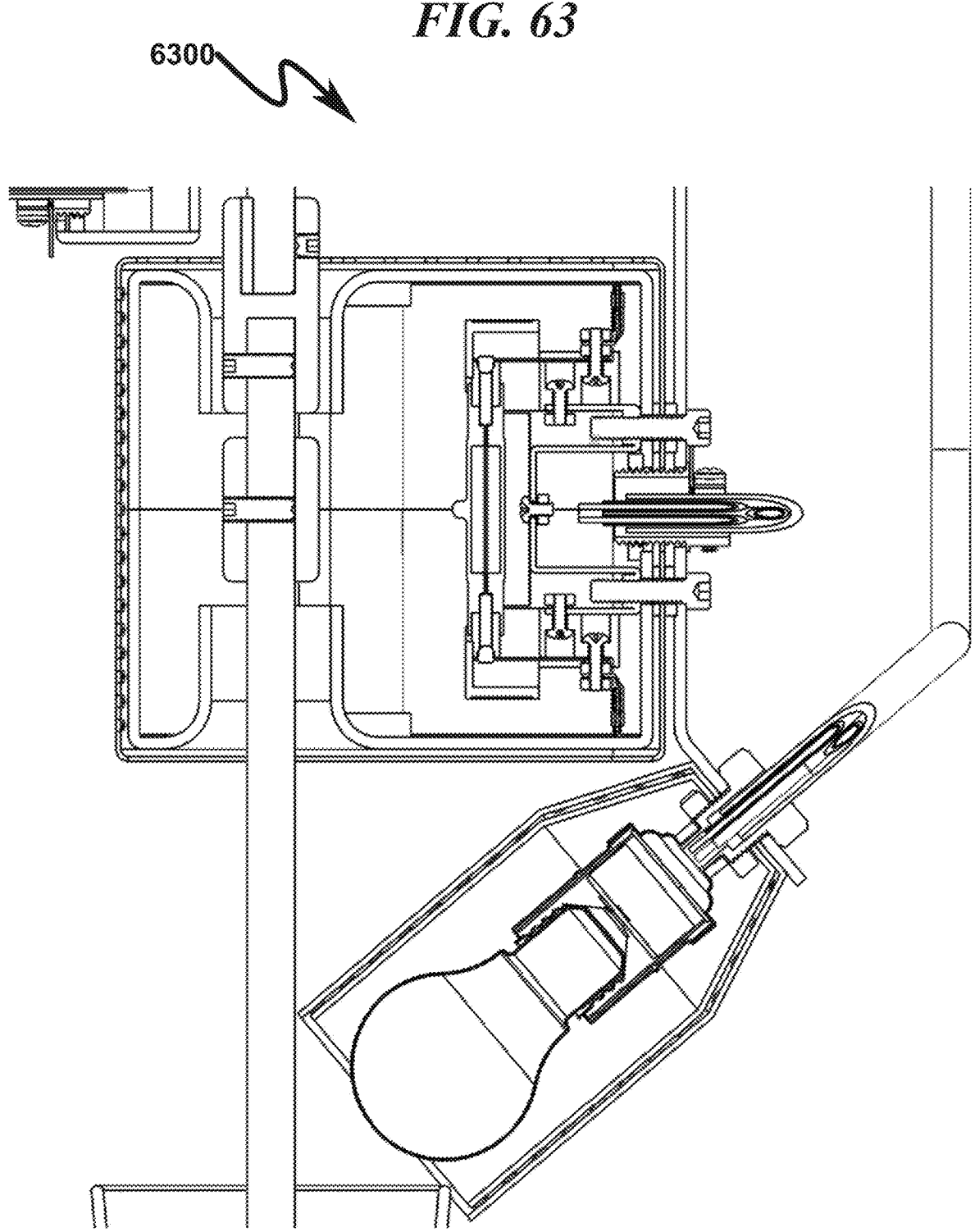
FIG. 63 illustrates a right side section detail view of a preferred exemplary beverage mixing system embodiment employing a computerized control of a vertical infrared heating source (IHS) configured to transfer heat through a mechanical mixing driveshaft (MMD) to a mechanical mixing agitator (MMA) and additionally heat the beverage product using an optional infrared irradiation source (IIS)
Figure 64:
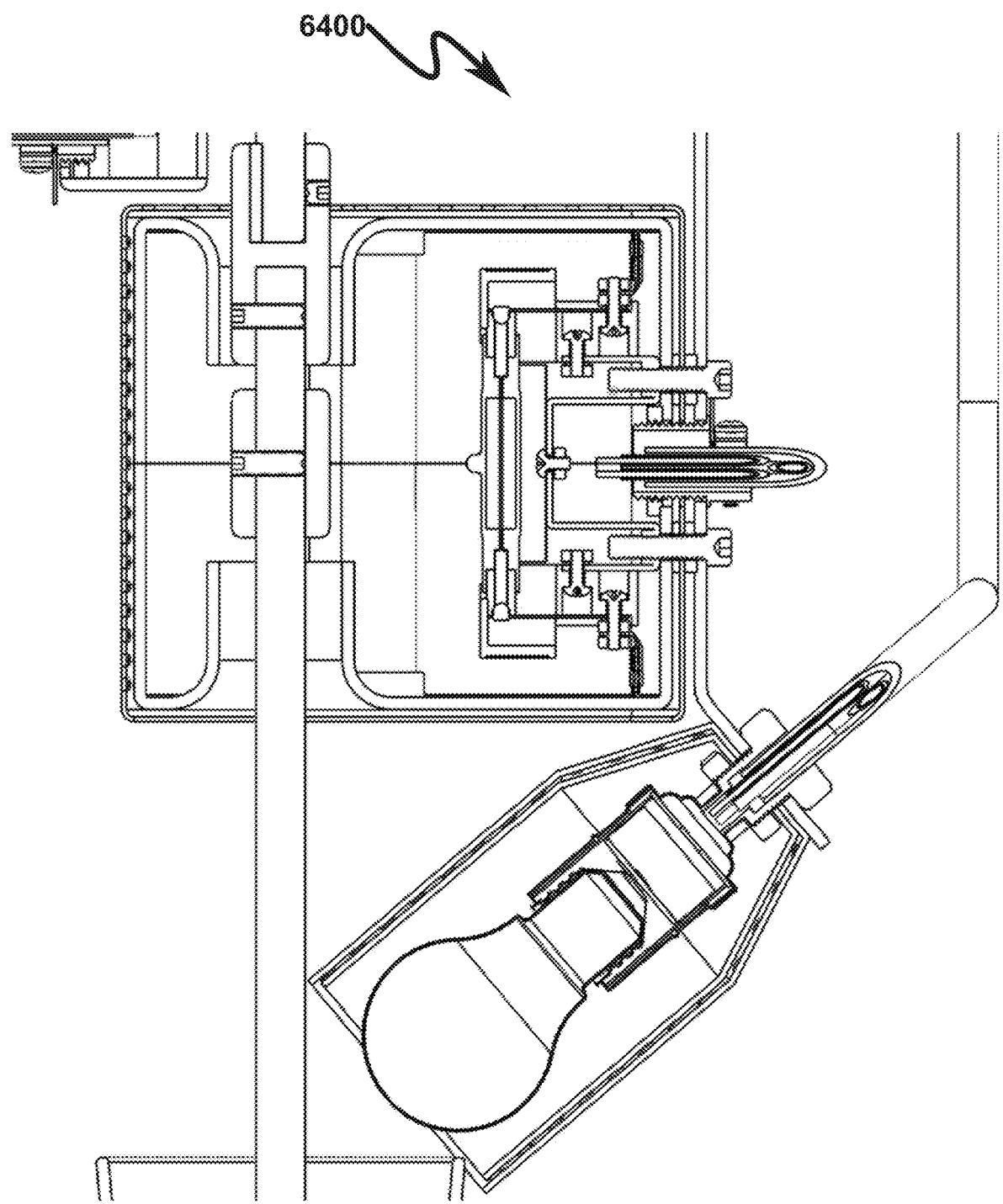
FIG. 64 illustrates a top right front perspective right side detail section view of a preferred exemplary beverage mixing system embodiment employing a computerized control of a vertical infrared heating source (IHS) configured to transfer heat through a mechanical mixing driveshaft (MMD) to a mechanical mixing agitator (MMA) and additionally heat the beverage product using an optional infrared irradiation source (IIS)

While the beverage mixing system may take many forms, an alternate preferred exemplary embodiment utilizing automated computerized controls is presented in FIG. 49 (4900)-FIG. 64 (6400). As generally depleted in the sectional view of FIG. 61 (6100), the beverage mixing system comprises a mechanical rotational driver (MRD) (6101), mechanical mixing driveshaft (MMD) (6102), mechanical mixing agitator (MMA) (6103), vertical infrared heating source (IHS) (6104), and an optional infrared irradiation source (IIS) (6105). As depicted in this example, the beverage mixing container (6109) contains the beverage product slurry that is stirred by the mechanical mixing agitator (MMA) (6103).

The infrared heating source (IHS) (6104) depicted incorporates a vertical heat lamp infrared heating source (IHS) (6104) configured as a halogen lamp. Control functions for the mechanical rotational driver (MRD) (6101) electric motor, vertical infrared heating source (IHS) (6104) heater, and the optional infrared irradiation source (IIS) (6105) are provided for via a computerized control panel (6106) that incorporates controls for MOTOR, ON, OFF, PROGRAM SELECT, RUN, and EMERGENCY STOP functions. Electrical power for the system is provided by a conventional power cord (6107). A baseplate (6108) provides structural support for the system.

As can be seen by the front system view of FIG. 49 (4900), the control panel (4910) provides manual switches to enable ON (4911) and OFF (4912) power functions and a PROGRAM SELECT FUNCTION (4913), and a RUN/OPERATE (4914) function. The ON (4911) and OFF (4912) power functions enable/disable electrical power to the system. Once power is supplied to the system, the PROGRAM SELECT FUNCTION (4913) allows one of several operational mixing modes to be selected and/or programmed into the system. Once a given mixing mode is selected/programmed via use of the PROGRAM SELECT FUNCTION (4913), the RUN/OPERATE (4914) control activates the selected/programmed mixing mode. Indication of the selected/programmed MIXING MODE (4915) is provided by one or more indicators (4916) on the control panel. It is anticipated that the computerized control functions detailed herein will be implemented using a microprocessor and/or microcontroller on a printed circuit board (PCB) in electrical communication with the switches and indicators described above.

Exemplary MMD Heatsink Embodiments (6500)-(7200)

Figure 65:
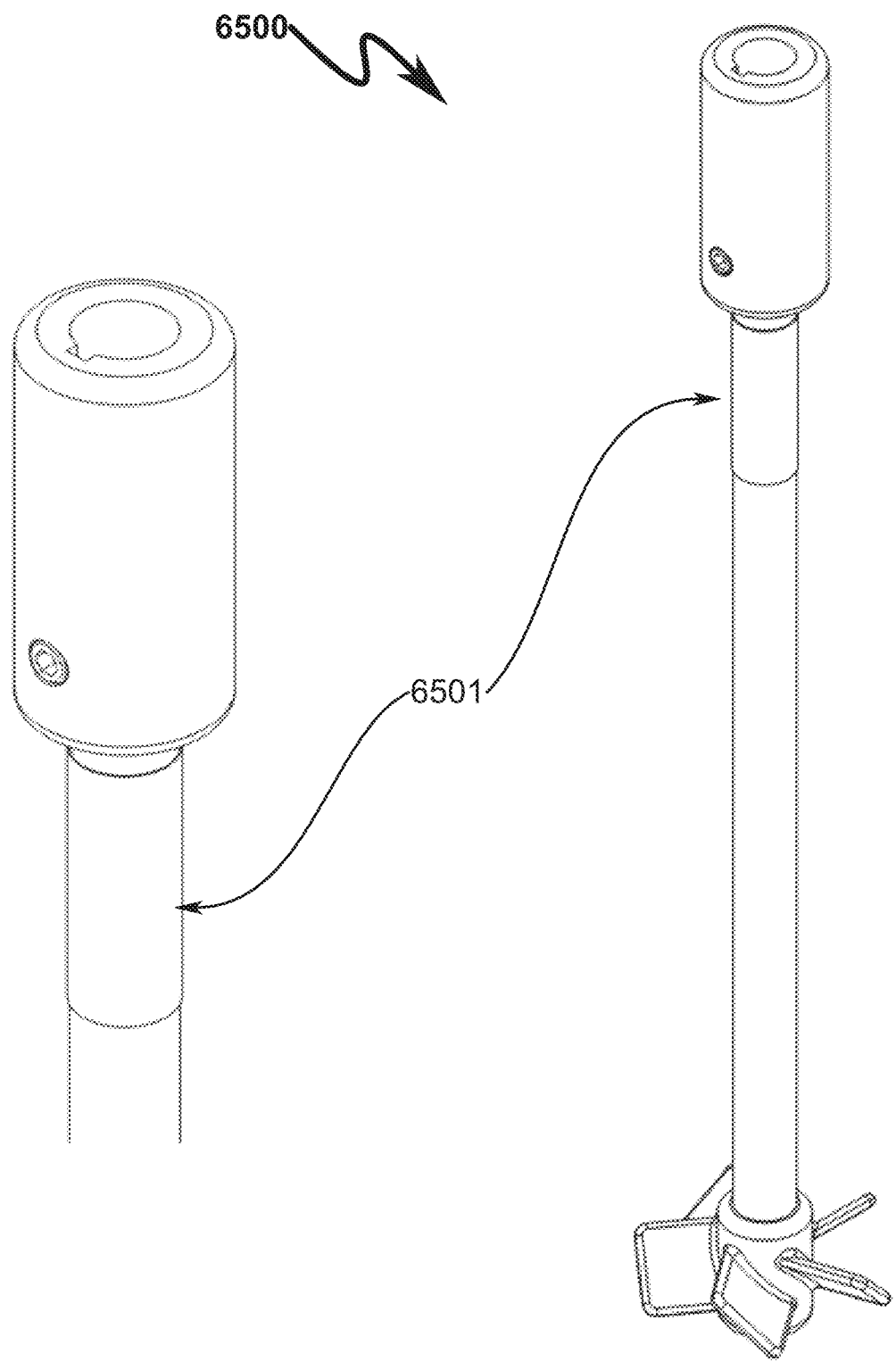
FIG. 65 illustrates a top perspective view of an exemplary shaft assembly structure with detail of an exemplary heatsink embodiment comprising a surface coating on the mechanical mixing driveshaft (MMD) or a painted surface on the mechanical mixing driveshaft (MMD)
Figure 72:
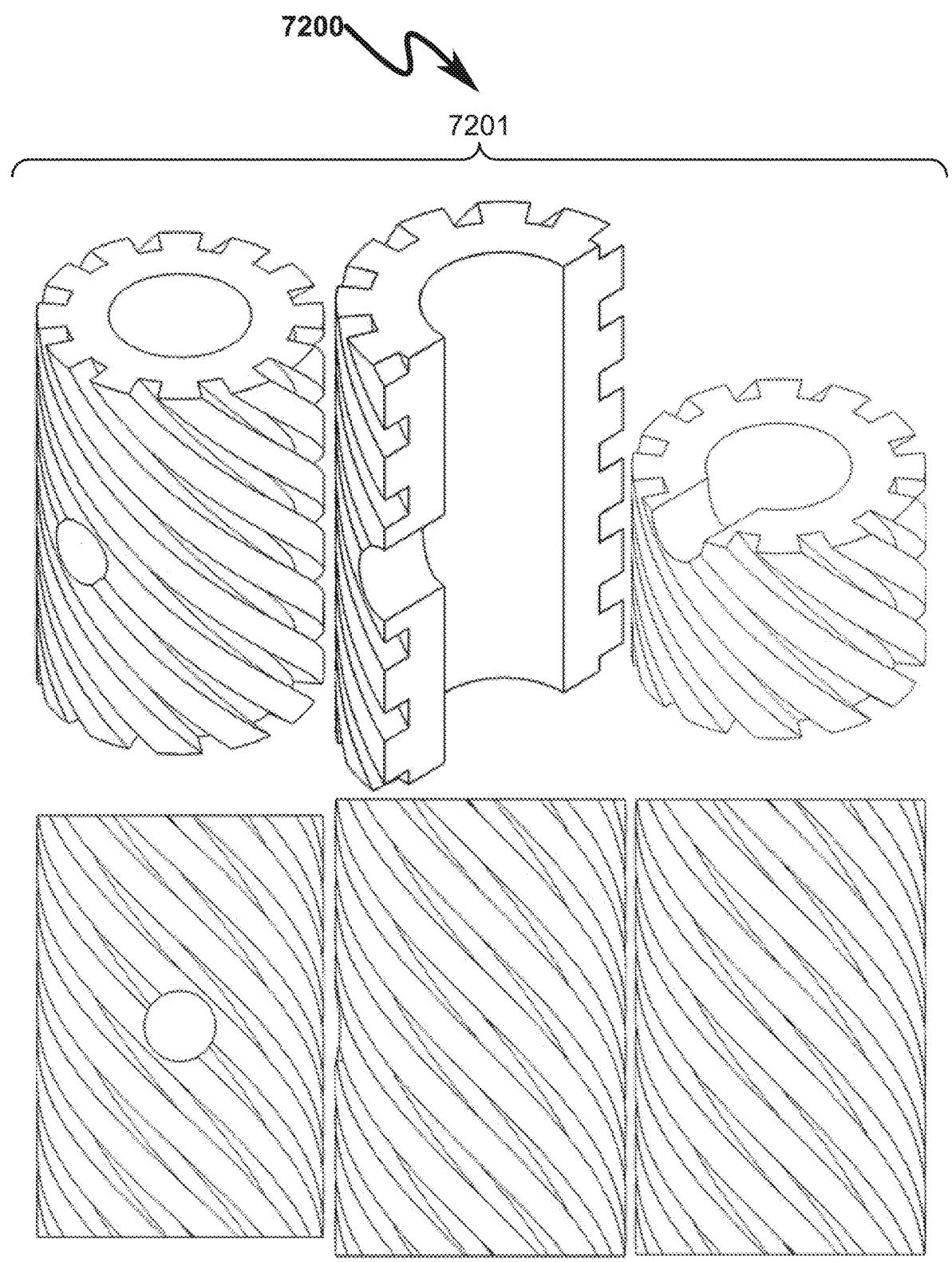
FIG. 72 illustrates detail top perspective, right section perspective, top section perspective, front, side, and rear views of an exemplary heatsink embodiment comprising a helically grooved cylindrical sleeve having a peripheral outer diameter larger than that of the mechanical mixing driveshaft (MMD)

While the mechanical mixing driveshaft (MMD) may take many forms, several exemplary assembly views are presented in FIG. 65 (6500)-FIG. 72 (7200). These views depict various MMD embodiments that are augmented with a heatsink to enable enhanced heat transfer from the infrared heating source (IHS) to the MMD shaft and beverage product being mixed.

Figure 66:
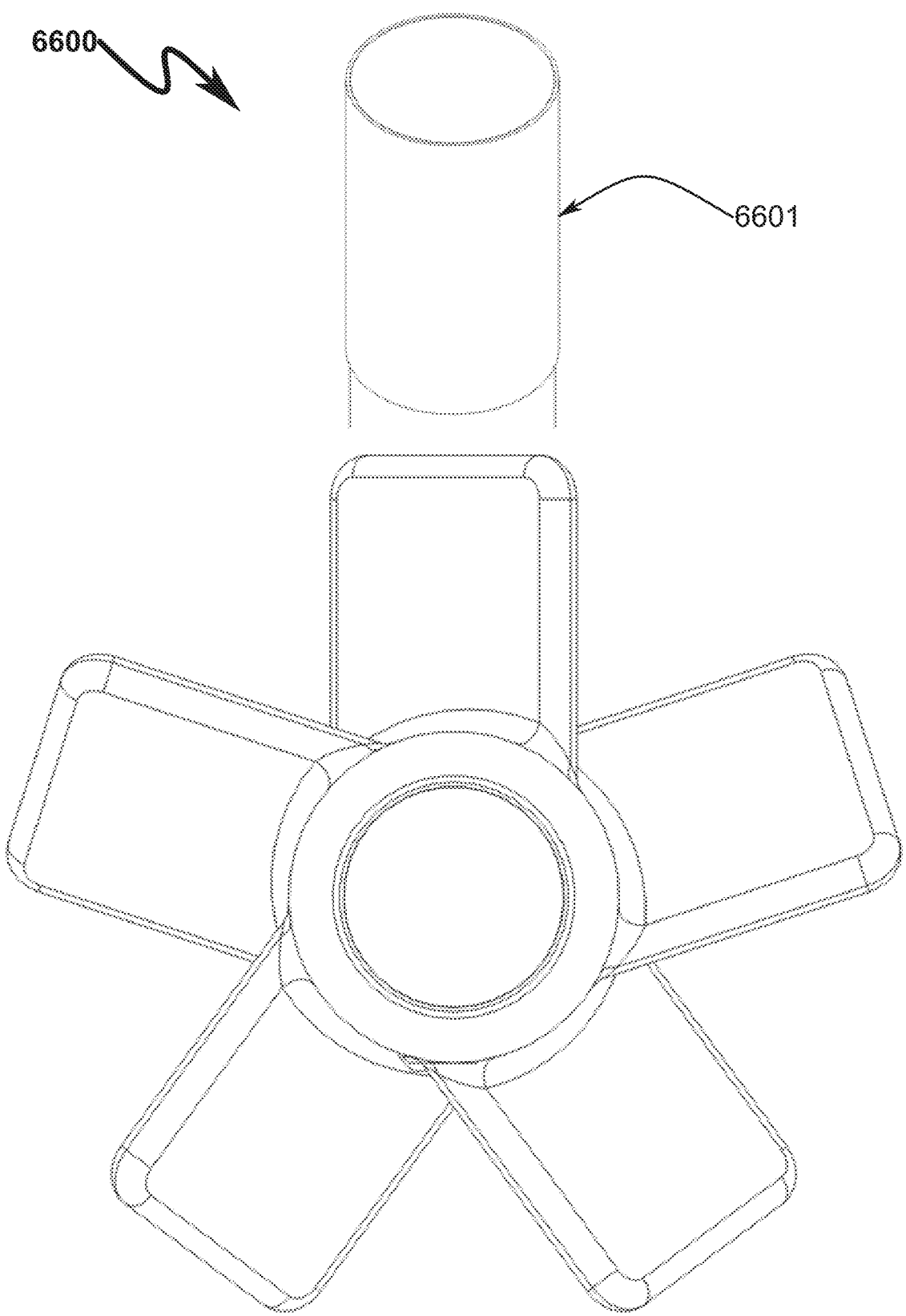
FIG. 66 illustrates top perspective section and top section views of an exemplary shaft assembly structure detailing an exemplary heatsink embodiment comprising a surface coating on the mechanical mixing driveshaft (MMD) or a painted surface on the mechanical mixing driveshaft (MMD)

FIG. 65 (6500)-FIG. 66 (6500) depict a scenario in which a portion of the MMD includes a heatsink (6501, 6601) comprising a surface coating on the MMD or equivalently a painted surface on the MMD that is used to collect infrared radiation from the infrared heating source (IHS).

Figure 67:
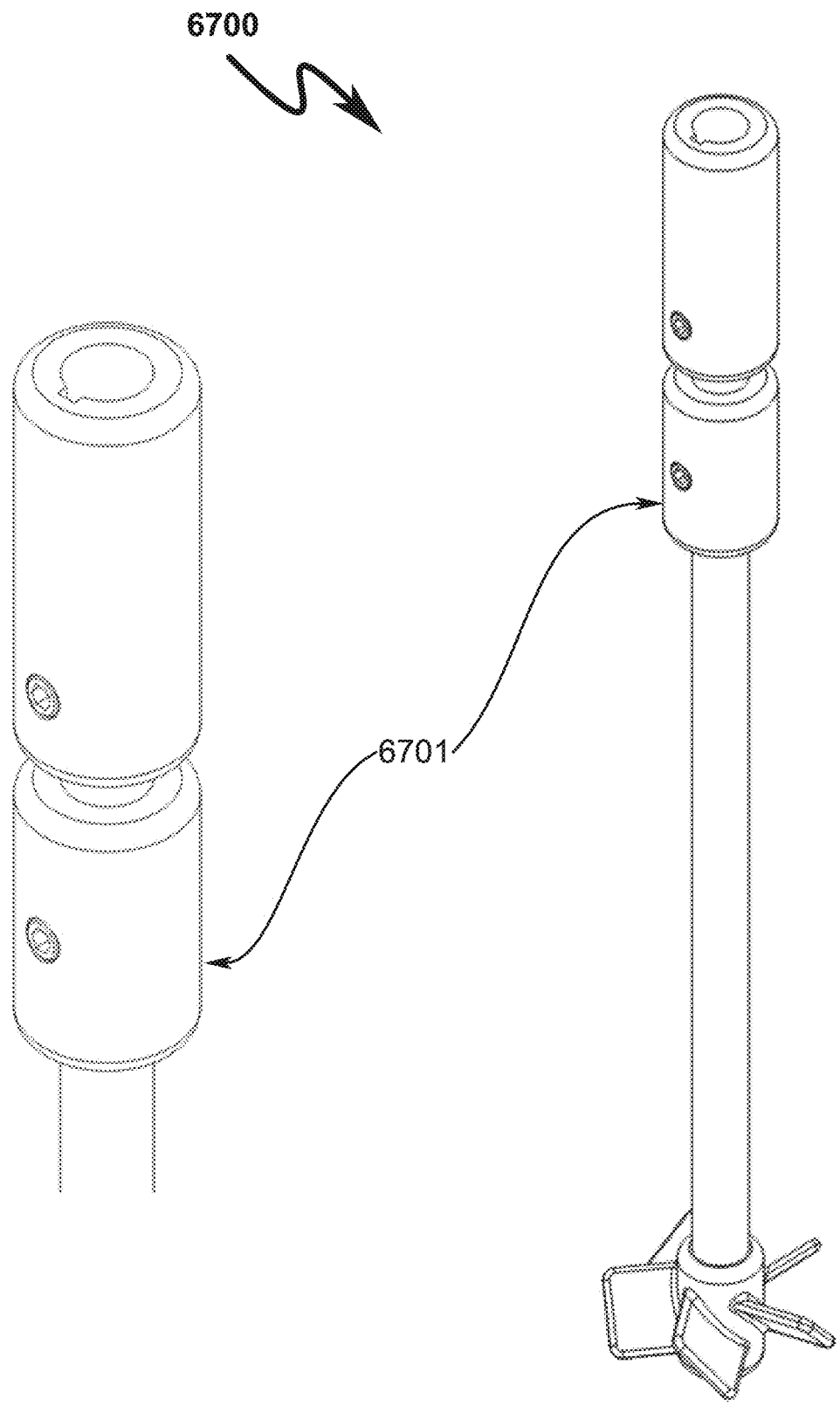
FIG. 67 illustrates a top perspective view of an exemplary shaft assembly structure with detail of an exemplary heatsink embodiment comprising a solid cylindrical sleeve having a peripheral outer diameter larger than that of the mechanical mixing driveshaft (MMD)
Figure 68:
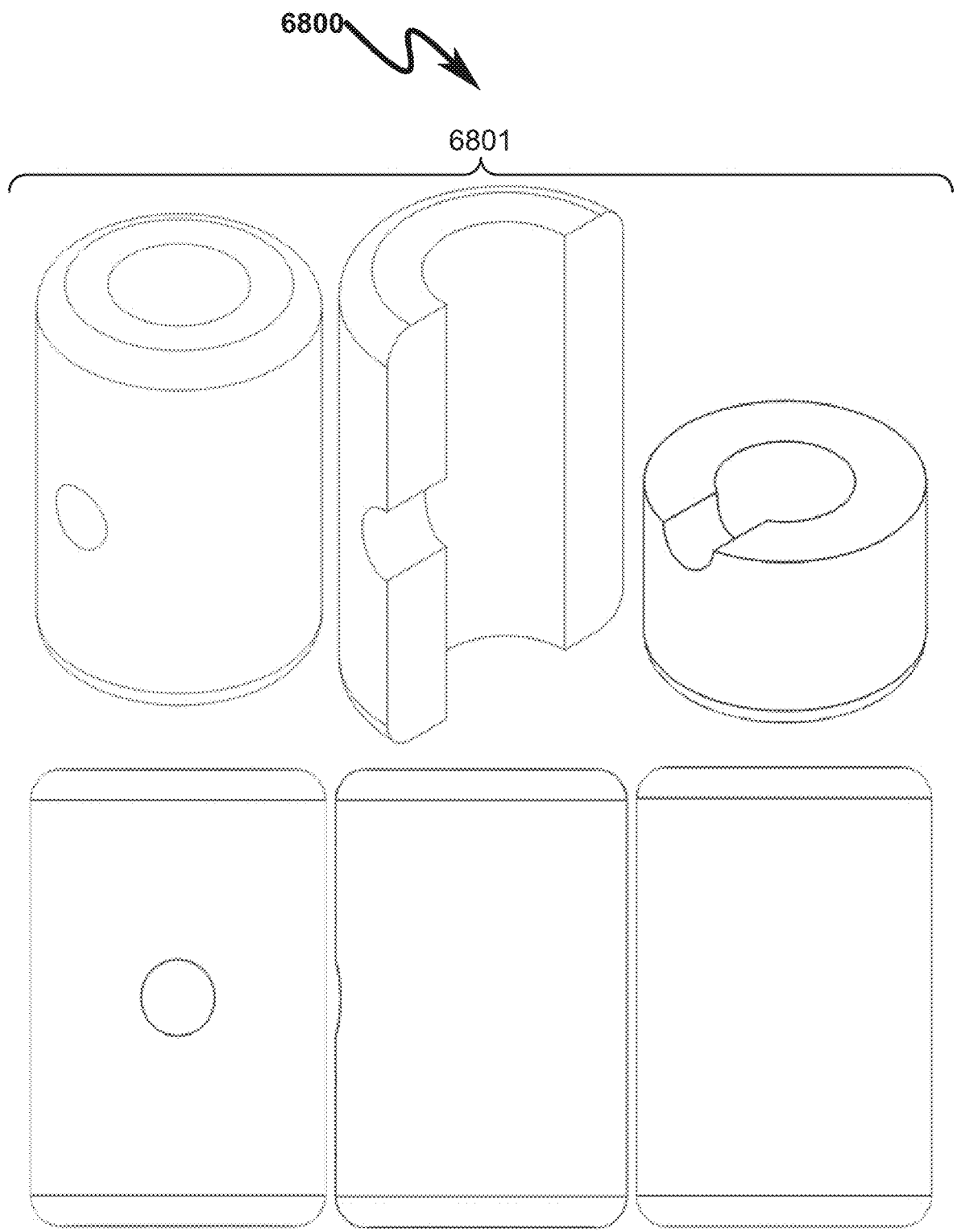
FIG. 68 illustrates detail top perspective, right section perspective, top section perspective, front, side, and rear views of an exemplary heatsink embodiment comprising a solid cylindrical sleeve having a peripheral outer diameter larger than that of the mechanical mixing driveshaft (MMD)
Figure 69:
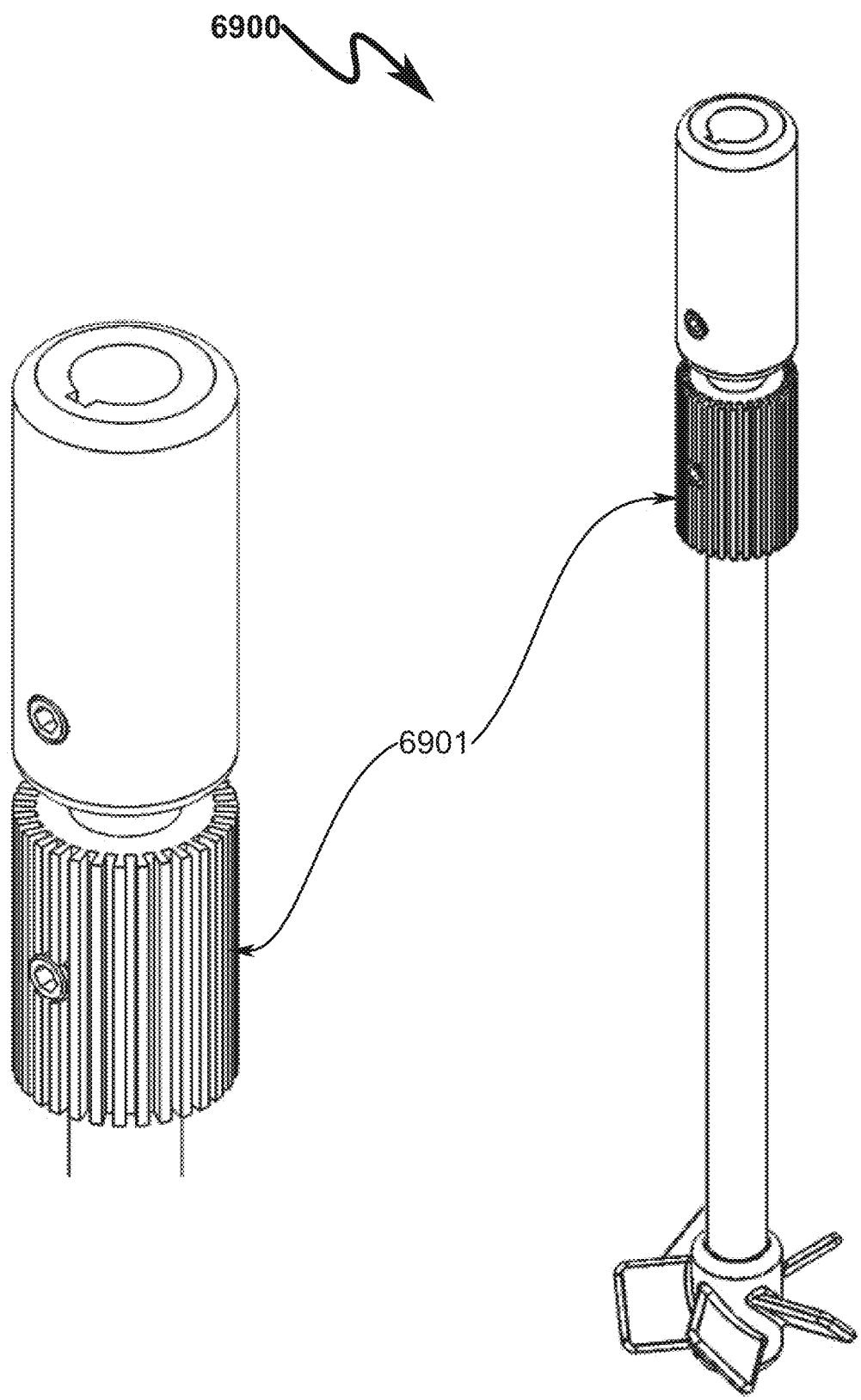
FIG. 69 illustrates a top perspective view of an exemplary shaft assembly structure with detail of an exemplary heatsink embodiment comprising a vertically grooved cylindrical sleeve having a peripheral outer diameter larger than that of the mechanical mixing driveshaft (MMD)
Figure 70:
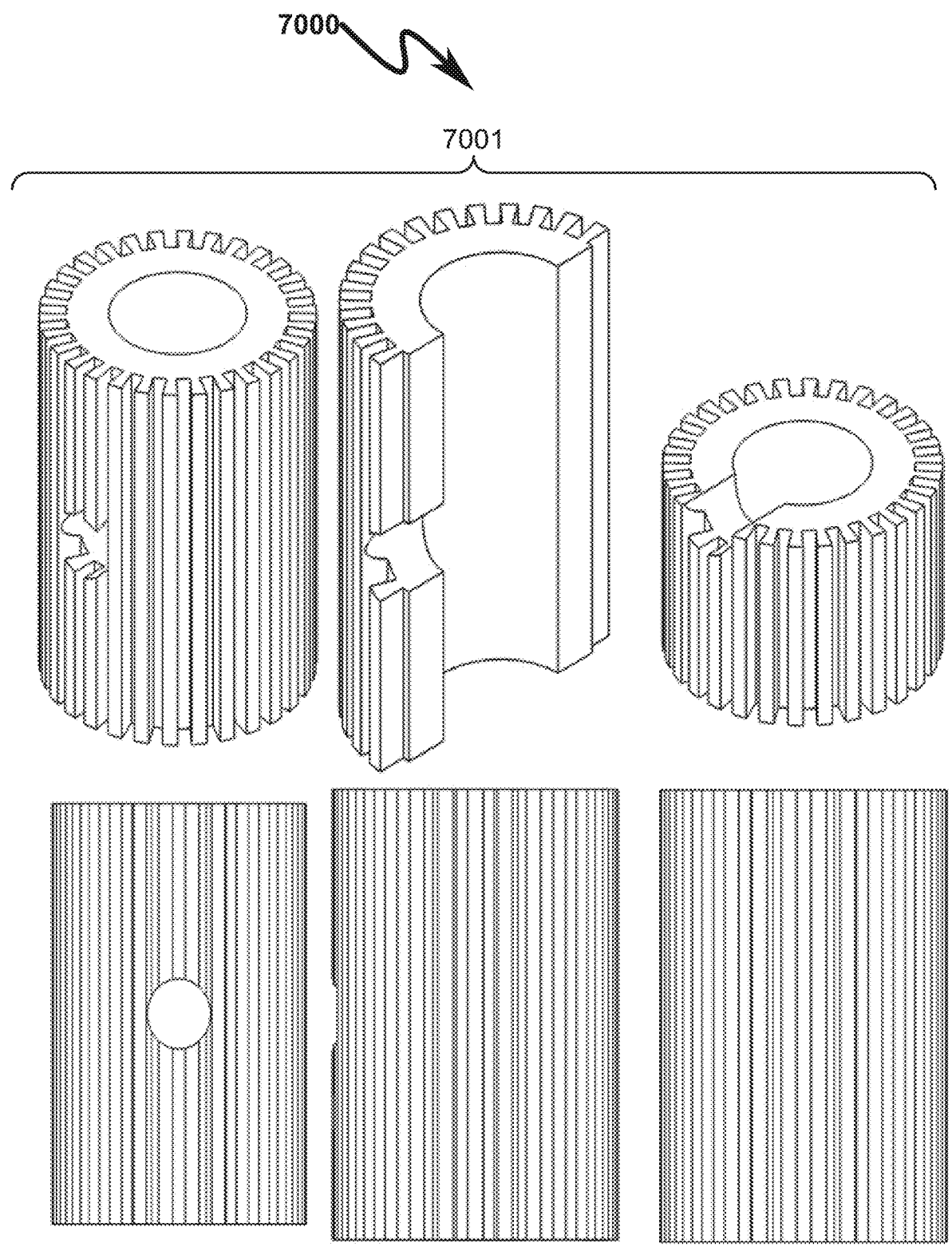
FIG. 70 illustrates detail top perspective, right section perspective, top section perspective, front, side, and rear views of an exemplary heatsink embodiment comprising a vertically grooved cylindrical sleeve having a peripheral outer diameter larger than that of the mechanical mixing driveshaft (MMD)
Figure 71:
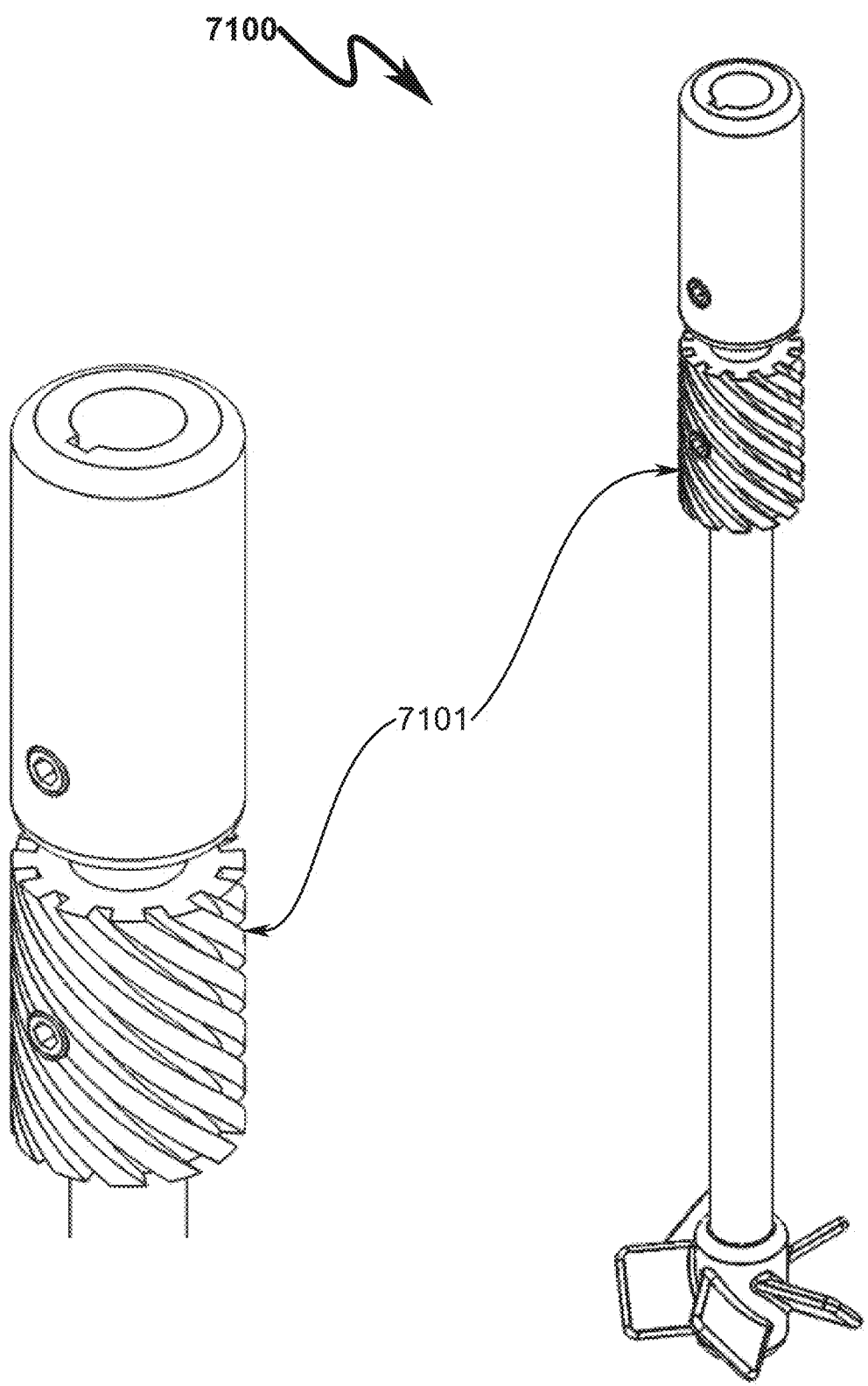
FIG. 71 illustrates a top perspective view of an exemplary shaft assembly structure with detail of an exemplary heatsink embodiment comprising a helically grooved cylindrical sleeve having a peripheral outer diameter larger than that of the mechanical mixing driveshaft (MMD)

Infrared radiation collection by the MMD may be enhanced via the use of a variety of cylindrical sleeves that are attached to the MMD as depicted in FIG. 67 (6700)-FIG. 72 (7200). FIG. 67 (6700)-FIG. 68 (6800) depict a scenario in which a heatsink (6701, 6801) comprising a solid cylindrical sleeve is attached to the MMD to collect infrared radiation, from, the infrared heating source (IHS). This additional surface area permits additional infrared radiation to be transmitted to the MMD. FIG. 69 (6900)-FIG. 70 (7000) is a variant of this configuration in which the heatsink (6901, 7001) comprises a vertically grooved cylindrical sleeve having a peripheral outer diameter larger than that of the MMD. FIG. 71 (7100)-FIG. 72 (7200) is a variant of this configuration in which the heatsink (7101, 7201) comprises a helically grooved cylindrical sleeve having a peripheral outer diameter larger than that of the MMD. The helically grooved cylindrical sleeve may be configured such that the helix generates a fan-like action and forces air heated by the heatsink downward to make contact with the beverage product thus enhancing heat transfer from, the HIS to the beverage product.

One skilled in the art will recognize that these are only several of many heatsink variants that are possible to improve heat transfer to the MMD by the IHS. While the heatsink in these examples has been shown to be a separate component of the MMD assembly, it can in some embodiments be directly incorporated into the construction of the MMD shaft. The cylindrical sleeve heatsinks depicted are typically attached to the MMD via the use of a setscrew or other fastener.

Exemplary Horizontal IHS Construction (7300)-(8000)

Figure 73:
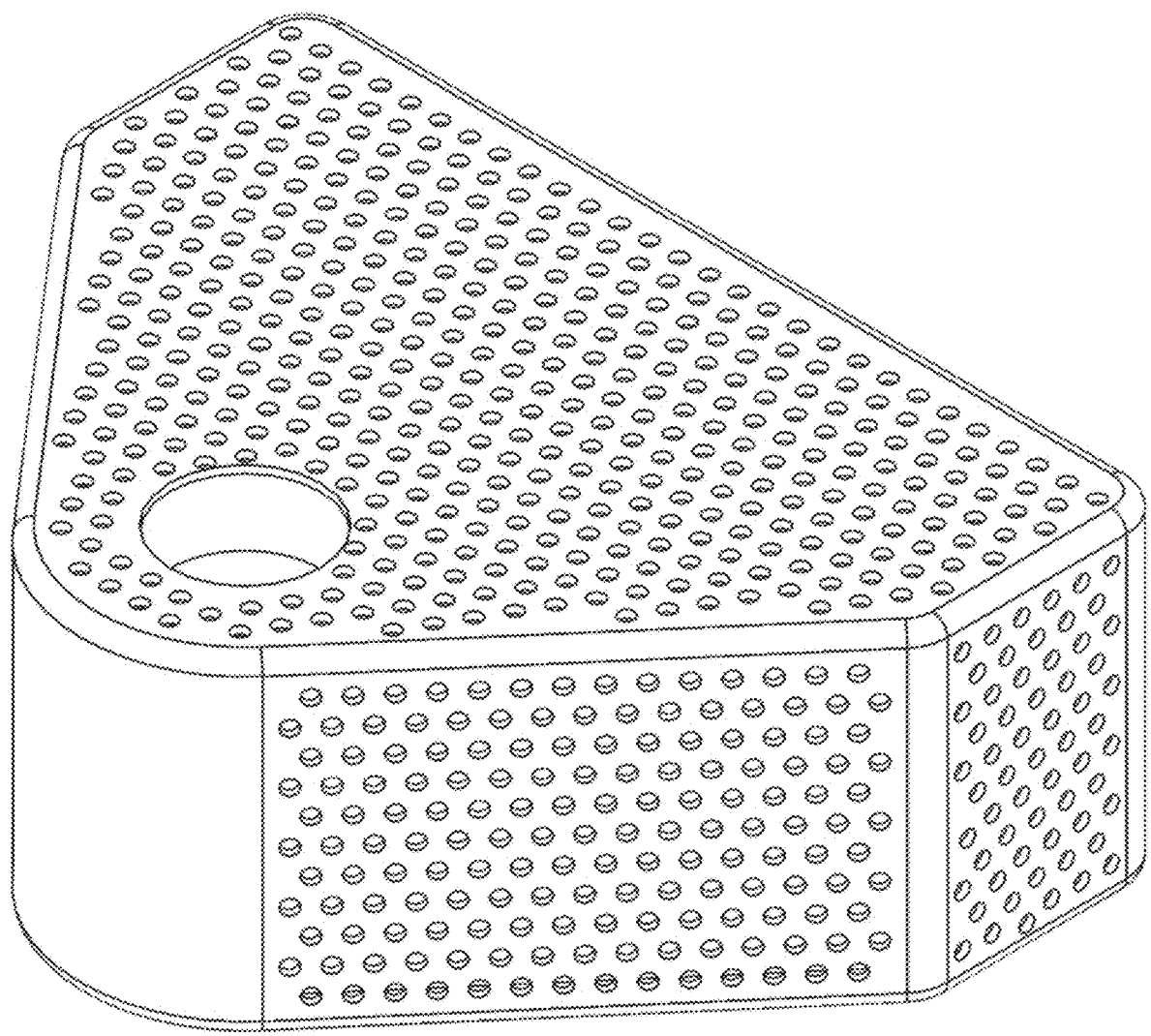
FIG. 73 illustrates a top right front perspective view of a preferred exemplary beverage mixing horizontal infrared heating source (IHS) system embodiment.
Figure 74:
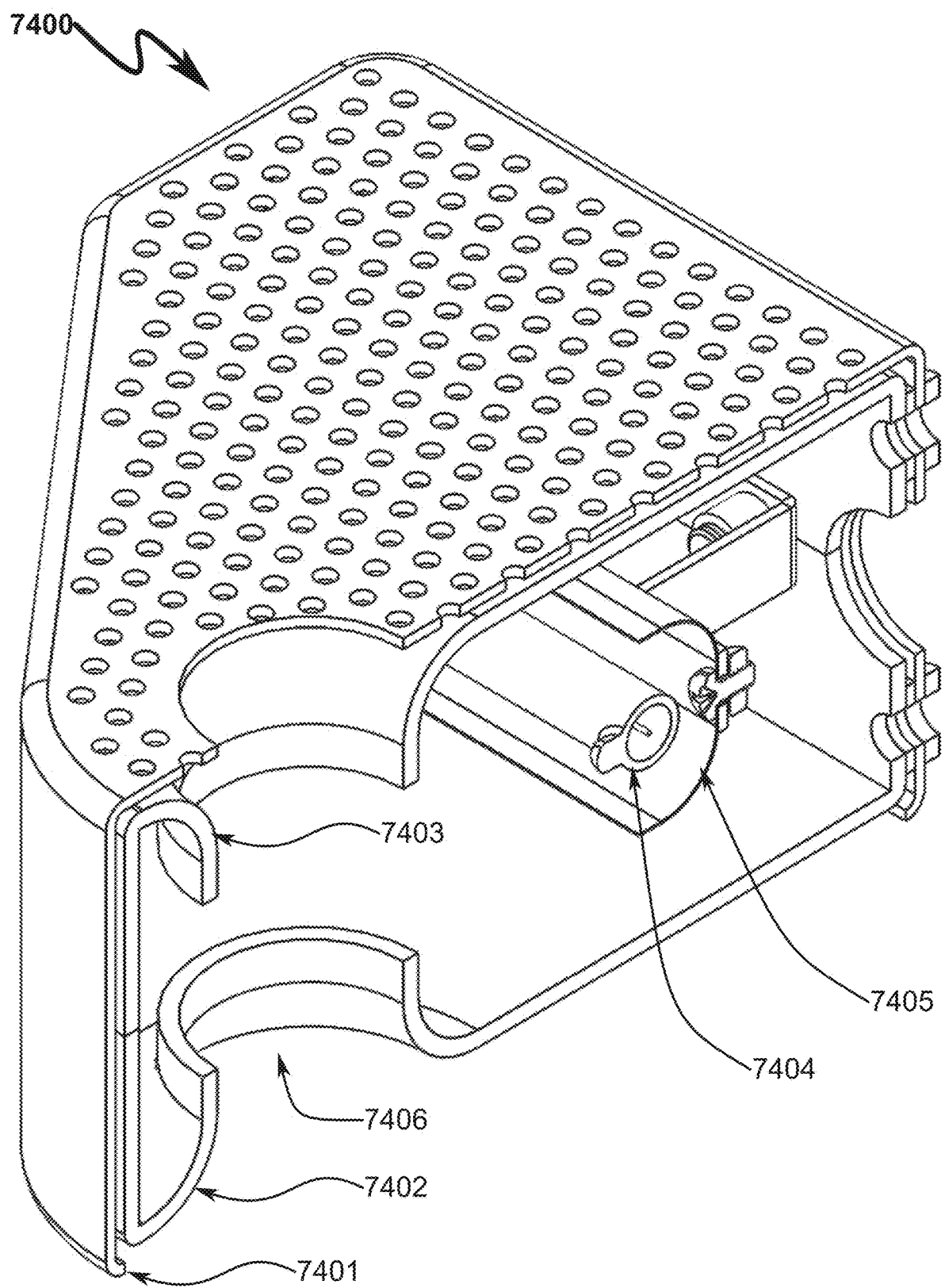
FIG. 74 illustrates a top right front perspective right side section view of a preferred exemplary beverage mixing horizontal infrared heating source (IHS) system embodiment.
Figure 75:
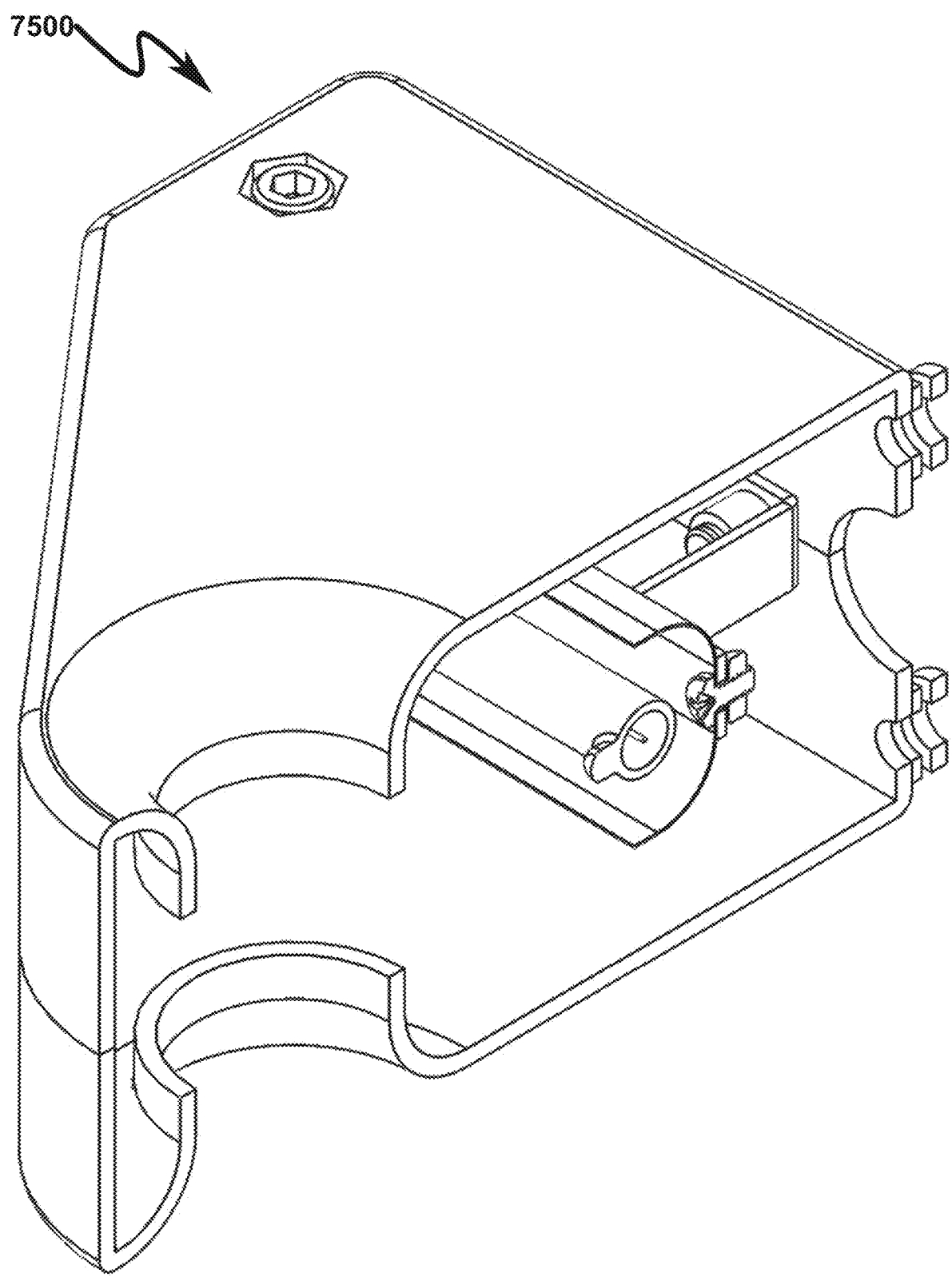
FIG. 75 illustrates a top right front perspective right side section view of a preferred exemplary beverage mixing horizontal infrared heating source (IHS) system embodiment with heat shield removed.
Figure 76:
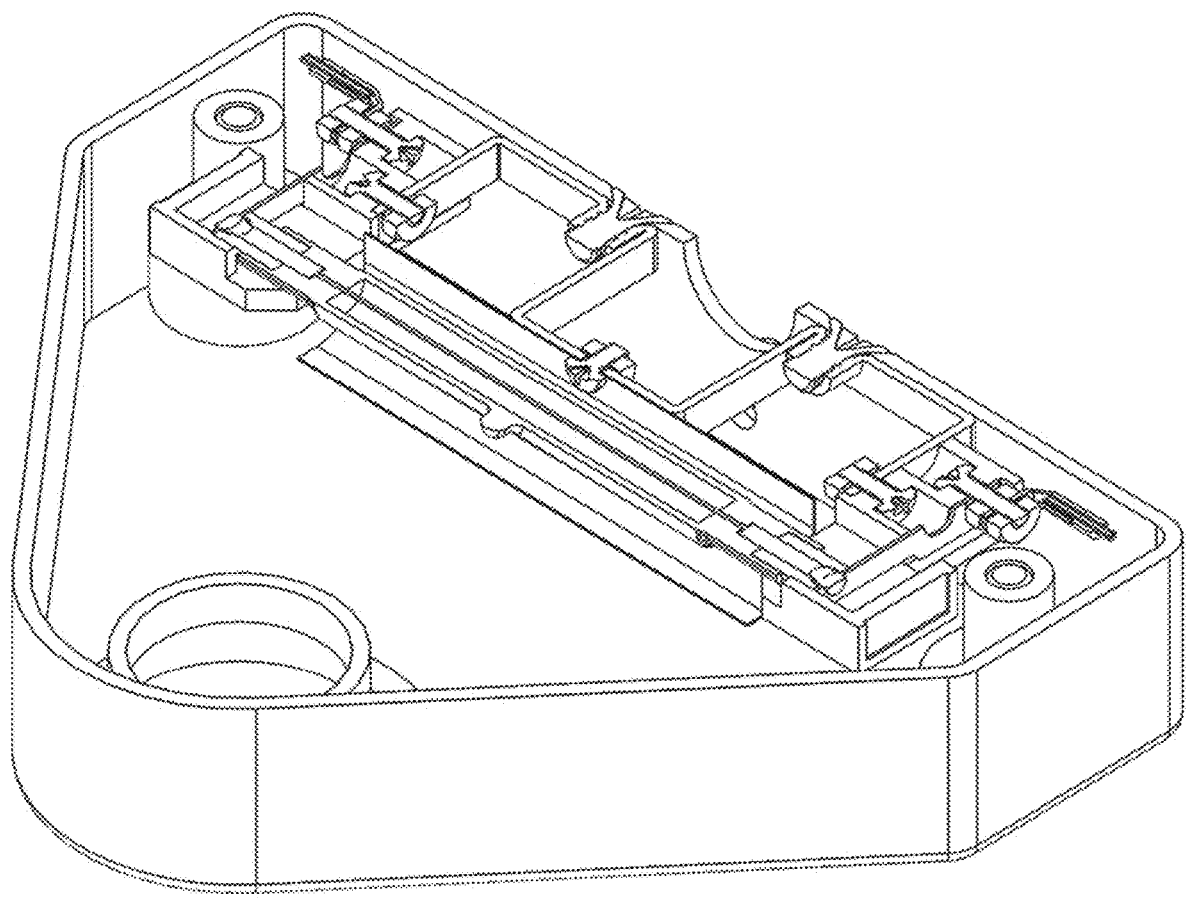
FIG. 76 illustrates a top right front perspective top side section view of a preferred exemplary beverage mixing horizontal infrared heating source (IHS) system embodiment with heatshield removed.
Figure 77:
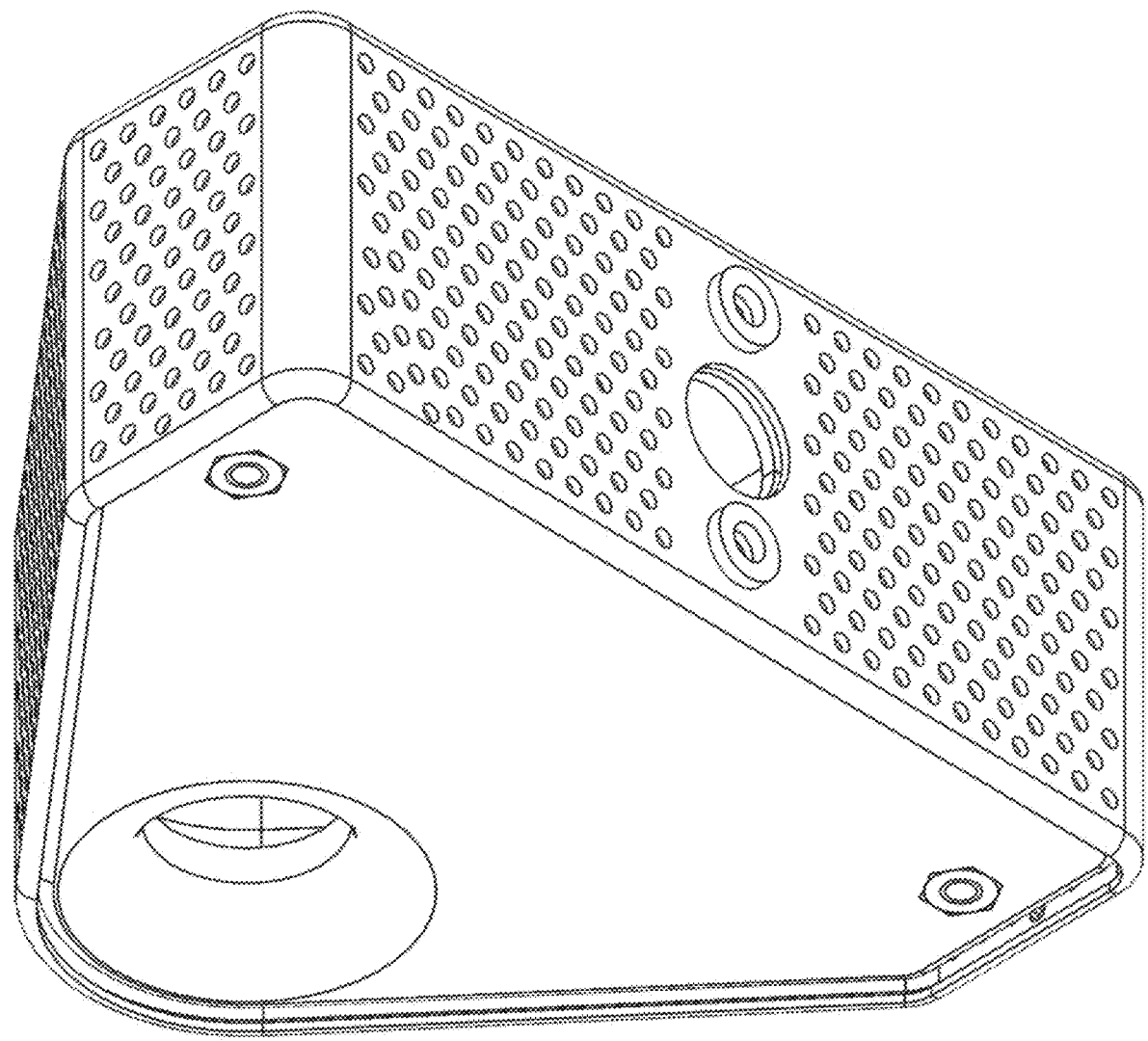
FIG. 77 illustrates a bottom right rear perspective view of a preferred exemplary beverage mixing horizontal infrared heating source (IHS) system embodiment.
Figure 78:
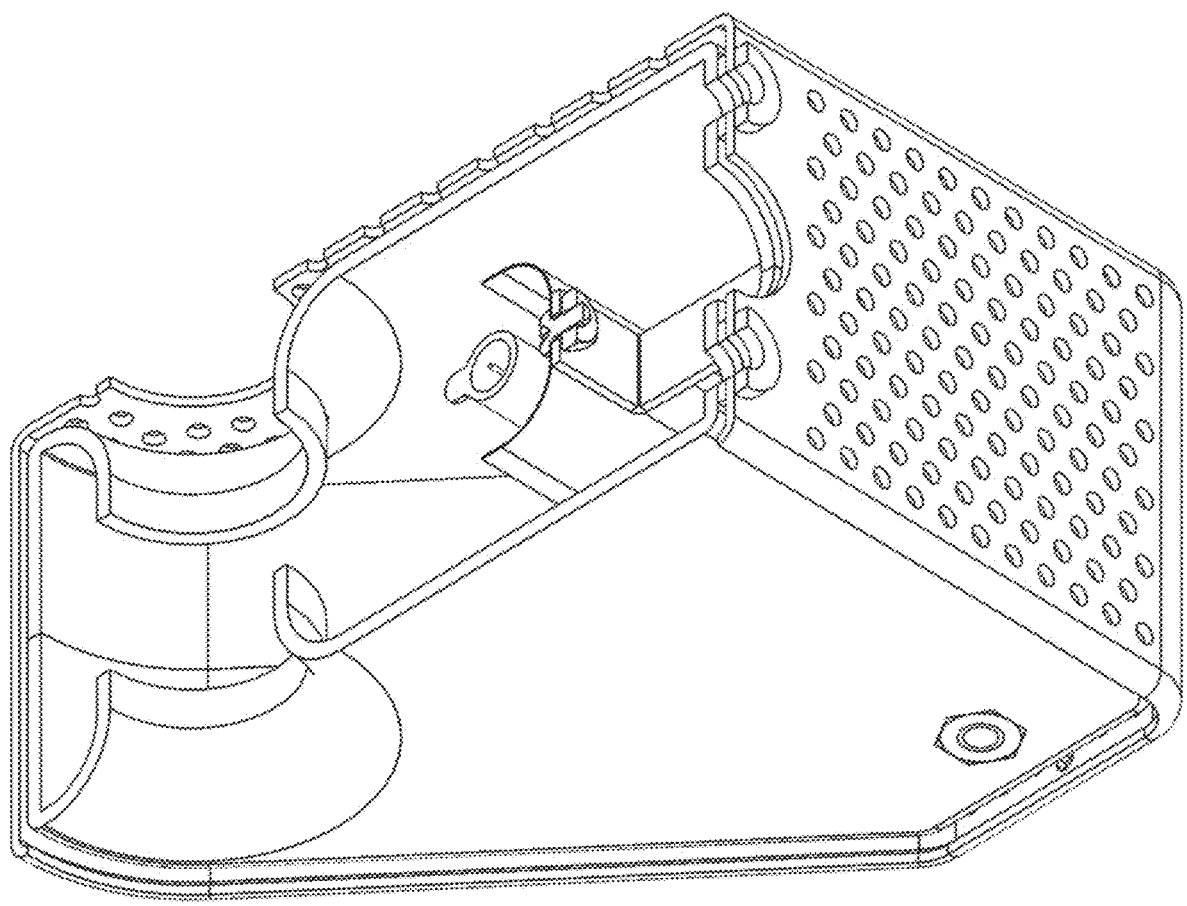
FIG. 78 illustrates a bottom right rear perspective right side section view of a preferred exemplary beverage mixing horizontal infrared heating source (IHS) system embodiment.
Figure 79:
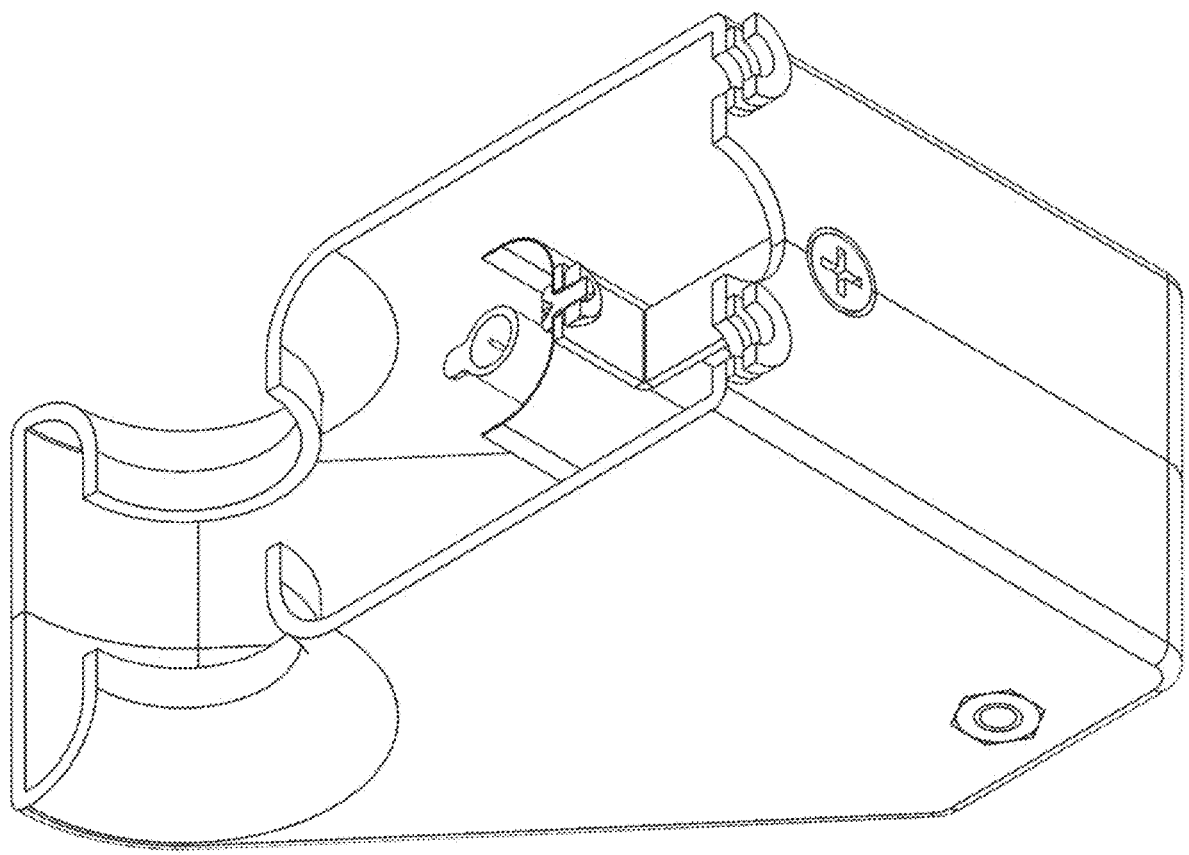
FIG. 79 illustrates a bottom right rear perspective right side section view of a preferred exemplary beverage mixing horizontal infrared heating source (IHS) system embodiment with heatshield removed.
Figure 80:
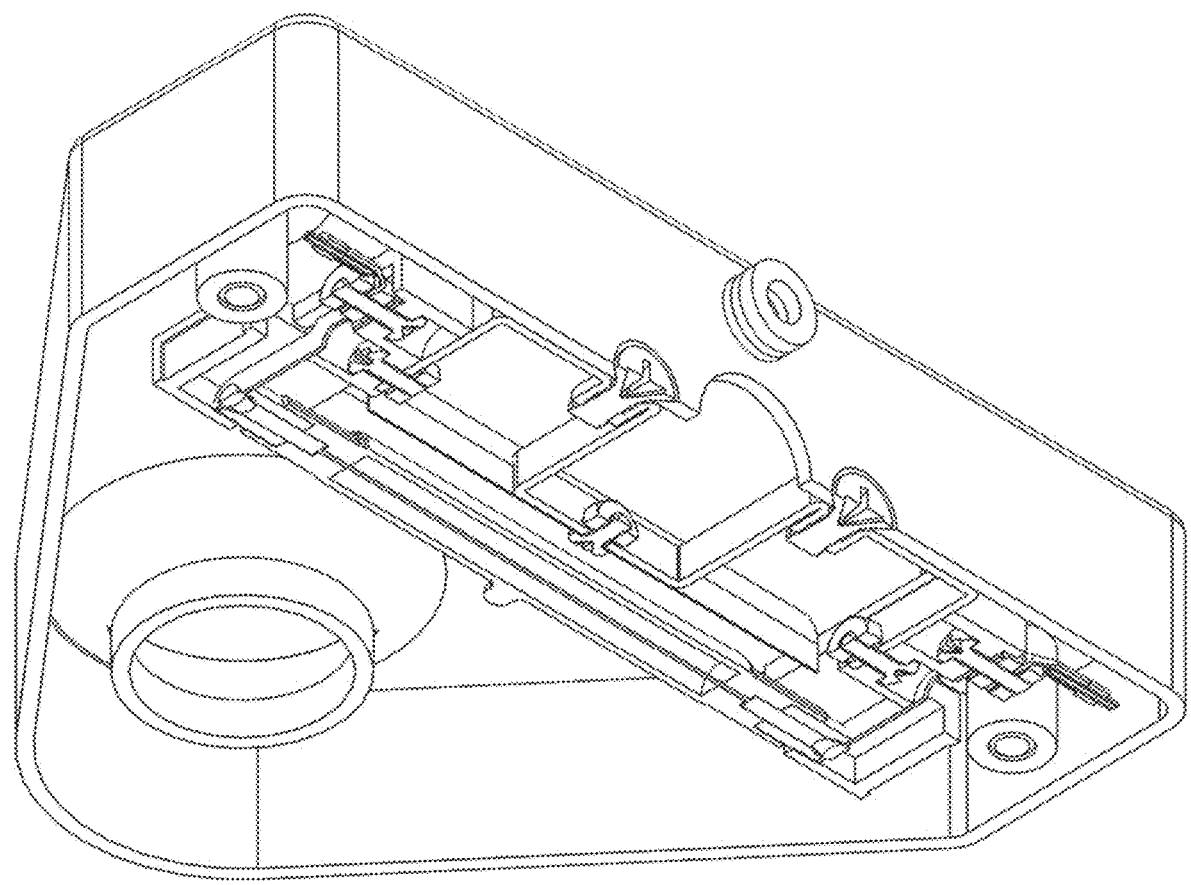
FIG. 80 illustrates a bottom right rear perspective top side section view of a preferred exemplary beverage mixing horizontal infrared heating source (IHS) system embodiment with heatshield removed.

Exemplary construction of a horizontal infrared heating source (IHS) is generally depicted in FIG. 73 (7300)-FIG. 80 (8000). As generally depicted in the sectional view of FIG. 74 (7400), this exemplary horizontal IHS embodiment consists of a heat shield (7401) enclosing an internally reflective symmetrical two-piece clamshell (7402, 7403) that encloses a halogen lamp (7404) and internal directional reflector (7405). An aperture (7406) in the internally reflective clamshell (7402, 7403) encircles the MMD and its associated MMD heatsink and permits infrared radiation from the halogen lamp (7404) to be directed onto the MMD either directly or via the MMD heatsink.

The horizontally oriented halogen lamp (7404) may be retained using a number of techniques known to those skilled in the art including a preferred ceramic receptacle incorporating stainless steel nigh temperature hardware. As the heat generated by the halogen lamp (7404) is sufficient to cause skin burning, a heat shield (7401) is generally required to enclose the internally reflective clamshell (7402, 7403) to prevent operator injury during use of the beverage mixing apparatus. Furthermore, it should be noted that heated air generated by the halogen lamp (7404) contained within the internally reflective clamshell (7402, 7403) may be directed downward along the outer surface of the MMD onto the beverage product by use of any number of helically-grooved heatsink embodiments that act as a fan to direct heated air within the internally reflective clamshell (7402, 7403) downward and onto the beverage product. Typical power dissipation by the halogen lamp (7404) in this configuration is anticipated to be in the range of 300 watts to 500 watts as a conventional 118 mm halogen lamp may be used in this horizontal configuration.

Exemplary Vertical IHS Construction (8100)-(8800)

Figure 81:
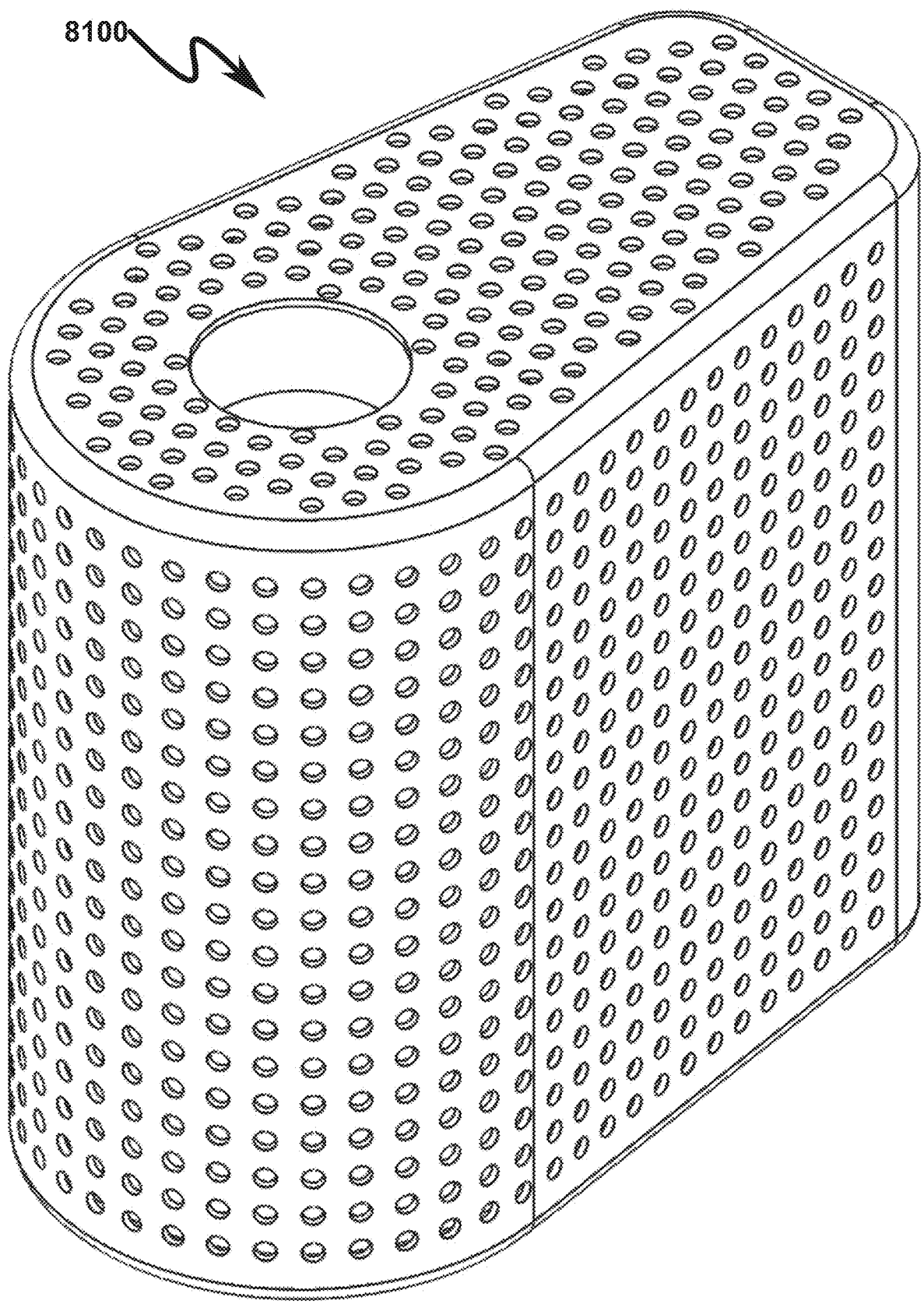
FIG. 81 illustrates a top right front perspective view of a preferred exemplary beverage mixing vertical infrared heating source (IHS) system embodiment.
Figure 82:
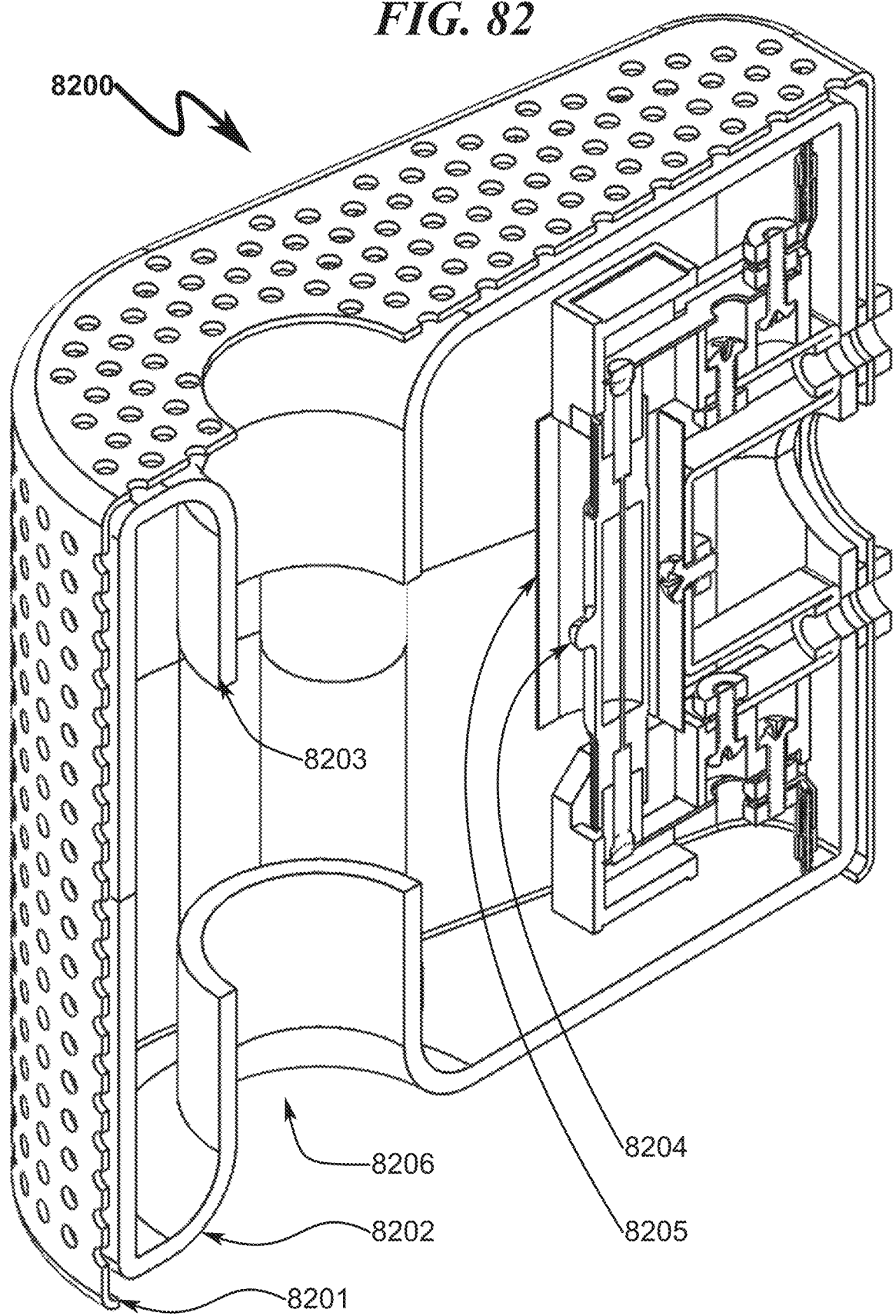
FIG. 82 illustrates a top right front perspective right side section view of a preferred exemplary beverage mixing vertical infrared heating source (IHS) system embodiment.
Figure 83:
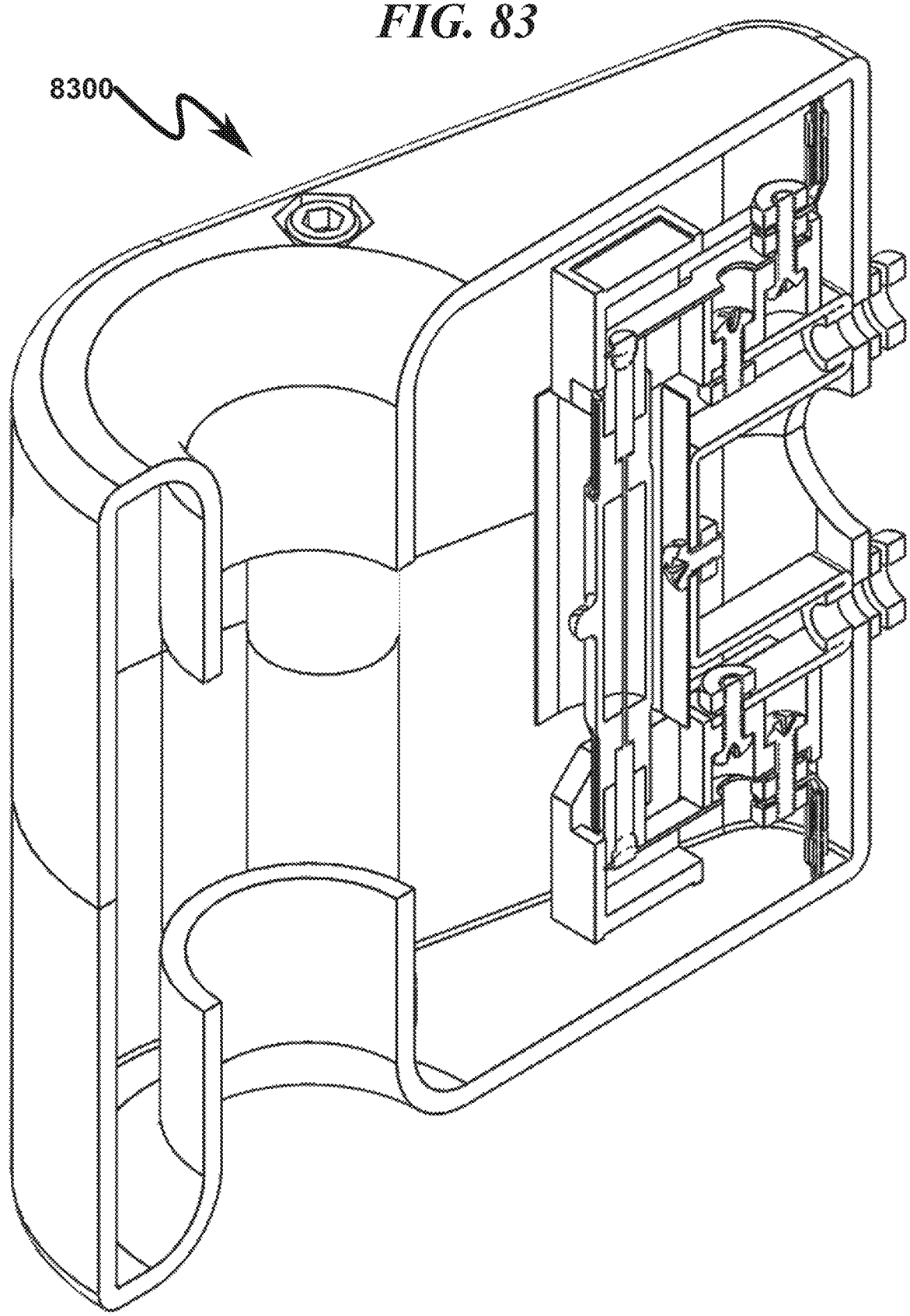
FIG. 83 illustrates a top right front perspective right side section view of a preferred exemplary beverage mixing vertical infrared heating source (IHS) system embodiment with heatshield removed.
Figure 84:
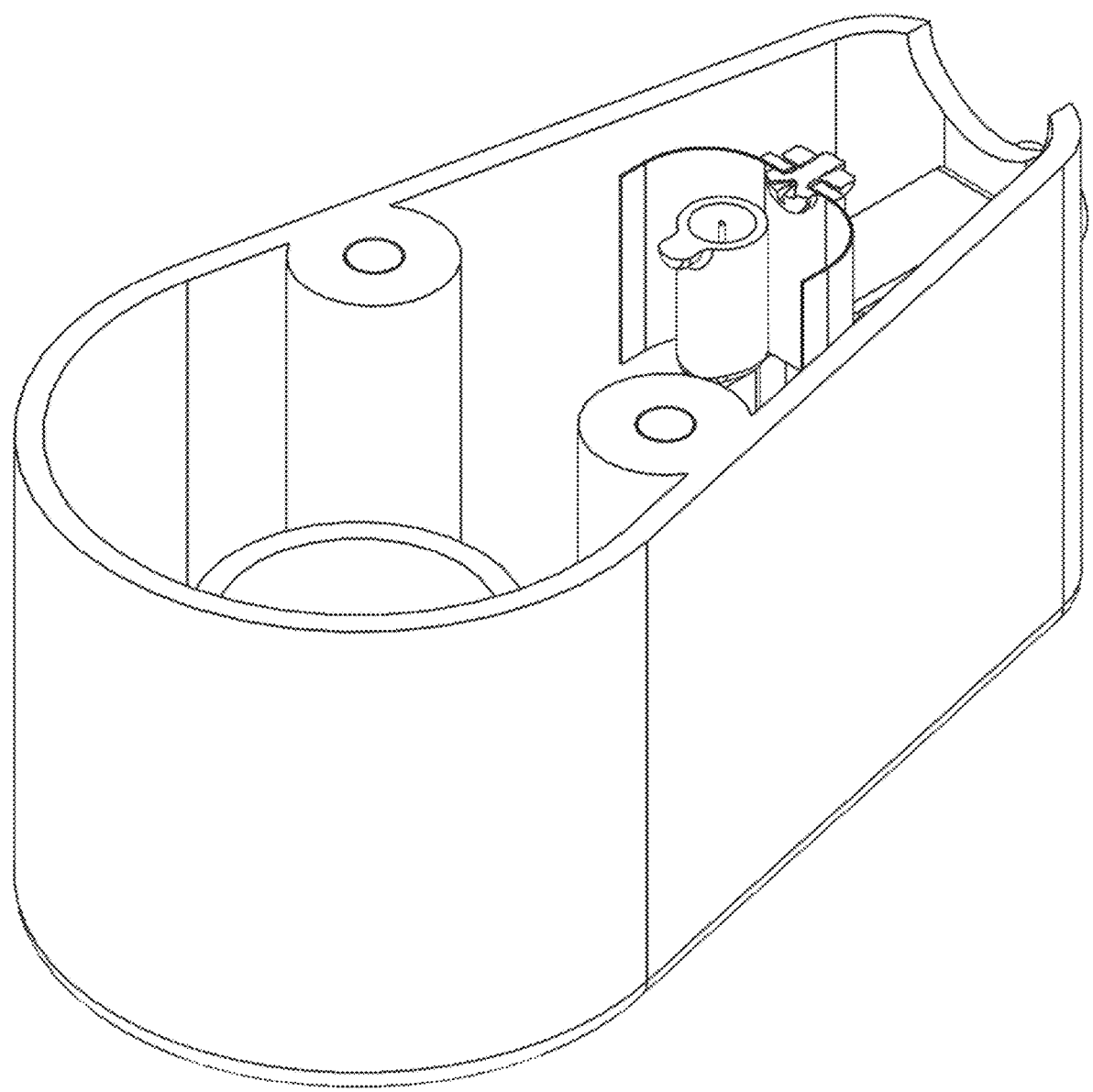
FIG. 84 illustrates a top right front perspective top side section view of a preferred exemplary beverage mixing vertical infrared heating source (IHS) system embodiment with heatshield removed.
Figure 85:
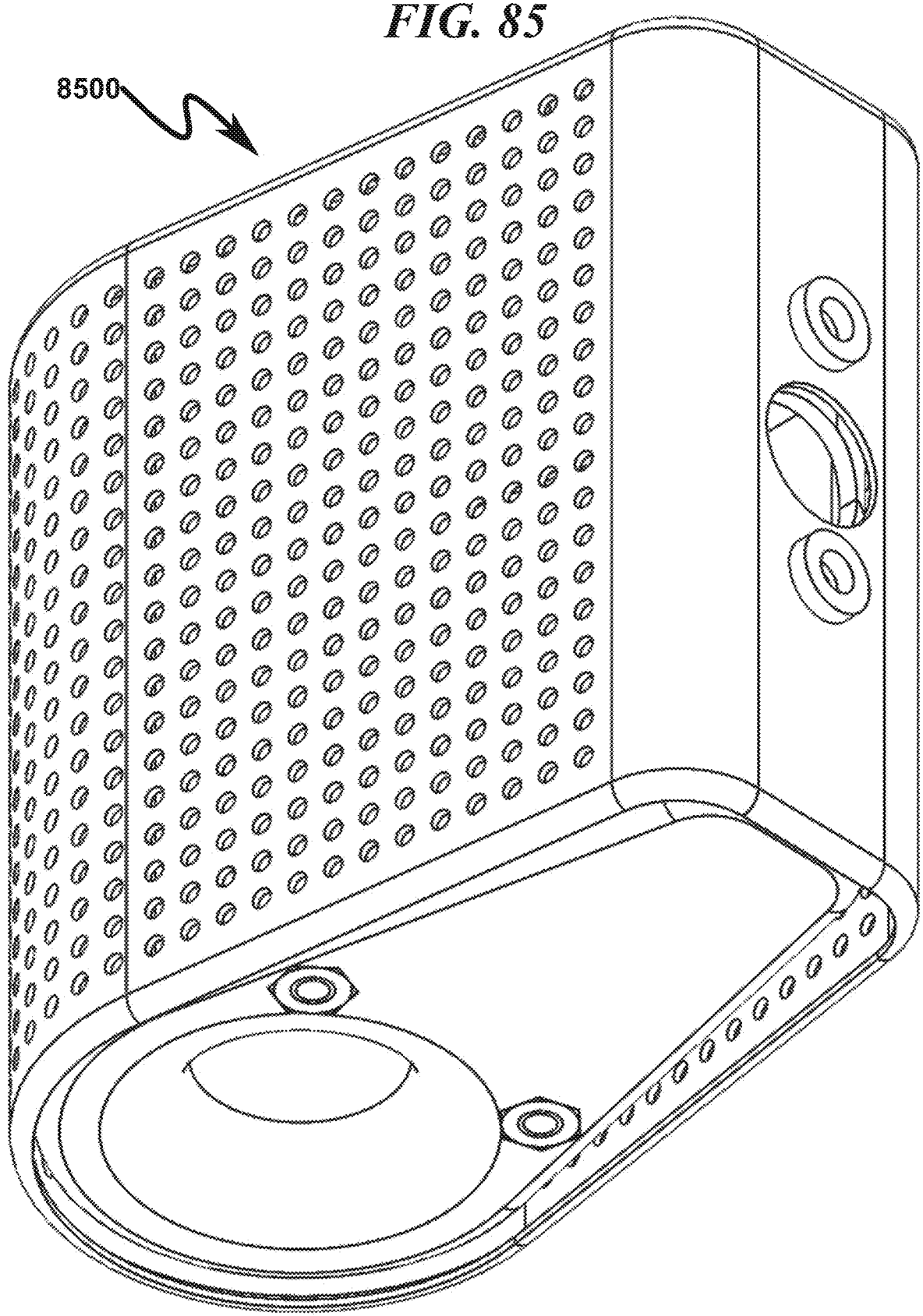
FIG. 85 illustrates a bottom right rear perspective view of a preferred exemplary beverage mixing vertical infrared heating source (IHS) system embodiment.
Figure 86:
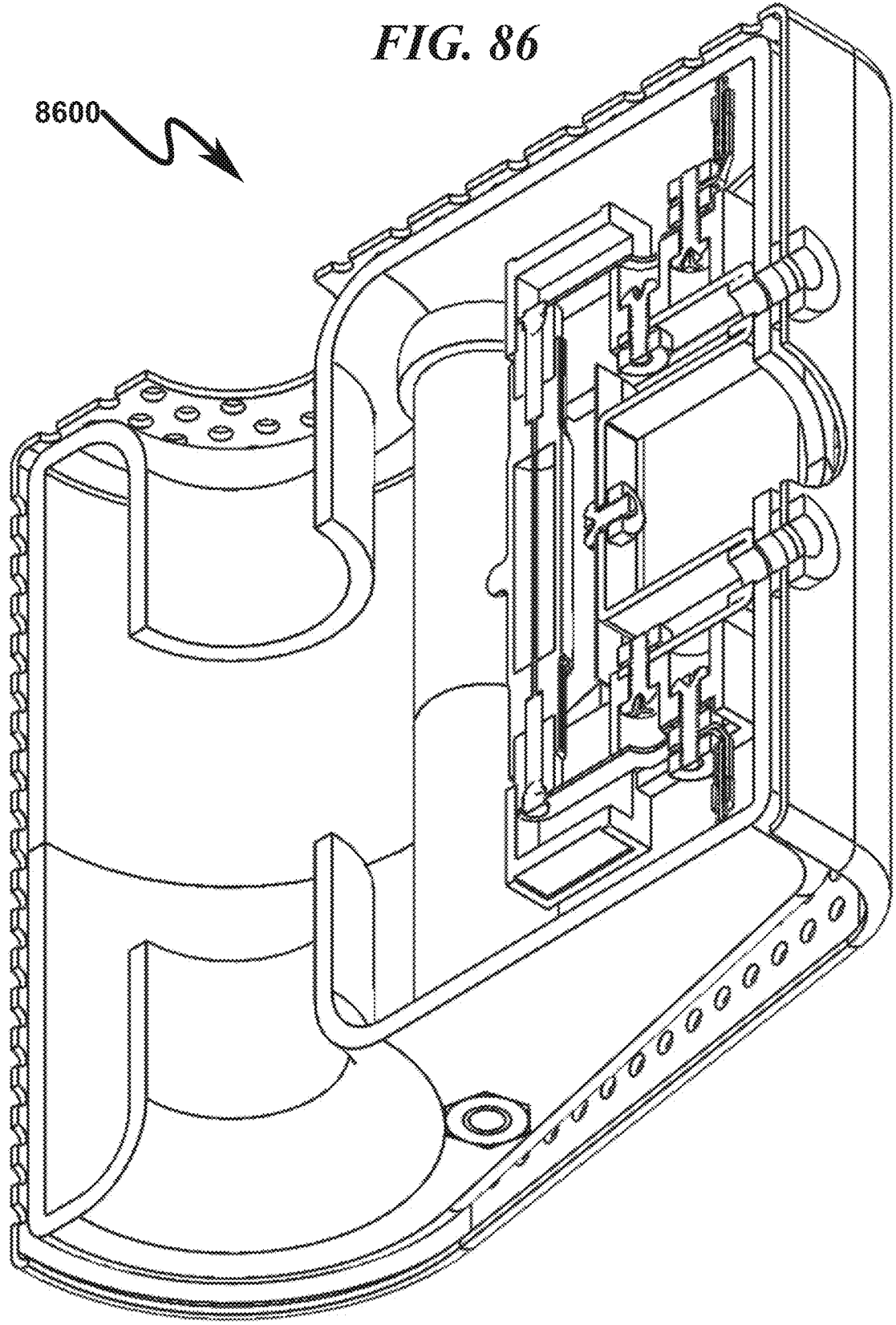
FIG. 86 illustrates a bottom right rear perspective right side section view of a preferred exemplary beverage mixing vertical infrared heating source (IHS) system embodiment.
Figure 87:
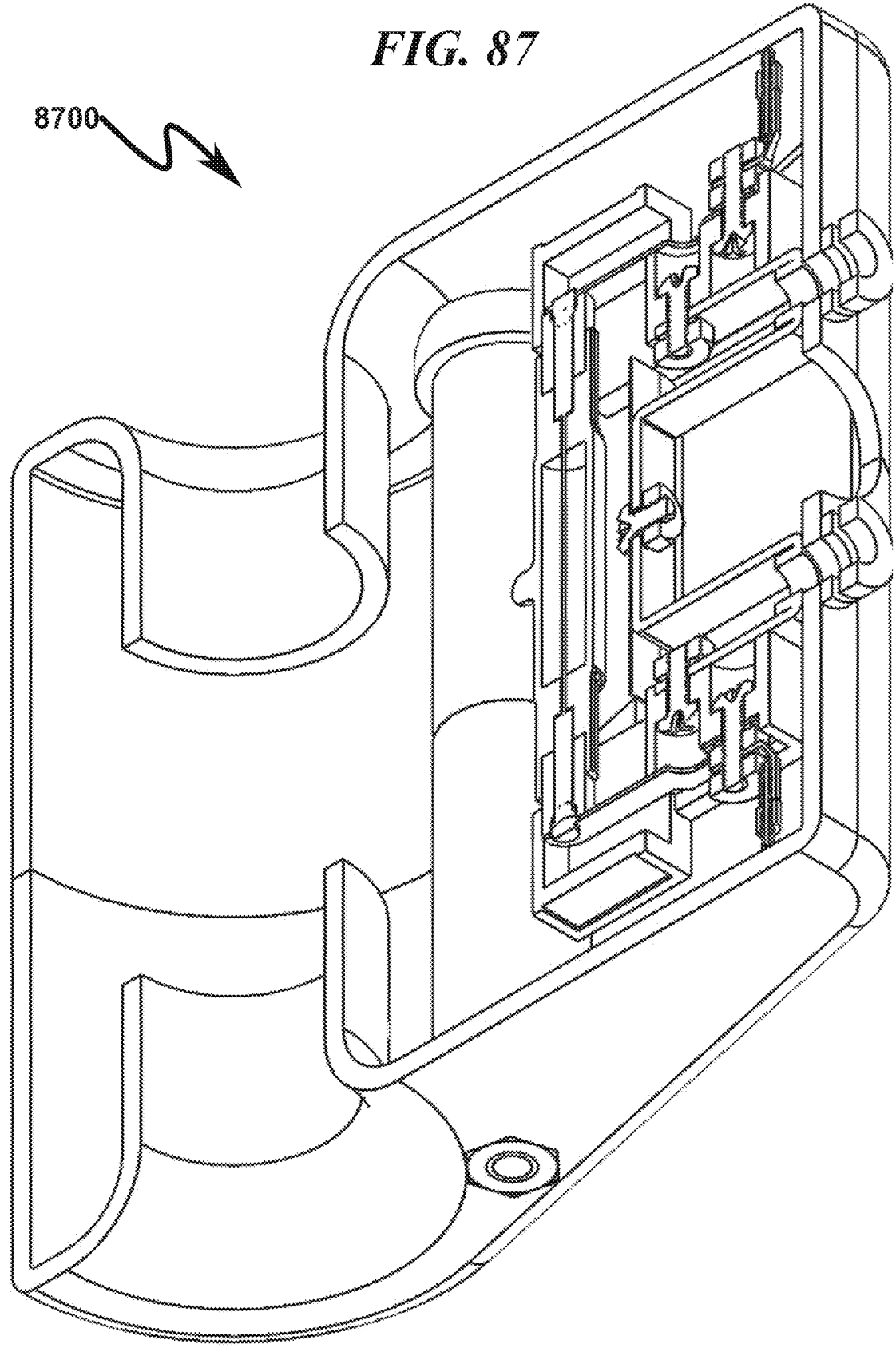
FIG. 87 illustrates a bottom right rear perspective right side section view of a preferred exemplary beverage mixing vertical infrared heating source (IHS) system embodiment with heatshield removed.
Figure 88:
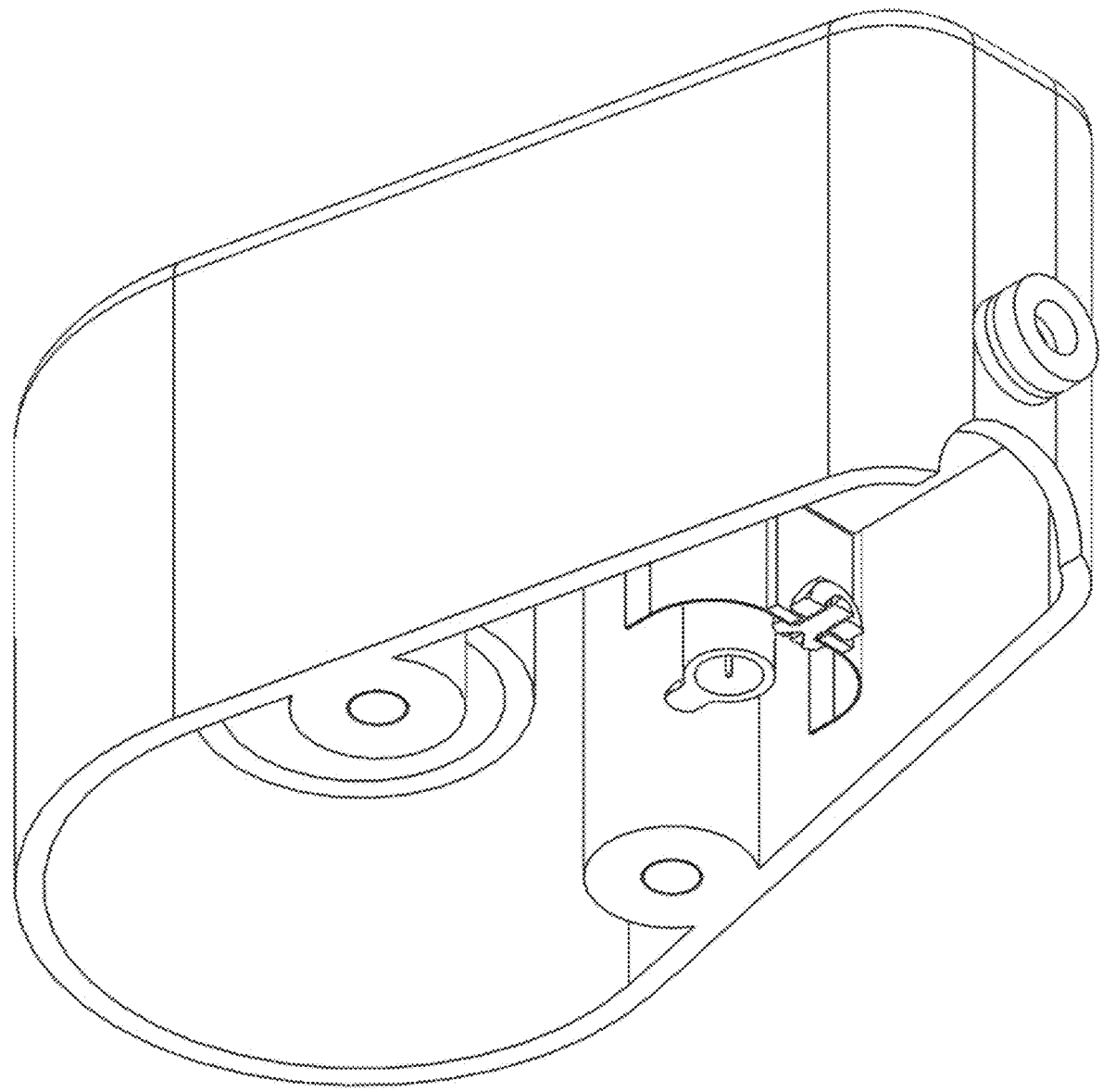
FIG. 88 illustrates a bottom right rear perspective top side section view of a preferred exemplary beverage mixing vertical infrared heating source (IHS) system embodiment with heatshield removed.

Exemplary construction of a vertical infrared heating source (IHS) is generally depicted in FIG. 81 (8100)-FIG. 88 (8800). As generally depicted in the sectional view of FIG. 82 (8200), this exemplary vertical IHS embodiment consists of a heat shield (8201) enclosing an internally reflective symmetrical two-piece clamshell (8202, 8203) that encloses a halogen lamp (8204) and internal directional reflector (8205). An aperture (8206) in the internally reflective clamshell (8202, 8203) encircles the MMD and its associated MMD heatsink and permits infrared radiation from the halogen lamp (8204) to be directed onto the MMD either directly or via the MMD heatsink.

The vertically oriented halogen lamp (8204) may be retained using a number of techniques known to those skilled in the art including a preferred ceramic receptacle incorporating stainless steel high temperature hardware. As the heat generated by the halogen lamp (8204) is sufficient to cause skin burning, a heat shield (8201) is generally required to enclose the internally reflective clamshell (8202, 8203) to prevent operator injury during use of the beverage mixing apparatus. Furthermore, it should be noted that heated air generated by the halogen lamp (8204) contained within the internally reflective clamshell (8202, 8203) may be directed downward along the outer surface of the MMD onto the beverage product by use of any number of helically-grooved heatsink embodiments that act as a fan to direct heated air within the internally reflective clamshell (8202, 8203) downward and onto the beverage product. Typical power dissipation by the halogen lamp (8204) in this configuration is anticipated to be in the range of 150 watts to 300 watts as a conventional 78 mm halogen lamp may be used in this vertical configuration.

Exemplary IIS Construction (8900)-(9600)

Figure 89:
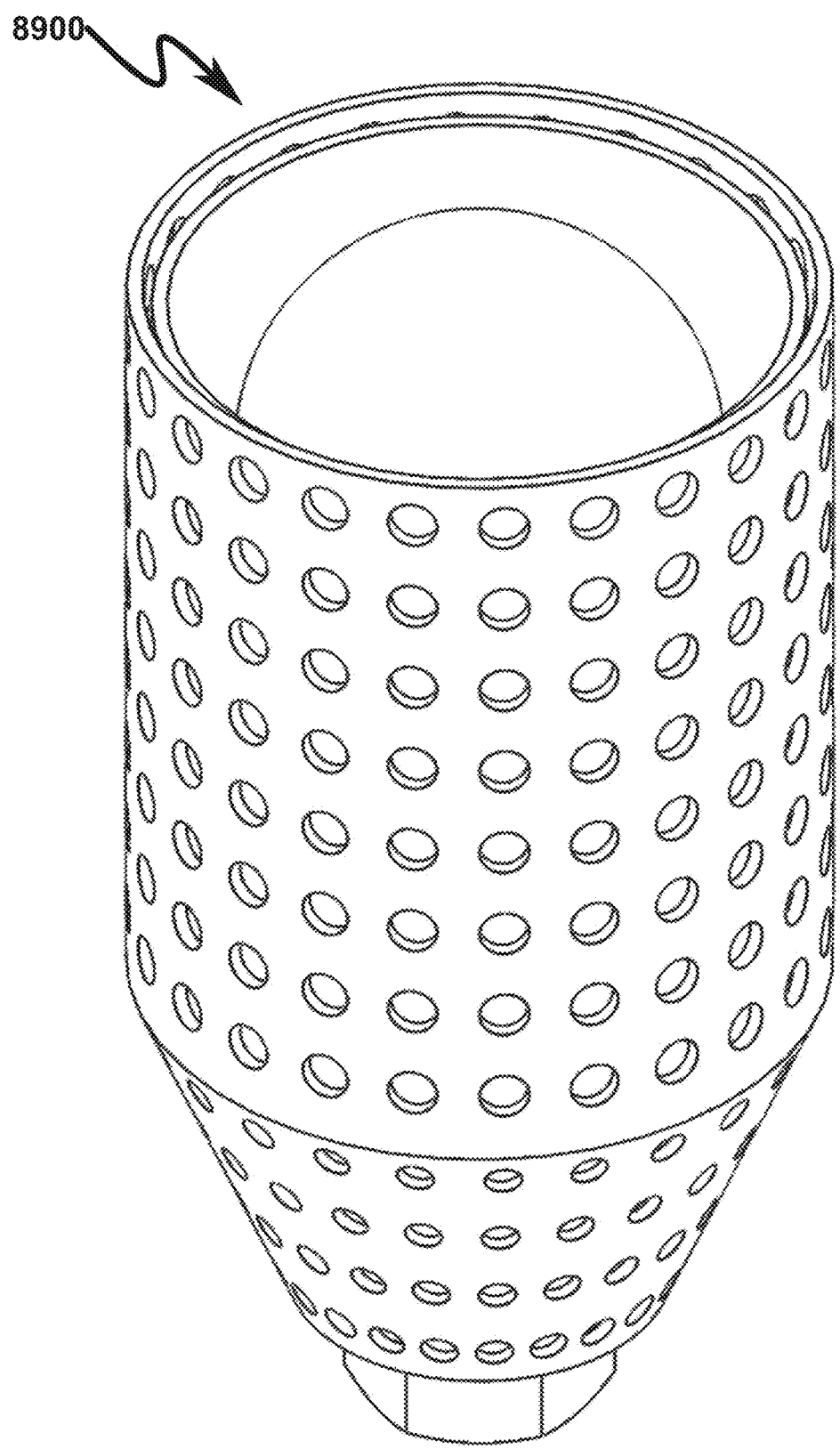
FIG. 89 illustrates a top right front perspective view of a preferred exemplary beverage mixing infrared irradiation source (IIS) system embodiment.
Figure 90:
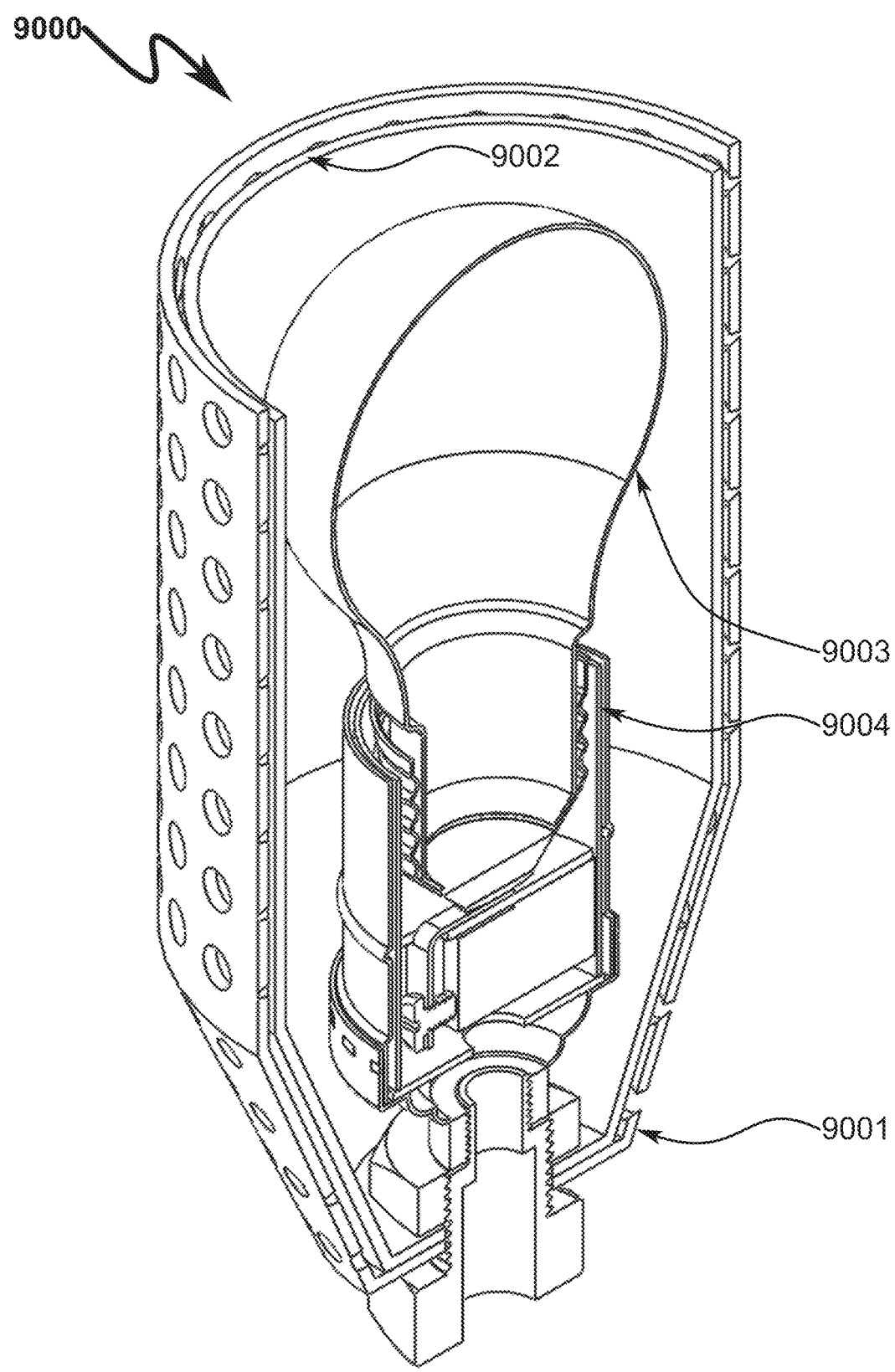
FIG. 90 illustrates a top right front perspective right side section view of a preferred exemplary beverage mixing infrared irradiation source (IIS) system embodiment.
Figure 91:
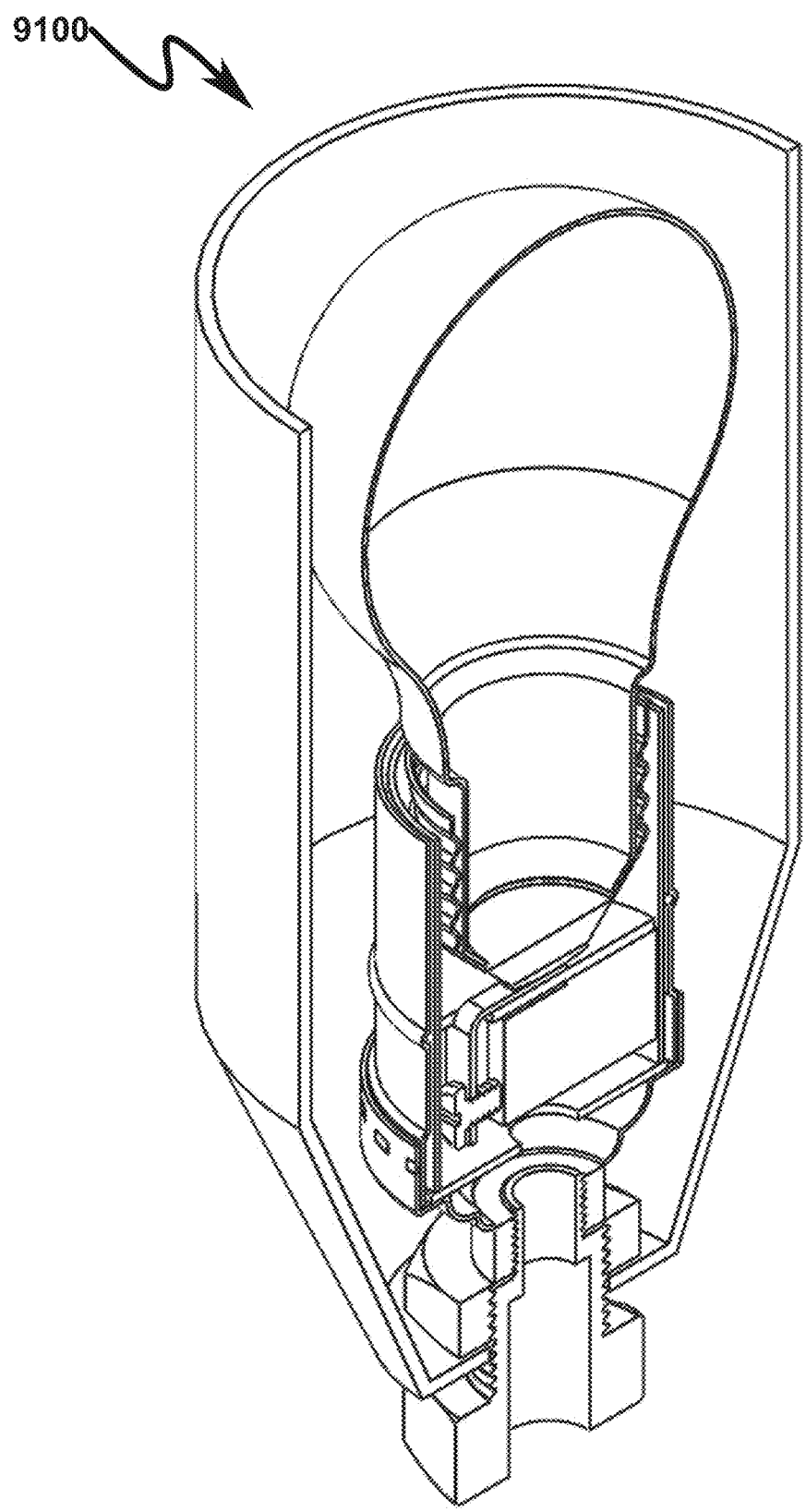
FIG. 91 illustrates a top right front perspective right side section view of a preferred exemplary beverage mixing infrared irradiation source (IIS) system embodiment with heatshield removed.
Figure 92:
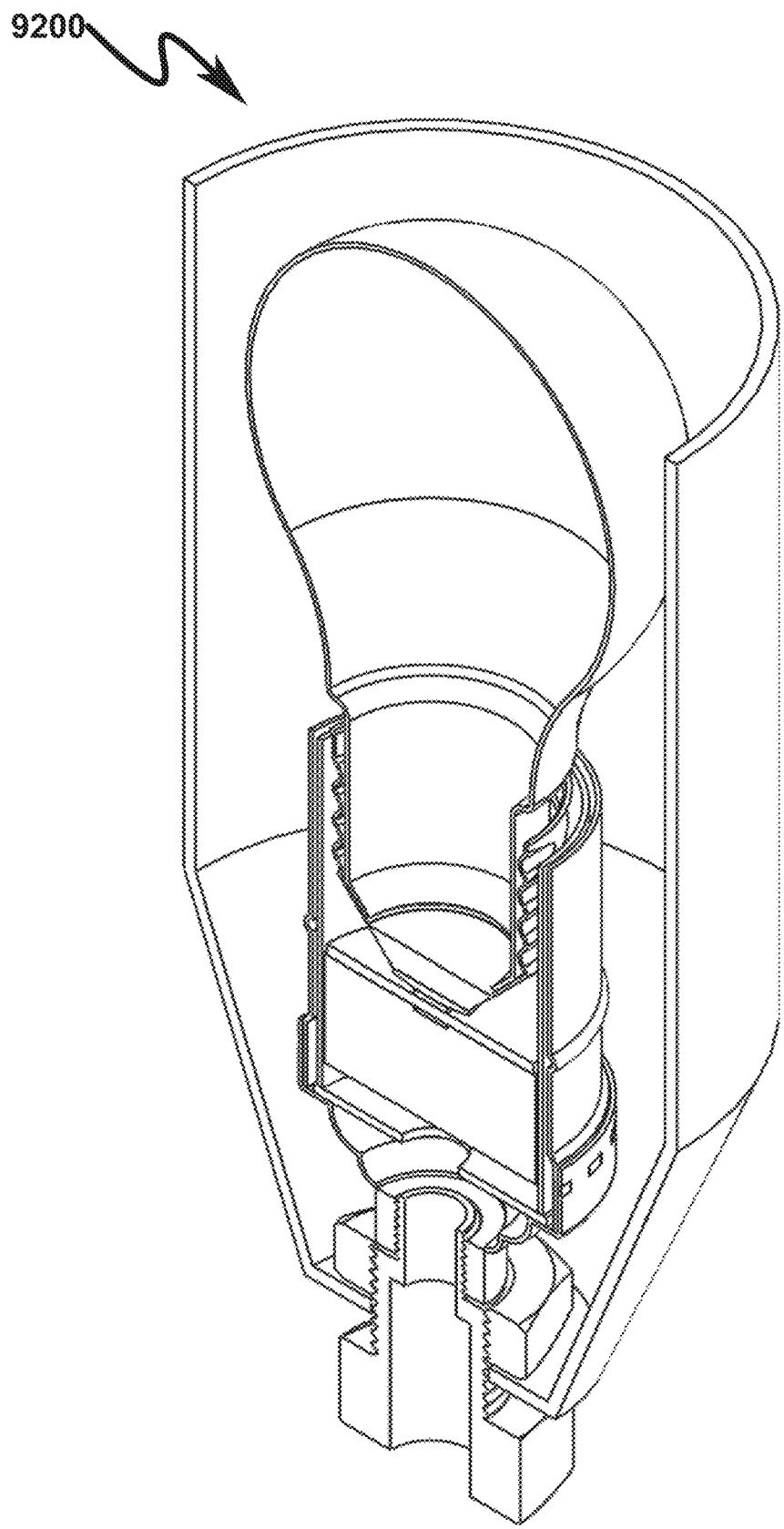
FIG. 92 illustrates a top right front perspective front side section view of a preferred exemplary beverage mixing infrared irradiation source (IIS) system embodiment with heatshield removed.
Figure 93:
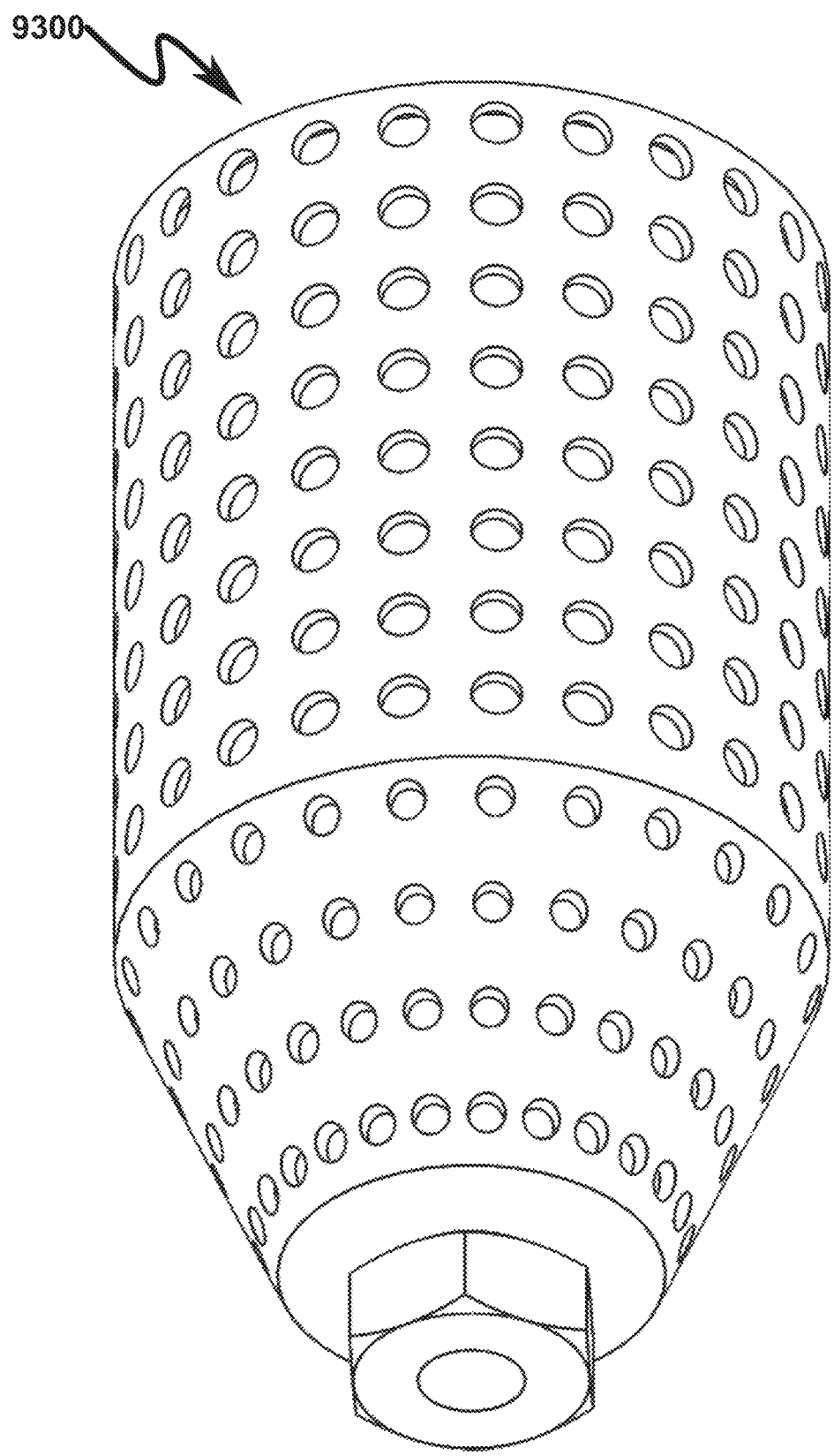
FIG. 93 illustrates a bottom right rear perspective view of a preferred exemplary beverage mixing infrared irradiation source (IIS) system embodiment.
Figure 94:
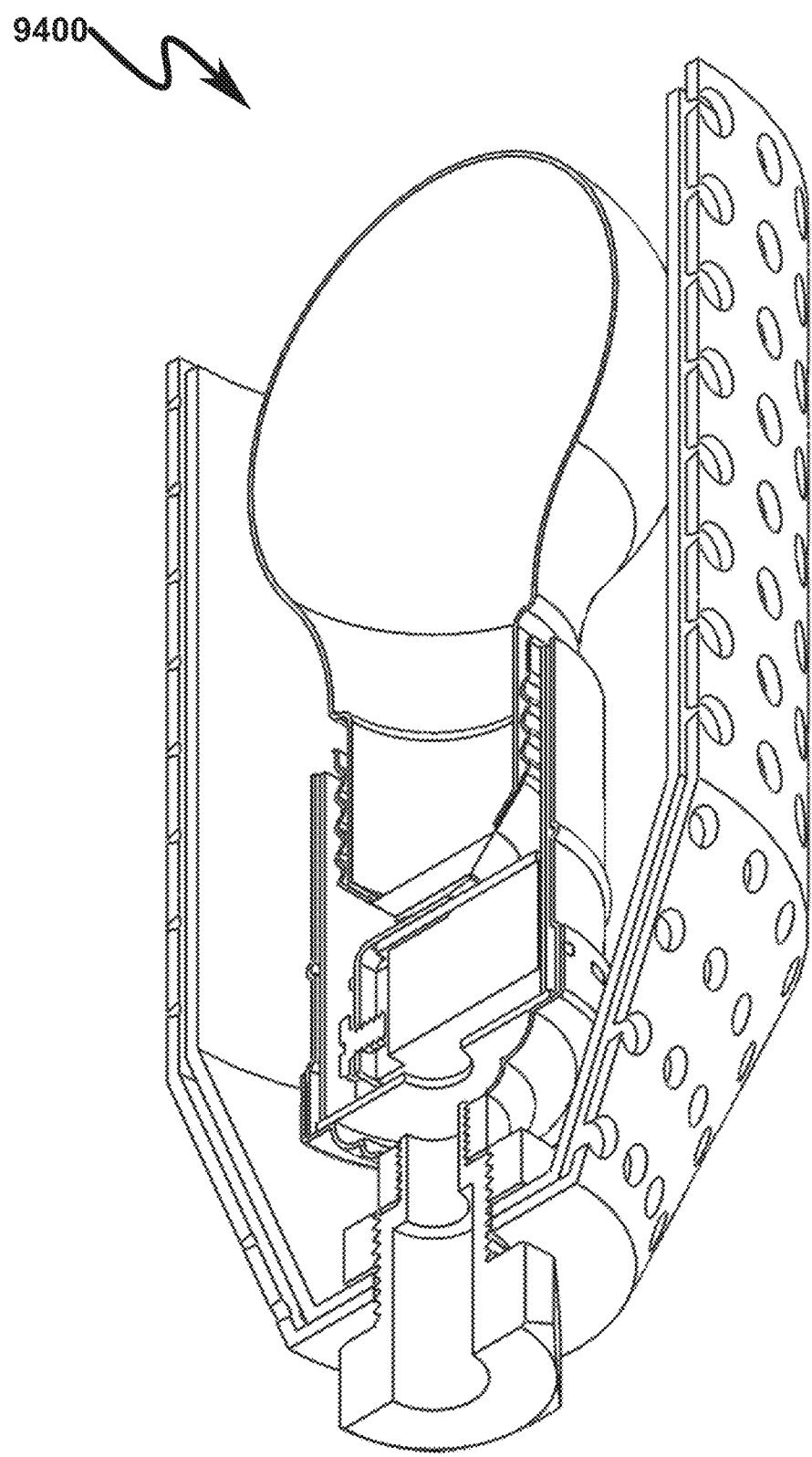
FIG. 94 illustrates a bottom right rear perspective right side section view of a preferred exemplary beverage mixing infrared irradiation source (IIS) system embodiment.
Figure 95:
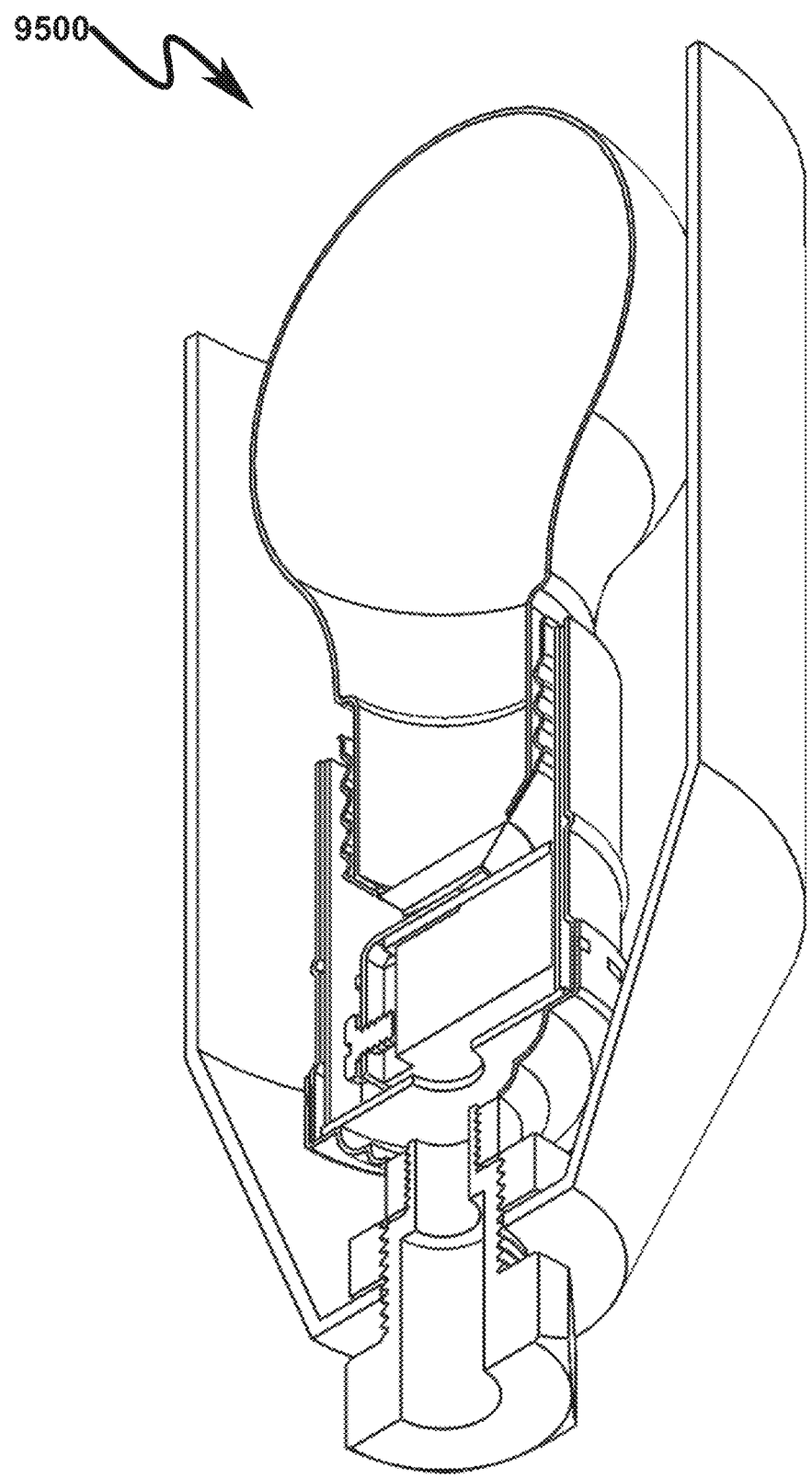
FIG. 95 illustrates a bottom right rear perspective right side section view of a preferred exemplary beverage mixing infrared irradiation source (IIS) system embodiment with heatshield removed.
Figure 96:
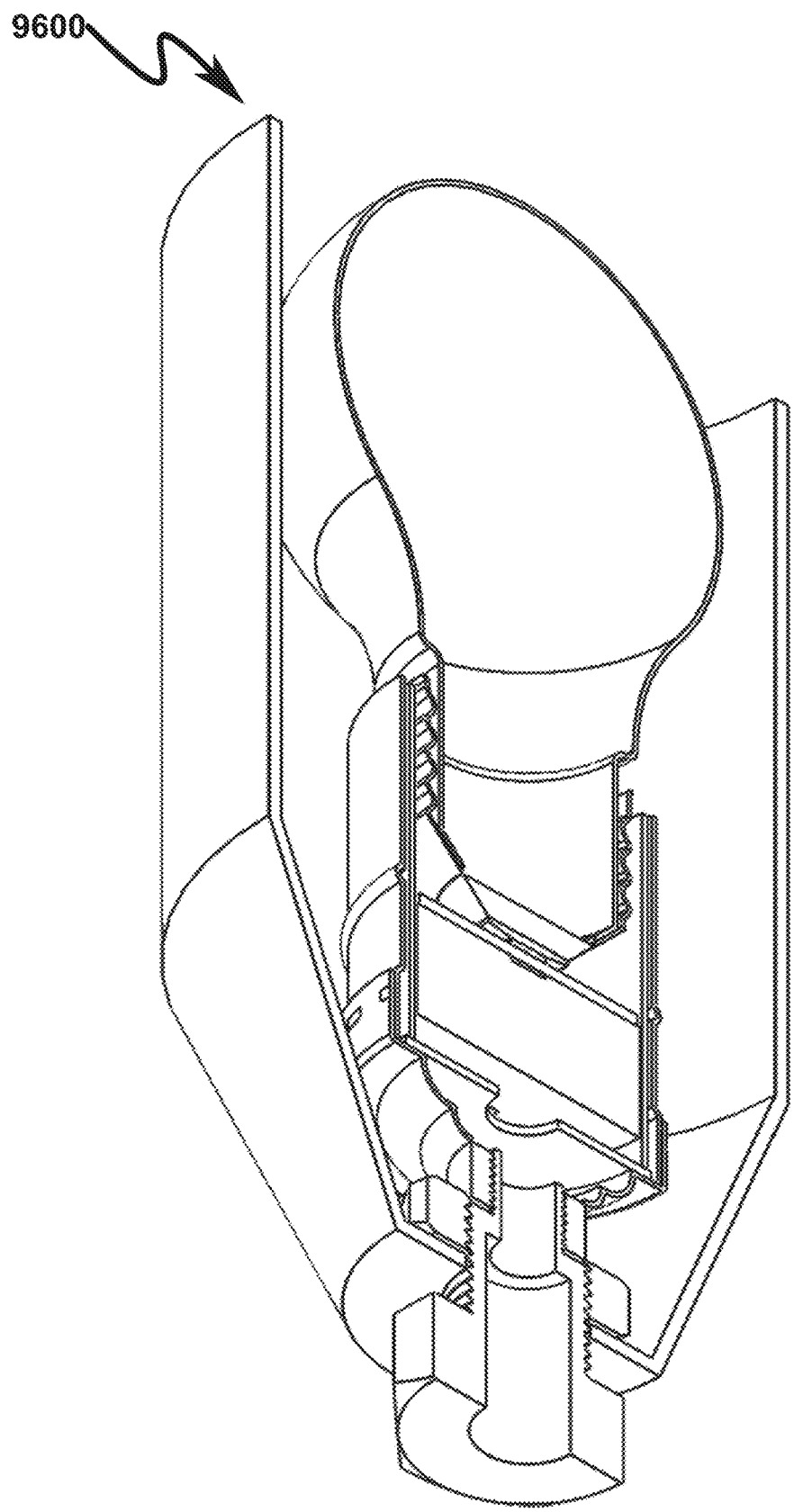
FIG. 96 illustrates a bottom right rear perspective front side section view of a preferred exemplary beverage mixing infrared irradiation source (IIS) system embodiment with heatshield removed.

Exemplary construction of an infrared irradiation source (IIS) configured to irradiate a beverage product in a mixing container is generally depicted in FIG. 89 (8900)-FIG. 96 (9600). As generally depicted in the sectional view of FIG. 90 (9000), this exemplary horizontal IHS embodiment consists of a heat shield (9001) enclosing a reflector (9002) that encloses an infrared lamp (9003). Infrared radiation emitted from the infrared lamp (9003) and reflected infrared radiation from the reflector (9002) are both directed toward the beverage product in the mixing container to directly impart heat into the beverage product.

The infrared lamp (9003) may be retained using a number of techniques known to those skilled in the art including a preferred embodiment Edison E26 screw socket (9004) which allows a wide variety of heating lamps to be used in this application. One skilled in the art will recognize that the heat shield (9001) and/or reflector (9002) may be modified to accommodate the specific infrared lamp (9003) configurations.

Preferred Embodiment System Summary

The present invention preferred exemplary system embodiment anticipates a wide variety of variations in the basic theme of construction, but can be generalized as a beverage mixing system comprising:
 (a) mechanical rotational driver (MRD);
 (b) mechanical mixing driveshaft (MMD);
 (c) mechanical mixing agitator (MMA); and
 (d) infrared heating source (IHS);
wherein:
 the MRD is mechanically coupled to and configured to rotate the MMD;
 the MMD is mechanically coupled to the MMA;
 the MMA is configured to mix or blend a beverage product within a mixing container;
 the IHS is configured to optically heat the MMD.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a beverage mixing method comprising:
 (1) mechanically coupling a mechanical rotational driver (MRD) to a mechanical mixing driveshaft (MMD);
 (2) mechanically coupling the MMD to a mechanical mixing agitator (MMA);
 (3) activating an infrared heating source (IHS) to optically heat the MMD and by conduction heating the MMA; and
 (4) activating the MRD to rotate the heated MMA within a beverage product placed in a container to modify the beverage product viscosity and proceeding to the step (3) until a desired beverage product viscosity is reached.

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the MMD comprises a material selected from a group consisting of: ferromagnetic steel; ferromagnetic stainless steel; SS430 stainless steel; copper plated metal; copper plated steel; and copper-over-nickel plated steel.

An embodiment wherein the MID comprises a heatsink configured to absorb infrared radiation from the HIS, the heatsink selected from a group consisting of: a surface coating on the MMD; a painted surface on the MMD; a solid cylindrical sleeve having a peripheral outer diameter larger than that of the MMD; a vertically grooved cylindrical sleeve having a peripheral outer diameter larger than that of the MMD; and a helically grooved cylindrical sleeve having a peripheral outer diameter larger than that of the MMD.

An embodiment wherein the IHS comprises a halogen lamp.

An embodiment wherein the IHS comprises a halogen lamp contained within a light-focusing enclosure (LFE) that encircles the MMD, the LFE configured to concentrate infrared radiation emitted from the halogen lamp onto the MMD.

An embodiment wherein the IHS comprises a halogen lamp contained within a light-focusing enclosure (LFE) that encircles the MMD, the LFE configured to concentrate infrared radiation emitted from the halogen lamp onto the MMD, and the LFE configured to direct some infrared radiation emitted from the halogen lamp onto the beverage product.

An embodiment wherein the IHS comprises a halogen lamp contained within a light-focusing enclosure (LFE) that encircles the MMD, the LFE configured to concentrate infrared radiation emitted from the halogen lamp onto the MMD, and the LFE comprising a protective heat shield (PHS) configured to prevent physical operator contact with the LFE.

An embodiment wherein the system further comprises an infrared irradiation source (IIS) configured to irradiate the beverage product.

An embodiment wherein the MMD is attached to the MRD with a mechanical shaft coupler (MSC), the MSC comprising a thermally insulating material (TIM) further comprising recessed cavities that mate with corresponding projections in an endshaft of the MRD and an endshaft of the MMD, each of the recessed cavities having a shape independently selected from a group consisting of: cylindrical shaft; spline shaft; TORX® shaft; regular polyhedron shaft profile; and WOODRUFF-style keyed shaft profile.

An embodiment wherein the TIM is selected from a group consisting of: TEFLON® brand polytetrafluoroethylene (PTFE) (synthetic fluoropolymer of tetrafluoroethylene); TORLON® brand polyamide-imide (PAI) (a reaction product of trimellitic anhydride and aromatic diamines); VESPEL® brand polyimide plastic; and DELRIN® brand polyoxymethylene (POM) (also known as acetal, polyacetal, and polyformaldehyde).

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d1383 (U.S. Pat. No. 5,710, 578), the present invention anticipates and includes this type of computer readable media within the scope of the invention. Pursuant to In re Nuijten, 500 F.3d1346 (Fed. Cir. 2007) (U.S. patent application Ser. No. 09/211,928), the present invention scope is limited to computer readable media wherein the media is both tangible and non-transitory.

CONCLUSION

A beverage mixing system/method allowing faster mixing/blending of frozen beverages has been disclosed. The system/method in various embodiments utilizes inductive coupling to introduce heat into the frozen beverage during the mixing/blending process via a rotating driveshaft and attached mechanical agitator to speed the mixing/blending process. Exemplary embodiments may be configured to magnetically induce heat into the driveshaft and/or mechanical agitator mixing blade to affect this mixing/blending performance improvement. This heating effect may be augmented via the use of high power LED arrays aimed into the frozen slurry to provide additional heat input. The system/method may be applied with particular advantage to the mixing of ice cream type beverages and other viscous beverage products.

What is claimed is:

1. A beverage mixing system comprising:
    (a) rotational driver;
    (b) driveshaft;
    (c) mechanical agitator;
    (d) induction coil; and
    (e) coil stimulator;
    wherein
    said rotational driver is mechanically coupled to and configured to rotate said driveshaft;
    said driveshaft comprises a solid copper shaft having a ferromagnetic or ferrous iron slug contained within a void formed within said driveshaft,
    said driveshaft is mechanically coupled to said mechanical agitator;
    said mechanical agitator is configured to mix or blend a beverage product within a mixing container;
    said induction coil is magnetically coupled to said driveshaft;
    said induction coil is configured to inductively generate heat in said slug when said induction coil is electrically driven; and
    said coil stimulator is electrically coupled to said induction coil and electrically drives said induction coil at an; excitation frequency.

2. The beverage mixing system of claim 1, wherein said void is formed in an opposing end of said driveshaft from where mechanically coupled to said mechanical agitator.

3. The beverage mixing system of claim 1, wherein said void has a shape that is complementary to the shape of said slug.

4. The beverage mixing system of claim 3, wherein said void and slug are cylindrically shaped.

5. The beverage mixing system of claim 1, wherein said induction coil comprises Litz wire.

6. The beverage mixing system of claim 1, wherein said induction coil further comprises an enclosure further comprising a shaft sensor.

7. The beverage mixing system of claim 1, wherein said driveshaft is metal plated.

8. The beverage mixing system of claim 7, wherein said driveshaft is nickel plated.

9. The beverage mixing system of claim 1, wherein said driveshaft is polymer coated.

10. The beverage mixing system of claim 1, wherein said driveshaft is attached to said rotational driver with a mechanical coupler.

11. The beverage mixing system of claim 10, wherein said mechanical coupler comprises a thermally insulating material further comprising recessed cavities that mate with corresponding projections in the endshaft of said rotational driver and the endshaft of said driveshaft, each of said recessed cavities having a shape independently selected from a group consisting of: cylindrical shaft, spline shaft, TORX® shaft, regular polyhedron shaft profile, and WOODRUFF-style keyed shaft profile.

12. The beverage mixing system of claim 11, wherein said thermally insulating material is selected from a group consisting of TEFLON®, TORLON®, VESPEL®, and DELRIN®.

13. The beverage mixing system of claim 1, wherein said excitation frequency is fixed at the resonant frequency of an LC tank circuit comprising said induction coil.

14. The beverage mixing system of claim 1, wherein said excitation frequency may be adjusted to deviate above and/or below the resonant frequency of an LC tank circuit comprising said induction coil.

15. The beverage mixing system of claim 1, wherein said excitation frequency is selected from a group consisting of: a counting number multiple of 50 Hz; a counting number multiple of 60 Hz; and an ultrasonic frequency.

16. The beverage mixing system of claim 1, wherein said system further comprises an infrared irradiation source configured to irradiate said beverage product.

17. The beverage mixing system of claim 1, wherein said system further comprises an infrared irradiation source configured to irradiate said beverage product, said infrared irradiation source configured within and irradiating outward from the enclosure that contains said induction coil.

18. The beverage mixing system of claim 1, wherein said system further comprises a computerized control system configured to manage the activation and operation of said rotational driver and said coil stimulator.

19. The beverage mixing system of claim 18, wherein said computerized control system modulates the heat generated by said induction coil within said slug using a modulation technique selected from a group consisting of: pulse width modulation; pulse frequency modulation; and pulse train duty cycle modulation.

20. The beverage mixing system of claim 18, wherein said computerized control system further comprises a rotational speed sensor configured to detect the rotation speed of said driveshaft, said rotational speed sensor selected from a group consisting of: optical speed sensor; Hall effect sensor; and magnetic pickup sensor.

21. The beverage mixing system of claim 18, wherein said computerized control system further comprises a rotational driver load sensor configured to detect the power consumed by said rotational driver, said rotational driver load sensor selected from a group consisting of: shunt detector in series with the electrical stimulus supplying power to said rotational driver; and inductive pickup detector in series with the electrical stimulus supplying power to said rotational driver.

22. The beverage mixing system of claim 18, wherein said computerized control system further comprises an infrared temperature sensor configured to detect the temperature of said driveshaft.

23. The beverage mixing system of claim 18, wherein said computerized control system further comprises a user interface control panel configured to accept heating and dwell time parameters.

24. The beverage mixing system of claim 18, wherein said computerized control system further comprises a user interface control panel configured to allow definition of pre-programmed recipes in a recipe memory for execution of heating and dwell time parameters to a beverage product.

25. The beverage mixing system of claim 18, wherein said computerized control system is configured to initiate a cooldown period for said driveshaft after said driveshaft heating is terminated using said induction coil during which time said rotational driver activity is maintained by said computerized control system.

26. A beverage mixing method comprising:
(1) mechanically coupling a rotational driver to a driveshaft, wherein said driveshaft comprises a solid copper shaft having a ferromagnetic or ferrous iron slug contained within said driveshaft;
(2) mechanically coupling said driveshaft to a mechanical agitator;
(3) magnetically coupling said slug contained within said driveshaft to induction coil;
(4) stimulating said induction coil with an electrical drive signal at an excitation frequency to inductively generate heat in said slug and by conduction heat said driveshaft and said mechanical agitator; and
(5) activating said rotational driver to rotate said heated mechanical agitator within a beverage product placed in a container to modify said beverage product viscosity and proceeding to said step (4) until a desired beverage product viscosity is reached.

27. The beverage mixing method of claim 26, wherein said induction coil comprises Litz wire.

28. The beverage mixing method of claim 26, wherein said induction coil further comprises an enclosure further comprising a shaft sensor.

29. The beverage mixing method of claim 26, wherein said driveshaft is metal plated or polymer coated.

30. The beverage mixing method of claim 26, wherein said driveshaft is attached to said rotational driver with a mechanical coupler.

31. The beverage mixing method of claim 30, wherein said mechanical coupler comprises a thermally insulating material further comprising recessed cavities that mate with corresponding projections in the endshaft of said rotational driver and the endshaft of said driveshaft, each of said recessed cavities having a shape independently selected from a group consisting of: cylindrical shaft, spline shaft, TORX® shaft, regular polyhedron shaft profile, and WOODRUFF-style keyed shaft profile.

32. The beverage mixing method of claim 31, wherein said thermally insulating material is selected from a group consisting of: TEFLON®, TORLON®, VESPEL®, and DELRIN®.

33. The beverage mixing method of claim 26, wherein said excitation frequency is fixed at the resonant frequency of an LC tank circuit comprising said induction coil.

34. The beverage mixing method of claim 26, wherein said excitation frequency may be adjusted to deviate above and/or below the resonant frequency of an LC tank circuit comprising said induction coil.

35. The beverage mixing method of claim 26, wherein said excitation frequency is selected from a group consisting of: a counting number multiple of 50 Hz; a counting number multiple of 60 Hz; and an ultrasonic frequency.

36. The beverage mixing method of claim 26, wherein said method further comprises irradiating said beverage product with an infrared irradiation source.

37. The beverage mixing method of claim 26, wherein said infrared irradiation source is configured within and irradiates outward from the enclosure that contains said induction coil.

38. The beverage mixing method of claim 26, wherein said method further comprises managing the activation and operation of said rotational driver and said coil stimulator with a computerized control system.

39. The beverage mixing method of claim 38, wherein said computerized control system modulates the heat generated by said induction coil within said driveshaft using a modulation technique selected from a group consisting of: pulse width modulation; pulse frequency modulation; and pulse train duty cycle modulation.

40. The beverage mixing method of claim 38, wherein said computerized control system further comprises a rotational speed sensor configured to detect the rotation speed of said driveshaft, said rotational speed sensor selected from a group consisting of: optical speed sensor; Hall effect sensor; and magnetic pickup sensor.

41. The beverage mixing method of claim 38, wherein said computerized control system further comprises a rotational driver load sensor configured to detect the power consumed by said rotational driver, said rotational driver load sensor selected from a group consisting of: shunt detector in series with the electrical stimulus supplying power to said rotational driver; and inductive pickup detector in series with the electrical stimulus supplying power to said rotational driver.

42. The beverage mixing method of claim 38, wherein said computerized control system further comprises an infrared temperature sensor configured to detect the temperature of said driveshaft.

43. The beverage mixing method of claim 38, wherein said computerized control system further comprises a user interface control panel configured to accept heating and dwell time parameters.

44. The beverage mixing method of claim 38, wherein said computerized control system further comprises a user interface control panel configured to allow definition of pre-programmed recipes in a recipe memory for execution of heating and dwell time parameters to a beverage product.

45. The beverage mixing method of claim 38, herein said computerized control system is configured to initiate a cooldown period for said driveshaft after said driveshaft heating is terminated using said induction coil during which time said rotational driver activity is maintained by said computerized control system.

\* \* \* \* \*